US012719579B2

(12) United States Patent
Wang et al.

(10) Patent No.: US 12,719,579 B2
(45) Date of Patent: Aug. 25, 2026

(54) CENTRAL UNIT AND REMOTE UNIT

(71) Applicant: HUAWEI TECHNOLOGIES CO., LTD., Shenzhen (CN)

(72) Inventors: Tianxiang Wang, Shenzhen (CN); Xu Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1057 days.

(21) Appl. No.: 17/834,442

(22) Filed: Jun. 7, 2022

(65) Prior Publication Data

US 2022/0303013 A1 Sep. 22, 2022

Related U.S. Application Data

(63) Continuation of application No. PCT/CN2020/134381, filed on Dec. 8, 2020.

(30) Foreign Application Priority Data

Dec. 9, 2019 (CN) ........................ 201911252880.0

(51) Int. Cl.
*H01S 3/00* (2006.01)
*H04B 10/27* (2013.01)
(Continued)

(52) U.S. Cl.
CPC ........... *H04B 10/294* (2013.01); *H04B 10/27* (2013.01); *H04B 10/506* (2013.01);
(Continued)

(58) Field of Classification Search
CPC .... H04B 10/294; H04B 10/27; H04B 10/506; H04B 10/614; H04B 10/40; H04J 14/02764
See application file for complete search history.

(56) References Cited

U.S. PATENT DOCUMENTS

2014/0072298 A1 3/2014 Hou
2014/0320346 A1* 10/2014 Caille ................ G02B 6/29386 385/24
2018/0332372 A1* 11/2018 Liu .................. H04B 10/25754

FOREIGN PATENT DOCUMENTS

CN 102457458 A 5/2012
CN 103338084 A 10/2013
(Continued)

OTHER PUBLICATIONS

Office Action issued in Chinese Application No. 201911252880.0 on Dec. 9, 2021, 13 pages (with English translation).
(Continued)

*Primary Examiner* — Mark Hellner
(74) *Attorney, Agent, or Firm* — Fish & Richardson P.C.

(57) ABSTRACT

The present disclosure relates to central units and remote units. One example central unit includes at least one digital-to-analog converter (DAC), at least one first electro-optical converter configured to convert an analog electrical signal output by the DAC into an analog optical signal, at least one first optical processor configured to process the analog optical signal output by the first electro-optical converter, where the first optical processor includes at least one of at least one first optical filter, at least one first optical phase shifter, and at least one first optical power amplifier, a first multiplexer configured to combine analog optical signals output by the first optical processor into one analog optical signal, and a first demultiplexer configured to decompose the one analog optical signal into multiple analog optical signals at different wavelengths.

20 Claims, 117 Drawing Sheets

(51) Int. Cl.

| | |
|---|---|
| ***H04B 10/294*** | (2013.01) |
| ***H04B 10/50*** | (2013.01) |
| ***H04B 10/61*** | (2013.01) |
| ***H04J 14/02*** | (2006.01) |
| *H04B 10/40* | (2013.01) |

(52) U.S. Cl.
CPC ...... *H04B 10/614* (2013.01); *H04J 14/02764* (2023.08); *H04B 10/40* (2013.01)

(56) References Cited

FOREIGN PATENT DOCUMENTS

| | | | |
|---|---|---|---|
| CN | 106304420 | A | 1/2017 |
| CN | 107534487 | A | 1/2018 |
| CN | 110121218 | A | 8/2019 |
| CN | 110166097 | A | 8/2019 |
| WO | 2016066104 | A1 | 5/2016 |
| WO | 2018013756 | A1 | 1/2018 |
| WO | 2018205876 | A1 | 11/2018 |

OTHER PUBLICATIONS

PCT International Search Report and Written Opinion issued in International Application No. PCT/CN2020/134381 on Mar. 10, 2021, 15 pages (with English translation).

Zeb et al., "High Capacity Mode Division Multiplexing Based MIMO Enabled All-Optical Analog Millimeter-Wave Over Fiber Fronthaul Architecture for 5G and Beyond," IEEE Access, vol. 7, Jul. 2, 2019, 12 pages.

Wake et al., "Radio Over Fiber Link Design for Next Generation Wireless Systems," Journal of Lightwave Technology, vol. 28, No. 16, Aug. 15, 2010, 9 pages.

Liu et al., "Efficient mobile fronthaul transmission of multiple LTE-A signals with 36.86-GB/s CPRI-equivalent data rate using a directly-modulated laser and fiber dispersion mitigation," In 2014 Asia Communications and Photonics Conference (ACP), Nov. 11, 2014, 3 pages.

Extended European Search Report in European AppIn No. 20897704.1, dated Dec. 15, 2022, 11 pages.

* cited by examiner

CENTRAL UNIT AND REMOTE UNIT

CROSS-REFERENCE TO RELATED APPLICATIONS

This application is a continuation of International Application No. PCT/CN2020/134381, filed on Dec. 8, 2020, which claims priority to Chinese Patent Application No. 201911252880.0, filed on Dec. 9, 2019. The disclosures of the aforementioned applications are hereby incorporated by reference in their entireties.

TECHNICAL FIELD

This application relates to the communications field, and more specifically, to a central unit and a remote unit.

BACKGROUND

In recent years, wired optical communications technologies rapidly develop in fields such as data centers, metropolitan area networks, and fronthaul links of wireless communications systems. In wired optical communication, an electrical signal at a transmit end is modulated into an optical signal by an electro-optical modulator, then the optical signal is propagated through an optical fiber, and finally the optical signal at a receive end is converted into an electrical signal by an optical-to-electrical converter.

Currently, the fronthaul link of the wireless communications system includes many electronic components (for example, an intermediate frequency module and a radio frequency module) regardless of whether wired digital optical communication or wired analog optical communication is used. The wireless communications system gradually develops toward multi-frequency band or high-frequency. When the fronthaul link of the wireless communications system needs to support a multi-frequency band or high-frequency system, performance such as frequencies and bandwidths of the electronic components is limited due to a limitation of a physical material process and the like of the electronic components. As a result, these electronic components cannot well support the multi-frequency band or high-frequency system. This is an urgent problem to be resolved.

SUMMARY

This application provides a central unit and a remote unit. An optical processing component is disposed in each of the central unit and the remote unit, so that the central unit and the remote unit can support multi-frequency band or high-frequency communication when the central unit and the remote unit use a wired analog optical communications technology. This ensures communication quality and efficiency in a multi-frequency band or high-frequency system.

According to a first aspect, a central unit is provided, where the central unit includes:

at least one digital-to-analog converter (DAC), where the DAC is configured to convert a digital electrical signal into an analog electrical signal;

at least one first electro-optical module, where the first electro-optical module is configured to: obtain the analog electrical signal output by the DAC, and convert the analog electrical signal into an analog optical signal;

at least one first optical processing module, where the first optical processing module is configured to: obtain the analog optical signal output by the first electro-optical module, and output an analog optical signal processed by the first optical processing module; and the first optical processing module includes at least one of: at least one first optical filter, at least one first optical phase shifter, and at least one first optical power amplifier;

a first multiplexer, configured to combine analog optical signals output by the first optical processing module into one analog optical signal; and/or a first demultiplexer, configured to decompose the one analog optical signal into a plurality of analog optical signals at different wavelengths;

at least one first optical-electrical module, where the first optical-electrical module is configured to convert an analog optical signal at one wavelength into an analog electrical signal; and at least one analog-to-digital converter (ADC), where the ADC is configured to convert the analog electrical signal output by the first optical-electrical module into a digital electrical signal.

According to the central unit provided in the first aspect, at least one optical-electrical component of an optical power amplifier, an optical filter, and an optical phase shifter is disposed in a transmit link of the central unit, and a sequence of the optical power amplifier, the optical filter, and the optical phase shifter is adjustable, so that the transmit link of the central unit can support multi-frequency band or high-frequency communication when the central unit uses a wired analog optical communications technology. This ensures communication quality and efficiency of the central unit in a multi-frequency band or high-frequency system, and improves communication efficiency of the central unit. In addition, because an optical component is easy to integrate, a chip may be used for control. Therefore, the central unit may be controlled by using a miniaturized integrated chip. Costs and complexity of implementation are reduced.

In a possible implementation of the first aspect, the central unit further includes:

at least one second optical processing module, where the second optical processing module is configured to: obtain an analog optical signal at one wavelength, and output an analog optical signal processed by the second optical processing module, where the second optical processing module includes at least one second optical filter and/or at least one second optical phase shifter, where the analog optical signal processed by the second optical processing module is converted into an analog electrical signal by the first optical-electrical module. In this implementation, at least one optical-electrical component of an optical power amplifier, an optical filter, and an optical phase shifter is disposed in a receive link of the central unit, and a sequence of the optical power amplifier, the optical filter, and the optical phase shifter is adjustable, so that the receive link of the central unit can support multi-frequency band or high-frequency communication when the central unit uses the wired analog optical communications technology. This ensures communication quality and efficiency of the central unit in the multi-frequency band or high-frequency system, and improves communication efficiency of the central unit. In addition, because an optical component is easy to integrate, a chip may be used for control. Therefore, the central unit may be controlled by using a miniaturized integrated chip. Costs and complexity of implementation are reduced.

In a possible implementation of the first aspect, the central unit further includes at least one post optical power amplifier. An input terminal of the post optical power amplifier is connected to an output terminal of the first multiplexer. The post optical power amplifier is configured to amplify the analog optical signal output by the first multiplexer. In this implementation, one or more post optical power amplifiers are connected after the first multiplexer, so that the analog optical signals at different wavelengths output by the first multiplexer can be amplified in a unified manner. For example, when the analog optical signals at different wavelengths need to be amplified by a same multiple, an optical power amplifier may not be disposed on a transmission path of each analog optical signal before the first multiplexer. This can reduce a quantity of optical power amplifiers required by the central unit, and reduce costs and complexity of implementation. Alternatively, when the analog optical signals at different wavelengths need to be amplified by different multiples, the post optical power amplifier may amplify the analog optical signals at different wavelengths by a larger multiple in a unified manner, that is, perform coarse adjustment for optical power amplification. However, an optical power amplifier disposed on a transmission path of each analog optical signal before the first multiplexer may separately amplify the analog optical signal by a smaller multiple, that is, perform fine adjustment. In this way, efficiency of performing optical power amplification on the analog optical signals at different wavelengths can be improved, implementation is flexible, and two-level optical power amplification is implemented.

In a possible implementation of the first aspect, the first optical processing module includes at least one first optical filter and at least one first optical phase shifter, the first optical filter is connected to the first optical phase shifter, and the first optical filter and the first optical phase shifter are located between the first electro-optical module and the first multiplexer. In this implementation, the first optical processing module includes at least one first optical filter and at least one first optical phase shifter, so that optical filtering and optical phase shift can be separately performed on an analog optical signal at any wavelength, and optical processing can be separately performed on signals at a plurality of frequencies and bandwidths. In addition, a sequence of positions of the first optical filter and the first optical phase shifter is adjustable, so that the positions of the first optical filter and the first optical phase shifter can be flexibly arranged. This improves flexibility of disposing the first optical filter and the first optical phase shifter, and facilitates implementation.

In a possible implementation of the first aspect, the second optical processing module includes at least one second optical filter and at least one second optical phase shifter, the second optical filter is connected to the second optical phase shifter, and the second optical filter and the second optical phase shifter are located between the first optical-electrical module and the first demultiplexer. In this implementation, the second optical processing module includes at least one second optical filter and at least one second optical phase shifter, so that optical filtering and optical phase shift can be separately performed on an analog optical signal at any wavelength, and optical processing can be separately performed on signals at a plurality of frequencies and bandwidths. In addition, a sequence of positions of the second optical filter and the second optical phase shifter is adjustable, so that the positions of the second optical filter and the second optical phase shifter can be flexibly arranged. This improves flexibility of disposing the second optical filter and the second optical phase shifter, and facilitates implementation.

In a possible implementation of the first aspect, the first optical processing module includes at least one first optical filter or at least one first optical phase shifter, and the first optical filter or the first optical phase shifter is located between the first electro-optical module and the first multiplexer. In this implementation, optical phase shift or optical power amplification can be separately performed on an analog optical signal sent at any wavelength, and optical phase shift or optical power amplification can be separately performed on signals at a plurality of frequencies and bandwidths. This facilitates implementation.

In a possible implementation of the first aspect, the second optical processing module includes at least one second optical filter or at least one second optical phase shifter, and the second optical filter or the second optical phase shifter is located between the first demultiplexer and the first optical-electrical module. In this implementation, optical phase shift can be separately performed on an analog optical signal received at any wavelength, and optical phase shift can be separately performed on signals at a plurality of frequencies and bandwidths. This facilitates implementation.

In a possible implementation of the first aspect, the central unit further includes a light source module. The light source module is configured to generate an optical carrier. The optical carrier is used to generate an analog optical signal. In this implementation, the light source module generates one or more optical carriers at different wavelengths. This can ensure quality of an analog optical signal output by any first electro-optical module, and improve efficiency of outputting the analog optical signal.

In a possible implementation of the first aspect, the analog electrical signal obtained by the first electro-optical module includes a plurality of analog electrical signals at different frequencies. The central unit further includes at least one of: at least one electrical power amplifier, at least one electrical phase shifter, and an electrical combiner.

The electrical power amplifier is configured to amplify an analog electrical signal at one frequency.

The electrical phase shifter is configured to shift a phase of an analog electrical signal at one frequency.

The electrical combiner is configured to: combine the plurality of analog electrical signals at different frequencies into one electrical signal, and then input the one electrical signal into the first electro-optical module.

In this implementation, any analog electrical signal including a plurality of different frequencies is input into the first electro-optical module. Electrical phase shift and/or electrical power amplification are/is separately performed on an electrical signal at each frequency. Analog electrical signals at different frequencies on which the electrical phase shifter and/or electrical power amplification are/is separately performed are combined into one electrical signal, and then the one electrical signal is input into the first electro-optical module. Then, optical processing is performed on the analog optical signal output by the first electro-optical module. Through two-level power amplification and/or phase shift, that is, optical and electrical power amplification and/or phase shift, unified power amplification and/or phase shift of beams at a plurality of frequencies are/is supported in optical domain, and separate power amplification and/or phase shift of beams at a plurality of frequencies are/is supported in electrical domain. Therefore, different beam directions and/or powers of signals at different frequencies are controlled. This ensures signal transmission quality and efficiency.

In a possible implementation of the first aspect, the central unit includes at least one electrical power amplifier or at least one electrical phase shifter, and the electrical combiner. An input terminal of the electrical power amplifier or an input terminal of the electrical phase shifter is configured to input an analog electrical signal at one frequency. An output terminal of the electrical power amplifier or an output terminal of the electrical phase shifter is connected to an input terminal of the electrical combiner. An output terminal of the electrical combiner is connected to an input terminal of the first electro-optical module. In this implementation, the electrical phase shifter or the electrical power amplifier is disposed to separately perform electrical phase shift or electrical power amplification on an electrical signal at each frequency in analog electrical signals that include a plurality of different frequencies and that are output by a second optical-electrical module. In this way, unified power amplification and/or phase shift of beams at a plurality of frequencies are/is supported in optical domain, and separate power amplification or phase shift of beams at a plurality of frequencies is supported in electrical domain.

In a possible implementation of the first aspect, the central unit includes at least one electrical power amplifier and at least one electrical phase shifter, the electrical power amplifier is connected to the electrical phase shifter, and the electrical power amplifier and the electrical phase shifter are located between the DAC and the first electro-optical module. In this implementation, the electrical phase shifter and the electrical power amplifier are disposed to separately perform electrical phase shift and electrical power amplification on an electrical signal at each frequency in analog electrical signals that include a plurality of different frequencies and that are output by a second optical-electrical module. In this way, unified power amplification and/or phase shift of beams at a plurality of frequencies are/is supported in optical domain, and separate power amplification and phase shift of beams at a plurality of frequencies are supported in electrical domain. In addition, a sequence of positions of the electrical phase shifter and the electrical power amplifier is adjustable, so that the positions of the electrical phase shifter and the electrical power amplifier can be flexibly arranged. This improves flexibility of disposing the electrical phase shifter and the electrical power amplifier, and facilitates implementation.

According to a second aspect, a central unit is provided, where the central unit includes:

at least one digital-to-analog converter (DAC), where the DAC is configured to convert a digital electrical signal into an analog electrical signal;

at least one first electro-optical module, where the first electro-optical module is configured to: obtain the analog electrical signal output by the DAC, and convert the analog electrical signal into an analog optical signal;

a first multiplexer, configured to combine analog optical signals output by the at least one first electro-optical module into one analog optical signal;

at least one post optical power amplifier, where an input terminal of the post optical power amplifier is connected to an output terminal of the first multiplexer, and the post optical power amplifier is configured to amplify the analog optical signal output by the first multiplexer; and/or a first demultiplexer, configured to decompose the one analog optical signal into a plurality of analog optical signals at different wavelengths;

at least one first optical-electrical module, where the first optical-electrical module is configured to convert an analog optical signal at one wavelength into an analog electrical signal; and at least one analog-to-digital converter (ADC), where the ADC is configured to convert the analog electrical signal output by the first optical-electrical module into a digital electrical signal.

According to the central unit provided in the second aspect, one or more post optical power amplifiers are connected after the first multiplexer, so that the analog optical signals at different wavelengths output by the first multiplexer can be amplified in a unified manner. This can reduce a quantity of optical power amplifiers required by the central unit, and reduce costs and complexity of implementation. In addition, the remote unit can support multi-frequency band or high-frequency communication when the central unit uses a wired analog optical communications technology.

In a possible implementation of the first aspect, the central unit further includes:

at least one first optical processing module, where the first optical processing module is configured to: obtain the analog optical signal output by the first electro-optical module, and output an analog optical signal processed by the first optical processing module; and the first optical processing module includes at least one of: at least one first optical filter, at least one first optical phase shifter, and at least one first optical power amplifier; and the first multiplexer, configured to combine analog optical signals output by the first optical processing module into one analog optical signal.

In this implementation, one or more post optical power amplifiers are connected after the first multiplexer, so that the analog optical signals at different wavelengths output by the first multiplexer can be amplified in a unified manner. For example, when the analog optical signals at different wavelengths need to be amplified by a same multiple, an optical power amplifier may not be disposed on a transmission path of each analog optical signal before the first multiplexer. This can reduce a quantity of optical power amplifiers required by the central unit, and reduce costs and complexity of implementation. Alternatively, when the analog optical signals at different wavelengths need to be amplified by different multiples, the post optical power amplifier may amplify the analog optical signals at different wavelengths by a larger multiple in a unified manner, that is, perform coarse adjustment for optical power amplification. However, an optical power amplifier disposed on a transmission path of each analog optical signal before the first multiplexer may separately amplify the analog optical signal by a smaller multiple, that is, perform fine adjustment. In this way, efficiency of performing optical power amplification on the analog optical signals at different wavelengths can be improved, implementation is flexible, and two-level optical power amplification is implemented.

In a possible implementation of the second aspect, the first optical processing module includes at least one first optical filter and at least one first optical phase shifter, the first optical filter is connected to the first optical phase shifter, and the first optical filter and the first optical phase shifter are located between the first electro-optical module and the first multiplexer.

In a possible implementation of the second aspect, the first optical processing module includes at least one first optical filter or at least one first optical phase shifter, and the first optical filter or the first optical phase shifter is located between the first electro-optical module and the first multiplexer.

In a possible implementation of the first aspect, the analog electrical signal obtained by the first electro-optical module includes a plurality of analog electrical signals at different frequencies. The central unit further includes at least one of: at least one electrical power amplifier, at least one electrical phase shifter, and an electrical combiner.

The electrical power amplifier is configured to amplify an analog electrical signal at one frequency.

The electrical phase shifter is configured to shift a phase of an analog electrical signal at one frequency.

The electrical combiner is configured to: combine the plurality of analog electrical signals at different frequencies into one electrical signal, and then input the one electrical signal into the first electro-optical module.

In this implementation, any analog electrical signal including a plurality of different frequencies is input into the first electro-optical module. Electrical phase shift and/or electrical power amplification are/is separately performed on an electrical signal at each frequency. Analog electrical signals at different frequencies on which the electrical phase shifter and/or electrical power amplification are/is separately performed are combined into one electrical signal, and then the one electrical signal is input into the first electro-optical module. Then, optical processing is performed on the analog optical signal output by the first electro-optical module. Through two-level power amplification and/or phase shift, that is, optical and electrical power amplification and/or phase shift, unified power amplification and/or phase shift of beams at a plurality of frequencies are/is supported in optical domain, and separate power amplification and/or phase shift of beams at a plurality of frequencies are/is supported in electrical domain. Therefore, different beam directions and/or powers of signals at different frequencies are controlled. This ensures signal transmission quality and efficiency.

In a possible implementation of the second aspect, the central unit includes at least one electrical power amplifier or at least one electrical phase shifter, and the electrical combiner. An input terminal of the electrical power amplifier or an input terminal of the electrical phase shifter is configured to input an analog electrical signal at one frequency. An output terminal of the electrical power amplifier or an output terminal of the electrical phase shifter is connected to an input terminal of the electrical combiner. An output terminal of the electrical combiner is connected to an input terminal of the first electro-optical module.

In a possible implementation of the second aspect, the central unit includes at least one electrical power amplifier and at least one electrical phase shifter, the electrical power amplifier is connected to the electrical phase shifter, and the electrical power amplifier and the electrical phase shifter are located between the DAC and the first electro-optical module.

According to a third aspect, a remote unit is provided, where the remote unit includes:

- a second demultiplexer, configured to decompose one analog optical signal into a plurality of analog optical signals at different wavelengths;
- at least one third optical processing module, where the third optical processing module is configured to: obtain an analog optical signal at one wavelength output by the second demultiplexer, and output an analog optical signal processed by the third optical processing module, where the third optical processing module includes at least one of: at least one third optical filter, at least one third optical phase shifter, and at least one third optical power amplifier;
- at least one second optical-electrical module, where the second optical-electrical module is configured to convert the analog optical signal output by the third optical processing module into an analog electrical signal; and/or
- at least one second electro-optical module, where the second electro-optical module is configured to: obtain the analog electrical signal, and convert the analog electrical signal into an analog optical signal; and
- a second multiplexer, configured to combine analog optical signals output by the at least one second electro-optical module into one analog optical signal.

According to the remote unit provided in the third aspect, at least one optical-electrical component of an optical power amplifier, an optical filter, and an optical phase shifter is disposed in the remote unit, and a sequence of the optical power amplifier, the optical filter, and the optical phase shifter is adjustable, so that the remote unit can support multi-frequency band or high-frequency communication when the remote unit uses a wired analog optical communications technology. This ensures communication quality and efficiency of the remote unit in a multi-frequency band or high-frequency system, and improves communication efficiency of the remote unit. In addition, because an optical component is easy to integrate, a chip may be used for control. Therefore, the remote unit may be controlled by using a miniaturized integrated chip. Costs and complexity of implementation are reduced.

In a possible implementation of the third aspect, the remote unit further includes:

- at least one fourth optical processing module, where the fourth optical processing module is configured to: obtain the analog optical signal output by the second electro-optical module, and output an analog optical signal processed by the fourth optical processing module, where the fourth optical processing module includes at least one fourth optical filter and/or at least one fourth optical phase shifter, and the analog optical signal processed by the fourth optical processing module is received by the second multiplexer. In this implementation, at least one optical-electrical component of an optical power amplifier, an optical filter, and an optical phase shifter is disposed in a receive link of the remote unit, and a sequence of the optical power amplifier, the optical filter, and the optical phase shifter is adjustable, so that the receive link of the remote unit can support multi-frequency band or high-frequency communication when the remote unit uses the wired analog optical communications technology. This ensures communication quality and efficiency of the remote unit in the multi-frequency band or high-frequency system, and improves communication efficiency of the remote unit. In addition, because an optical component is easy to integrate, a chip may be used for control. Therefore, the remote unit may be controlled by using a miniaturized integrated chip. Costs and complexity of implementation are reduced.

In a possible implementation of the third aspect, the remote unit further includes at least one pre-optical power amplifier. The pre-optical power amplifier is configured to obtain an analog optical signal and amplify the analog optical signal. An analog optical signal amplified by the pre-optical power amplifier is received by the second demultiplexer. In this implementation, the pre-optical power amplifier is disposed before the second DEMUX, so that the analog optical signals at different wavelengths that are input into the second DEMUX can be amplified in a unified manner. This can reduce a quantity of optical power amplifiers required by the remote unit, and reduce costs and complexity of implementation. In addition, efficiency of performing optical power amplification on the analog optical signals at different wavelengths can be improved, implementation is flexible, and two-level optical power amplification is implemented.

In a possible implementation of the third aspect, the third optical processing module includes at least one third optical filter and at least one third optical phase shifter, the third optical filter is connected to the third optical phase shifter, and the third optical filter and the third optical phase shifter are located between the second demultiplexer and the second optical-electrical module. In this implementation, optical filtering and optical phase shift can be separately performed on an analog optical signal at any wavelength, and optical processing can be separately performed on signals at a plurality of frequencies and bandwidths. In addition, a sequence of positions of the third optical filter and the third optical phase shifter is adjustable, so that the positions of the third optical filter and the third optical phase shifter can be flexibly arranged. This improves flexibility of disposing the third optical filter and the third optical phase shifter, and facilitates implementation.

In a possible implementation of the third aspect, the fourth optical processing module includes at least one fourth optical filter and at least one fourth optical phase shifter, the fourth optical filter is connected to the fourth optical phase shifter, and the fourth optical filter and the fourth optical phase shifter are located between the second multiplexer and the second electro-optical module. In this implementation, the fourth optical processing module includes at least one fourth optical filter and at least one fourth optical phase shifter, so that optical filtering and optical phase shift can be separately performed on an analog optical signal at any wavelength, and optical processing can be separately performed on signals at a plurality of frequencies and bandwidths. In addition, a sequence of positions of the fourth optical filter and the fourth optical phase shifter is adjustable, so that the positions of the fourth optical filter and the fourth optical phase shifter can be flexibly arranged. This improves flexibility of disposing the fourth optical filter and the fourth optical phase shifter, and facilitates implementation.

In a possible implementation of the third aspect, the third optical processing module includes at least one third optical filter or at least one third optical phase shifter, and the third optical filter or the third optical phase shifter is located between the second demultiplexer and the second optical-electrical module. In this implementation, optical phase shift or optical power amplification can be separately performed on an analog optical signal sent at any wavelength, and optical phase shift or optical power amplification can be separately performed on signals at a plurality of frequencies and bandwidths. This facilitates implementation.

In a possible implementation of the third aspect, the fourth optical processing module includes at least one fourth optical filter or at least one fourth optical phase shifter, and the fourth optical filter or the fourth optical phase shifter is located between the second electro-optical module and the second multiplexer. In this implementation, optical phase shift or optical power amplification can be separately performed on an analog optical signal received at any wavelength, and optical phase shift or optical power amplification can be separately performed on signals at a plurality of frequencies and bandwidths. This facilitates implementation.

In a possible implementation of the third aspect, the second electro-optical module is further configured to: generate an optical carrier, receive a radio frequency signal, modulate the radio frequency signal to the optical carrier, and output an analog optical signal. In this implementation, the second electro-optical module generates the optical carrier and modulates the radio frequency signal, so that no additional light source is required to generate the optical carrier. This reduces costs. In addition, because the generated optical carrier does not need to be transmitted over a long distance, quality of the optical carrier is ensured.

In a possible implementation of the third aspect, the second demultiplexer is further configured to decompose one optical carrier input into the second demultiplexer into a plurality of optical carriers at different wavelengths; and the second electro-optical module is further configured to: obtain the optical carrier, receive a radio frequency signal, modulate the radio frequency signal to the optical carrier, and output an analog optical signal. In this implementation, because the light source module is disposed in a central unit, and the central unit is disposed indoors, a temperature change is not significant. Therefore, disposing the light source in the central unit and transmitting the generated optical carrier to the second electro-optical module in the central unit can effectively overcome a wavelength drift problem caused by temperature impact.

In a possible implementation of the third aspect, the second electro-optical module is further configured to: recover an optical carrier from an analog optical signal output by the second demultiplexer, receive a radio frequency signal, modulate the radio frequency signal to the optical carrier, and output an analog optical signal. In this implementation, the second electro-optical module recovers an optical carrier from an analog optical signal transmitted in a downlink, and implements electrical signal modulation, so that no additional light source is required to generate the optical carrier. This reduces costs, and improves utilization of the optical carrier.

In a possible implementation of the third aspect, the analog electrical signal output by the second optical-electrical module includes a plurality of analog electrical signals at different frequencies. The remote unit further includes at least one of: at least one electrical power amplifier, at least one electrical phase shifter, and an electrical splitter. The electrical power amplifier is configured to amplify an analog electrical signal at one frequency. The electrical phase shifter is configured to shift a phase of an analog electrical signal at one frequency. The electrical splitter is configured to decompose the analog electrical signal output by the second optical-electrical module into the plurality of analog electrical signals at different frequencies. In this implementation, the electrical phase shifter and/or the electrical power amplifier are/is disposed to separately perform electrical phase shift and/or electrical power amplification on an electrical signal at each frequency in analog electrical signals that include a plurality of different frequencies and that are output by the second optical-electrical module. In this way, unified power amplification and/or phase shift of beams at a plurality of frequencies are/is supported in optical domain, and separate power amplification and/or phase shift of beams at a plurality of frequencies are/is supported in electrical domain. In addition, a sequence of positions of the electrical phase shifter and the electrical power amplifier is adjustable, so that the positions of the electrical phase shifter and the electrical power amplifier can be flexibly arranged. This improves flexibility of disposing the electrical phase shifter and the electrical power amplifier, and facilitates implementation.

In a possible implementation of the third aspect, the remote unit includes at least one electrical power amplifier or at least one electrical phase shifter, and the electrical splitter.

An input terminal of the electrical power amplifier or an input terminal of the electrical phase shifter is configured to input an analog electrical signal at one frequency. The input terminal of the electrical power amplifier or the input terminal of the electrical phase shifter is connected to an output terminal of the electrical splitter. An input terminal of the electrical splitter is connected to an output terminal of the second electro-optical module.

In a possible implementation of the third aspect, the remote unit includes at least one electrical power amplifier, at least one electrical phase shifter, and the electrical splitter. The electrical power amplifier is connected to the electrical phase shifter. The electrical power amplifier and the electrical phase shifter are located after the electrical splitter. An input terminal of the electrical splitter is connected to an output terminal of the second electro-optical module.

According to a fourth aspect, a remote unit is provided, where the remote unit includes:

a second demultiplexer, configured to decompose one analog optical signal into a plurality of analog optical signals at different wavelengths;

at least one second optical-electrical module, where the second optical-electrical module is configured to convert an analog optical signal output by a third optical processing module into an analog electrical signal;

at least one pre-optical power amplifier, where the pre-optical power amplifier is configured to obtain an analog optical signal and amplify the analog optical signal, where an analog optical signal amplified by the pre-optical power amplifier is received by the second demultiplexer; and/or at least one second electro-optical module, where the second electro-optical module is configured to: obtain the analog electrical signal, and convert the analog electrical signal into an analog optical signal; and a second multiplexer, configured to combine analog optical signals output by the at least one second electro-optical module into one analog optical signal.

According to the remote unit provided in the fourth aspect, the pre-optical power amplifier is disposed before the second demultiplexer, so that the analog optical signals at different wavelengths that are input into the second demultiplexer can be amplified in a unified manner. For example, when the analog optical signals at different wavelengths need to be amplified by a same multiple, an optical power amplifier may not be disposed on a transmission path of each analog optical signal after the second demultiplexer. This can reduce a quantity of optical power amplifiers required by the remote unit, and reduce costs and complexity of implementation. In addition, the remote unit can support multi-frequency band or high-frequency communication when the remote unit uses a wired analog optical communications technology.

In a possible implementation of the fourth aspect, the remote unit further includes:

at least one third optical processing module, where the third optical processing module is configured to: obtain an analog optical signal at one wavelength output by the second demultiplexer, and output an analog optical signal processed by the third optical processing module, where the third optical processing module includes at least one of: at least one third optical filter, at least one third optical phase shifter, and at least one third optical power amplifier; and at least one second optical-electrical module, where the second optical-electrical module is configured to convert the analog optical signal output by the third optical processing module into an analog electrical signal.

In this implementation, at least one optical-electrical component of an optical power amplifier, an optical filter, and an optical phase shifter is disposed in the remote unit, and a sequence of the optical power amplifier, the optical filter, and the optical phase shifter is adjustable, so that the remote unit can support multi-frequency band or high-frequency communication when the remote unit uses the wired analog optical communications technology. This ensures communication quality and efficiency of the remote unit in a multi-frequency band or high-frequency system, and improves communication efficiency of the remote unit.

In a possible implementation of the fourth aspect, the remote unit further includes:

at least one fourth optical processing module, where the fourth optical processing module is configured to: obtain the analog optical signal output by the second electro-optical module, and output an analog optical signal processed by the fourth optical processing module, where the fourth optical processing module includes at least one fourth optical filter and/or at least one fourth optical phase shifter, and the analog optical signal processed by the fourth optical processing module is received by the second multiplexer.

In a possible implementation of the fourth aspect, the third optical processing module includes at least one third optical filter and at least one third optical phase shifter, the third optical filter is connected to the third optical phase shifter, and the third optical filter and the third optical phase shifter are located between the second demultiplexer and the second optical-electrical module.

In a possible implementation of the fourth aspect, the fourth optical processing module includes at least one fourth optical filter and at least one fourth optical phase shifter, the fourth optical filter is connected to the fourth optical phase shifter, and the fourth optical filter and the fourth optical phase shifter are located between the second multiplexer and the second electro-optical module.

In a possible implementation of the fourth aspect, the third optical processing module includes at least one third optical filter or at least one third optical phase shifter, and the third optical filter or the third optical phase shifter is located between the second demultiplexer and the second optical-electrical module.

In a possible implementation of the fourth aspect, the fourth optical processing module includes at least one fourth optical filter or at least one fourth optical phase shifter, and the fourth optical filter or the fourth optical phase shifter is located between the second electro-optical module and the second multiplexer.

In a possible implementation of the fourth aspect, the second electro-optical module is further configured to: generate an optical carrier, receive a radio frequency signal, modulate the radio frequency signal to the optical carrier, and output an analog optical signal.

In a possible implementation of the fourth aspect, the second demultiplexer is further configured to decompose one optical carrier input into the second demultiplexer into a plurality of optical carriers at different wavelengths; and the second electro-optical module is further configured to: obtain the optical carrier, receive a radio frequency signal, modulate the radio frequency signal to the optical carrier, and output an analog optical signal.

In a possible implementation of the fourth aspect, the second electro-optical module is further configured to: recover an optical carrier from an analog optical signal output by the second demultiplexer, receive a radio frequency signal, modulate the radio frequency signal to the optical carrier, and output an analog optical signal.

In a possible implementation of the fourth aspect, the analog electrical signal output by the second optical-electrical module includes a plurality of analog electrical signals at different frequencies. The remote unit further includes at least one of: at least one electrical power amplifier, at least one electrical phase shifter, and an electrical splitter. The electrical power amplifier is configured to amplify an analog electrical signal at one frequency. The electrical phase shifter is configured to shift a phase of an analog electrical signal at one frequency. The electrical splitter is configured to decompose the analog electrical signal output by the second optical-electrical module into the plurality of analog electrical signals at different frequencies. In this implementation, the electrical phase shifter and/or the electrical power amplifier are/is disposed to separately perform electrical phase shift and/or electrical power amplification on an electrical signal at each frequency in analog electrical signals that include a plurality of different frequencies and that are output by the second optical-electrical module. In this way, unified power amplification and/or phase shift of beams at a plurality of frequencies are/is supported in optical domain, and separate power amplification and/or phase shift of beams at a plurality of frequencies are/is supported in electrical domain. In addition, a sequence of positions of the electrical phase shifter and the electrical power amplifier is adjustable, so that the positions of the electrical phase shifter and the electrical power amplifier can be flexibly arranged. This improves flexibility of disposing the electrical phase shifter and the electrical power amplifier, and facilitates implementation.

In a possible implementation of the fourth aspect, the remote unit includes at least one electrical power amplifier or at least one electrical phase shifter, and the electrical splitter. An input terminal of the electrical power amplifier or an input terminal of the electrical phase shifter is configured to input an analog electrical signal at one frequency. The input terminal of the electrical power amplifier or the input terminal of the electrical phase shifter is connected to an output terminal of the electrical splitter. An input terminal of the electrical splitter is connected to an output terminal of the second electro-optical module.

In a possible implementation of the fourth aspect, the remote unit includes at least one electrical power amplifier, at least one electrical phase shifter, and the electrical splitter. The electrical power amplifier is connected to the electrical phase shifter. The electrical power amplifier and the electrical phase shifter are located after the electrical splitter. An input terminal of the electrical splitter is connected to an output terminal of the second electro-optical module.

Optionally, the central unit provided in the first aspect or the central unit provided in the second aspect may be a building baseband processing unit (building baseband unit, BBU) or a centralized unit (CU).

Optionally, the remote unit provided in the third aspect or the remote unit provided in the fourth aspect may be a remote radio unit (RRU) or a distributed unit (DU).

According to a fifth aspect, a communications apparatus is provided. The communications apparatus includes the central unit provided in the first aspect or the central unit provided in the second aspect, and includes the remote unit provided in the third aspect or the remote unit provided in the fourth aspect.

Optionally, the communications apparatus provided in the fifth aspect may be an access network device, and the access network device may include a CU and a DU. The CU and the DU may be integrated and located on one hardware device, or may be separate devices and are separately located on different hardware devices.

Optionally, the communications apparatus provided in the fifth aspect may be an access network device, and the access network device may include a BBU and an RRU.

BRIEF DESCRIPTION OF DRAWINGS

FIG. 29A and FIG. 29B to FIG. 73A and FIG. 73B are schematic block diagrams of structures of a communications apparatus according to an embodiment of this application.

DESCRIPTION OF EMBODIMENTS

Figure 1:
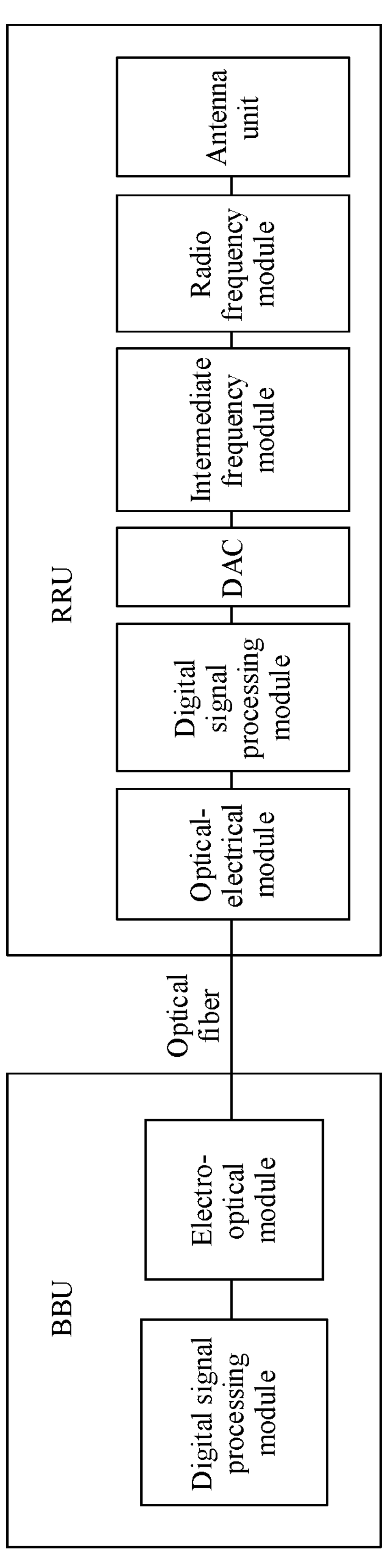
FIG. 1 is a schematic diagram of an architecture of a BBU and an RRU when a fronthaul link uses a wired optical communications technology.

The following describes the technical solutions of this application with reference to the accompanying drawings.

The technical solutions in the embodiments of this application may be applied to various communications systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a fifth generation (5th Generation, 5G) communications system or new radio (NR), and various future communications systems.

A terminal device in the embodiments of this application may also be referred to as user equipment, an access terminal, a subscriber unit, a subscriber station, a mobile station, a remote station, a remote terminal, a mobile device, a user terminal, a terminal, a wireless communications device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in the embodiments of this application.

An access network device in the embodiments of this application may be a device configured to communicate with a terminal device and a core network device. The access network device may be a base transceiver station (BTS) in a global system for mobile communications (GSM) or code division multiple access (CDMA), or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the access network device may be a relay station, an access point, a vehicle-mounted device, a wearable device, a network device in a 5G network, an access network device in a future evolved PLMN network, or the like. This is not limited in the embodiments of this application.

In recent years, wired optical communications technologies rapidly develop in fields such as data centers, metropolitan area networks, and fronthaul links of wireless communications systems. In wired optical communication, an electrical signal at a transmit end is modulated into an optical signal by an electro-optical modulator, then the optical signal is propagated through an optical fiber, and finally the optical signal at a receive end is converted into the electrical signal by an optical-to-electrical converter.

In 4G, access network devices (for example, base stations) widely use a distributed base station architecture. The base station includes a building baseband unit (BBU), a remote radio unit (RRU), and an antenna. The BBU mainly implements baseband processing functions (such as coding, multiplexing, modulation, and spectrum spreading) of a Uu interface, a function of an IUB interface of a radio network controller (RNC), signaling processing, and local and remote operation and maintenance functions, and functions of monitoring a working status of a NodeB system and reporting alarm information. The IUB interface is a logical interface between the RNC and the NodeB. The RRU mainly includes four modules: an intermediate frequency module, a transceiver module, a power amplifier, and a filter module. The digital intermediate frequency module is used for modulation and demodulation, digital up/down conversion, and digital/analog conversion in optical transmission. The transceiver module converts an intermediate frequency signal into a radio frequency signal. After power amplification and filtering, the radio frequency signal is transmitted through an antenna port.

Each base station has a BBU and an RRU, and is connected to a core network device through the BBU. The RRU and the BBU are connected through an optical fiber. All BBUs are placed in an equipment room. The RRU is connected to an antenna through a coaxial cable, a coupler, and the like. That is, the optical fiber is used in a backbone network and the coaxial cable is used in a branch. A BBU+RRU multi-channel solution can be used to provide better indoor coverage for a large stadium. A link between the RRU and the BBU may be referred to as a fronthaul link.

With evolution of communications technologies, in 5G, for a base station, the RRU in 4G may be combined with an antenna to constitute an active antenna unit (AAU) in 5G, and the BBU in 4G may be further divided into a centralized unit (CU) and a distributed unit (DU). In other words, in 5G, a base station may include a CU, a DU, and an AAU. The CU is shared by a plurality of base stations, that is, a plurality of base stations share one CU. Each base station has a DU, and the plurality of base stations may share one CU for centralized management. The CU and the DU may be integrated and located on one hardware device, or may be separate devices and are separately located on different hardware devices. 5G uses a network architecture in which a CU and a DU are separated. This implements baseband resource sharing, facilitates radio access slicing and cloudification, and meets a site coordination requirement in a complex 5G networking scenario.

Division into the CU and the DU may be based on protocol layers of a wireless network. The protocol layers may include protocol layers such as a radio resource control (RRC) layer, a packet data convergence protocol (PDCP) layer, a radio link control (RLC) layer, a media access control (MAC) layer, and a physical layer (PHY). The physical layer is located at the bottom layer (layer 1), the MAC layer, the RLC layer, and the PDCP layer belong to the second layer (layer 2), and the RRC layer belongs to the third layer (layer 3). In an implementation, a service data adaptation protocol (SDAP) layer may be further included above the PDCP layer. For example, functions of the PDCP layer and the protocol layers above the PDCP layer are configured on the CU, and functions of the protocol layers below the PDCP layer such as the RLC layer, the MAC layer, and the like are configured on the DU.

FIG. 1 is a schematic diagram of an architecture of a BBU and an RRU when a fronthaul link uses a wired optical communications technology. Currently, a fronthaul link mainly uses a wired digital optical communications technology, and a solution under research is a wired analog optical communications technology. The fronthaul link shown in FIG. 1 uses the wired digital optical communications technology. As shown in FIG. 1, when a fronthaul link of a wireless communications system uses wired digital optical communication, a digital optical signal is transmitted on an optical fiber connecting the BBU and the RRU. The BBU includes a digital signal processing module and an electro-optical module. The digital signal processing module is responsible for generating a baseband digital electrical signal. The electro-optical module is responsible for modulating the digital electrical signal into a digital optical signal. The RRU includes an optical-electrical module, a digital signal processing module, a digital-to-analog converter (DAC), an intermediate frequency module, a radio frequency module, and an antenna unit. The optical-electrical module is responsible for converting the digital optical signal into a digital electrical signal. The digital signal processing module is responsible for converting the digital electrical signal into a digital electrical quadrature amplitude modulation (QAM) signal. The DAC is responsible for converting the digital electrical QAM modulation signal into an analog electrical QAM modulation signal. The intermediate frequency module is responsible for converting the analog electrical QAM modulation signal into an intermediate frequency analog signal. The radio frequency module is responsible for converting the intermediate frequency analog signal into a radio frequency analog signal. Finally, the radio frequency analog signal is sent through the antenna unit.

Figure 2:
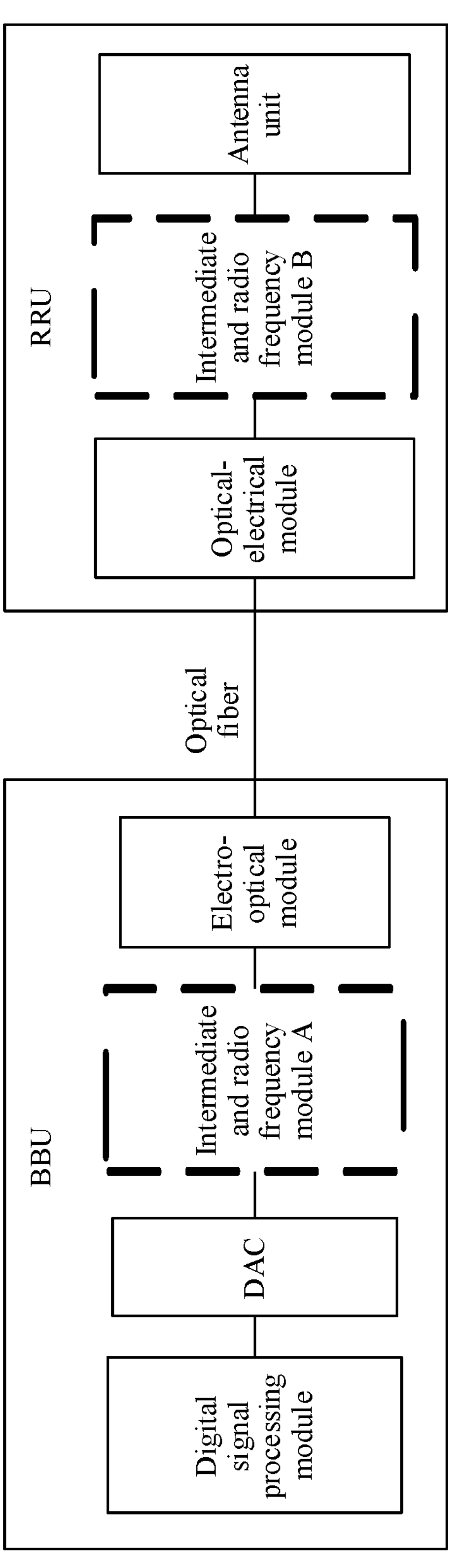
FIG. 2 is a schematic diagram of an architecture of a BBU and an RRU when a fronthaul link uses a wired analog optical communications technology.

FIG. 2 is a schematic diagram of an architecture of a BBU and an RRU when a fronthaul link uses a wired analog optical communications technology. As shown in FIG. 2, an analog optical signal is transmitted on an optical fiber connecting the BBU and the RRU. The BBU includes a digital signal processing module, a DAC, and an electro-optical module. Optionally, the BBU may further include an intermediate and radio frequency module A. The RRU includes an optical-electrical module and an antenna unit. Optionally, the RRU may further include an intermediate and radio frequency module B. When the optical analog signal on the optical fiber is a QAM modulation signal, the intermediate and radio frequency module A does not exist, and the intermediate and radio frequency module B includes an intermediate frequency module and a radio frequency module. When the optical analog signal on the optical fiber is an intermediate frequency analog signal, the intermediate and radio frequency module A includes an intermediate frequency module, and the intermediate and radio frequency module B includes a radio frequency module. When the optical analog signal on the optical fiber is a radio frequency analog signal, the intermediate and radio frequency module A includes an intermediate frequency module and a radio frequency module, and the intermediate and radio frequency module B does not exist.

Currently, a wireless communications system gradually develops toward multi-frequency band or high-frequency. Multi-frequency band means that a plurality of frequencies, for example, 0.9 GHz, 1.8 GHz, 2.4 GHz, 3.5 GHz, and 5 GHz, are supported at the same time. In addition, a signal at each frequency has a specific bandwidth, and the bandwidth may be referred to as a subband. A high frequency refers to a relatively high frequency, for example, 28 GHz, 39 GHz, or a frequency in a unit of THz. In addition, a high-frequency system generally features a large bandwidth.

A fronthaul link of the wireless communications system requires electronic components (for example, an intermediate frequency module and a radio frequency module) regardless of whether wired digital optical communication or wired analog optical communication is used. When the fronthaul link of the wireless communications system needs to support a multi-frequency band or high-frequency system, performance such as a frequency and a bandwidth of an electronic component is limited due to a limitation of a physical material process and the like. A design difficulty, power consumption, a size, and costs of the electronic component all pose great challenges. As a result, the electronic component cannot well support the multi-frequency band or high-frequency system. This is an urgent problem to be resolved.

In view of this, this application provides a central unit. Optical components are disposed in the central unit. The optical components include, for example, an optical phase shifter (O-PS), an optical filter (O-F), and an optical power amplifier (O-PA). In this way, the central unit can support multi-frequency band or high-frequency communication when a fronthaul link of the central unit uses a wired analog optical communications technology. This ensures communication quality and efficiency of the central unit in a multi-frequency band or high-frequency system, and improves communication efficiency of the central unit.

Figure 3:
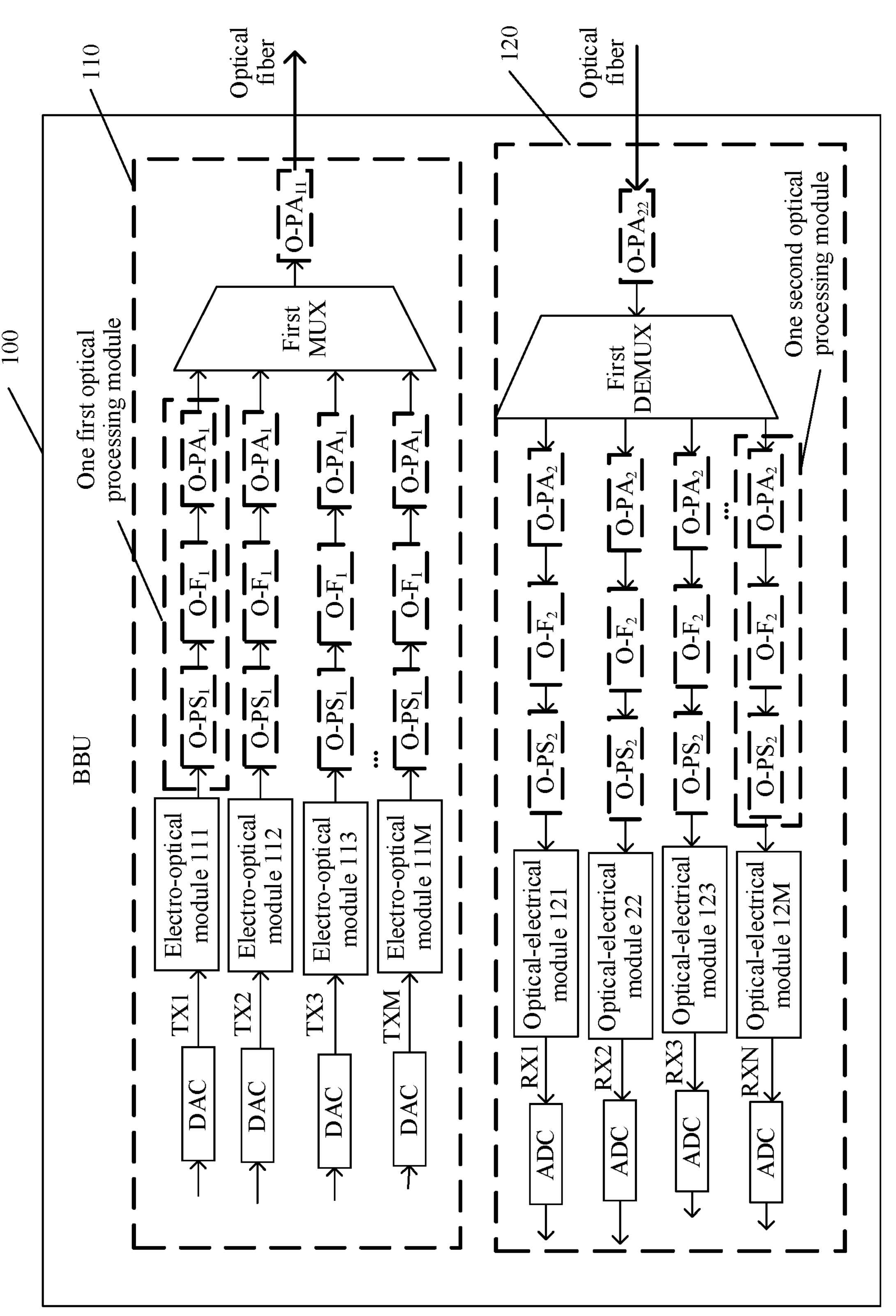
FIG. 3 to FIG. 10 are schematic block diagrams of structures of a central unit according to an embodiment of this application.

With reference to FIG. 3, the following describes the central unit provided in this application. In the following description, an example in which the central unit is a BBU is used for description. It should be understood that the central unit in this application may be a BBU or a CU.

As shown in FIG. 3, the central unit 100 includes a transmit link 110 and a receive link 120.

The transmit link 110 includes:

at least one digital-to-analog converter (DAC), where each DAC is configured to convert one digital electrical signal into an analog electrical signal;

at least one first electro-optical module, where FIG. 3 is a schematic diagram of a plurality of first electro-optical modules, the at least one first electro-optical module is one or more of electro-optical modules 111 to 11M shown in FIG. 3, any first electro-optical module is configured to obtain one analog electrical signal output by one DAC and convert (modulate) the analog electrical signal into an analog optical signal, and optionally, analog optical signals output by different electro-optical modules may have different wavelengths;

at least one first optical processing module, where one first optical processing module is configured to process an analog optical signal output by one first electro-optical module, and transmit a processed analog optical signal to a first multiplexer, any first optical processing module includes at least one of the following components: at least one first optical filter O-$F_1$, at least one first optical phase shifter O-$PS_1$, and at least one first optical power amplifier O-$PA_1$, where any O-$F_1$ is configured to filter the analog optical signal, any O-$PS_1$ is configured to shift a phase of the analog optical signal, and any O-$PA_1$ is configured to amplify the analog optical signal; and the first multiplexer (MUX), configured to combine analog optical signals at different wavelengths processed by the at least one first optical processing module into one analog optical signal, where the first MUX combines a plurality of analog optical signals at different wavelengths output by the electro-optical module 111 to the electro-optical module 11M into one analog optical signal, as shown in FIG. 3.

The receive link 120 includes:

a first demultiplexer (DEMUX), configured to decompose the one analog optical signal into a plurality of analog optical signals at different wavelengths, where optionally the plurality of analog optical signals at different wavelengths output by the first DEMUX may be separately input into at least one first optical-electrical module;

the at least one first optical-electrical module, where the at least one first optical-electrical module is one or more of optical-electrical modules 121 to 12M shown in FIG. 3, any first optical-electrical module is configured to obtain one analog optical signal and convert the analog optical signal into an analog electrical signal, optionally, one first optical-electrical module is configured to convert one analog optical signal output by the first DEMUX into an analog electrical signal, and analog optical signals input by different first optical-electrical modules have different wavelengths; and at least one analog-to-digital converter (ADC), where any ADC is configured to convert one analog electrical signal output by one first optical-electrical module into a digital electrical signal.

Optionally, the receive link 120 further includes at least one second optical processing module, where any second optical processing module is configured to process one analog optical signal output by the first DEMUX, and transmit a processed analog optical signal to one first optical-electrical module.

The second optical processing module includes at least one of the following components:

at least one second optical power amplifier O-$PA_2$, at least one second optical filter O-$F_2$, and at least one second optical phase shifter O-$PS_2$.

Any O-$F_2$ is configured to filter an analog optical signal, and any O-$PS_2$ is configured to shift a phase of the analog optical signal.

Optionally, the second optical processing module may further include at least one second optical power amplifier O-$PA_2$, where any O-$PA_2$ is configured to amplify the analog optical signal.

Specifically, for the transmit link 110, as shown in FIG. 3, each transmit signal (TX) may be generated by a digital signal processing module, converted into an analog electrical signal by a DAC, and then input into a first electro-optical module. That is, the central unit 100 may further include the digital signal processing module. The first electro-optical module (for example, the electro-optical module 111) converts the analog electrical signal into an analog optical signal, and outputs the analog optical signal to one O-$PS_1$. The O-$PS_1$ is configured to shift a phase of the analog optical signal output by the electro-optical module, and output a phase-shifted analog optical signal to one O-$F_1$. The O-$F_1$ is configured to filter the analog optical signal whose phase is shifted by the O-$PS_1$, and output a filtered analog optical signal to one O-PA. The O-$PA_1$ is configured to amplify the analog optical signal output by the O-$F_1$. A signal output by the O-$PA_1$ is input into the first MUX. It should be understood that analog optical signals that are input into the first MUX by different (O-$PA_1$)s may have different wavelengths.

It should be understood that, in this embodiment of this application, a plurality of first optical processing modules may be integrated into one optical processor, and a plurality of second optical processing modules may also be integrated into one optical processor.

It should be further understood that, in this embodiment of this application, any one or more of a plurality of optical processing components included in one first optical processing module may be integrated into one optical processor. For example, it is assumed that one first optical processing module includes an O-$PS_1$, an O-$F_1$, and an O-$PA_1$. The O-$PS_1$ and the O-$F_1$ may be integrated into one optical processor, the O-$F_1$ and the O-$PA_1$ may be integrated into one optical processor, or the O-$PS_1$, the O-$F_1$, and the O-$PA_1$ may be integrated into one optical processor.

Similarly, any one or more of a plurality of optical processing components included in one second optical processing module may also be integrated into one optical processor.

Optionally, an output terminal of the first MUX may be further connected to one or more post optical power amplifiers (O-$PA_{11}$)s. The O-$PA_{11}$ amplifies one analog optical signal output by the first MUX, and then transmits an amplified analog optical signal to an optical fiber, to send the analog optical signal to another device through the optical fiber. In the embodiment of the central unit 100 in the application, the post O-$PA_{11}$ is an O-PA located after the first MUX. An input terminal of the O-$PA_{11}$ is connected to the output terminal of the first MUX, and an output terminal of the O-$PA_{11}$ is connected to an input terminal of the optical fiber. One or more post optical power amplifiers are connected after the first MUX, so that the analog optical signals at different wavelengths output by the first MUX can be amplified in a unified manner. For example, when the analog optical signals at different wavelengths need to be amplified by a same multiple, an optical power amplifier O-$PA_1$ may not be disposed on a transmission path of each analog optical signal before the first MUX. This can reduce a quantity of optical power amplifiers required by the central unit 100, and reduce costs and complexity of implementation. Alternatively, when the analog optical signals at different wavelengths need to be amplified by different multiples, the post optical power amplifier may amplify the analog optical signals at different wavelengths by a larger multiple in a unified manner, that is, perform coarse adjustment for optical power amplification. However, an optical power amplifier O-$PA_1$ disposed on a transmission path of each analog optical signal before the first MUX may separately amplify the analog optical signal by a smaller multiple, that is, perform fine adjustment. In this way, efficiency of performing optical power amplification on the analog optical signals at different wavelengths can be improved, implementation is flexible, and two-level optical power amplification is implemented.

In this embodiment of this application, the transmit link may be a link for the central unit 100 to send a signal to another device (for example, a terminal device or an RRU), and the transmit link may also be referred to as a downlink.

For the receive link 120, as shown in FIG. 3, an output terminal of the optical fiber may be connected to an input terminal of the first DEMUX. The first DEMUX receives an analog optical signal transmitted through the optical fiber, and the first DEMUX decomposes (de-multiplexes) the input analog optical signal into a plurality of analog optical signals at different wavelengths. One analog optical signal obtained through decomposition may sequentially pass through one O-$PA_2$, one O-$F_2$, one O-$PS_2$, and one second optical-electrical module (for example, the optical-electrical module 121), and finally be converted into an analog electrical signal. The analog electrical signal is input into the ADC. The ADC converts the analog electrical signal into a digital electrical signal, and finally inputs the digital electrical signal into the digital signal processing module of the central unit 100 for processing.

Optionally, as shown in FIG. 3, a pre-optical power amplifier O-$PA_{22}$ may exist before the first DEMUX. An input terminal of the O-$PA_{22}$ is connected to the output terminal of the optical fiber, and an output terminal of the O-$PA_{22}$ is connected to the input terminal of the first DEMUX. The pre-O-$PA_{22}$ amplifies an analog optical signal output through the optical fiber, and then inputs an amplified analog optical signal to the first DEMUX. One or more pre-optical power amplifiers are connected before the first DEMUX, so that analog optical signals at different wavelengths input into the first DEMUX can be amplified in a unified manner. For example, when the analog optical signals at different wavelengths need to be amplified by a same multiple, an optical power amplifier O-$PA_1$ may not be disposed on a transmission path of each analog optical signal after the first DEMUX. This can reduce a quantity of optical power amplifiers required by the central unit 100, and reduce costs and complexity of implementation. Alternatively, when the analog optical signals at different wavelengths need to be amplified by different multiples, the post optical power amplifier may amplify the analog optical signals at different wavelengths by a larger multiple in a unified manner, that is, perform coarse adjustment for optical power amplification. However, an optical power amplifier O-$PA_2$ disposed on a transmission path of each analog optical signal after the first DEMUX may separately amplify the analog optical signal by a smaller multiple, that is, perform fine adjustment. In this way, efficiency of performing optical power amplification on the analog optical signals at different wavelengths can be improved, implementation is flexible, and two-level optical power amplification is implemented.

In this embodiment of this application, the receive link may be understood as a link for the central unit 100 to receive a signal sent by another device. The receive link may also be referred to as an uplink.

It should be further understood that FIG. 3 is merely an example, and should not constitute a limitation on a sequence (or a sequence of positions) and quantities of ($O\text{-}PS_1$)s, ($O\text{-}F_1$)s, and ($O\text{-}PA_1$)s in the transmit link, and should not constitute a limitation on a quantity of ($O\text{-}PA_{11}$)s in the transmit link, either. Similarly, FIG. 3 should not constitute a limitation on a sequence (or a sequence of positions) and quantities of ($O\text{-}PS_2$)s, ($O\text{-}F_2$)s, and ($O\text{-}PA_2$)s in the receive link, and should not constitute a limitation on a quantity of ($O\text{-}PA_{22}$)s in the receive link, either. For example, an analog optical signal output by an output terminal of the electro-optical module 111 may pass through one or more of the three optical components: the $O\text{-}PS_1$, the O-Ft, and the $O\text{-}PA_1$, and a quantity, a sequence, and the like of one or more optical components through which the analog optical signal passes may be set based on requirements. Similarly, an analog optical signal output by the output terminal of the first DEMUX may pass through one or more of the three optical components: the $O\text{-}PS_2$, the $O\text{-}F_2$, and the $O\text{-}PA_2$, and a quantity, a sequence, and the like of one or more optical components through which the analog optical signal passes may be set based on requirements.

It should be further understood that optical components (the $O\text{-}PS_1$, the $O\text{-}F_1$, the $O\text{-}PA_1$, the $O\text{-}PS_2$, the $O\text{-}F_2$, the $O\text{-}PA_2$, the $O\text{-}PA_{11}$, and the $O\text{-}PA_{22}$) represented by dashed boxes in FIG. 3 are all optional, and the central unit 100 may include only a part or all of the optical components represented by the dashed boxes.

It should be further understood that, as shown in FIG. 3, an analog optical signal is transmitted on the optical fiber, where the analog optical signal may be any one of a QAM modulation signal, an intermediate frequency analog signal, or a radio frequency analog signal. This is not limited herein in this embodiment of this application.

It should be further understood that, as shown in FIG. 3, in this embodiment of this application, the first optical processing module may be located between the electro-optical module and the first MUX, and the second optical processing module may be located between the optical-electrical module and the first DEMUX.

According to the central unit provided in this application, at least one optical-electrical component of an optical power amplifier, an optical filter, and an optical phase shifter is disposed in the central unit, and a sequence of the optical power amplifier, the optical filter, and the optical phase shifter is adjustable, so that the central unit can support multi-frequency band or high-frequency communication when the central unit uses a wired analog optical communications technology. This ensures communication quality and efficiency of the central unit in a multi-frequency band or high-frequency system, and improves communication efficiency of the central unit. In addition, because an optical component is easy to integrate, a chip may be used for control. Therefore, the central unit may be controlled by using a miniaturized integrated chip. Costs and complexity of implementation are reduced.

It should be understood that FIG. 3 is a schematic diagram in which the transmit link 110 and the receive link 120 include the first optical processing module and the second optical processing module respectively.

Figure 4:
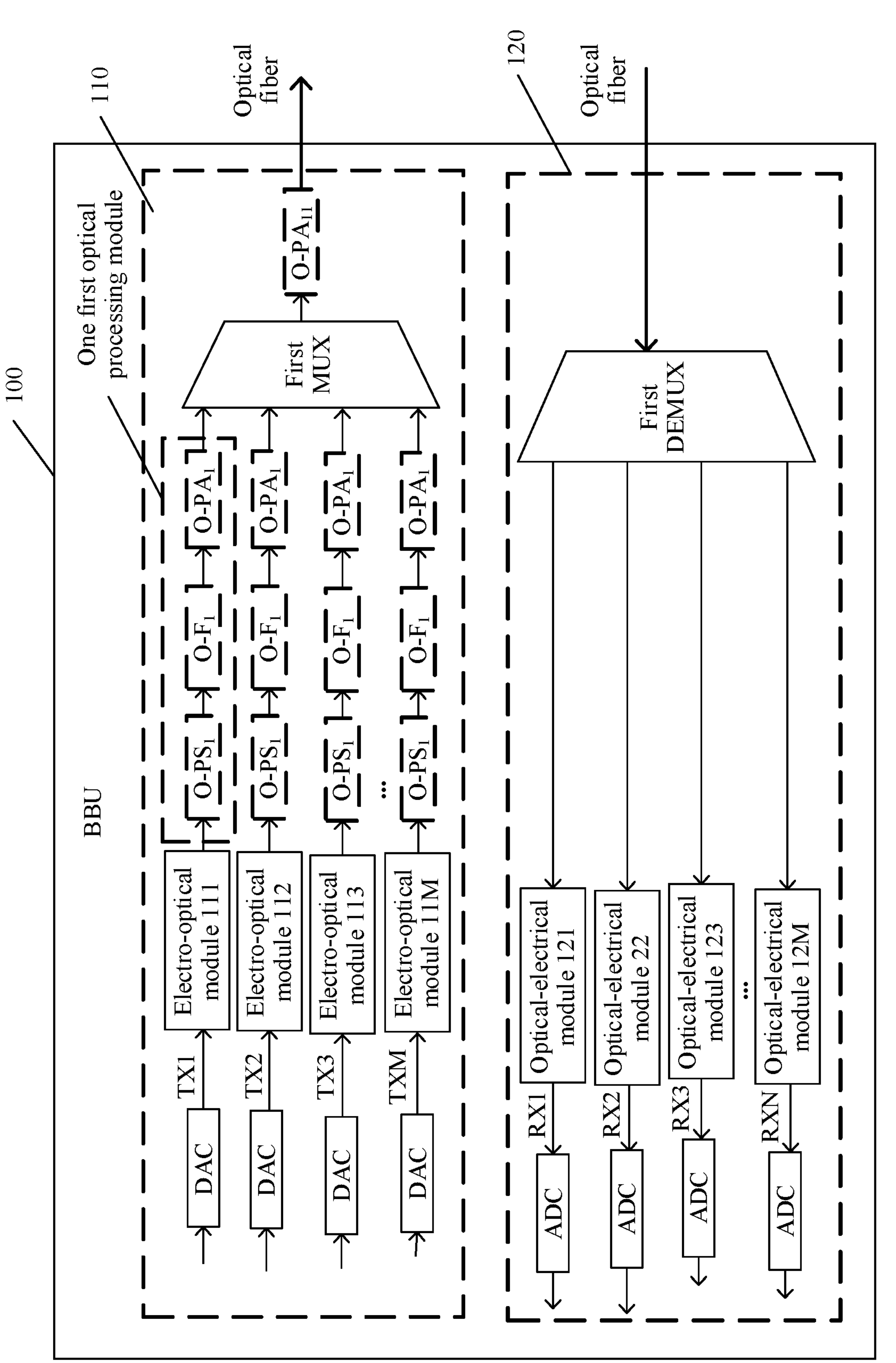

Optionally, in a possible implementation, FIG. 4 is another schematic block diagram of a structure of the central unit 100 according to this application. The transmit link 110 includes at least one first optical processing module and/or at least one $O\text{-}PA_{11}$. The receive link 120 includes no second optical processing module.

Figure 5:
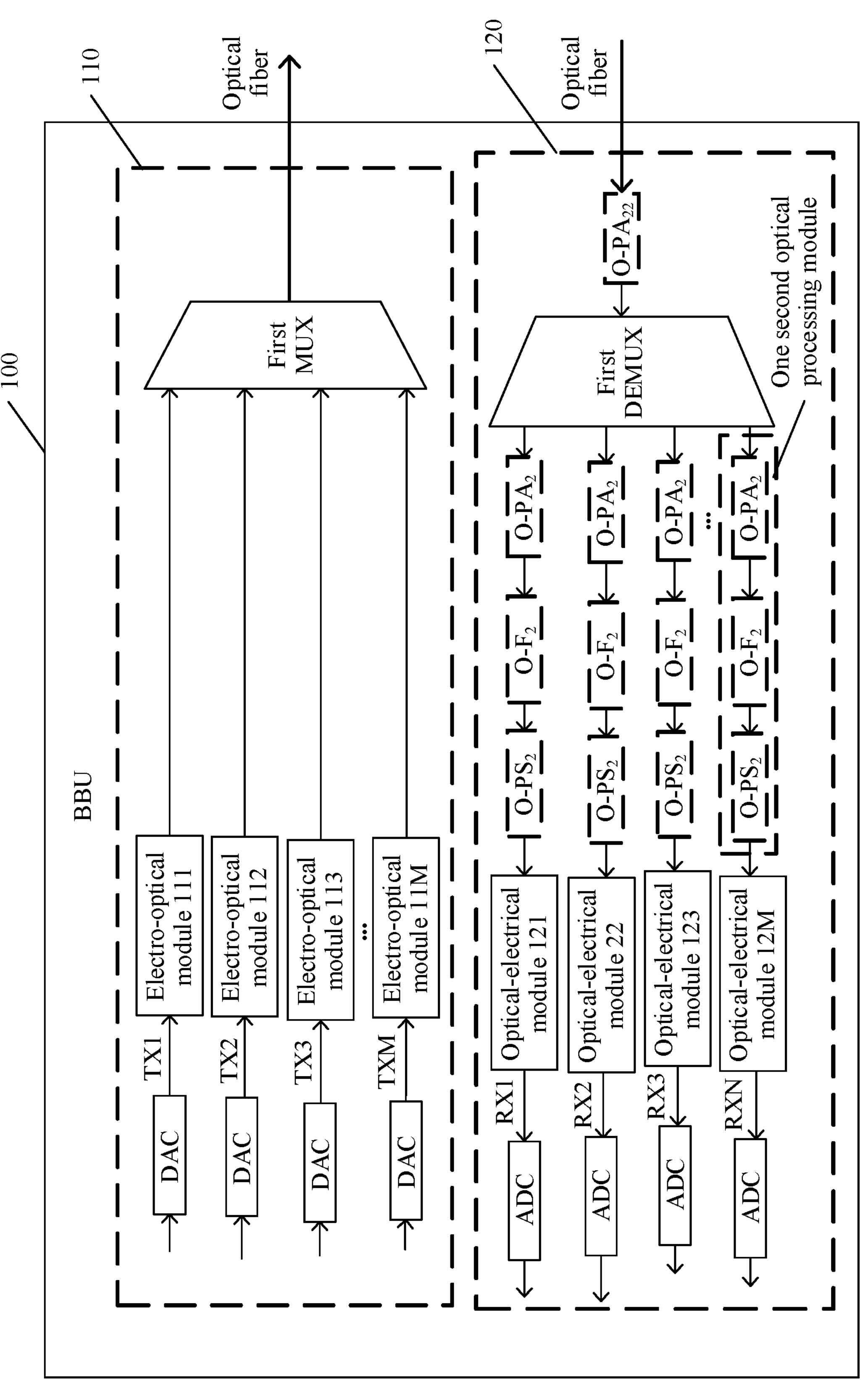

Optionally, in another possible implementation, FIG. 5 is another schematic block diagram of a structure of the central unit 100 according to this application. The transmit link 110 includes no first optical processing module. The receive link 120 includes at least one second optical processing module and/or at least one $O\text{-}PA_{22}$.

Optionally, in a possible implementation, the central unit 100 may alternatively include only the transmit link 110, but not include the receive link 120. Alternatively, the central unit 100 may not include the transmit link 110, but include only the receive link 120.

Figure 6:
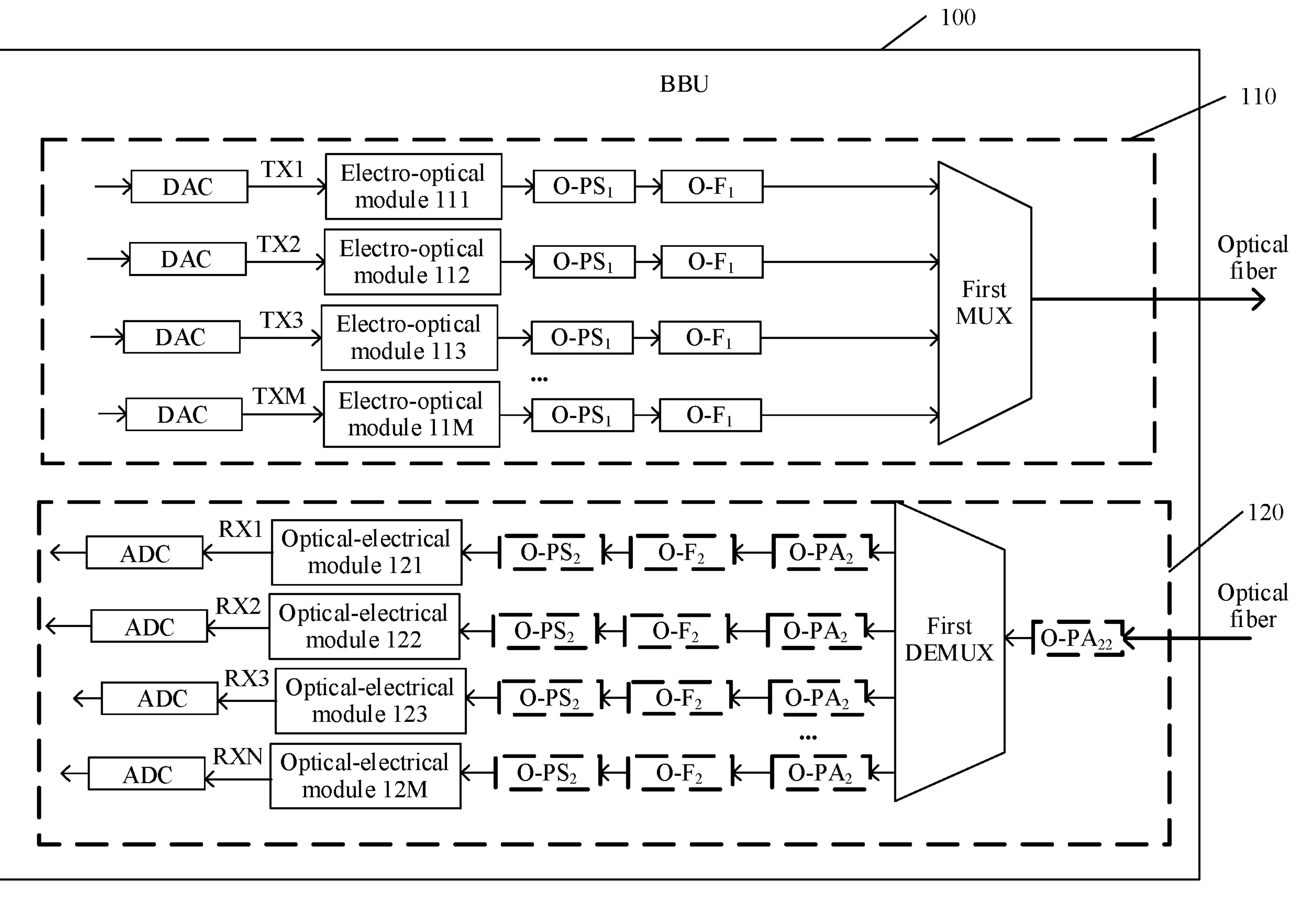
Figure 7:
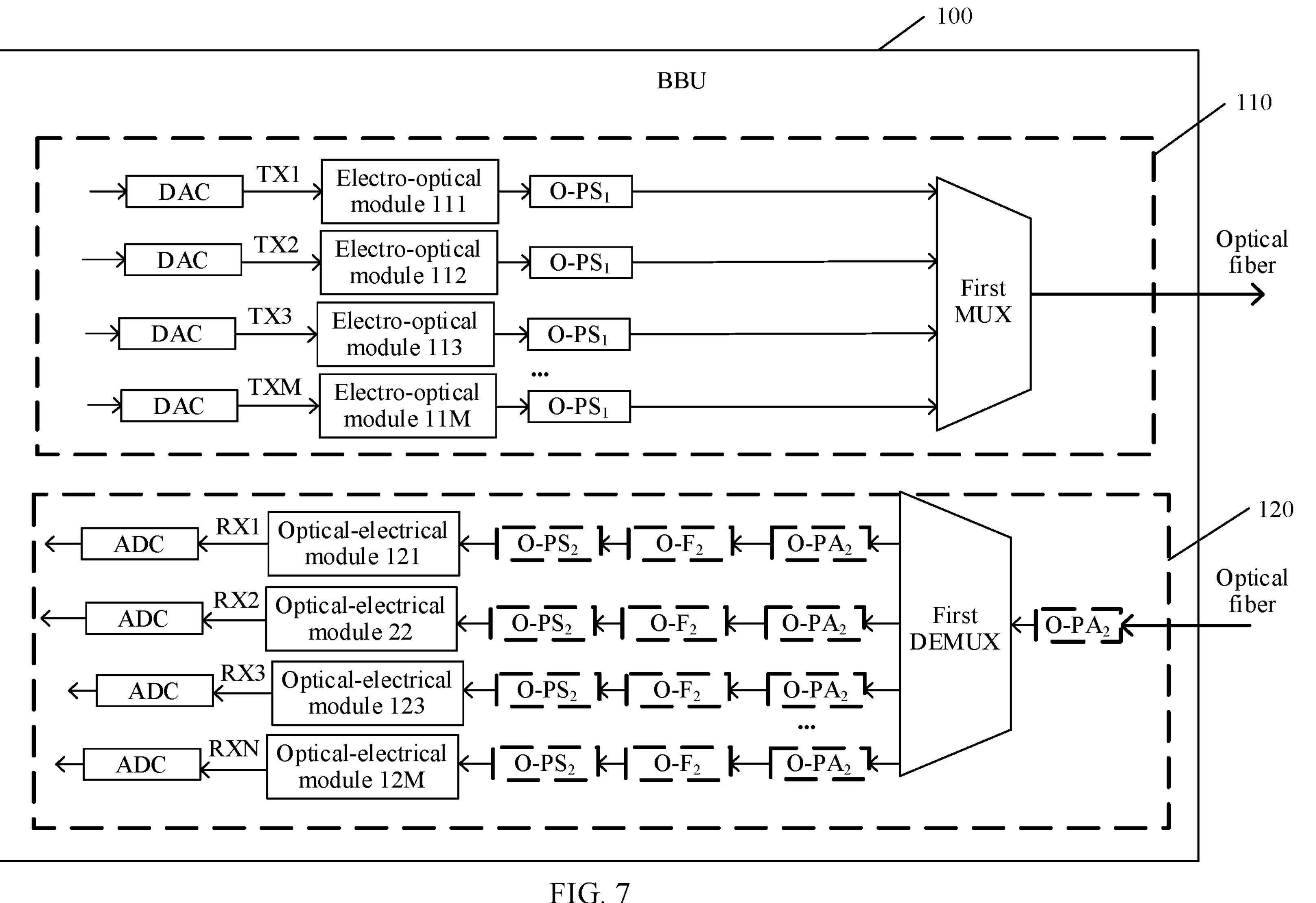
Figure 8:
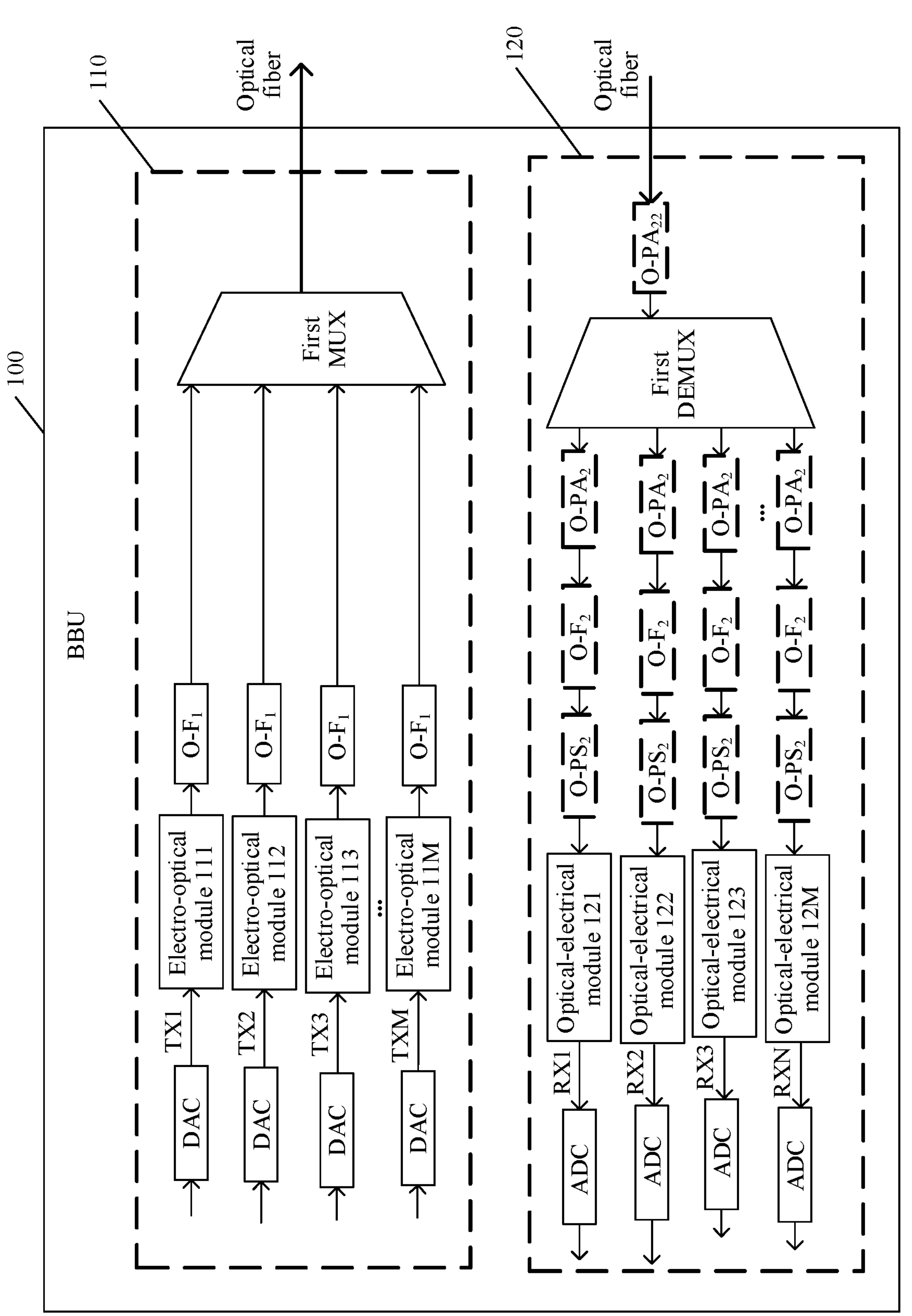

Optionally, in some possible implementations of this application, the transmit link 110 is used as an example for description. A case in which the transmit link 110 includes a first optical processing module is shown in FIG. 6 to FIG. 8. For a path through which any TX signal passes, there may be the following three positions and sequences of an $O\text{-}PS_1$ and an $O\text{-}F_1$:

Type 1: As shown in FIG. 6, the first optical processing module includes at least one $O\text{-}PS_1$ and at least one $O\text{-}F_1$. One $O\text{-}PS_1$ is connected to the at least one $O\text{-}F_1$. An output terminal of the $O\text{-}PS_1$ and an output terminal of the $O\text{-}F_1$ are connected to the input terminal of the first MUX. An input terminal of the $O\text{-}PS_1$ and an input terminal of the $O\text{-}F_1$ are connected to the output terminal of the first optical-electrical module (for example, the electro-optical module 111). In addition, that the $O\text{-}PS_1$ is connected to the $O\text{-}F_1$ may include: The output terminal of the $O\text{-}PS_1$ is connected to the input terminal of the $O\text{-}F_1$, that is, the $O\text{-}PS_1$ is located before the $O\text{-}F_1$. In this case, the input terminal of the $O\text{-}PS_1$ and the input terminal of the $O\text{-}F_1$ are the input terminal of the $O\text{-}PS_1$, and the output terminal of the $O\text{-}PS_1$ and the output terminal of the $O\text{-}F_1$ are the output terminal of the $O\text{-}F_1$. Alternatively, the output terminal of the $O\text{-}F_1$ is connected to the input terminal of the $O\text{-}PS_1$, that is, the $O\text{-}F_1$ is located before the $O\text{-}PS_1$. In this case, the input terminal of the $O\text{-}F_1$ and the input terminal of the $O\text{-}PS_1$ are the input terminal of the $O\text{-}F_1$, and the output terminal of the $O\text{-}F_1$ and the output terminal of the $O\text{-}PS_1$ are the output terminal of the $O\text{-}PS_1$. FIG. 6 shows an example in which the $O\text{-}PS_1$ is located before the $O\text{-}F_1$. In other words, the first optical filter is connected to the first optical phase shifter, the input terminal of the first optical filter and the input terminal of the first optical phase shifter are connected to the output terminal of the first electro-optical module, and the output terminal of the first optical filter and the output terminal of the first optical phase shifter are connected to the input terminal of the first multiplexer. The first optical processing module includes at least one $O\text{-}PS_1$ and at least one $O\text{-}F_1$, so that optical filtering and optical phase shift can be separately performed on an analog optical signal at any wavelength, and optical processing can be separately performed on signals at a plurality of frequencies and bandwidths. In addition, a sequence of positions of the $O\text{-}F_1$ and the $O\text{-}PS_1$ is adjustable, so that the positions of the $O\text{-}F_1$ and the $O\text{-}PS_1$ can be flexibly arranged. This improves flexibility of disposing the $O\text{-}F_1$ and the $O\text{-}PS_1$, and facilitates implementation.

Type 2: The first optical processing module does not include at least one $O\text{-}F_1$, but includes at least one $O\text{-}PS_1$. In this case, one $O\text{-}PS_1$ may be located between the first electro-optical module and the first MUX. An output terminal of the $O\text{-}PS_1$ is connected to the input terminal of the first MUX. An input terminal of the $O\text{-}PS_1$ is connected to the output terminal of the first optical-electrical module (for example, the electro-optical module 111), as shown in FIG. 7. In other words, the input terminal of the first optical phase shifter is connected to the output terminal of the first electro-optical module, and the output terminal of the first optical phase shifter is connected to the input terminal of the first multiplexer. The first optical processing module includes at least one O-$PS_1$, so that optical phase shift can be separately performed on an analog optical signal at any wavelength, and optical phase shift can be separately performed on signals at a plurality of frequencies and bandwidths. This facilitates implementation.

Type 3: The first optical processing module does not include at least one O-$PS_1$, but includes at least one O-$F_1$. In this case, one O-$F_1$ may be located between the first electro-optical module and the first MUX. An output terminal of the O-$F_1$ is connected to the input terminal of the first MUX. An input terminal of the O-$F_1$ is connected to the output terminal of the first optical-electrical module (for example, the electro-optical module 111), as shown in FIG. 8. The input terminal of the first optical filter is connected to the output terminal of the first electro-optical module, and the output terminal of the first optical filter is connected to the input terminal of the first multiplexer. The first optical processing module includes at least one O-$F_1$, so that optical filtering can be separately performed on an analog optical signal at any wavelength, and optical filtering can be separately performed on signals at a plurality of frequencies and bandwidths. This facilitates implementation.

It should be understood that, in this embodiment of this application, if the receive link 120 includes the second optical processing module, for a path through which any RX signal passes, positions and sequences of an O-$PS_2$ and an O-$F_2$ may be similar to the positions and the sequences of the O-$PS_1$ and the O-$F_1$ in the transmit link. For similar descriptions, refer to the foregoing related descriptions of the positions and the sequences of the O-$PS_1$ and the O-$F_1$. For brevity, details are not described herein again.

Figure 9:
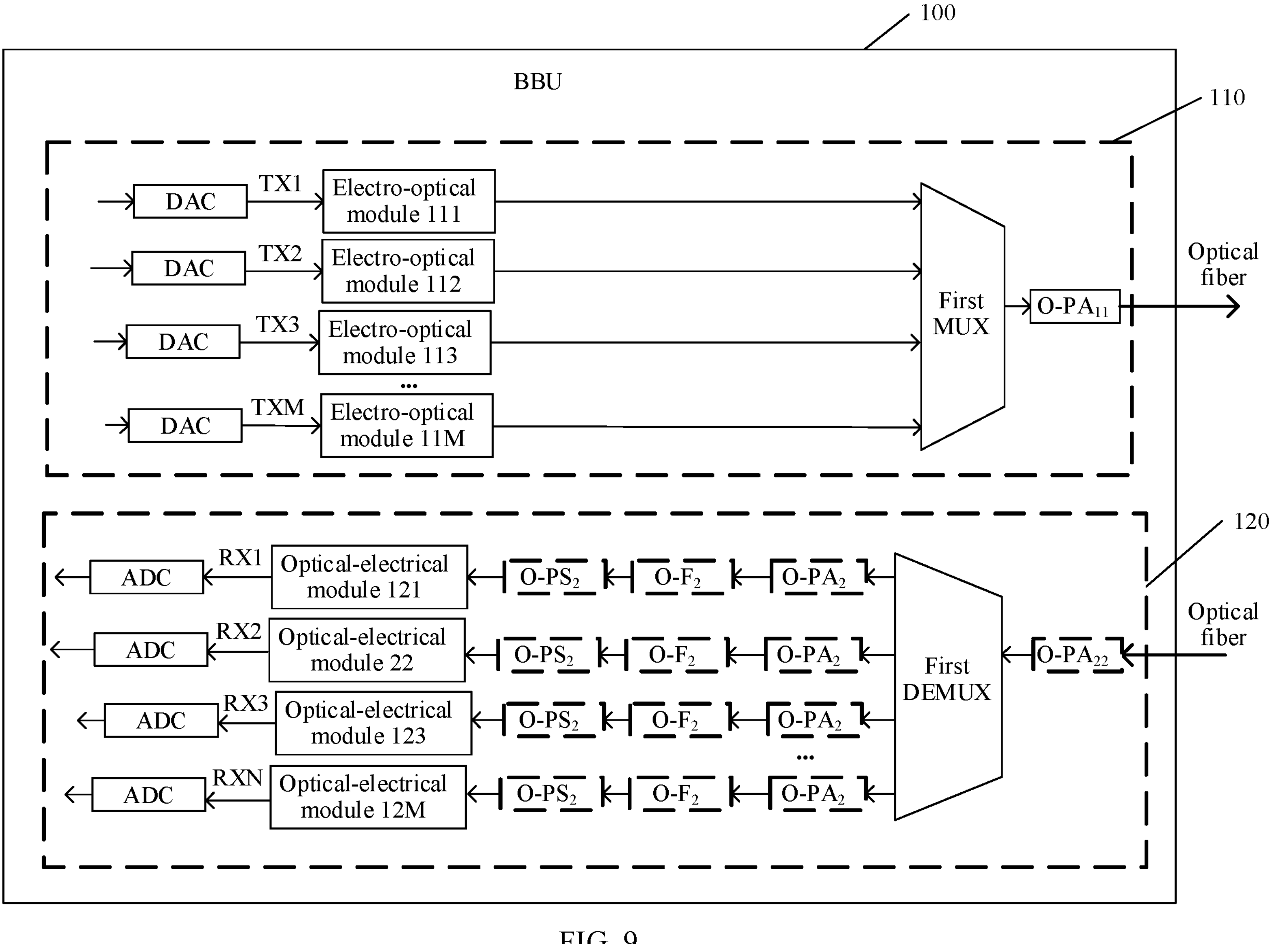
Figure 10:
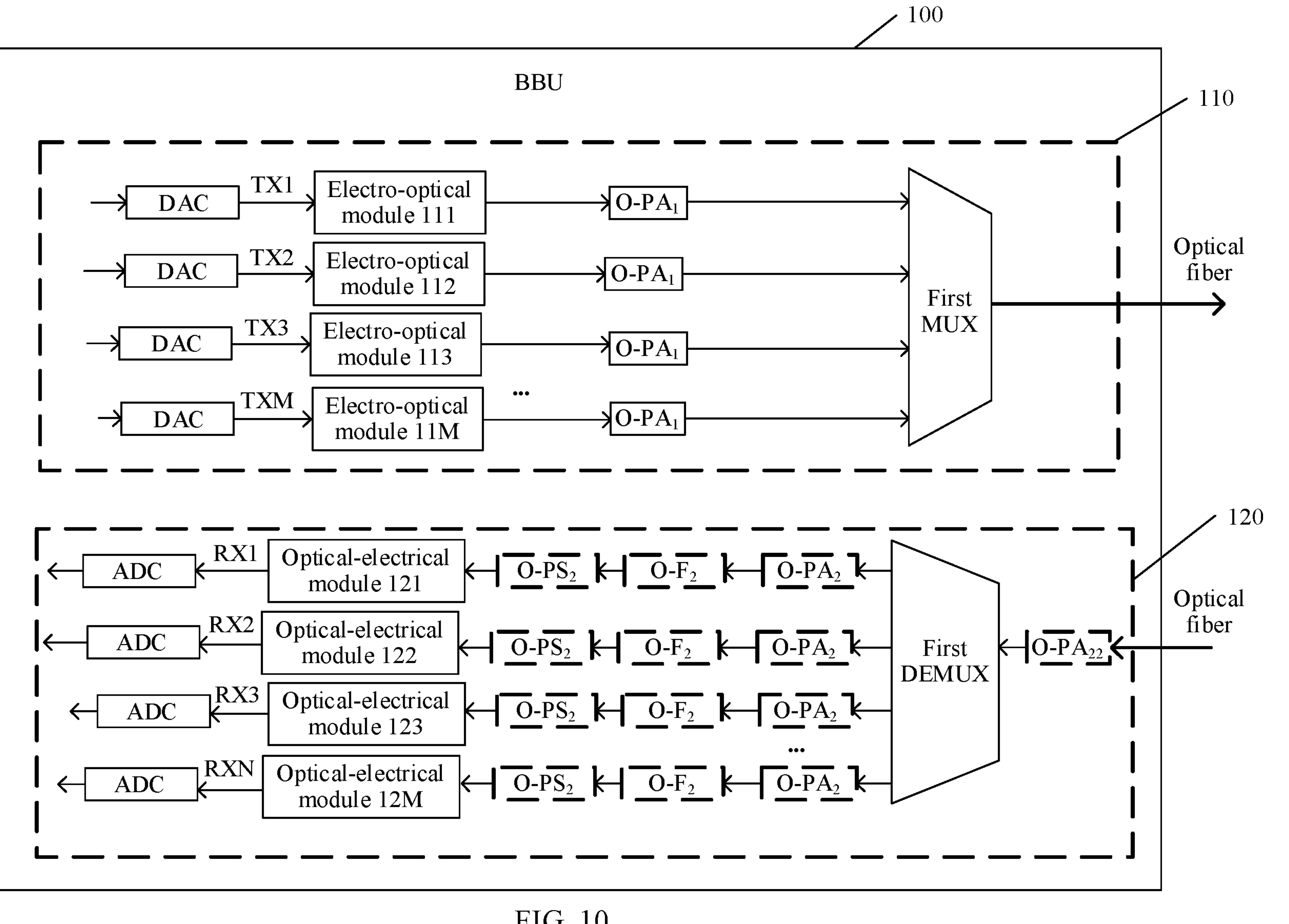

Optionally, in some possible implementations of this application, the transmit link 110 is used as an example for description, as shown in FIG. 9 and FIG. 10. For a path through which any TX signal passes, there may be the following two positions of an O-PA:

Type 1: The first optical processing module does not include at least one O-$PA_1$, but the central unit 100 includes at least one post optical power amplifier O-$PA_{11}$. An input terminal of the O-$PA_{11}$ is connected to the output terminal of the first MUX, and an output terminal of the O-$PA_1$ is connected to the input terminal of the optical fiber, as shown in FIG. 9. In other words, the input terminal of the O-$PA_{11}$ is connected to the output terminal of the first multiplexer, and the output terminal of the O-$PA_{11}$ is connected to the input terminal of the optical fiber. In this implementation, analog optical signals at different wavelengths output by the first MUX can be amplified in a unified manner. This can reduce a quantity of optical power amplifiers required by the central unit 100, and reduce costs and complexity of implementation.

Type 2: The first optical processing module includes at least one O-$PA_1$, but the central unit 100 does not include at least one post optical power amplifier O-$PA_{11}$. An input terminal of the O-$PA_1$ is connected to the output terminal of the first electro-optical module (for example, the electro-optical module 111), and an output terminal of the O-$PA_1$ is connected to the input terminal of the first MUX, as shown in FIG. 10. The O-$PA_1$ is located between the first electro-optical module and the first MUX. In other words, the output terminal of the first optical power amplifier is connected to the input terminal of the first multiplexer. In this implementation, optical power amplification can be separately performed on each analog optical signal. In this way, efficiency and precision of performing optical power amplification on analog optical signals at different wavelengths can be improved, and implementation flexibility is high.

It should be understood that, in this embodiment of this application, when the first optical processing module includes at least one O-$PA_1$, the central unit 100 may also include at least one O-$PA_{11}$. For example, FIG. 3 shows a case in which the central unit 100 may also include at least one O-$PA_{11}$ when the first optical processing module includes at least one O-$PA_1$.

It should be understood that, in this embodiment of this application, the central unit 100 may alternatively not include at least one first optical processing module, but include at least one post optical power amplifier O-$PA_{11}$, for example, as shown in the architecture in FIG. 9.

It should be understood that, in this embodiment of this application, if the receive link 120 includes at least one second optical processing module and the second optical processing module includes an O-$PA_2$, for a path through which any RX signal passes, positions of the O-$PA_2$ may be similar to the positions of the O-$PA_1$ in the transmit link. For similar descriptions, refer to the foregoing related descriptions of the positions of the O-$PA_1$. For brevity, details are not described herein again.

It should be further understood that, in this embodiment of this application, when the second optical processing module includes at least one O-$PA_2$, the receive link 120 may also include at least one pre-optical power amplifier O-$PA_{22}$. For example, FIG. 3 shows a case in which the receive link 120 may also include at least one O-$PA_{22}$ when the second optical processing module includes at least one O-$PA_2$.

It should be understood that, in this embodiment of this application, the receive link 120 may alternatively not include at least one second optical processing module, but include at least one O-$PA_{22}$.

It should be further understood that, for the transmit link 110, when the first optical processing module includes an O-$PS_1$, an O-$F_1$, and an O-$PA_1$, any sequence of positions of the O-$PS_1$ and the O-$F_1$ may be combined with any sequence of a position of the O-$PA_1$. In addition, a sequence of positions of the O-$PS_1$ and the O-Ft and a position of the O-$PA_1$ after combination is not limited. A sequence or a sequence of positions of the O-$PS_1$, the O-$F_1$, and the O-$PA_1$ is adjustable. The sequence or the sequence of positions of the O-$PS_1$, the O-$F_1$, and the O-$PA_1$ is not limited in this embodiment of this application. For example, the O-$PA_1$ may be located between the O-$PS_1$ and the O-$F_1$. For another example, the O-$PA_1$ may be located before the O-$PS_1$ and the O-$F_1$. For another example, the O-$PA_1$ may be located after the O-$PS_1$ and the O-$F_1$. In this way, optical filtering, optical phase shift, and optical power amplification can be separately performed on an analog optical signal at any wavelength, and optical processing can be separately performed on signals at a plurality of frequencies and bandwidths. In addition, the sequence of positions of the O-$F_1$, the O-$PS_1$, and the O-$PA_1$ is adjustable, so that the positions of the O-$F_1$, the O-$PS_1$, and the O-$PA_1$ can be flexibly arranged. This improves flexibility of arranging the positions of the O-$F_1$, the O-$PS_1$, and the O-$PA_1$, and facilitates implementation.

It should be further understood that, for the receive link 120, when the second optical processing module includes an O-$PS_2$, an O-$F_2$, and an O-$PA_2$, any sequence of positions of the $O\text{-}PS_2$ and the $O\text{-}F_2$ may be combined with any sequence of a position of the $O\text{-}PA_2$. In addition, a sequence of positions of the $O\text{-}PS_2$ and the $O\text{-}F_2$ and a position of the $O\text{-}PA_2$ after combination is not limited. For example, when the second optical processing module further includes at least one $O\text{-}PA_2$, a sequence or a sequence of positions of the $O\text{-}PS_2$, the $O\text{-}F_2$, and the $O\text{-}PA_2$ is adjustable. The sequence or the sequence of positions of the $O\text{-}PS_2$, the $O\text{-}F_2$, and the $O\text{-}PA_2$ is not limited in this embodiment of this application. For example, the $O\text{-}PA_2$ may be located between the $O\text{-}PS_2$ and the $O\text{-}F_2$. For another example, the $O\text{-}PA_2$ may be located before the $O\text{-}PS_2$ and the $O\text{-}F_2$. For another example, the $O\text{-}PA_2$ may be located after the $O\text{-}PS_2$ and the $O\text{-}F_2$.

Optionally, for the transmit link 110, an electrical power amplifier PA may further exist before any electro-optical module. The PA is configured to electrically amplify an analog electrical signal to be input into the any electro-optical module, and then input an amplified analog electrical signal into the electro-optical module. In this way, an analog electrical signal at any wavelength can be separately amplified, so that transmit quality and a transmit power can be ensured, and transmit efficiency can be improved.

Optionally, for the receive link 120, an electrical power amplifier PA may further exist after any optical-electrical module. The PA is configured to amplify an analog electrical signal output by the any optical-electrical module, and then input an amplified analog electrical signal into the ADC.

It should be further understood that, in this embodiment of this application, for the transmit link 110 and the receive link 120, any possible structural form of the transmit link 110 may be combined with any possible structural form of the receive link 120, to obtain a plurality of possible architectures of the central unit 100. This is not limited herein in this embodiment of this application.

Optionally, in some possible implementations of this application, the central unit 100 may further include a light source module. The light source module is configured to generate an optical carrier. The light source module may be located in the transmit link or in the receive link. For example, the light source module may be an RX multi-wavelength light source module. The light source module generates one or more optical carriers at different wavelengths. This can ensure quality of an analog optical signal output by any first electro-optical module, and improve efficiency of outputting the analog optical signal.

In a possible implementation, the one or more optical carriers at different wavelengths generated by the light source module are transmitted to another device through the first MUX and the optical fiber, so that the another device generates an optical signal based on the optical carrier. Optionally, the one or more optical carriers at different wavelengths generated by the light source module may alternatively be transmitted through another optical fiber or another MUX.

In another possible implementation, because a radio frequency signal and an optical carrier are input into a first electro-optical module, the first electro-optical module modulates the radio frequency signal to the optical carrier, and outputs an analog optical signal. The analog optical signal output by the first electro-optical module includes the optical carrier and a modulated radio frequency signal. The radio frequency signal input into the first electro-optical module may be generated by the digital signal processing module and obtained through processing by the intermediate and radio frequency module. The optical carrier may be provided by the light source module or another module. This is not limited herein in this application.

Optionally, in some possible implementations of this application, for the communications central unit 100 shown in any one of FIG. 3 to FIG. 10, TX1 is used as an example for an analog optical signal at any wavelength in the transmit link. Because the TX1 may be a combined signal of a plurality of signals at different frequencies, after the combined signal passes through the $O\text{-}PS_1$, the $O\text{-}F_1$, and the $O\text{-}PA_1$ in the transmit link, optical power amplification and phase shift are implemented for the combined signal in a unified manner. The signals at different frequencies in the combined signal have a same beam direction and power. However, in actual application, the signals at different frequencies may need to have different beam directions and powers. Therefore, the transmit link 110 of the central unit 100 may further include at least one electrical processing unit.

Any electrical processing unit includes at least one of: at least one electrical power amplifier, at least one electrical phase shifter, and an electrical combiner.

Each electrical power amplifier is configured to amplify an analog electrical signal at one frequency.

Each electrical phase shifter is configured to shift a phase of an analog electrical signal at one frequency.

The electrical combiner is configured to: combine a plurality of analog electrical signals at different frequencies that pass through all electrical power amplifiers and all electrical phase shifters into one electrical signal, and then input the one electrical signal into the first electro-optical module; or combine a plurality of analog electrical signals at different frequencies into one electrical signal, and then input the one electrical signal into the first electro-optical module.

According to the central unit provided in this application, any analog electrical signal including a plurality of different frequencies is input into the first electro-optical module. Electrical phase shift and/or electrical power amplification are/is separately performed on an electrical signal at each frequency. Analog electrical signals at different frequencies on which the electrical phase shifter and/or electrical power amplification are/is separately performed are combined into one electrical signal, and then the one electrical signal is input into the first electro-optical module. Then, optical processing is performed on the analog optical signal output by the first electro-optical module. Through two-level power amplification and/or phase shift, that is, optical and electrical power amplification and/or phase shift, unified power amplification and/or phase shift of beams at a plurality of frequencies are/is supported in optical domain, and separate power amplification and/or phase shift of beams at a plurality of frequencies are/is supported in electrical domain. Therefore, different beam directions and/or powers of signals at different frequencies are controlled. This ensures signal transmission quality and efficiency.

Optionally, in some possible implementations of this application, the electrical processing unit includes at least one electrical power amplifier and an electrical combiner. An input terminal of the electrical power amplifier is configured to input a plurality of analog electrical signals at different frequencies. An output terminal of the at least one electrical power amplifier is connected to an input terminal of the electrical combiner. An output terminal of the electrical combiner is connected to the input terminal of the first electro-optical module.

Optionally, in some possible implementations of this application, the electrical processing unit includes at least one electrical phase shifter and an electrical combiner. An input terminal of the electrical phase shifter is configured to input a plurality of analog electrical signals at different frequencies. An output terminal of the at least one electrical phase shifter is connected to an input terminal of the electrical combiner. An output terminal of the electrical combiner is connected to the input terminal of the first electro-optical module.

Optionally, in some possible implementations of this application, the electrical processing unit includes at least one electrical power amplifier, at least one electrical phase shifter, and an electrical combiner. The electrical power amplifier is connected to the electrical phase shifter. An input terminal of the electrical power amplifier and an input terminal of the electrical phase shifter are configured to input an analog electrical signal at one frequency. An output terminal of the electrical power amplifier and an output terminal of the electrical phase shifter are connected to an input terminal of the electrical combiner. An output terminal of the electrical combiner is connected to the output terminal of the first electro-optical module.

It should be understood that, that the electrical power amplifier is connected to the electrical phase shifter may include: The output terminal of the electrical power amplifier is connected to the input terminal of the electrical phase shifter, that is, the electrical power amplifier is located before the electrical phase shifter. In this case, the input terminal of the electrical power amplifier and the input terminal of the electrical phase shifter are the input terminal of the electrical power amplifier, and the output terminal of the electrical power amplifier and the output terminal of the electrical phase shifter are the output terminal of the electrical phase shifter. Alternatively, the output terminal of the electrical phase shifter may be connected to the input terminal of the electrical power amplifier, that is, the electrical phase shifter is located before the electrical power amplifier. In this case, the input terminal of the electrical power amplifier and the input terminal of the electrical phase shifter are the input terminal of the electrical phase shifter, and the output terminal of the electrical power amplifier and the output terminal of the electrical phase shifter are the output terminal of the electrical power amplifier.

Before analog electrical signals that include a plurality of different frequencies are input into the first electro-optical module, the electrical phase shifter and/or the electrical power amplifier are/is disposed to separately perform electrical phase shift or electrical power amplification on an electrical signal at each frequency in the analog electrical signals that include a plurality of different frequencies and that are input into the first electro-optical module. In this way, unified power amplification and/or phase shift of beams at a plurality of frequencies are/is supported in optical domain, and separate power amplification and/or phase shift of beams at a plurality of frequencies are/is supported in electrical domain. In addition, a sequence of positions of the electrical phase shifter and the electrical power amplifier is adjustable, so that the positions of the electrical phase shifter and the electrical power amplifier can be flexibly arranged. This improves flexibility of disposing the electrical phase shifter and the electrical power amplifier, and facilitates implementation.

The following provides a description with reference to a specific example. It should be understood that, in the following example, only TX1 is used as an example for description. For any input signal TX in any transmit link 110, a processing process of the input signal TX is the same as that of the TX1. For a similar description, refer to a description of the TX1.

Figure 11:
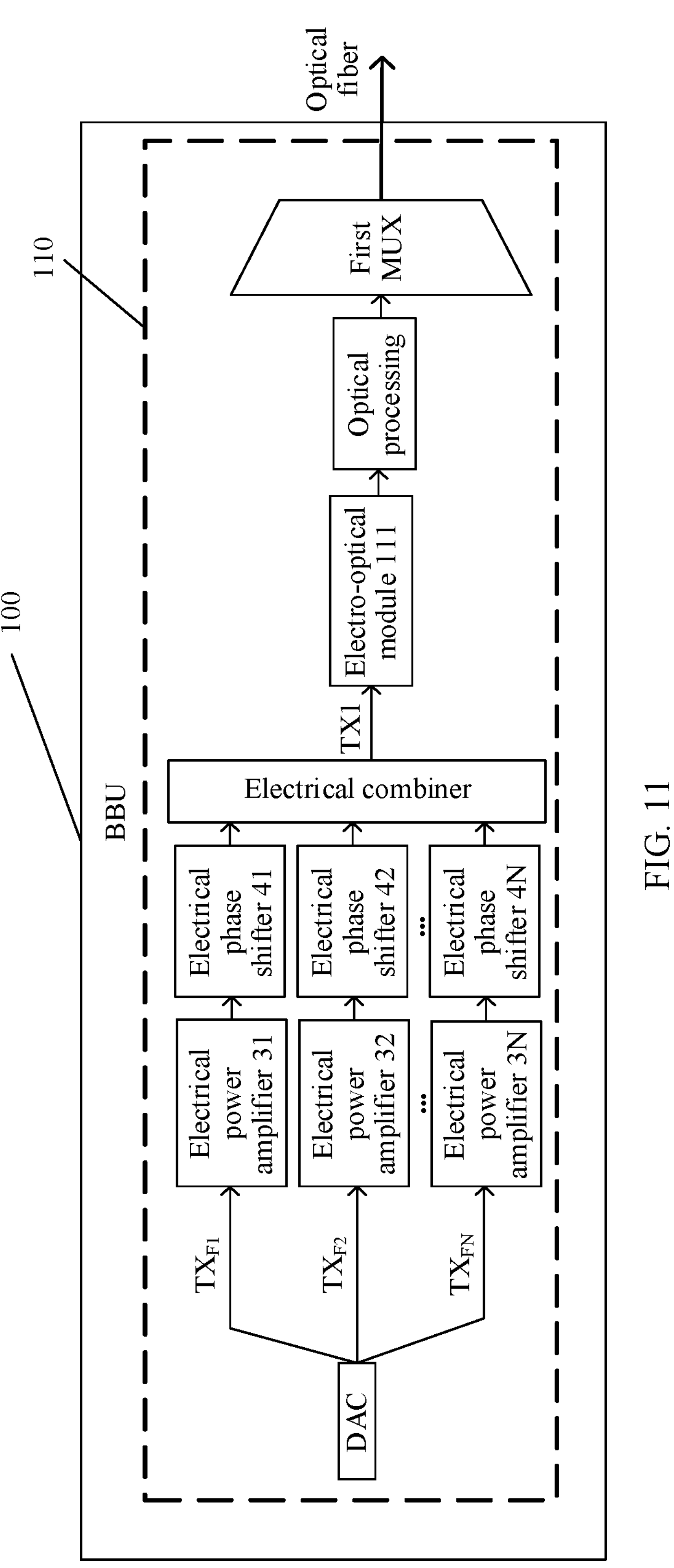
FIG. 11 to FIG. 15 are schematic block diagrams of structures of an electrical combiner, a plurality of electrical power amplifiers and/or a plurality of electrical phase shifters, and an electrical combiner that are included in a central unit according to an embodiment of this application.

FIG. 11 is a schematic diagram of an example in which the central unit includes a plurality of electrical power amplifiers, a plurality of electrical phase shifters, and an electrical combiner. As shown in FIG. 11, a plurality of electrical power amplifiers TX1 are used as an example for description. The TX1 is a combined signal of a plurality of electrical signals at different frequencies $TX_{F1}$, $TX_{F2}$, . . . , and $TX_{FN}$. An output terminal of the DAC outputs the plurality of electrical signals at different frequencies $TX_{F1}$, $TX_{F2}$, . . . , and $TX_{FN}$. Electrical power amplifiers 31 to 3N each are configured to separately amplify an electrical signal at one frequency. The electrical power amplifiers 31 to 3N output processed signals to a plurality of electrical phase shifters 41 to 4N respectively. The plurality of electrical phase shifters 41 to 4N each are configured to separately shift a phase of an electrical signal at one frequency. Output terminals of the plurality of electrical phase shifters 41 to 4N are connected to an input terminal of the electrical combiner. An output terminal of the electrical combiner outputs the TX1. The TX1 may be input into the electro-optical module 111 and enter the transmit link 110. For an optical processing process of the TX1 in the transmit link, refer to the foregoing description of the processing process of the TX1 shown in FIG. 3 to FIG. 10. For brevity, details are not described herein again. After optical processing, the TX1 is input into the optical fiber for sending. The architecture shown in FIG. 11 implements control on beam powers and directions of signals at a plurality of frequencies in electrical domain.

Figure 12:
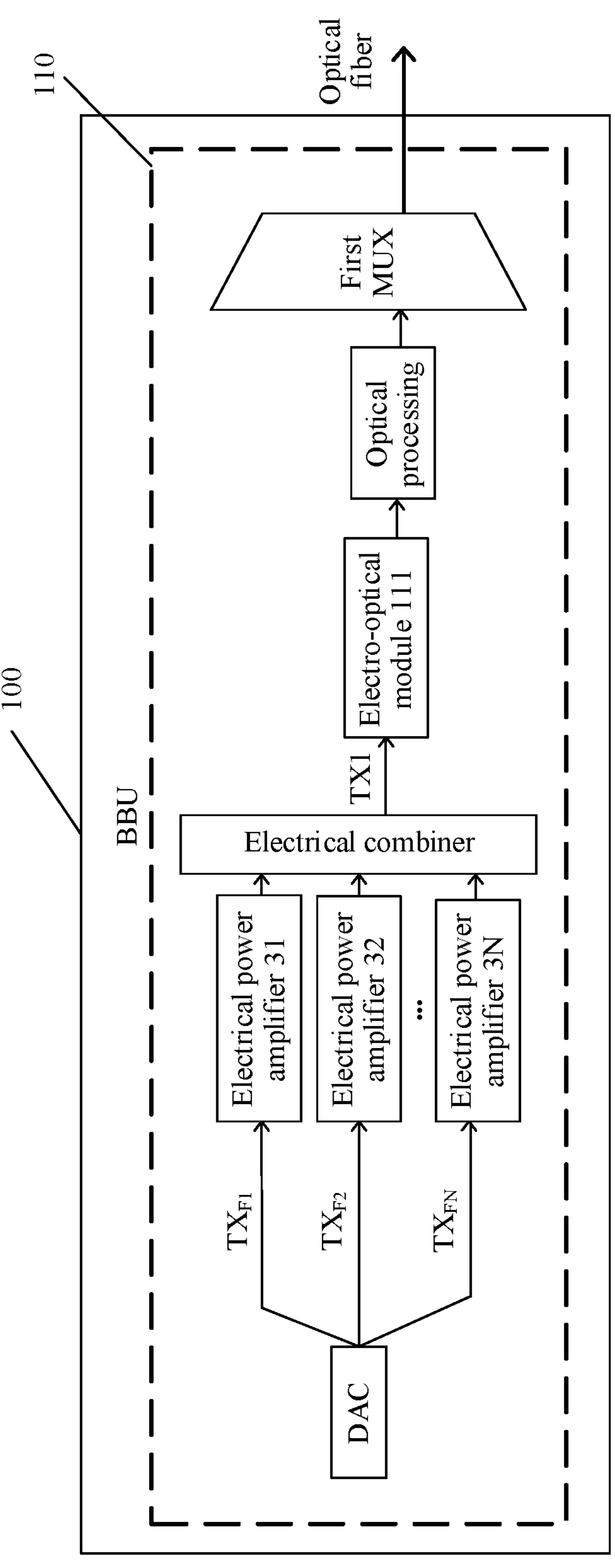

FIG. 12 is a schematic diagram of an example in which the central unit 100 includes a plurality of electrical power amplifiers, an electrical combiner, and an electrical splitter. As shown in FIG. 12, a plurality of electrical power amplifiers TX1 are used as an example for description. The TX1 is a combined signal of a plurality of electrical signals at different frequencies $TX_{F1}$, $TX_{F2}$, . . . , and $TX_{FN}$. An output terminal of the DAC outputs the plurality of electrical signals at different frequencies $TX_{F1}$, $TX_{F2}$, . . . , and $TX_{FN}$. Electrical power amplifiers 31 to 3N each are configured to separately amplify an electrical signal at one frequency. Output terminals of the electrical power amplifiers 31 to 3N are connected to an input terminal of the electrical combiner. An output terminal of the electrical combiner outputs the TX1. The TX1 may be input into the electro-optical module 111 and enter the transmit link 110. For an optical processing process of the TX1 in the transmit link, refer to the foregoing description of the processing process of the TX1 shown in FIG. 3 to FIG. 10. For brevity, details are not described herein again. After optical processing, the TX1 is input into the optical fiber for sending. The architecture shown in FIG. 12 implements control on beam powers of signals at a plurality of frequencies in electrical domain.

Figure 13:
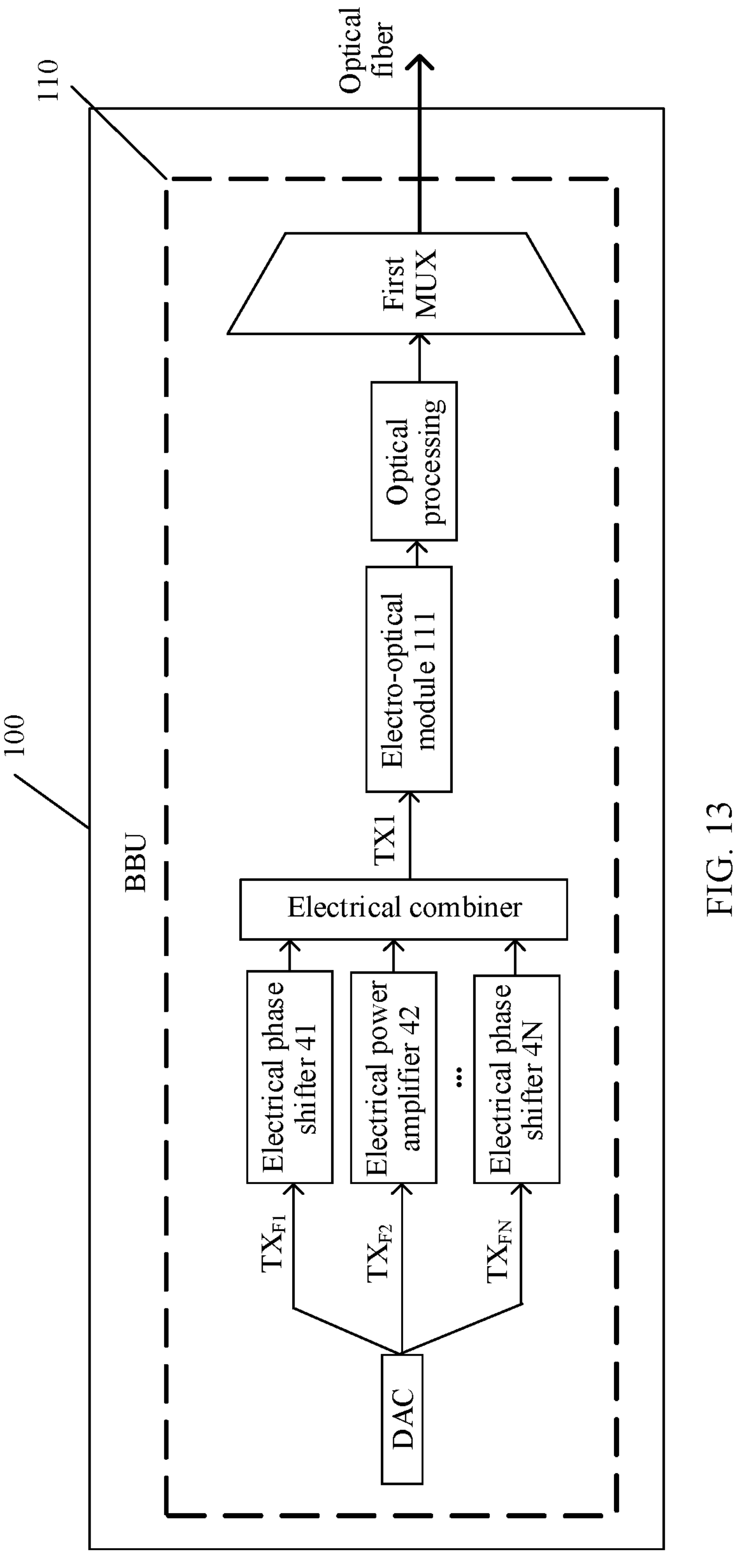

FIG. 13 is a schematic diagram of an example in which the central unit includes a plurality of electrical phase shifters, an electrical combiner, and an electrical splitter. As shown in FIG. 13, a plurality of electrical power amplifiers TX1 are used as an example for description. The TX1 is a combined signal of a plurality of electrical signals at different frequencies $TX_{F1}$, $TX_{F2}$, . . . , and $TX_{FN}$. An input terminal of the electrical splitter is connected to an output terminal of the DAC, and decomposes one signal output by the DAC into the plurality of electrical signals at different frequencies $TX_{F1}$, $TX_{F2}$, . . . , and $TX_{FN}$. A plurality of electrical phase shifters 41 to 4N each are configured to separately shift a phase of an electrical signal at one frequency. Output terminals of the plurality of electrical phase shifters 41 to 4N are connected to an input terminal of the electrical combiner. An output terminal of the electrical combiner outputs the TX1. The TX1 may be input into the electro-optical module 111 and enter the transmit link 110. For an optical processing process of the TX1 in the transmit link, refer to the foregoing description of the processing process of the TX1 shown in FIG. 3 to FIG. 10. For brevity, details are not described herein again. After optical processing, the TX1 is input into the optical fiber for sending. The architecture shown in FIG. 11 implements control on beam powers and directions of signals at a plurality of frequencies in electrical domain.

Figure 14:
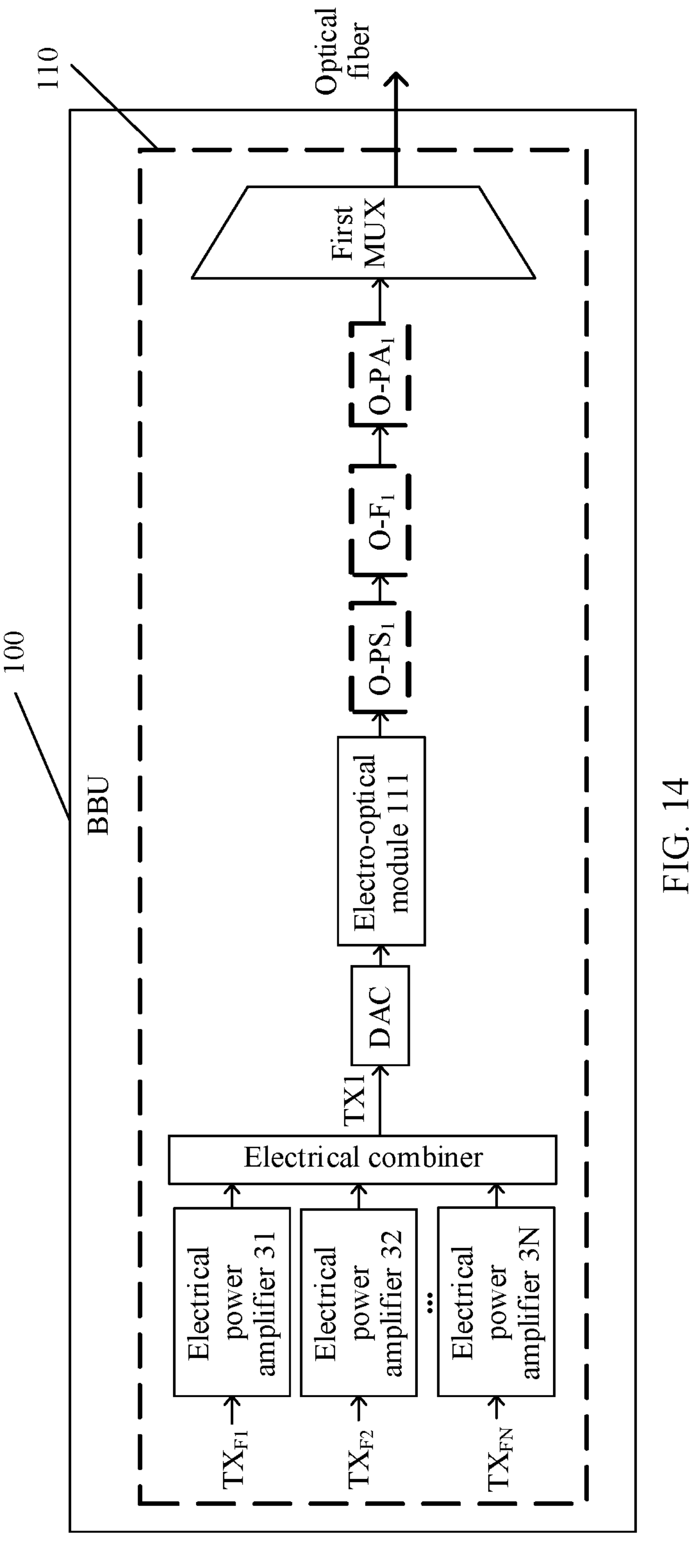

FIG. 14 is a schematic diagram of an architecture of an example in which the communications central unit further includes a plurality of electrical power amplifiers and an electrical combiner. As shown in FIG. 14, an example in which the plurality of electrical power amplifiers and the electrical combiner process TX1 is used for description. The plurality of electrical power amplifiers and the electrical combiner are located before the DAC. The TX1 is a combined signal of a plurality of electrical signals at different frequencies $TX_{F1}$, $TX_{F2}$, and $TX_{FN}$. Electrical power amplifiers 31 to 3N each are configured to separately amplify an electrical signal at one frequency. Output terminals of the electrical power amplifiers 31 to 3N are connected to an input terminal of the electrical combiner. An output terminal of the electrical combiner outputs the TX1. After the TX1 passes through the DAC, the TX1 may be input into the electro-optical module 111 and enter the transmit link 110. For a processing process of the TX1 in the transmit link 110, refer to the foregoing description of the processing process of the TX1 shown in FIG. 3 to FIG. 10. For brevity, details are not described herein again. After optical processing, the TX1 is input into the optical fiber for sending. The architecture shown in FIG. 15 implements separate power amplification on beam powers of signals at a plurality of frequencies in electrical domain.

Figure 15:
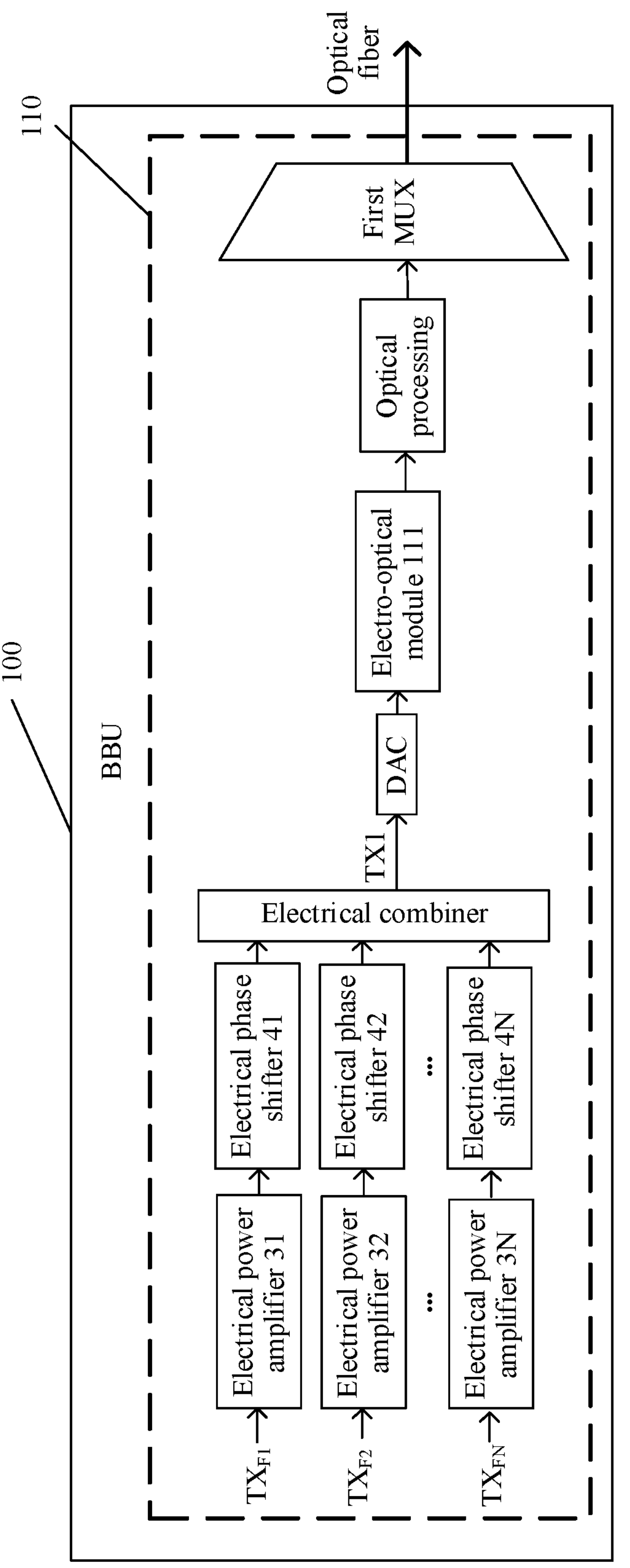

FIG. 15 is a schematic diagram of an architecture of an example in which the communications central unit further includes a plurality of electrical power amplifiers, a plurality of electrical phase shifters, and an electrical combiner. As shown in FIG. 15, an example in which the plurality of electrical power amplifiers, the plurality of electrical phase shifters, the electrical combiner, and an electrical splitter process TX1 is used for description. The TX1 is a combined signal of a plurality of electrical signals at different frequencies $TX_{F1}$, $TX_{F2}$, . . . , and $TX_{FN}$. The plurality of electrical power amplifiers are connected to the plurality of electrical phase shifters. Optionally, output terminals of the plurality of electrical power amplifiers may be connected to input terminals of the plurality of electrical phase shifters respectively, that is, the plurality of electrical power amplifiers are located before the plurality of electrical phase shifters. Alternatively, output terminals of the plurality of electrical phase shifters may be connected to input terminals of the plurality of electrical power amplifiers respectively, that is, the plurality of electrical phase shifters are located before the plurality of electrical power amplifiers. After the electrical signals at different frequencies $TX_{F1}$, $TX_{F2}$, and $TX_{FN}$ pass through the electrical power amplifiers, the electrical phase shifters, and the electrical combiner, the TX1 is output. After the TX1 passes through the DAC, the TX1 may be input into the electro-optical module 111 for optical processing. For an optical processing process, refer to the foregoing description of the processing process of the TX1 shown in FIG. 3 to FIG. 10. For brevity, details are not described herein again. After optical processing, the TX1 is input into the optical fiber for sending. As shown in FIG. 15, the output terminals of the plurality of electrical power amplifiers are connected to the input terminals of the plurality of electrical phase shifters respectively. The architecture shown in FIG. 15 implements control on beam directions and powers of signals at a plurality of frequencies.

Figure 16:
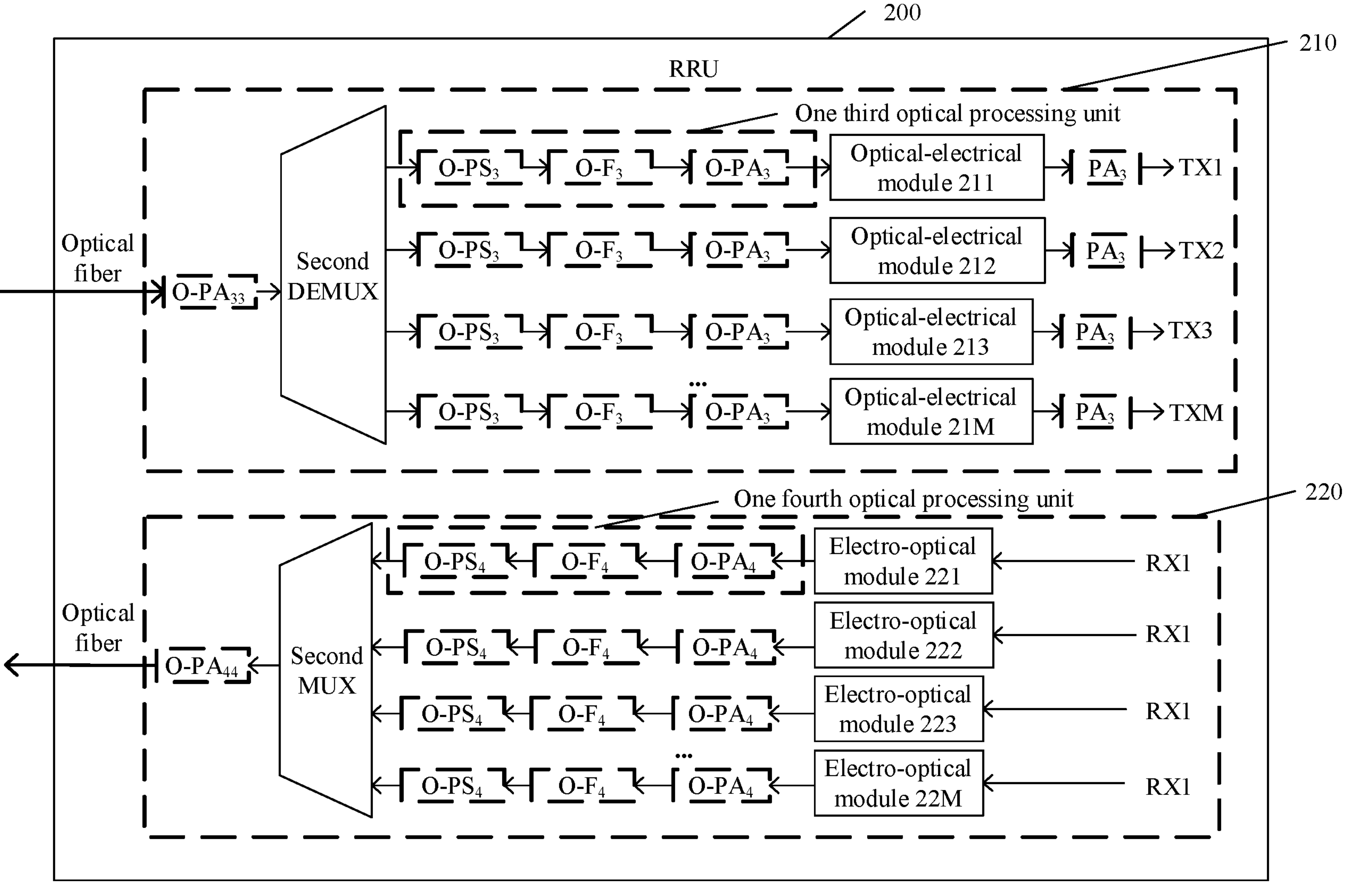
FIG. 16 to FIG. 25 are schematic block diagrams of structures of a remote unit according to an embodiment of this application.

An embodiment of this application provides a remote unit 200. With reference to FIG. 16, the following describes the remote unit 200 provided in this application. It should be understood that the remote unit in this application may be an RRU or a DU.

As shown in FIG. 16, the remote unit 200 includes a transmit link 210 and a receive link 220.

The transmit link 210 includes:

a second DEMUX, configured to decompose one analog optical signal into a plurality of analog optical signals at different wavelengths;

at least one third optical processing module, where any third optical processing module includes at least one of the following components: at least one third optical filter $O\text{-}F_3$, at least one third optical phase shifter $O\text{-}PS_3$, and at least one third optical power amplifier $O\text{-}PA_3$, the $O\text{-}F_3$ is configured to filter an analog optical signal, the $O\text{-}PS_3$ is configured to shift a phase of the analog optical signal, and the $O\text{-}PA_3$ is configured to amplify the analog optical signal; and the third optical processing module is configured to obtain an analog optical signal at one wavelength output by the second DEMUX, and output an analog optical signal processed by the third optical processing module; and at least one second optical-electrical module, where FIG. 16 is a schematic diagram of a plurality of second optical-electrical modules; the at least one second optical-electrical module is one or more of optical-electrical modules 211 to 21M shown in FIG. 14; and each second optical-electrical module is configured to receive one analog optical signal, and convert the one analog optical signal into an analog electrical signal, and optionally, one second optical-electrical module is configured to convert one analog optical signal output by one third optical processing module into an analog electrical signal, and send the analog electrical signal through an antenna unit.

The receive link 220 includes:

at least one second electro-optical module, where the at least one second electro-optical module is one or more of an electro-optical module 221 to an electro-optical module 22M shown in FIG. 16, each second electro-optical module is configured to receive one analog electrical signal RX and convert the one analog electrical signal RX into an analog optical signal, and analog optical signals output by different second electro-optical modules may have different wavelengths; and a second MUX, configured to combine a plurality of analog optical signals at different wavelengths output by the at least one second electro-optical module into one analog optical signal, where as shown in FIG. 16, the second MUX combines a plurality of analog optical signals at different wavelengths output by the electro-optical module 221 to the electro-optical module 22M into one analog optical signal.

Optionally, the receive link 220 may further include at least one fourth optical processing module. Any fourth optical processing module includes at least one of the following components: at least one fourth optical filter $O\text{-}F_4$ and at least one fourth optical phase shifter $O\text{-}PS_4$.

The $O\text{-}F_4$ is configured to filter an analog optical signal, and the $O\text{-}PS_4$ is configured to shift a phase of the analog optical signal.

Optionally, the fourth optical processing module may further include at least one fourth optical power amplifier $O\text{-}PA_4$. The $O\text{-}PA_4$ is configured to amplify the analog optical signal.

One fourth optical processing module is configured to obtain an analog optical signal output by one second electro-optical module, and output an analog optical signal processed by the fourth optical processing module. The analog optical signal output by the at least one fourth optical processing module is input into the second MUX.

FIG. 16 is a schematic diagram in which the transmit link 210 and the receive link 220 include the third optical processing module and the fourth optical processing module respectively.

For the transmit link 210, an analog optical signal transmitted on an optical fiber is transmitted to the second DEMUX. It should be understood that the analog optical signal input into the second DEMUX includes a plurality of signals at different wavelengths. The second DEMUX decomposes (de-multiplexes) the input analog optical signal into a plurality of analog optical signals at different wavelengths. One analog optical signal obtained through decomposition sequentially passes through one $O\text{-}PS_3$, one $O\text{-}F_3$, one $O\text{-}PA_3$, and one second optical-electrical module, and finally be converted into an analog electrical signal.

Optionally, for the transmit link 210, an electrical power amplifier $PA_3$ may further exist after any optical-electrical module. One $PA_3$ may be configured to amplify an analog electrical signal output by one optical-electrical module, and then send an amplified analog electrical signal to a terminal device or another device through the antenna unit. That is, the remote unit 200 may further include the antenna unit. In this way, an analog electrical signal at any wavelength can be separately amplified, so that transmit quality and a transmit power can be ensured, and transmit efficiency can be improved.

Optionally, an analog electrical signal output by any second optical-electrical module may not pass through the $PA_3$, but is directly sent through the antenna unit. That is, the transmit link 210 may not include the $PA_3$.

Optionally, before the analog optical signal is input into the second DEMUX, a pre-optical power amplifier $O\text{-}PA_{33}$ may further exist. The $O\text{-}PA_{33}$ is configured to amplify one analog optical signal, and then input an amplified analog optical signal into the second DEMUX. An input terminal of the $O\text{-}PA_{33}$ is connected to an output terminal of the optical fiber, and an output terminal of the $O\text{-}PA_{33}$ is connected to an input terminal of the second DEMUX. Analog optical signals at different wavelengths input into the second DEMUX can be amplified in a unified manner. For example, when the analog optical signals at different wavelengths need to be amplified by a same multiple, an optical power amplifier $O\text{-}PA_3$ may not be disposed on a transmission path of each analog optical signal after the second DEMUX. This can reduce a quantity of optical power amplifiers required by the remote unit 200, and reduce costs and complexity of implementation. Alternatively, when the analog optical signals at different wavelengths need to be amplified by different multiples, the pre-optical power amplifier $O\text{-}PA_{33}$ may amplify the analog optical signals at different wavelengths in a unified manner. However, an optical power amplifier $O\text{-}PA_3$ disposed on a transmission path of each analog optical signal after the second DEMUX may separately amplify the analog optical signal. In this way, efficiency of performing optical power amplification on the analog optical signals at different wavelengths can be improved, implementation is flexible, and two-level optical power amplification is implemented.

As shown in FIG. 16, for the receive link 220, a received radio frequency signal RX1 is used as an example for description. The RX1 may be received through the antenna unit and transmitted to the electro-optical module 221. Specifically, the radio frequency signal and an optical carrier are input into the optical-electrical module 211. The optical carrier may be generated by the electro-optical module 221 or a light source module included in the electro-optical module 221, or the optical carrier may be provided by an external light source. An analog optical signal output by the electro-optical module 221 sequentially passes through the $O\text{-}PA_4$, the $O\text{-}F_4$, and the $O\text{-}PS_4$. An analog electrical signal output by the $O\text{-}PS_4$ is input into the second MUX. It should be understood that analog optical signals that are input into the second MUX by different $(O\text{-}PS_4)$s may have different wavelengths. The second MUX combines the plurality of analog optical signals at different wavelengths into one analog optical signal.

Optionally, the analog optical signal output by the second MUX may be further amplified by a post optical power amplifier $O\text{-}PA_{44}$, then output to the optical fiber, and transmitted to another device through the optical fiber. That is, the post optical power amplifier $O\text{-}PA_{44}$ may exist after the second MUX. An output terminal of the $O\text{-}PA_{44}$ is connected to an input terminal of the optical fiber, and an input terminal of the $O\text{-}PA_{44}$ is connected to an output terminal of the second MUX. Analog optical signals at different wavelengths output by the first MUX can be amplified in a unified manner. For example, when the analog optical signals at different wavelengths need to be amplified by a same multiple, an optical power amplifier $O\text{-}PA_4$ may not be disposed on a transmission path of each analog optical signal before the second MUX. This can reduce a quantity of optical power amplifiers required by the remote unit 200, and reduce costs and complexity of implementation. Alternatively, when the analog optical signals at different wavelengths need to be amplified by different multiples, the post optical power amplifier $O\text{-}PA_{44}$ may amplify the analog optical signals at different wavelengths in a unified manner. However, an optical power amplifier $O\text{-}PA_4$ disposed on a transmission path of each analog optical signal before the second MUX may separately amplify the analog optical signal. In this way, efficiency of performing optical power amplification on the analog optical signals at different wavelengths can be improved, implementation is flexible, and two-level optical power amplification is implemented.

In this embodiment of this application, the transmit link 210 may be a link for the remote unit 200 to send a signal to another device (for example, a terminal device), and the transmit link 210 may also be referred to as a downlink.

In this embodiment of this application, the receive link 220 may be understood as a link for the remote unit 200 to receive a signal sent by another device. The receive link 220 may also be referred to as an uplink.

It should be understood that, in this embodiment of this application, a plurality of third optical processing modules may be integrated into one optical processor, and a plurality of fourth optical processing modules may also be integrated into one optical processor.

It should be further understood that, in this embodiment of this application, any one or more of a plurality of optical processing components included in one third optical processing module may be integrated into one optical processor.

For example, it is assumed that one third optical processing module includes an O-$PS_3$, an O-$F_3$, and an O-$PA_3$. The O-$PS_3$ and the O-$F_3$ may be integrated into one optical processor, the O-$F_3$ and the O-$PA_3$ may be integrated into one optical processor, or the O-$PS_3$, the O-$F_3$, and the O-$PA_3$ may be integrated into one optical processor.

Similarly, any one or more of a plurality of optical processing components included in one fourth optical processing module may also be integrated into one optical processor.

It should be further understood that FIG. 16 is merely an example, and should not constitute a limitation on a sequence (or a sequence of positions) and quantities of (O-$PS_3$)s, (O-$F_3$)s, and (O-$PA_3$)s in the transmit link 210, and should not constitute a limitation on a quantity of (O-$PA_{33}$)s in the transmit link 210, either. Similarly, FIG. 3 should not constitute a limitation on a sequence (or a sequence of positions) and quantities of (O-$PS_4$)s, (O-$F_4$)s, and (O-$PA_4$)s in the receive link 220, and should not constitute a limitation on a quantity of (O-$PA_{44}$)s in the receive link 220, either. For example, an analog optical signal output by an output terminal of the electro-optical module 221 may pass through one or more of the three optical components: the O-$PS_4$, the O-$F_4$, and the O-$PA_4$, and a quantity, a sequence, and the like of one or more optical components through which the analog optical signal passes may be set based on requirements. Similarly, an analog optical signal output by an output terminal of the second DEMUX may pass through one or more of the three optical components: the O-$PS_3$, the O-$F_3$, and the O-$PA_3$, and a quantity, a sequence, and the like of one or more optical components through which the analog optical signal passes may be set based on requirements.

It should be further understood that optical components (the O-$PS_3$, the O-$F_3$, the O-$PA_3$, the O-$PS_4$, the O-$F_4$, the O-$PA_4$, the $PA_3$, the O-$PA_{33}$, and the O-$PA_{44}$) represented by dashed boxes in FIG. 16 are optional, and the remote unit 200 may include only a part or all of the optical components represented by the dashed boxes.

It should be further understood that, as shown in FIG. 16, an analog optical signal is transmitted on the optical fiber, where the analog optical signal may be any one of a QAM modulation signal, an intermediate frequency analog signal, or a radio frequency analog signal. This is not limited herein in this embodiment of this application.

It should be further understood that, in this embodiment of this application, the third optical processing module may be located between the second DEMUX and the second optical-electrical module, and the fourth optical processing module may be located between the electro-optical module and the second MUX.

According to the remote unit provided in this application, at least one optical-electrical component of an optical power amplifier, an optical filter, and an optical phase shifter is disposed in the remote unit, and a sequence of the optical power amplifier, the optical filter, and the optical phase shifter is adjustable, so that the remote unit can support multi-frequency band or high-frequency communication when the remote unit uses a wired analog optical communications technology. This ensures communication quality and efficiency of the remote unit in a multi-frequency band or high-frequency system, and improves communication efficiency of the remote unit. In addition, because an optical component is easy to integrate, a chip may be used for control. Therefore, the remote unit may be controlled by using a miniaturized integrated chip. Costs and complexity of implementation are reduced.

Figure 17:
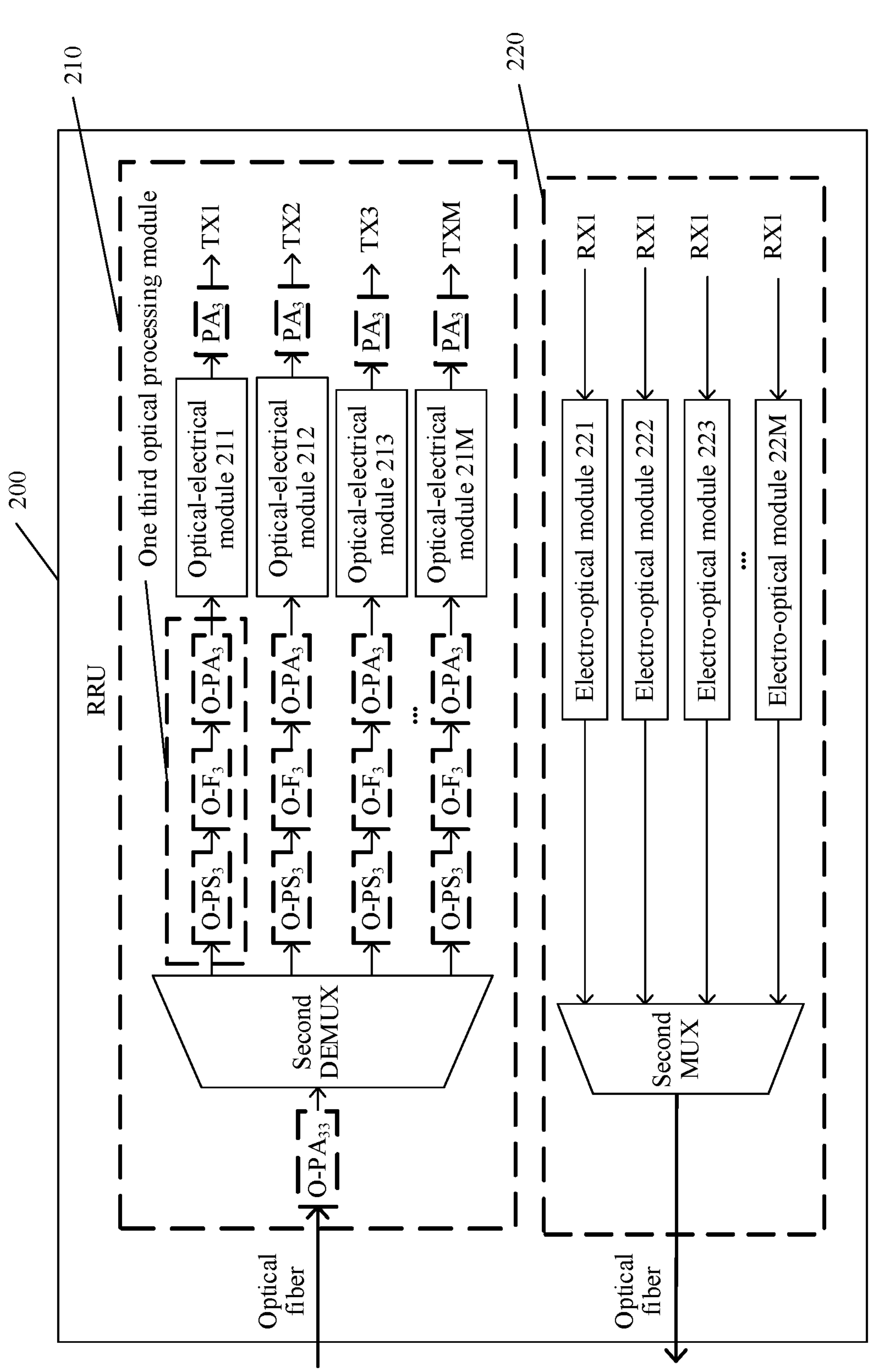

Optionally, in a possible implementation, FIG. 17 is another schematic block diagram of a structure of the remote unit 200 according to this application. The transmit link 210 includes at least one third optical processing module and/or an O-$PA_{33}$. The receive link 220 includes neither at least one fourth optical processing module nor an O-$PA_{44}$.

Figure 18:
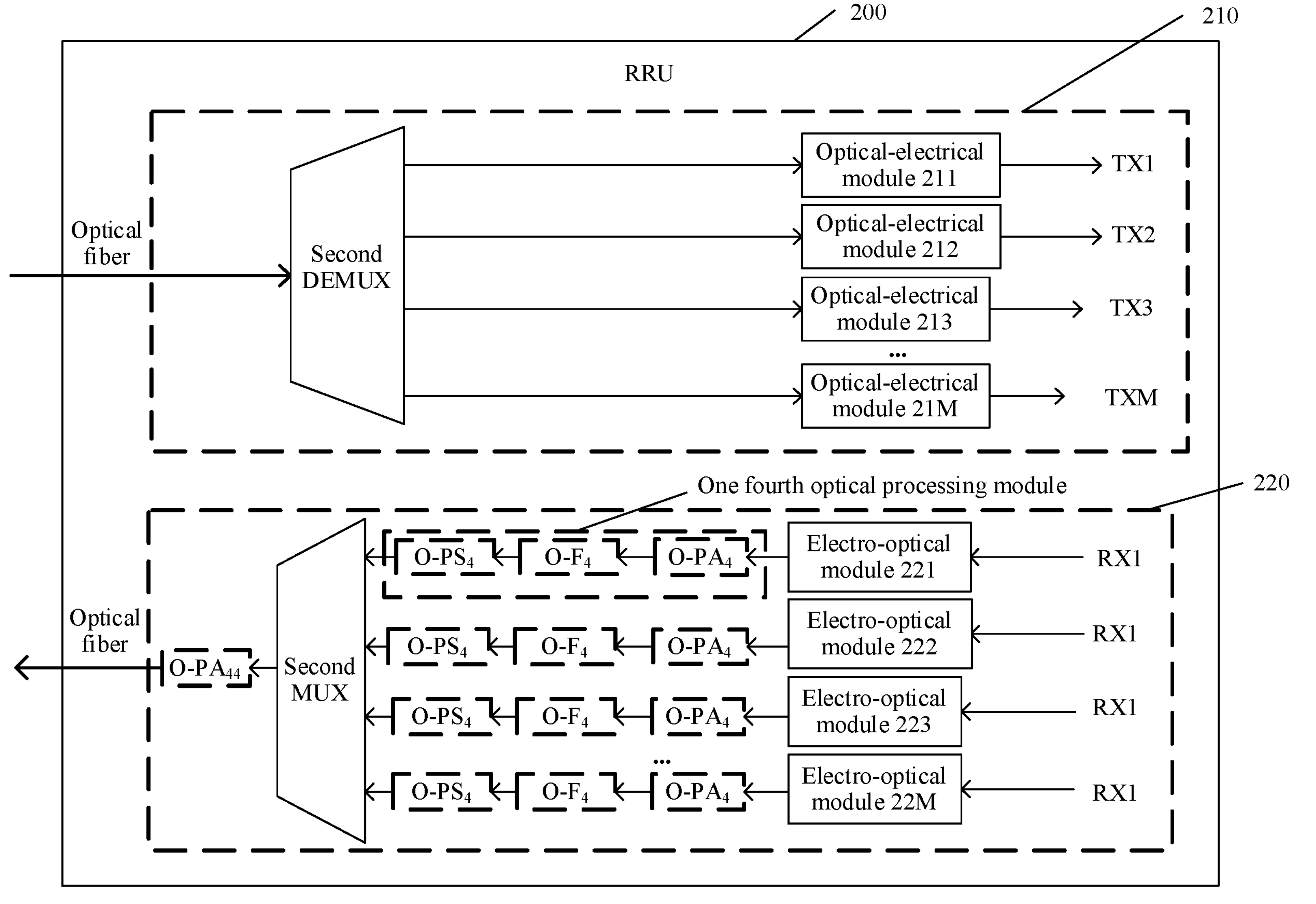

Optionally, in a possible implementation, FIG. 18 is another schematic block diagram of a structure of the remote unit 200 according to this application. The transmit link 210 includes neither at least one third optical processing module nor an O-$PA_{33}$. The receive link 220 includes at least one fourth optical processing module and/or an O-$PA_{44}$.

Optionally, in a possible implementation, the remote unit 200 may alternatively include only the transmit link 210, but not include the receive link 220. Alternatively, the remote unit 200 may not include the transmit link 210, but include only the receive link 220.

Figure 19:
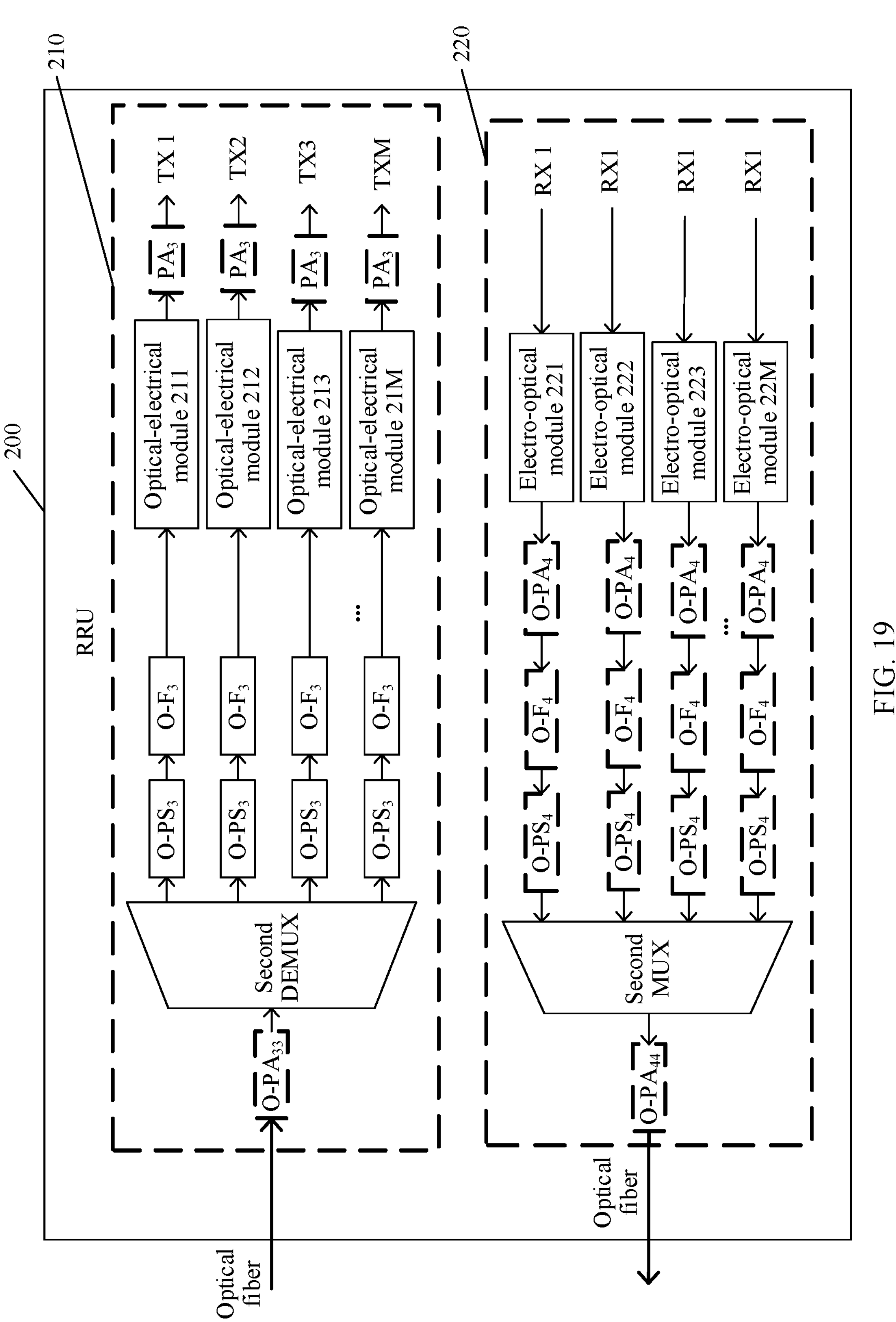
Figure 20:
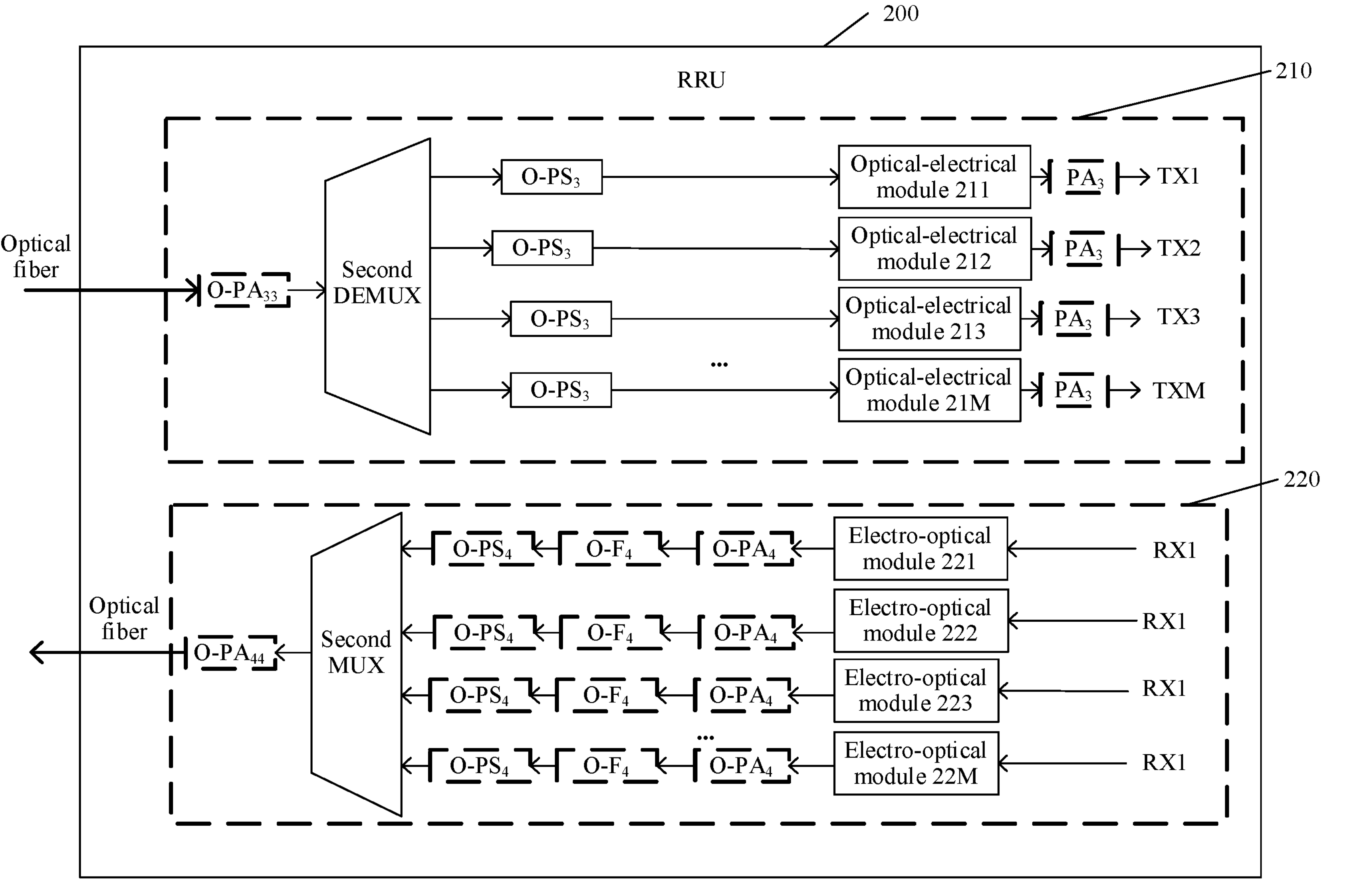
Figure 21:
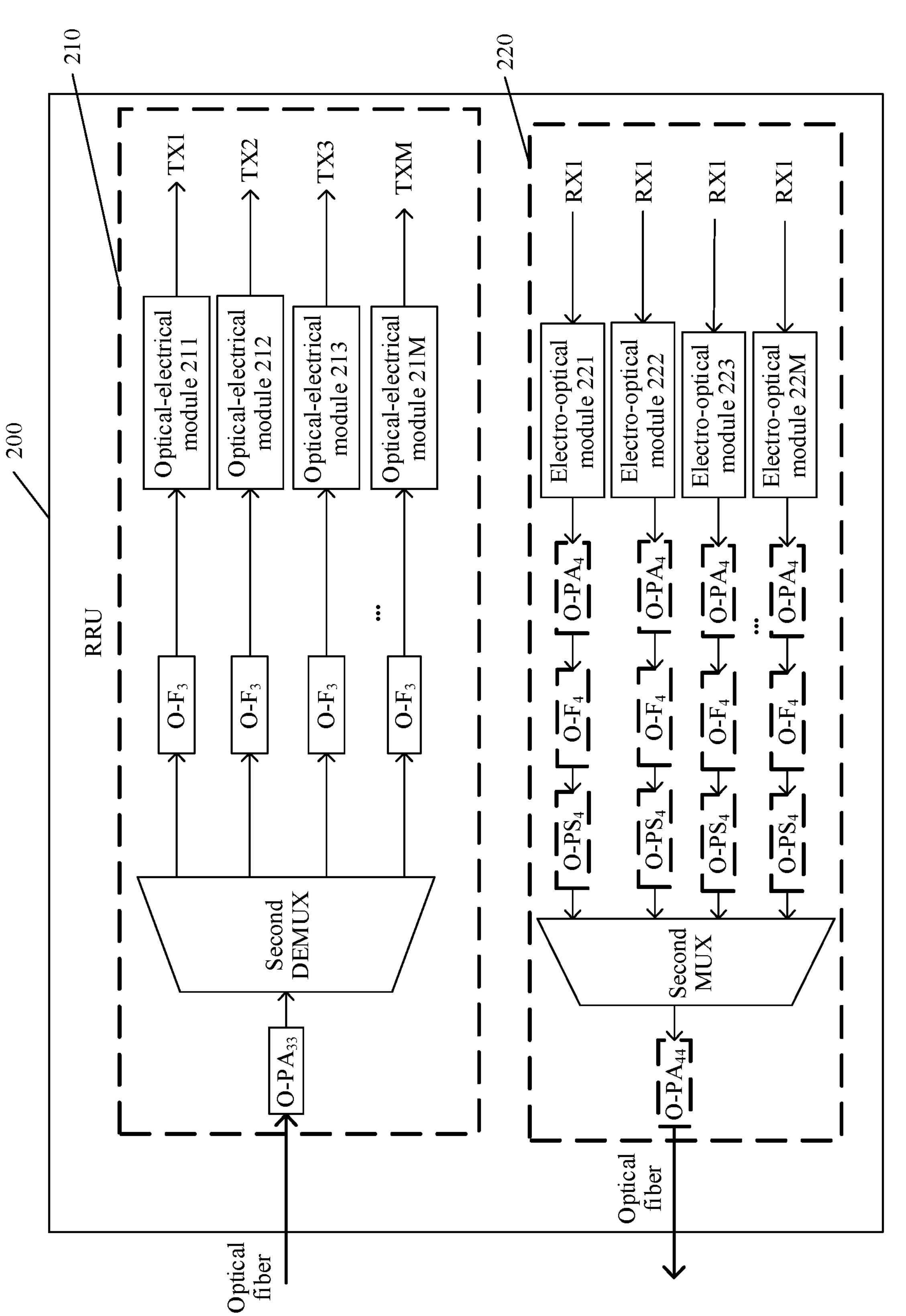

Optionally, in some possible implementations of this application, when the transmit link 210 includes the third optical processing module, the transmit link 210 is used as an example for description, as shown in FIG. 19 to FIG. 21. For a path through which any TX signal passes, there may be the following three positions and sequences of an O-$PS_3$ and an O-$F_3$:

Type 1: As shown in FIG. 19, the third optical processing module includes at least one O-$PS_3$ and at least one O-$F_3$. One O-$PS_3$ is connected to one O-$F_3$. An output terminal of the O-$PS_3$ and an output terminal of the O-$F_3$ are connected to an input terminal of the second optical-electrical module (for example, the optical-electrical module 211). An input terminal of the O-$PS_3$ and an input terminal of the O-$F_3$ are connected to the output terminal of the second DEMUX. In addition, that the O-$PS_3$ is connected to the O-$F_3$ may include: The output terminal of the O-$PS_3$ is connected to the input terminal of the O-$F_3$, that is, the O-$PS_3$ is located before the O-$F_3$. In this case, the input terminal of the O-$PS_3$ and the input terminal of the O-$F_3$ are the input terminal of the O-$PS_3$, and the output terminal of the O-$PS_3$ and the output terminal of the O-$F_3$ are the output terminal of the O-$F_3$. Alternatively, the output terminal of the O-$F_3$ is connected to the input terminal of the O-$PS_3$, that is, the O-$F_3$ is located before the O-$PS_3$. In this case, the input terminal of the O-$F_3$ and the input terminal of the O-$PS_3$ are the input terminal of the O-$F_3$, and the output terminal of the O-$F_3$ and the output terminal of the O-$PS_1$ are the output terminal of the O-$PS_3$. FIG. 19 shows an example in which the O-$PS_3$ is located before the O-$F_3$. In other words, the third optical filter is connected to the third optical phase shifter, the input terminal of the third optical filter and the input terminal of the third optical phase shifter are connected to the output terminal of the second DEMUX, and the output terminal of the third optical filter and the output terminal of the third optical phase shifter are connected to the input terminal of the second optical-electrical module. The third optical processing module includes at least one O-$PS_3$ and at least one O-$F_3$, so that optical filtering and optical phase shift can be separately performed on an analog optical signal at any wavelength, and optical processing can be separately performed on signals at a plurality of frequencies and bandwidths. In addition, a sequence of positions of the O-$F_3$ and the O-$PS_3$ is adjustable, so that the positions of the O-$F_3$ and the O-$PS_3$ can be flexibly arranged. This improves flexibility of disposing the O-$F_3$ and the O-$PS_3$, and facilitates implementation.

Type 2: The third optical processing module does not include at least one O-$F_3$, but includes at least one O-$PS_3$. In this case, one O-$PS_3$ may be located between the second optical-electrical module and the second DEMUX. An input terminal of the O-$PS_3$ is connected to the output terminal of the second DEMUX. An output terminal of the O-$PS_3$ is connected to the input terminal of the second optical-electrical module (for example, the optical-electrical module 211), as shown in FIG. 20. In other words, the input terminal of the third optical phase shifter is connected to the output terminal of the second DEMUX, and the output terminal of the third optical phase shifter is connected to an input terminal of a third optical-electrical module. The third optical processing module includes at least one O-$PS_3$, so that optical phase shift can be separately performed on an analog optical signal at any wavelength, and optical phase shift can be separately performed on signals at a plurality of frequencies and bandwidths. This facilitates implementation.

Type 3: The third optical processing module does not include at least one O-$PS_3$, but includes at least one O-$F_3$. In this case, the O-$F_3$ may be located between the second optical-electrical module and the second DEMUX. An input terminal of the O-$F_3$ is connected to the output terminal of the second DEMUX. An output terminal of the O-$F_3$ is connected to the output terminal of the second optical-electrical module (for example, the optical-electrical module 211), as shown in FIG. 21. In other words, the input terminal of the third optical filter is connected to the output terminal of the second demultiplexer, and the output terminal of the third optical filter is connected to an input terminal of a third optical-electrical module. The third optical processing module includes at least one O-$F_3$, so that optical filtering can be separately performed on an analog optical signal at any wavelength, and optical filtering can be separately performed on signals at a plurality of frequencies and bandwidths. This facilitates implementation.

It should be understood that, in this embodiment of this application, if the receive link 220 includes the fourth optical processing module, for a path through which any RX signal passes, positions and sequences of an O-$PS_4$ and an O-$F_4$ may be similar to the positions and the sequences of the O-$PS_4$ and the O-$F_4$ in the transmit link 210. For similar descriptions, refer to the foregoing related descriptions of the positions and the sequences of the O-$PS_4$ and the O-$F_4$. For brevity, details are not described herein again.

Figure 22:
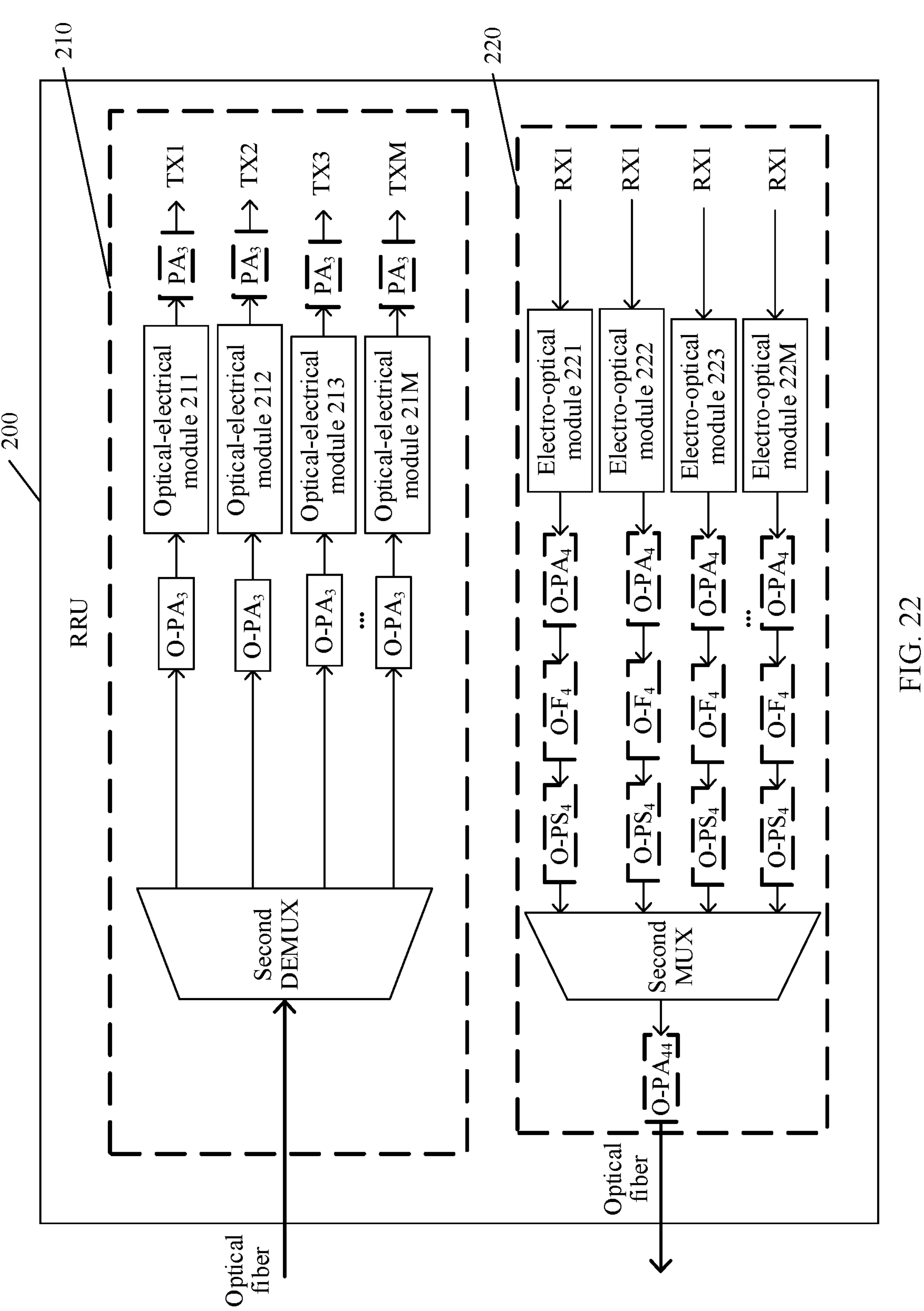
Figure 23:
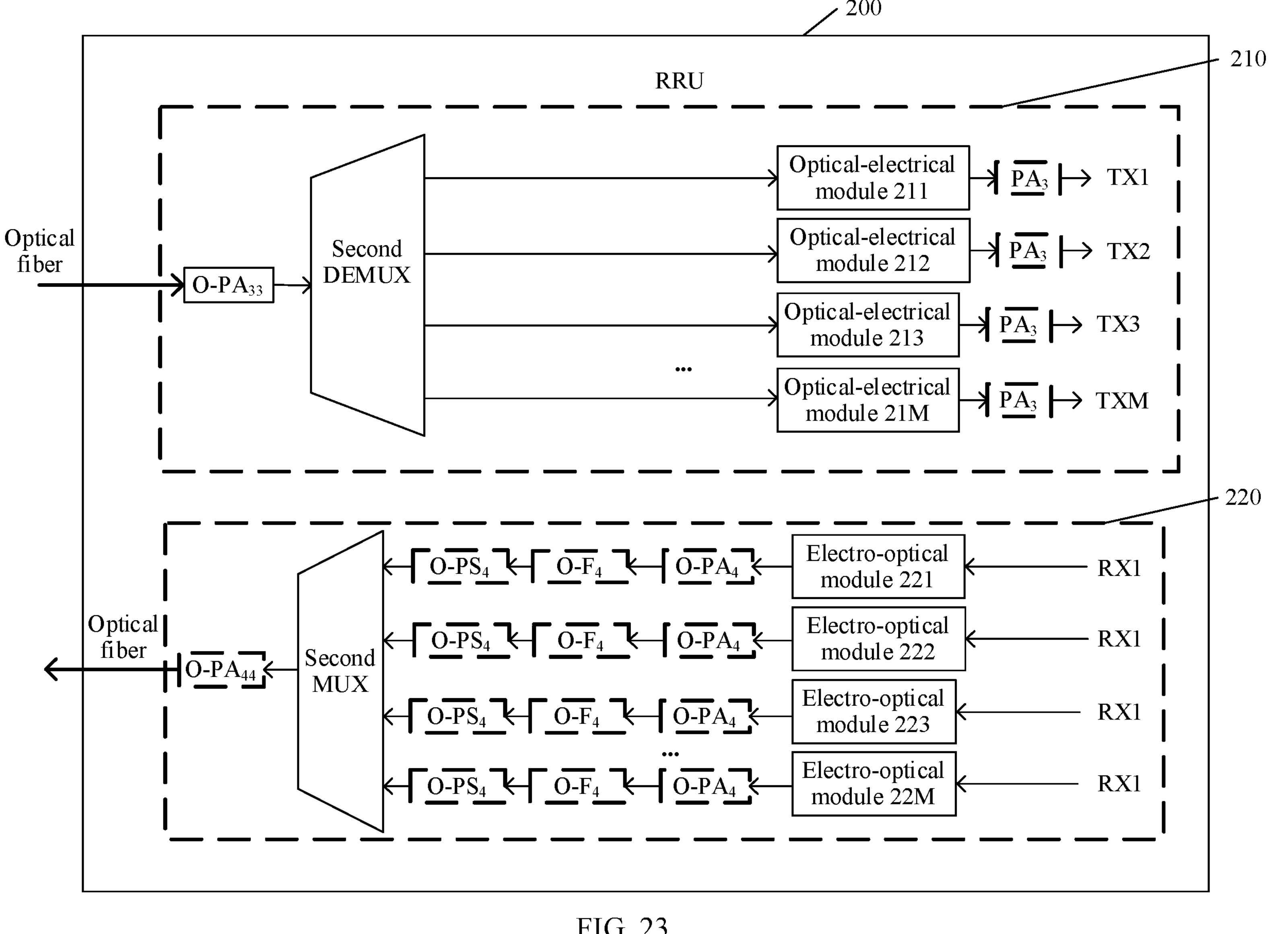

Optionally, in some possible implementations of this application, the transmit link 210 is used as an example for description, as shown in FIG. 22 and FIG. 23. For a path through which any TX signal passes, there may be the following two positions of an O-PA:

Type 1: The third optical processing module includes at least one O-$PA_3$, but the remote unit 200 does not include at least one O-$PA_{33}$. An input terminal of the O-$PA_3$ is connected to the output terminal of the second DEMUX, and an output terminal of the O-$PA_3$ is connected to the input terminal of the second optical-electrical module (for example, the optical-electrical module 211). As shown in FIG. 22, the O-$PA_3$ is located between the optical-electrical module and the second DEMUX. In this implementation, analog optical signals at different wavelengths input into the second DEMUX can be amplified in a unified manner. This can reduce a quantity of optical power amplifiers required by the central unit 100, and reduce costs and complexity of implementation.

Type 2: The third optical processing module does not include at least one O-$PA_3$, but the remote unit 200 includes at least one O-$PA_{33}$. As shown in FIG. 23, the O-$PA_{33}$ is located between the optical fiber and the second DEMUX. In this implementation, optical power amplification can be separately performed on each analog optical signal. In this way, efficiency and precision of performing optical power amplification on analog optical signals at different wavelengths can be improved, and implementation flexibility is high.

It should be understood that, in this embodiment of this application, when the third optical processing module includes at least one O-$PA_3$, the transmit link 210 may also include at least one O-$PA_{33}$. For example, FIG. 16 shows a case in which the transmit link 210 may also include at least one O-$PA_{33}$ when the third optical processing module includes at least one O-$PA_3$.

It should be understood that, in this embodiment of this application, the remote unit 200 may alternatively not include at least one third optical processing module, but include at least one O-$PA_{33}$, as shown in FIG. 23. Optionally, in FIG. 23, the remote unit 200 may not include at least one $PA_3$.

It should be understood that, in this embodiment of this application, if the receive link 220 includes the fourth optical processing module and the fourth optical processing module includes an O-$PA_4$, for a path through which any RX signal passes, positions of the O-$PA_4$ may be similar to the positions of the O-$PA_3$ in the transmit link 210. For similar descriptions, refer to the foregoing related descriptions of the positions of the O-$PA_3$. For brevity, details are not described herein again.

It should be further understood that, in this embodiment of this application, when the fourth optical processing module includes at least one O-$PA_4$, the receive link 220 may also include at least one O-$PA_{44}$. For example, FIG. 16 shows a case in which the receive link 120 may also include at least one O-$PA_{44}$ when the fourth optical processing module includes at least one O-$PA_4$.

It should be understood that, in this embodiment of this application, the remote unit 200 may alternatively not include at least one fourth optical processing module, but include at least one O-$PA_{44}$.

It should be further understood that, for the transmit link 210, when the third optical processing module includes an O-$PS_3$, an O-$F_3$, and an O-$PA_3$, any sequence of positions of the O-$PS_3$ and the O-$F_3$ may be combined with any sequence of a position of the O-$PA_3$. In addition, a sequence of positions of the O-$PS_3$ and the O-$F_3$ and a position of the O-$PA_3$ after combination is not limited. A sequence or a sequence of positions of the O-$PS_3$, the O-$F_3$, and the O-$PA_3$ is adjustable. The sequence or the sequence of positions of the O-$PS_3$, the O-$F_3$, and the O-$PA_3$ is not limited in this embodiment of this application. For example, the O-$PA_3$ may be located between the O-$PS_3$ and the O-$F_3$. For another example, the O-$PA_3$ may be located before the O-$PS_3$ and the O-$F_3$. For another example, the O-$PA_3$ may be located after the O-$PS_3$ and the O-$F_3$. In this way, optical filtering, optical phase shift, and optical power amplification can be separately performed on an analog optical signal at any wavelength, and optical processing can be separately performed on signals at a plurality of frequencies and bandwidths. In addition, the sequence of positions of the O-$F_3$, the O-$PS_3$, and the O-$PA_3$ is adjustable, so that the positions of the O-$F_3$, the O-$PS_3$, and the O-$PA_3$ can be flexibly arranged. This improves flexibility of arranging the positions of the O-$F_3$, the O-$PS_3$, and the O-$PA_3$, and facilitates implementation.

It should be further understood that, for the receive link 220, any sequence of positions of the O-$PS_4$ and the O-$F_4$ may be combined with any sequence of a position of the O-$PA_4$. In addition, a sequence of positions of the O-$PS_4$ and the O-$F_4$ and a position of the O-$PA_4$ after combination is not limited. For example, when the fourth optical processing module further includes at least one O-$PA_4$, a sequence or a sequence of positions of the O-$PS_4$, the O-$F_4$, and the O-$PA_4$ is adjustable. The sequence or the sequence of positions of the O-$PS_4$, the O-$F_4$, and the O-$PA_4$ is not limited in this embodiment of this application.

It should be further understood that, in this embodiment of this application, for the transmit link 210 and the receive link 220, any possible structural form of the transmit link 210 may be combined with any possible structural form of the receive link 220, to obtain a plurality of possible architectures of the remote unit 200. This is not limited herein in this embodiment of this application.

In this embodiment of this application, a radio frequency signal and an optical carrier are input into any second electro-optical module in the receive link 220, and an analog optical signal is output. In other words, the second electro-optical module receives the radio frequency signal and the optical carrier, modulates the radio frequency signal to the optical carrier, and outputs the analog optical signal. The analog optical signal output by the second electro-optical module includes the optical carrier and a modulated radio frequency signal. The radio frequency signal input into the second electro-optical module may be received by the antenna unit and transmitted to the second electro-optical module. The optical carrier may be obtained by the second electro-optical module (any second electro-optical module, for example, the electro-optical module 221) in the following three manners.

Manner 1: The second electro-optical module generates the optical carrier and modulates the radio frequency signal. For example, the second electro-optical module may include a direct modulation light source module, and the direct modulation light source module supports generation of both the optical carrier and the modulated radio frequency signal. The direct modulation light source module receives the radio frequency signal from the antenna unit, and may generate the optical carrier. The direct modulation light source module modulates the received radio frequency signal to the optical carrier, and outputs the analog optical signal. For another example, the second electro-optical module may include a light source module and an external modulation module. The light source module is configured to generate the optical carrier. The external modulation module is configured to receive the radio frequency signal, modulate the radio frequency signal to the optical carrier, and output the analog optical signal. Optionally, the light source module and the external modulation module may be located in the RRU. The second electro-optical module generates the optical carrier and modulates the radio frequency signal, so that no additional light source is required to generate the optical carrier. This reduces costs. In addition, because the generated optical carrier does not need to be transmitted over a long distance, quality of the optical carrier is ensured.

Figure 24:
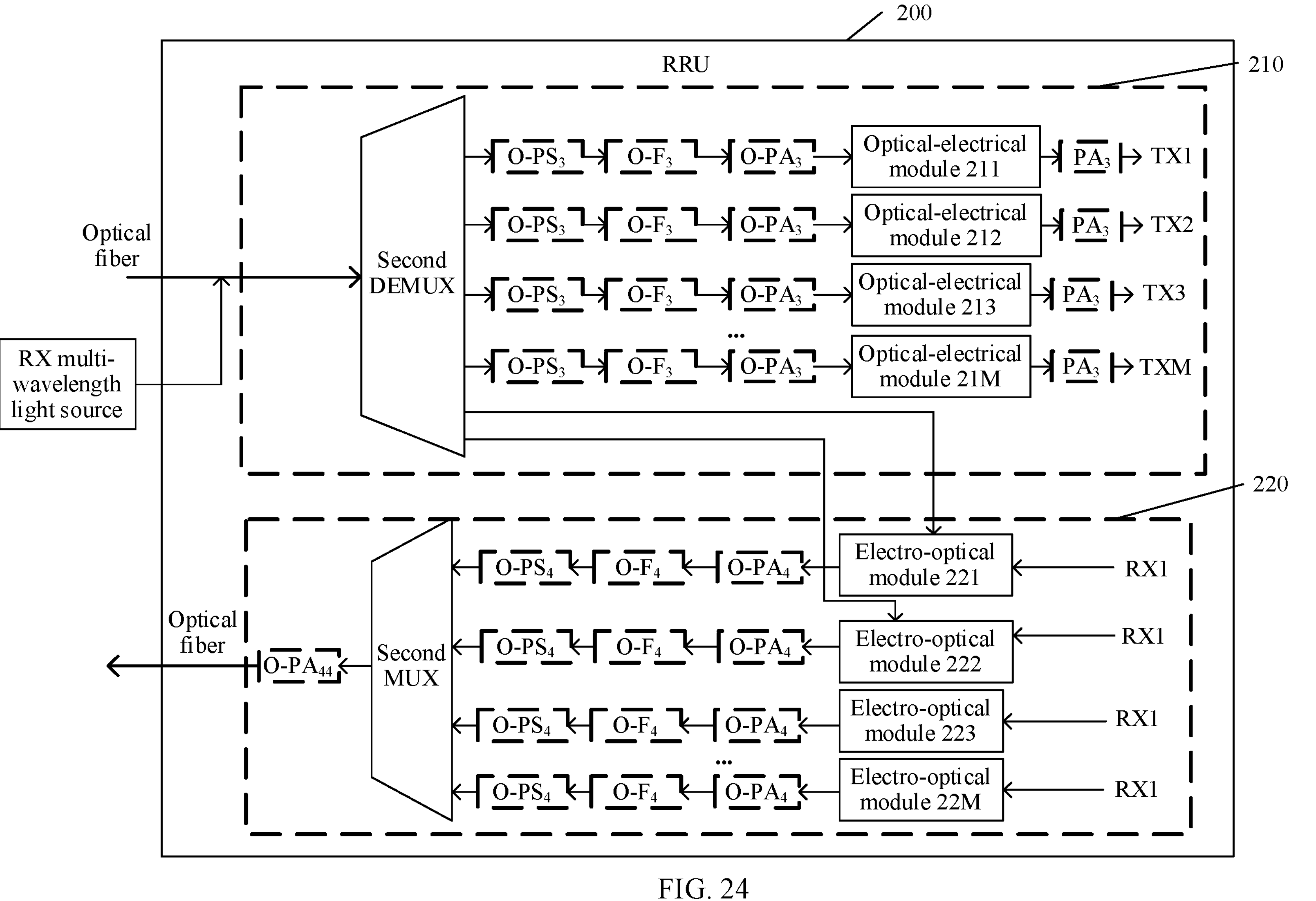

Manner 2: The second electro-optical module receives a dedicated optical carrier from the downlink (the transmit link) and implements modulation. In this manner, a light source module may exist in an external device (for example, a BBU), and is configured to generate the optical carrier. FIG. 24 is a schematic diagram in which the second electro-optical module (for example, the electro-optical modules 221 and 222) receives the dedicated optical carrier from the downlink and implements modulation. For example, the light source module may be an RX multi-wavelength light source module. The light source module generates one or more optical carriers at different wavelengths. The one or more optical carriers at different wavelengths sequentially pass through the optical fiber and the second DEMUX, are split into a plurality of optical carriers at different wavelengths after passing through the second DEMUX, and are separately transmitted to a second electro-optical module (for example, the electro-optical module 221 and the electro-optical module 222 in the figure). Optionally, the second electro-optical module may include an external modulation module. The external modulation module is configured to obtain the radio frequency signal received by the antenna unit, modulate the radio frequency signal to the optical carrier, and output the analog optical signal. For example, the light source module may be disposed in a BBU, and the optical carrier generated by the light source module is transmitted to the second electro-optical module through the receive link. In Manner 1, the electro-optical module generates the optical carrier and implement modulation. The electro-optical module is disposed in the RRU. Because the RRU is disposed outdoors, a temperature change is significant. This may cause a wavelength drift. In addition, the second MUX and the second DEMUX module cannot effectively combine and split signals at different wavelengths respectively. In Manner 2, because the light source module is disposed in the BBU, and the BBU is disposed indoors, a temperature change is not significant. Therefore, disposing the light source in the BBU and transmitting the generated optical carrier to the second electro-optical module in the RRU can effectively overcome a wavelength drift problem caused by temperature impact.

Optionally, after the light source module generates the optical carrier, the optical carrier may alternatively be transmitted to the second electro-optical module through a dedicated optical fiber and a third DEMUX instead of the optical fiber and the second DEMUX. In other words, the optical fiber and the DEMUX for transmitting the optical carrier generated by the light source module may reuse the optical fiber and the second DEMUX in FIG. 24, or may be an independent optical fiber and an independent DEMUX. This is not limited in this application.

Figure 25:
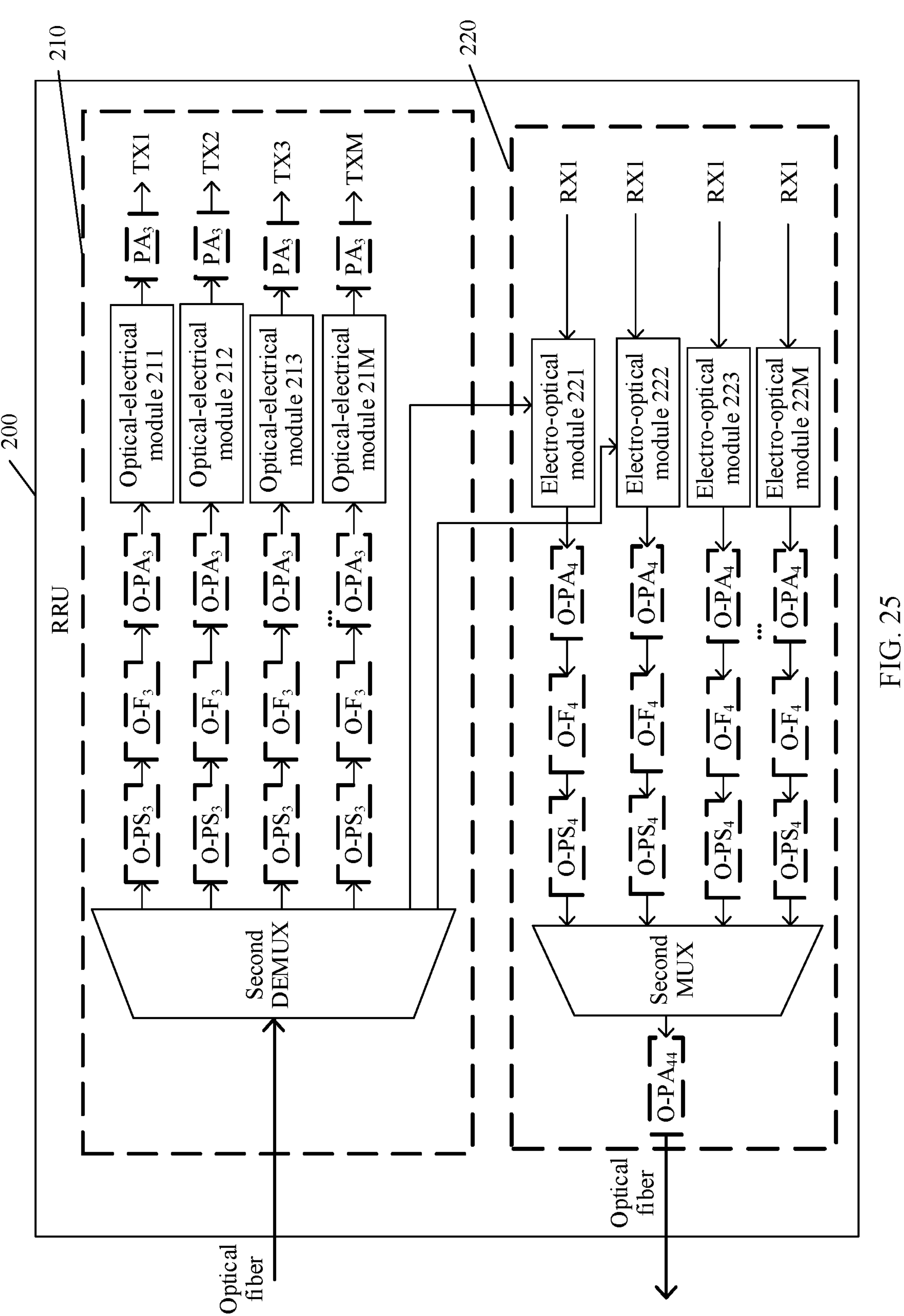

Manner 3: The second electro-optical module recovers an optical carrier from an analog optical signal transmitted in the downlink (the transmit link) and implements electrical signal modulation. FIG. 25 is a schematic diagram in which the second electro-optical module recovers the optical carrier from the analog optical signal transmitted in the downlink and implements electrical signal modulation. A second electro-optical module obtains an analog optical signal output by the second DEMUX, and recovers an optical carrier from the analog optical signal. For example, the second electro-optical module may include an optical carrier recovery module and an external modulation module. The optical carrier recovery module receives the analog optical signal output by the second DEMUX, and recovers the optical carrier from the analog optical signal. The external modulation module is configured to receive the radio frequency signal, modulates the radio frequency signal to the optical carrier, and outputs the analog optical signal. Optionally, the optical carrier recovery module and the external modulation module may be located in the RRU. The second electro-optical module recovers the optical carrier from the analog optical signal transmitted in the downlink, and implements electrical signal modulation, so that no additional light source is required to generate the optical carrier. This reduces costs, and improves utilization of the optical carrier.

Optionally, the optical-electrical module in this embodiment of this application may be a photoelectric detector.

In another possible implementation of this application, for the remote unit 200 shown in any one of FIG. 16 to FIG. 25, TX1 is used as an example for an output signal at any wavelength in the transmit link 210. Because the analog electrical signal TX1 output by the second optical-electrical module may be a combined signal of a plurality of signals at different frequencies, after the combined signal passes through the O-$PS_3$, the O-$F_3$, and the O-$PA_3$ in the transmit link 210, optical power amplification and phase shift are implemented for the combined signal in a unified manner. The signals at different frequencies in the combined signal have a same beam direction and power. However, in actual application, the signals at different frequencies may need to have different beam directions and powers. Therefore, the transmit link of the remote unit 200 may further include at least one electrical processing unit.

Any electrical processing unit includes at least one of: at least one electrical power amplifier, at least one electrical phase shifter, and an electrical splitter.

Each electrical power amplifier is configured to amplify an analog electrical signal at one frequency.

Each electrical phase shifter is configured to shift a phase of an analog electrical signal at one frequency.

The electrical splitter is configured to decompose one analog electrical signal output by the second optical-electrical module into a plurality of analog electrical signals at different frequencies.

According to the remote unit provided in this application, any electrical signal output by the second optical-electrical module includes a plurality of different frequencies. The electrical phase shifter and/or electrical power amplification are/is separately performed on an electrical signal at each frequency. Through two-level power amplification and phase shift, that is, optical and electrical power amplification and phase shift, unified power amplification and phase shift of beams at a plurality of frequencies are supported in optical domain, and separate power amplification and phase shift of beams at a plurality of frequencies are supported in electrical domain. Therefore, different beam directions and/or powers of signals at different frequencies are controlled.

Optionally, in some possible implementations of this application, the electrical processing unit includes at least one electrical power amplifier and an electrical splitter. An input terminal of the electrical power amplifier is configured to input a plurality of analog electrical signals at different frequencies. The input terminal of the electrical power amplifier is connected to an output terminal of the electrical splitter. An input terminal of the electrical splitter is connected to an output terminal of the second optical-electrical module.

Optionally, in some other possible implementations of this application, the electrical processing unit includes at least one electrical phase shifter and an electrical splitter. An input terminal of the electrical phase shifter is configured to input a plurality of analog electrical signals at different frequencies. The input terminal of the electrical phase shifter is connected to an output terminal of the electrical splitter. An input terminal of the electrical splitter is connected to an output terminal of the second optical-electrical module.

Optionally, in some other possible implementations of this application, the electrical processing unit includes at least one electrical power amplifier, at least one electrical phase shifter, and an electrical splitter. The electrical power amplifier is connected to the electrical phase shifter. An input terminal of the electrical power amplifier and an input terminal of the electrical phase shifter are connected to an output terminal of the electrical splitter. An input terminal of the electrical splitter is connected to an output terminal of the second optical-electrical module.

Optionally, that the electrical power amplifier is connected to the electrical phase shifter may include: An output terminal of the electrical power amplifier is connected to the input terminal of the electrical phase shifter, that is, the electrical power amplifier is located before the electrical phase shifter. In this case, the input terminal of the electrical power amplifier and the input terminal of the electrical phase shifter are the input terminal of the electrical power amplifier, and the output terminal of the electrical power amplifier and an output terminal of the electrical phase shifter are the output terminal of the electrical phase shifter. Alternatively, an output terminal of the electrical phase shifter is connected to the input terminal of the electrical power amplifier, that is, the electrical phase shifter is located before the electrical power amplifier. In this case, the input terminal of the electrical power amplifier and the input terminal of the electrical phase shifter are the input terminal of the electrical phase shifter, and an output terminal of the electrical power amplifier and the output terminal of the electrical phase shifter are the output terminal of the electrical power amplifier.

The electrical phase shifter and/or the electrical power amplifier are/is disposed to separately perform electrical phase shift and/or electrical power amplification on an electrical signal at each frequency in analog electrical signals that include a plurality of different frequencies and that are output by the second optical-electrical module. In this way, unified power amplification and/or phase shift of beams at a plurality of frequencies are/is supported in optical domain, and separate power amplification and/or phase shift of beams at a plurality of frequencies are/is supported in electrical domain. In addition, a sequence of positions of the electrical phase shifter and the electrical power amplifier is adjustable, so that the positions of the electrical phase shifter and the electrical power amplifier can be flexibly arranged. This improves flexibility of disposing the electrical phase shifter and the electrical power amplifier, and facilitates implementation.

The following provides a description with reference to a specific example. It should be understood that, in the following example, only TX1 is used as an example for description. For any output signal TX in any transmit link 210, a processing process of the output signal TX is the same as that of the TX1. For a similar description, refer to a description of the TX1.

Figure 26:
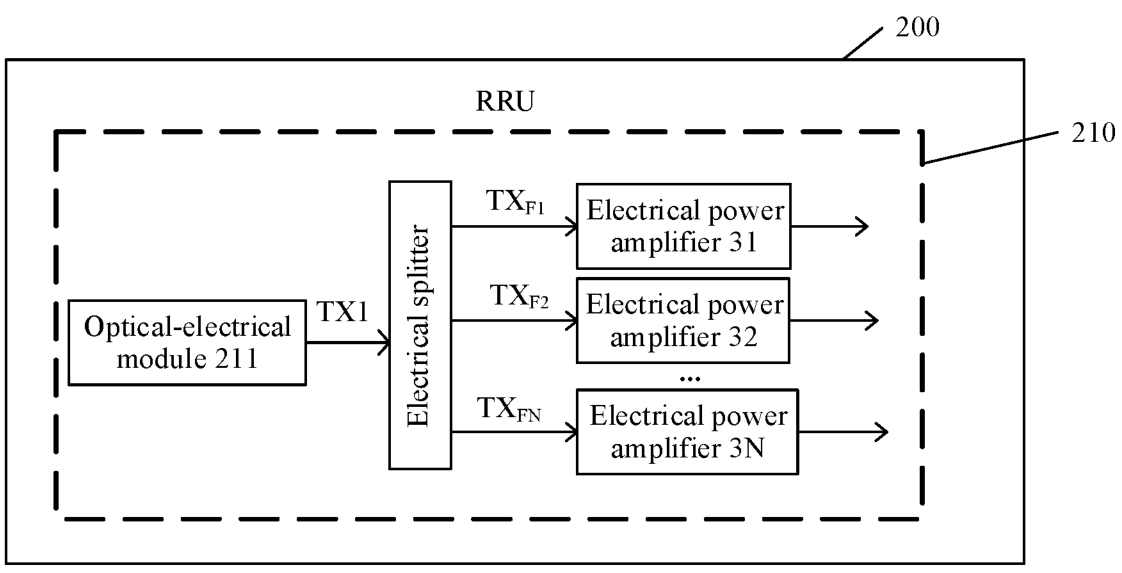
FIG. 26 to FIG. 28 are schematic block diagrams of structures of an electrical splitter, a plurality of electrical power amplifiers and/or a plurality of electrical phase shifters, and an electrical combiner that are included in a remote unit according to an embodiment of this application.

FIG. 26 is a schematic diagram of an architecture of an example in which the remote unit 200 further includes a plurality of electrical power amplifiers and an electrical splitter. As shown in FIG. 26, the TX1 is a combined signal of a plurality of electrical signals at different frequencies $TX_{F1}$, $TX_{F2}$, . . . , and $TX_{FN}$. The electrical splitter splits the TX1 into the plurality of analog electrical signals at different frequencies $TX_{F1}$, $TX_{F2}$, . . . , and $TX_{FN}$. The plurality of analog electrical signals at different frequencies $TX_{F1}$, $TX_{F2}$, . . . , and $TX_{FN}$ are input into electrical power amplifiers 31 to 3N respectively. The electrical power amplifiers 31 to 3N each are configured to separately amplify an analog signal at one frequency. After power amplification, the signals are separately sent through the antenna unit. The remote unit shown in FIG. 26 implements separate power amplification on beam powers of signals at a plurality of frequencies in electrical domain.

Figure 27:
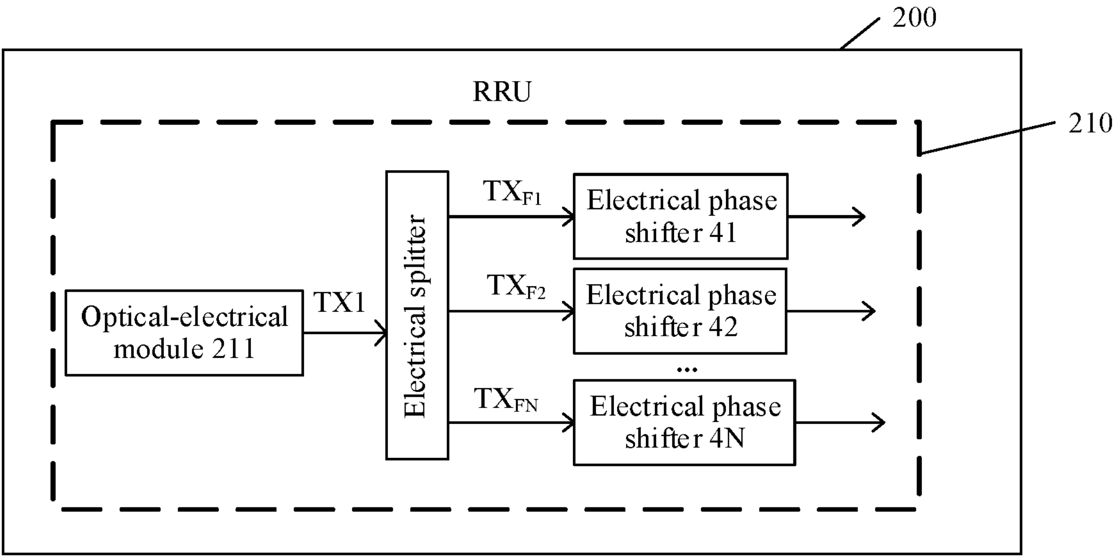

FIG. 27 is a schematic diagram of an architecture of another example in which the remote unit 200 further includes a plurality of electrical phase shifters and an electrical splitter. As shown in FIG. 27, the TX1 is a combined signal of a plurality of electrical signals at different frequencies $TX_{F1}$, $TX_{F2}$, . . . , and $TX_{FN}$. The electrical splitter splits the TX1 into the plurality of analog electrical signals at different frequencies $TX_{F1}$, $TX_{F2}$, . . . , and $TX_{FN}$. The plurality of analog electrical signals at different frequencies $TX_{F1}$, $TX_{F2}$, . . . , and $TX_{FN}$ are input into electrical phase shifters 41 to 4N respectively. The electrical phase shifters 41 to 4N each are configured to separately shift a phase of an analog signal at one frequency. After phase shift, the signals are separately sent through the antenna unit. The remote unit shown in FIG. 27 implements control on beam directions of signals at a plurality of frequencies in electrical domain.

Figure 28:
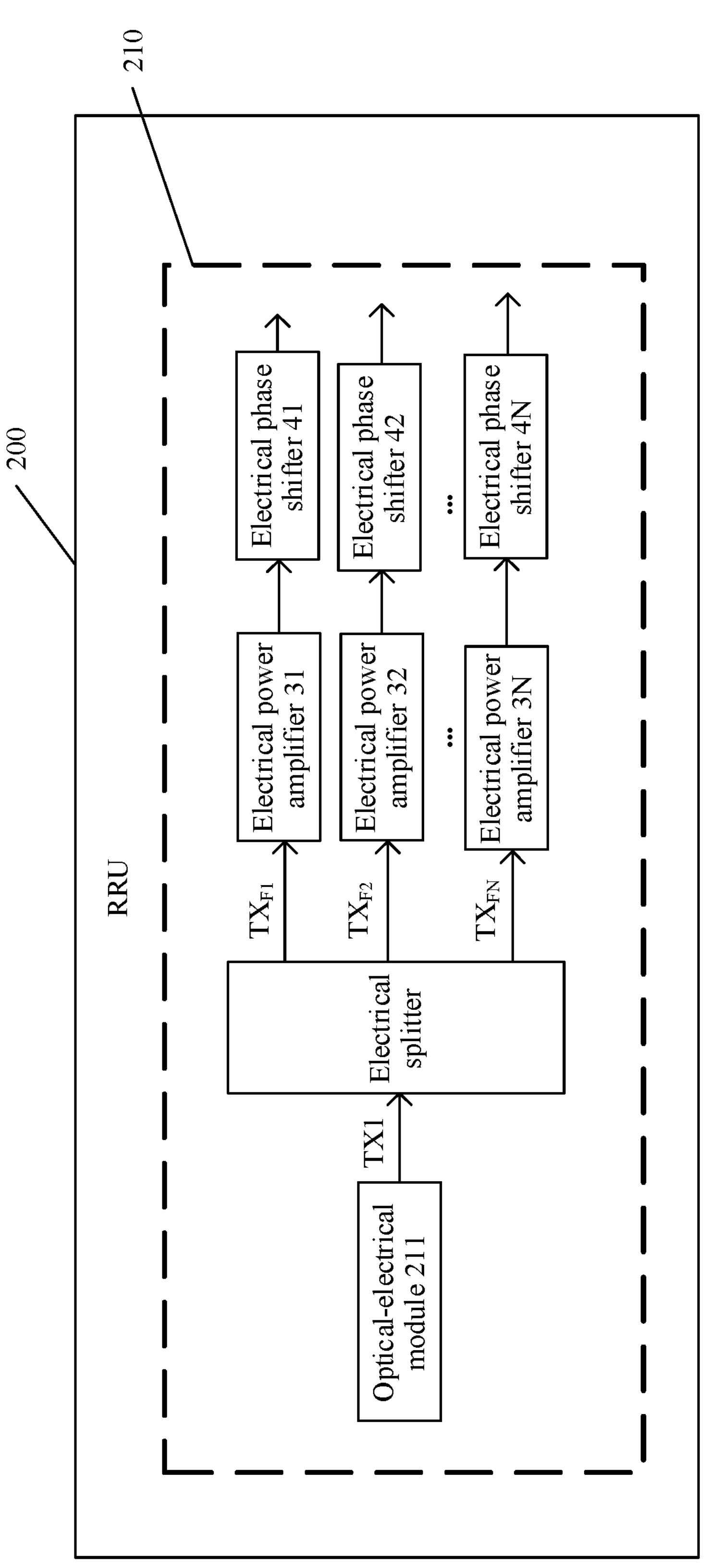

FIG. 28 is a schematic diagram of an architecture of another example in which the remote unit 200 further includes a plurality of electrical phase shifters, a plurality of electrical power amplifiers, and an electrical splitter. The electrical power amplifier is connected to the electrical phase shifter. Optionally, an output terminal of the electrical power amplifier is connected to an input terminal of the electrical phase shifter, that is, the electrical power amplifier is located before the electrical phase shifter. Alternatively, an output terminal of the electrical phase shifter is connected to an input terminal of the electrical power amplifier, that is, the electrical phase shifter is located before the electrical power amplifier. FIG. 28 shows an example in which the electrical power amplifier is located before the electrical phase shifter. The plurality of analog electrical signals at different frequencies $TX_{F1}$, $TX_{F2}$, . . . , and $TX_{FN}$ are input into electrical power amplifiers 31 to 3N respectively. The electrical power amplifiers 31 to 3N each are configured to separately amplify an analog signal at one frequency. After power amplification, the plurality of analog electrical signals at different frequencies $TX_{F1}$, $TX_{F2}$, and $TX_{FN}$ are input into electrical phase shifters 41 to 4N respectively. The electrical phase shifters 41 to 4N each are configured to separately shift a phase of an electrical signal at one frequency. After phase shift, the signals are separately sent through the antenna unit. The remote unit shown in FIG. 28 implements control on beam directions and powers of signals at a plurality of frequencies.

This application further provides a communications apparatus. The communications apparatus 300 includes the foregoing central unit 100 and the foregoing remote unit 200. Optionally, the communications apparatus 300 may be an access network device (for example, a base station). The base station may have a distributed base station architecture. According to the apparatus provided in this application, optical components are disposed in the communications apparatus, and the optical components include, for example, an O-PS, an O-F, and an O-PA. In this way, the communications apparatus can support multi-frequency band or high-frequency communication when a fronthaul link of the communications apparatus uses a wired analog optical communications technology. This ensures communication quality and efficiency of the communications apparatus in a multi-frequency band or high-frequency system, and improves communication efficiency of the apparatus.

The following describes a possible structural form of the communications apparatus 300 with reference to a specific example.

It should be understood that, in the following description, an example in which the central unit 100 is a BBU and the remote unit 200 is an RRU is used for description.

Figure 29A:
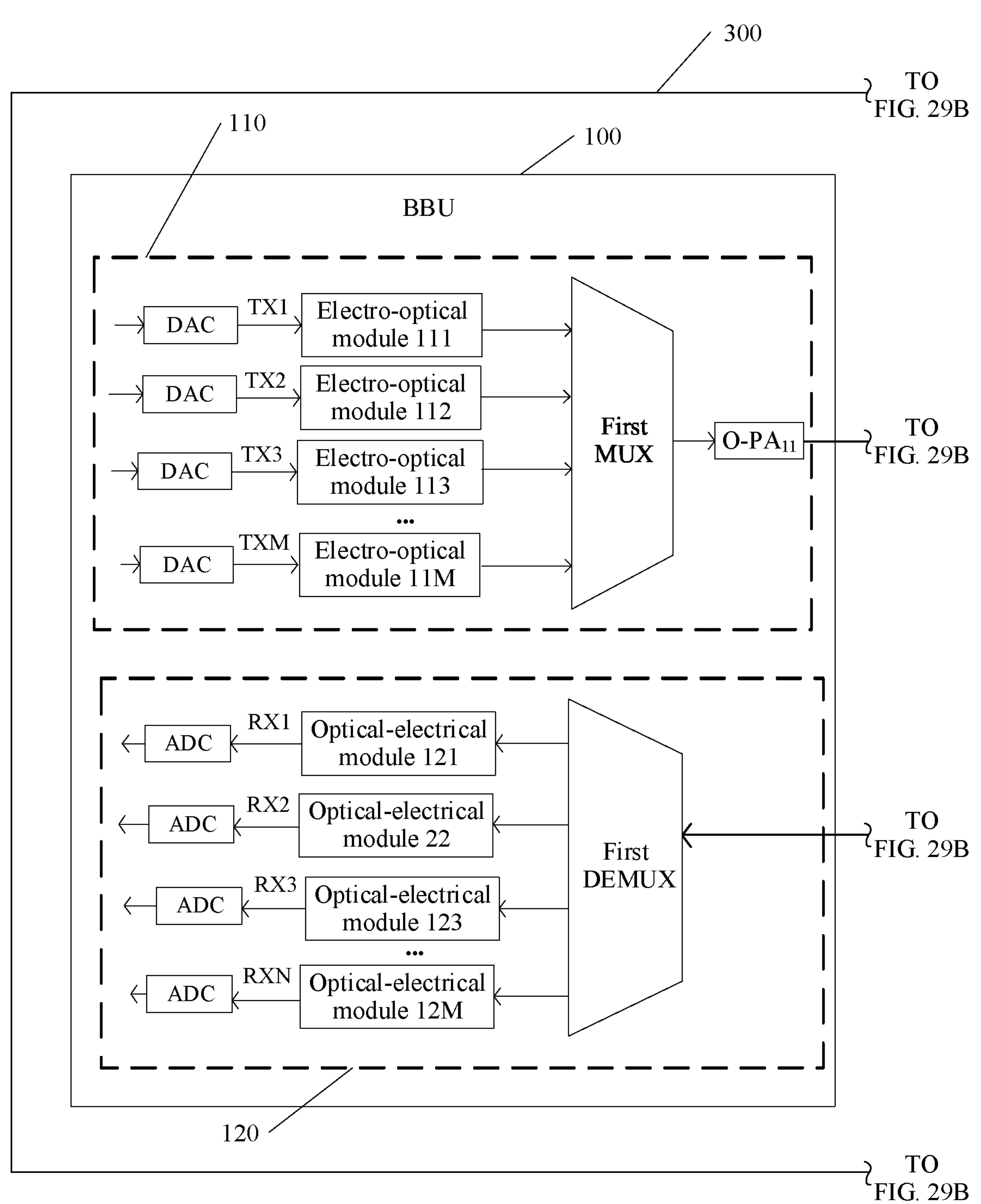
Figure 29B:
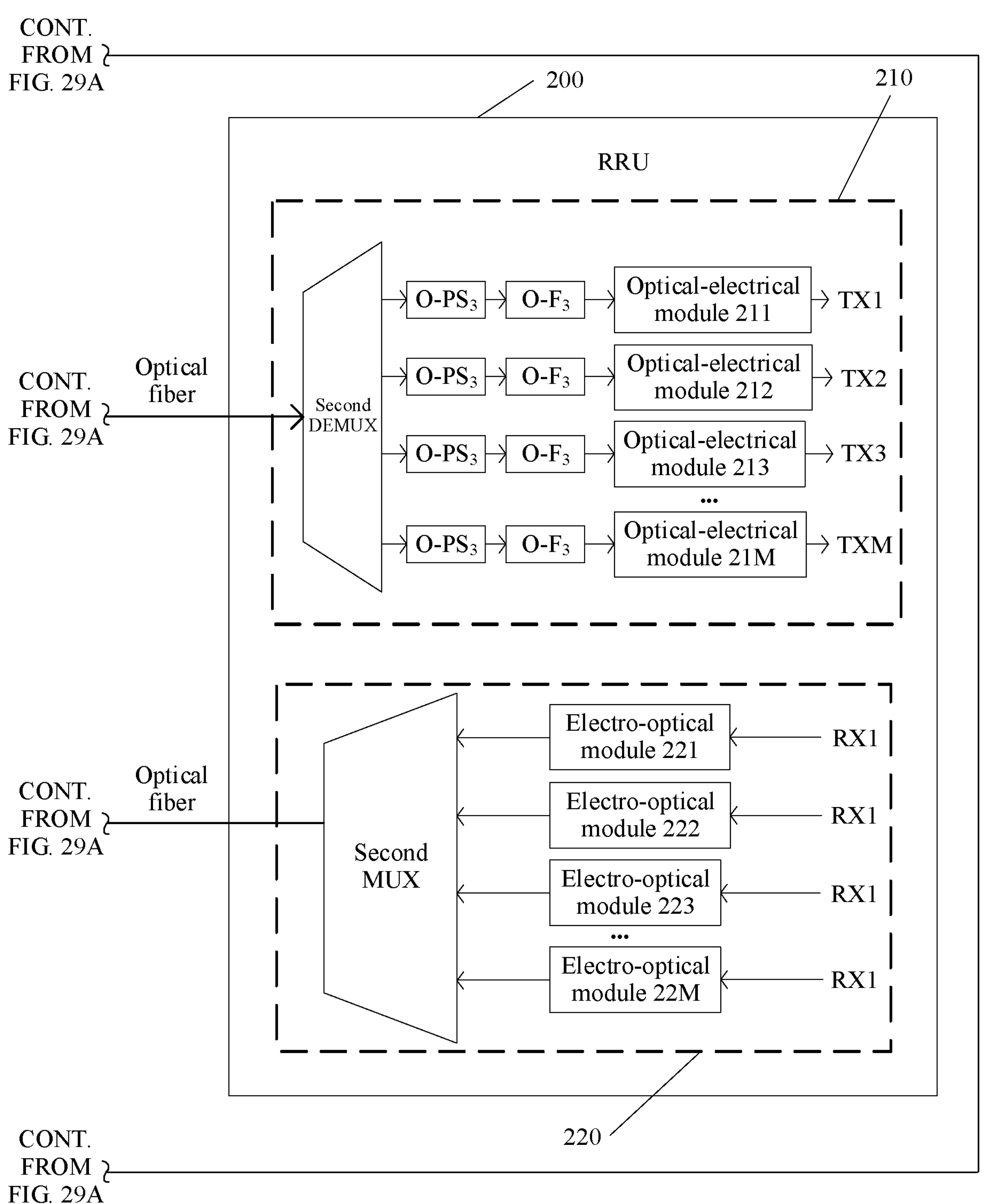

FIG. 29A and FIG. 29B are a schematic block diagram of a possible structure of the communications apparatus 300. As shown in FIG. 29A and FIG. 29B, the communications apparatus 300 includes a communications apparatus 100 and a communications apparatus 200. Neither a receive link 120 nor a receive link 220 includes an optical processing module. A transmit link 110 includes only a post optical power amplifier O-$PA_{11}$. An input terminal of the O-$PA_{11}$ is connected to an output terminal of a first MUX, and an output terminal of the O-$PA_{11}$ is connected to an input terminal of an optical fiber. A third optical processing module in a transmit link 210 includes only an O-$PS_3$ and an O-$F_3$. The O-$PS_3$ is connected to the O-$F_3$. An output terminal of the O-$PS_3$ and an output terminal of the O-$F_3$ are connected to an input terminal of a second optical-electrical module (for example, an optical-electrical module 211). An input terminal of the O-$PS_3$ and an input terminal of the O-$F_3$ are connected to an output terminal of a second DEMUX. For processing processes of a TX signal and an RX signal, refer to the foregoing descriptions of the processing processes of the TX signal and the RX signal in the apparatus 100 and the apparatus 200. For brevity, details are not described herein again. In addition, in the architecture shown in FIG. 29A and FIG. 29B, a part or all of second electro-optical modules (electro-optical modules 221 to 22M) each generate an optical carrier and modulate a radio frequency signal.

Figure 30A:
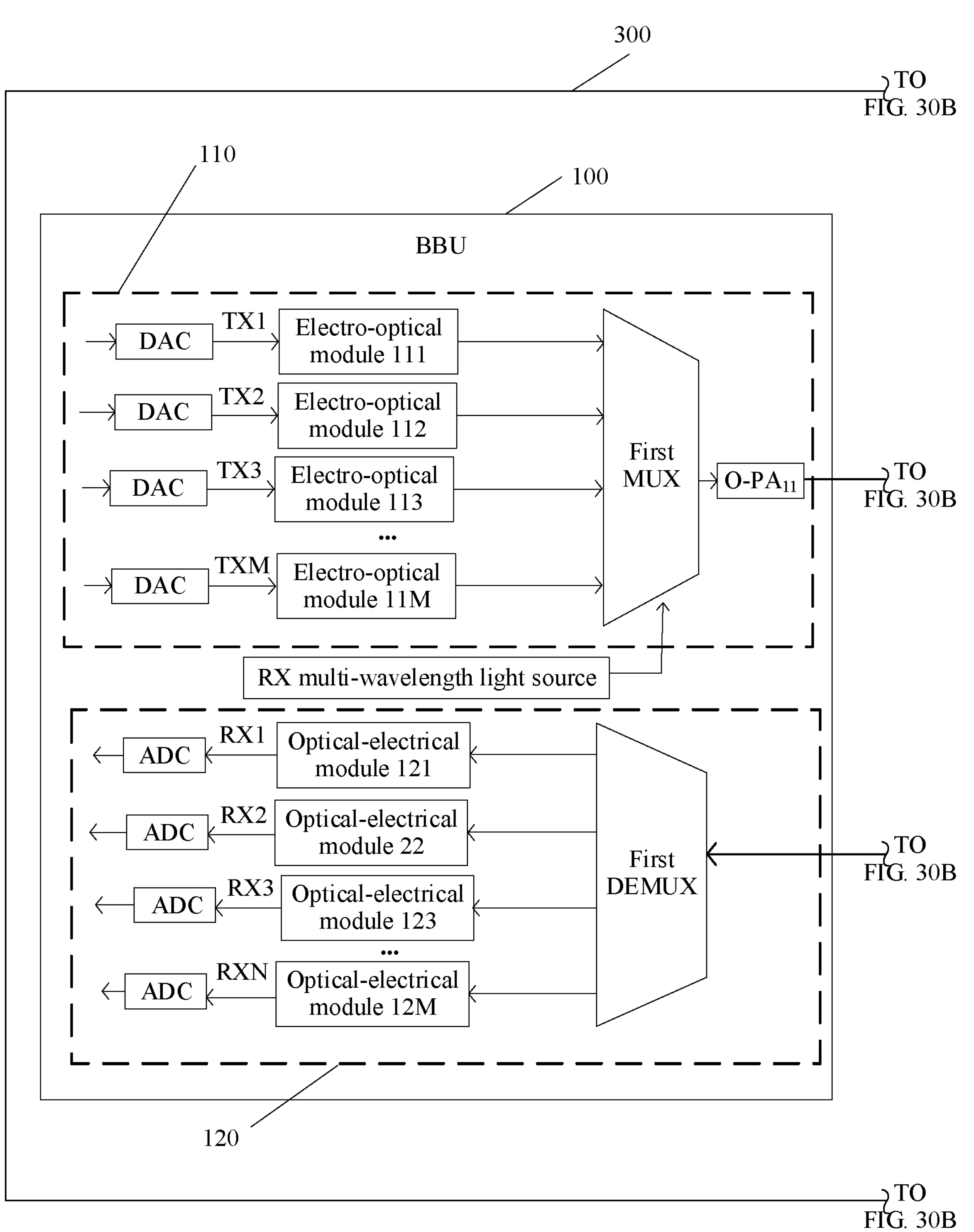
Figure 30B:
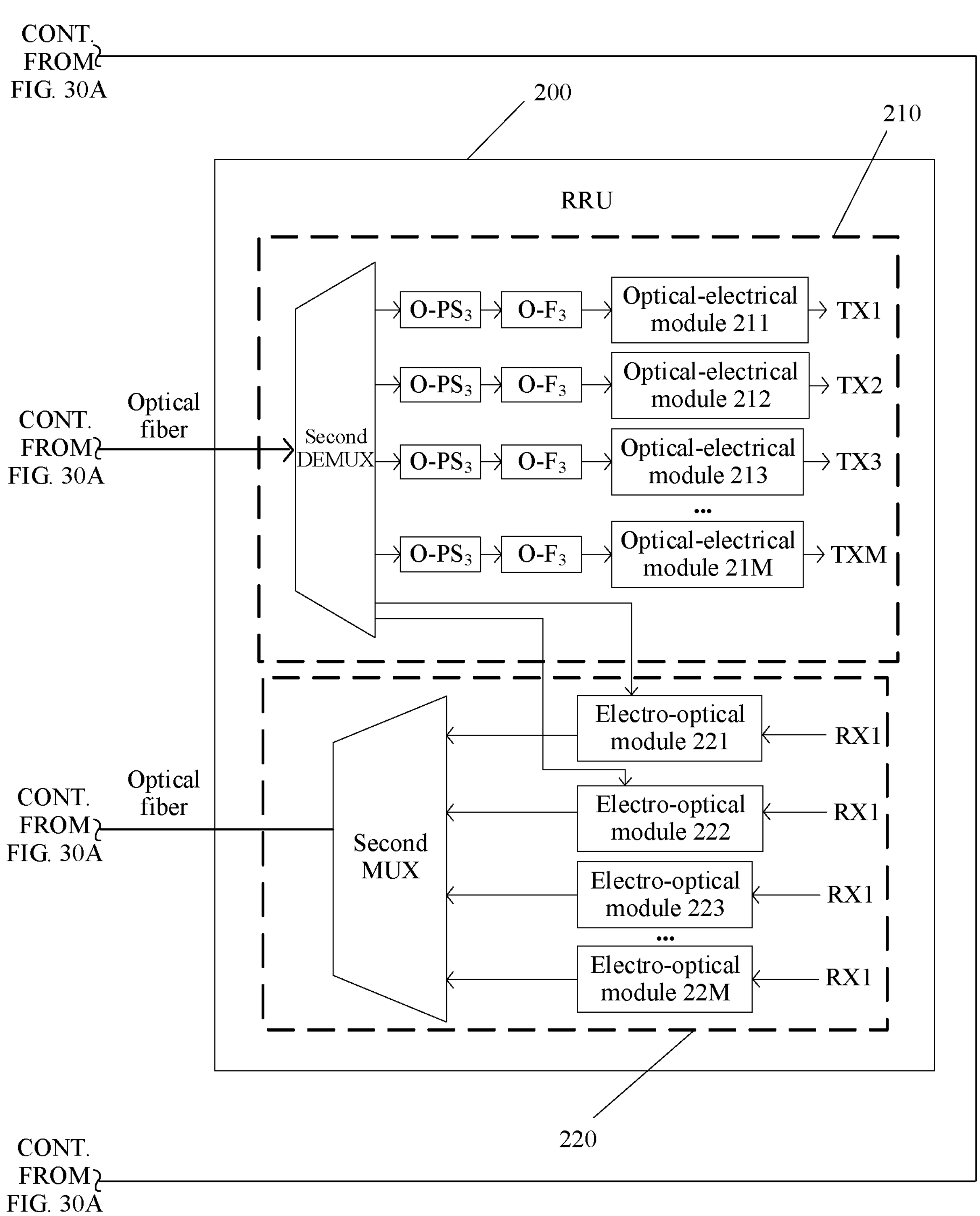

FIG. 30A and FIG. 30B are a schematic block diagram of a possible structure of the communications apparatus 300. As shown in FIG. 30A and FIG. 30B, the communications apparatus 300 includes a communications apparatus 100 and a communications apparatus 200. Neither a receive link 120 nor a receive link 220 includes an optical processing module. A transmit link 110 includes only a post optical power amplifier O-$PA_{11}$. An input terminal of the O-$PA_{11}$ is connected to an output terminal of a first MUX, and an output terminal of the O-$PA_{11}$ is connected to an input terminal of an optical fiber. A third optical processing module in a transmit link 210 includes only an O-$PS_3$ and an O-$F_3$. The O-$PS_3$ is connected to the O-$F_3$. An output terminal of the O-$PS_3$ and an output terminal of the O-$F_3$ are connected to an input terminal of a second optical-electrical module (for example, an optical-electrical module 211). An input terminal of the O-$PS_3$ and an input terminal of the O-$F_3$ are connected to an output terminal of a second DEMUX. For processing processes of a TX signal and an RX signal, refer to the foregoing descriptions of the processing processes of the TX signal and the RX signal in the apparatus 100 and the apparatus 200. For brevity, details are not described herein again. In addition, in the architecture shown in FIG. 30A and FIG. 30B, a part or all of second electro-optical modules (electro-optical modules 221 to 22M) each receive a dedicated optical carrier from the transmit link and implement modulation. There are a plurality of RX multi-wavelength light source modules in a BBU.

Figure 31A:
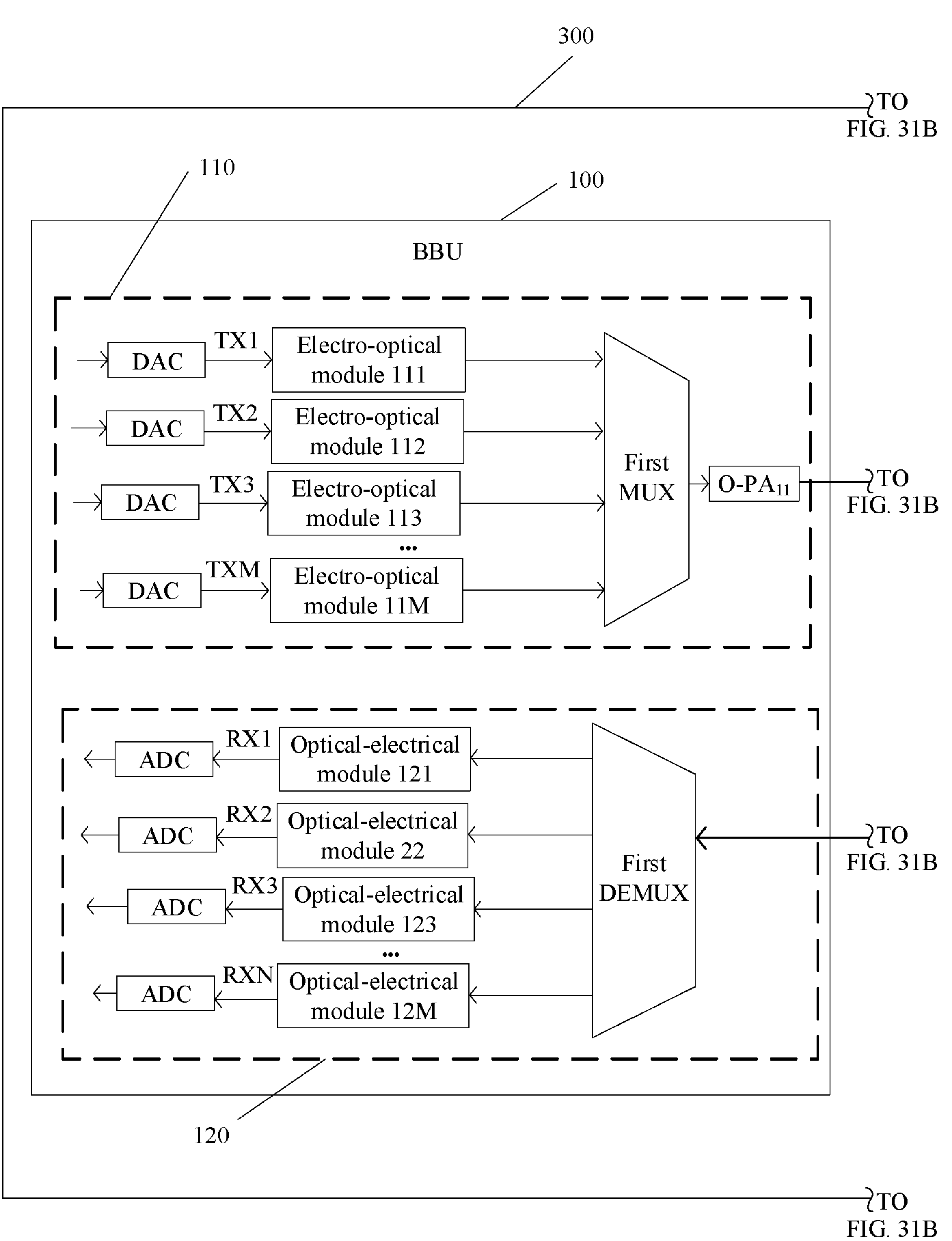
Figure 31B:
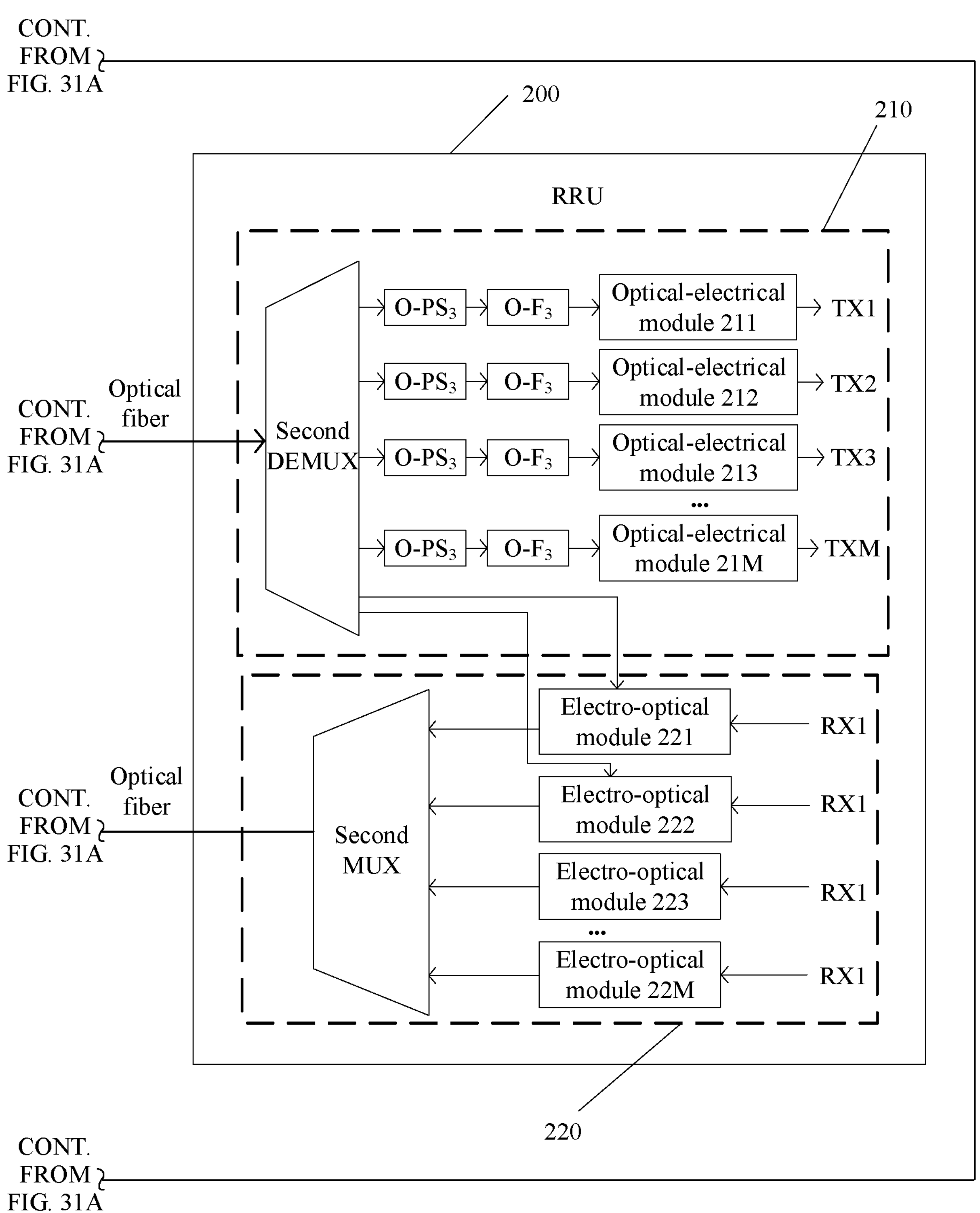

FIG. 31A and FIG. 31B are a schematic block diagram of a possible structure of the communications apparatus 300. As shown in FIG. 31A and FIG. 31B, the communications apparatus 300 includes a communications apparatus 100 and a communications apparatus 200. Neither a receive link 120 nor a receive link 220 includes an optical processing module. A transmit link 110 includes only a post optical power amplifier O-$PA_{11}$. An input terminal of the O-$PA_{11}$ is connected to an output terminal of a first MUX, and an output terminal of the O-$PA_{11}$ is connected to an input terminal of an optical fiber. A third optical processing module in a transmit link 210 includes only an O-$PS_3$ and an O-$F_3$. The O-$PS_3$ is connected to the O-$F_3$. An output terminal of the O-$PS_3$ and an output terminal of the O-$F_3$ are connected to an input terminal of a second optical-electrical module (for example, an optical-electrical module 211). An input terminal of the O-$PS_3$ and an input terminal of the O-$F_3$ are connected to an output terminal of a second DEMUX. For processing processes of a TX signal and an RX signal, refer to the foregoing descriptions of the processing processes of the TX signal and the RX signal in the apparatus 100 and the apparatus 200. For brevity, details are not described herein again. In addition, in the architecture shown in FIG. 30A and FIG. 30B, a part or all of second electro-optical modules (electro-optical modules 221 to 22M) each recover an optical carrier from an analog optical signal transmitted in the downlink (the transmit link) and implement electrical signal modulation.

Figure 32A:
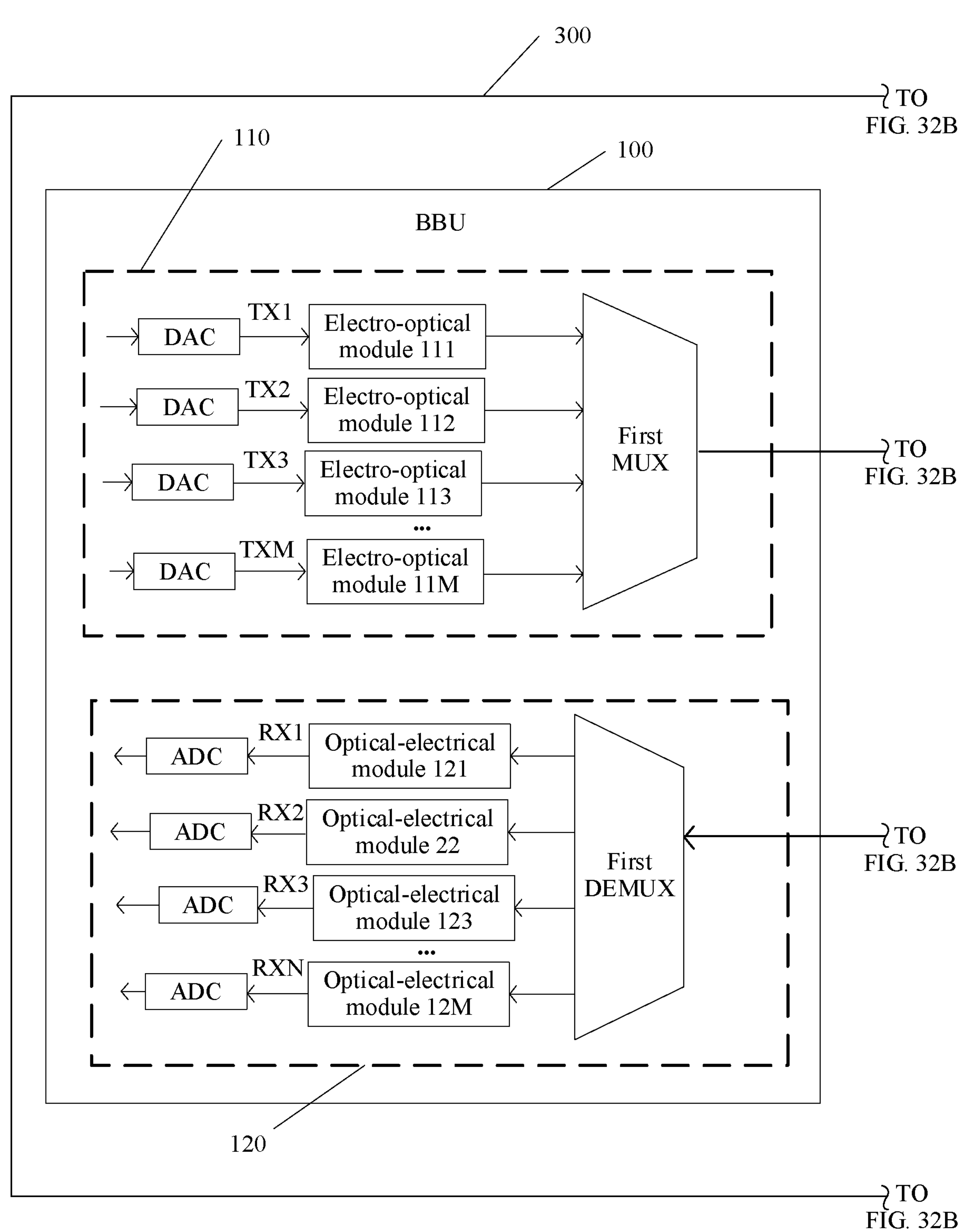
Figure 32B:
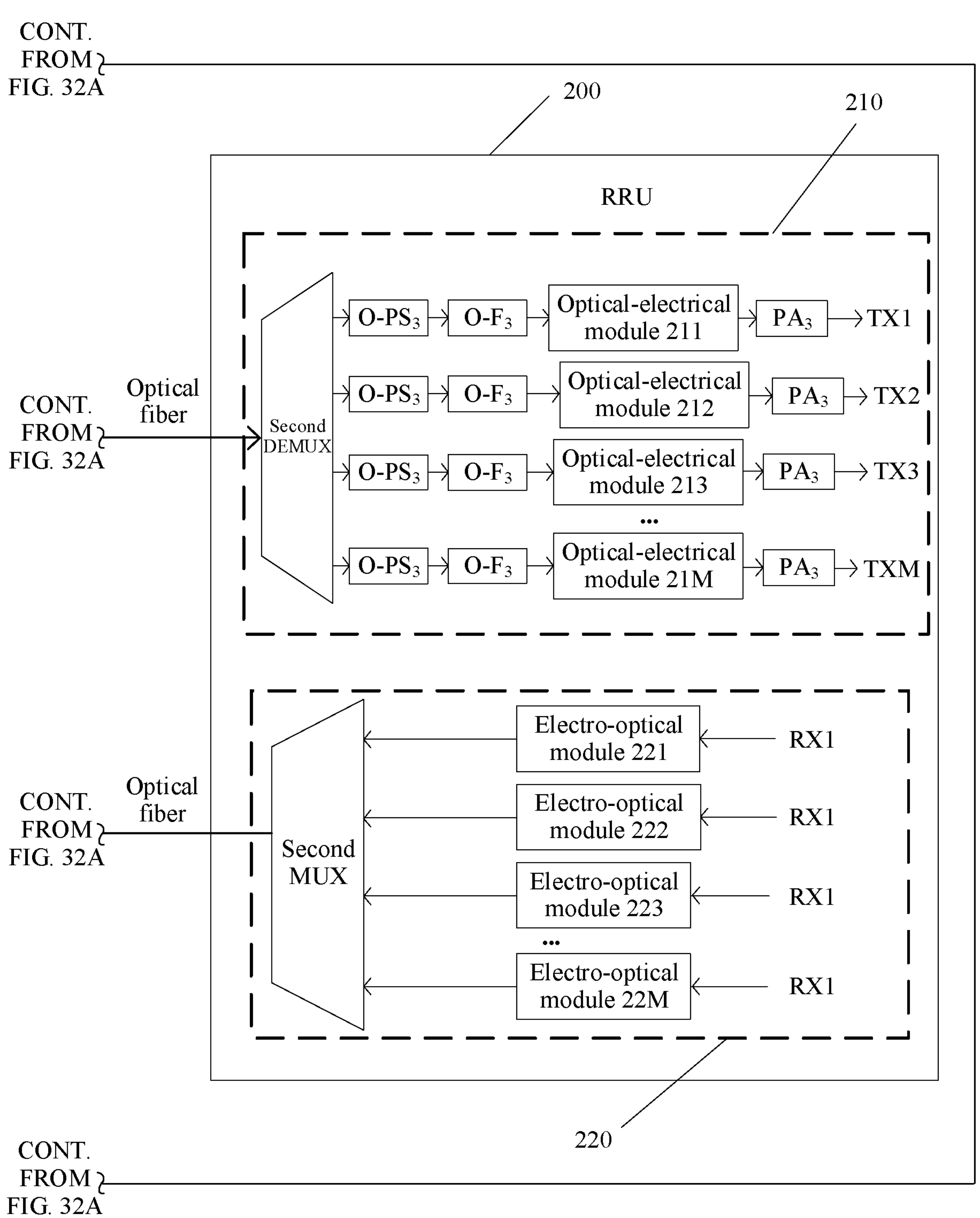

FIG. 32A and FIG. 32B are a schematic block diagram of a possible structure of the communications apparatus 300. As shown in FIG. 32A and FIG. 32B, the communications apparatus 300 includes a communications apparatus 100 and a communications apparatus 200. As shown in FIG. 32A and FIG. 32B, neither a receive link 120 nor a receive link 220 includes an optical processing module. A transmit link 110 does not include a first optical processing module, either. A third optical processing module in a transmit link 210 includes only an O-$PS_3$ and an O-$F_3$. The O-$PS_3$ is connected to the O-$F_3$. An output terminal of the O-$PS_3$ and an output terminal of the O-$F_3$ are connected to an input terminal of a second optical-electrical module (for example, an optical-electrical module 211). An input terminal of the O-$PS_3$ and an input terminal of the O-$F_3$ are connected to an output terminal of a second DEMUX. In addition, an electrical power amplifier $PA_3$ further exists after a second optical-electrical module (for example, the optical-electrical module 211). For processing processes of a TX signal and an RX signal, refer to the foregoing descriptions of the processing processes of the TX signal and the RX signal in the apparatus 100 and the apparatus 200. For brevity, details are not described herein again. In addition, in the architecture shown in FIG. 32A and FIG. 32B, a part or all of second electro-optical modules (electro-optical modules 221 to 22M) each generate an optical carrier and modulate a radio frequency signal.

Figure 33A:
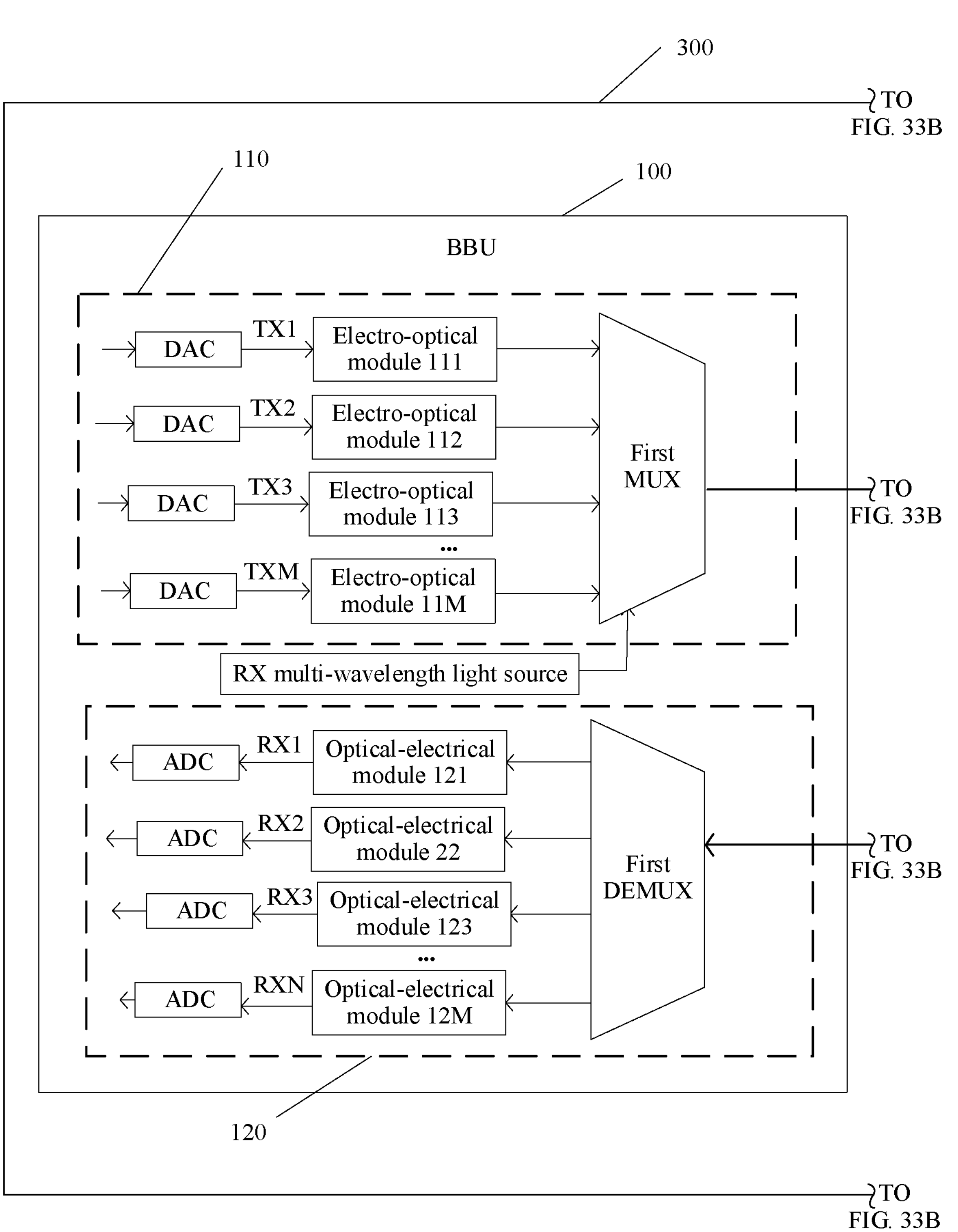
Figure 33B:
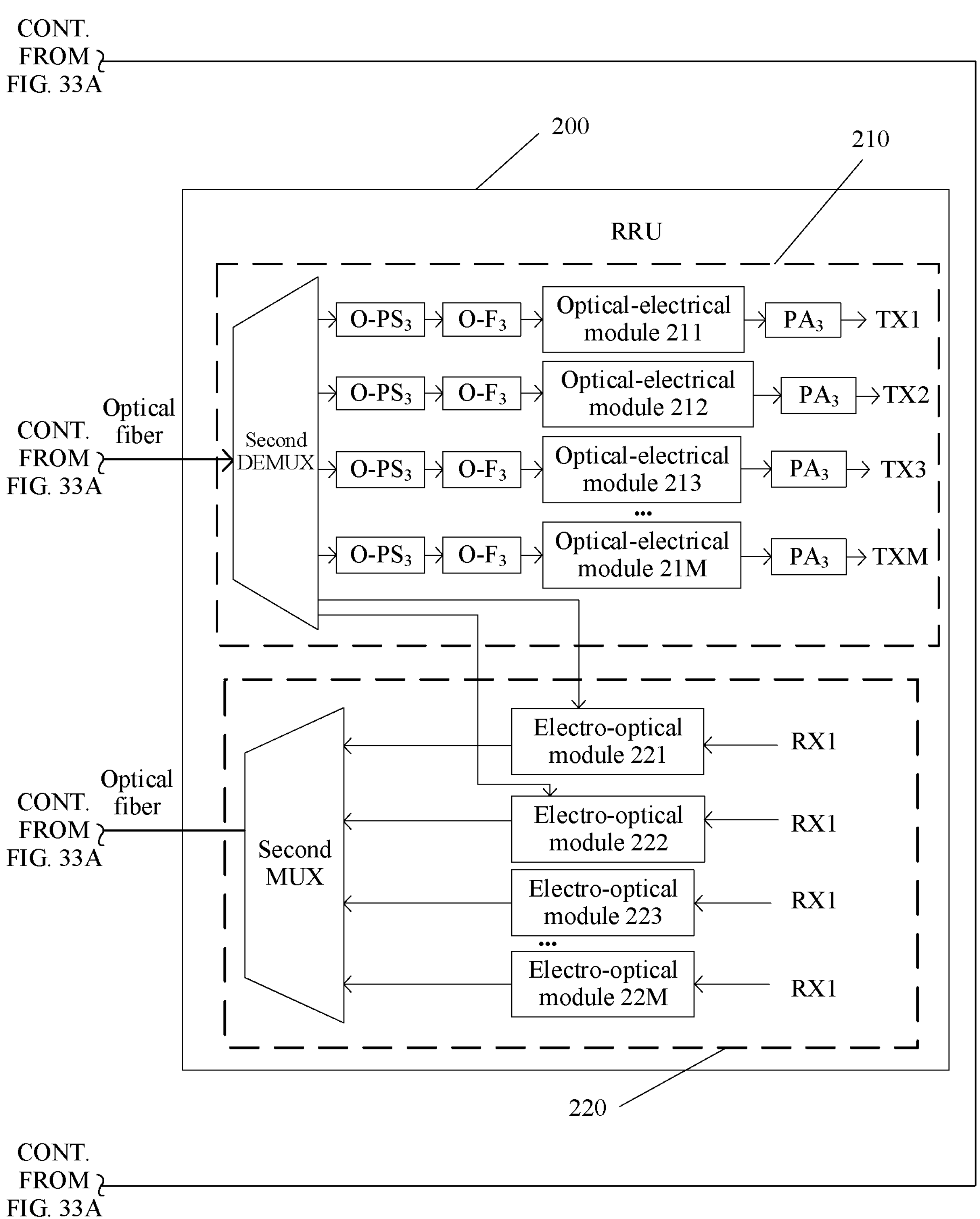

FIG. 33A and FIG. 33B are a schematic block diagram of a possible structure of the communications apparatus 300. As shown in FIG. 33A and FIG. 33B, the communications apparatus 300 includes a communications apparatus 100 and a communications apparatus 200. As shown in FIG. 33A and FIG. 33B, neither a receive link 120 nor a receive link 220 includes an optical processing module. A transmit link 110 does not include a first optical processing module, either. A third optical processing module in a transmit link 210 includes only an O-$PS_3$ and an O-$F_3$. The O-$PS_3$ is connected to the O-$F_3$. An output terminal of the O-$PS_3$ and an output terminal of the O-$F_3$ are connected to an input terminal of a second optical-electrical module (for example, an optical-electrical module 211). An input terminal of the O-$PS_3$ and an input terminal of the O-$F_3$ are connected to an output terminal of a second DEMUX. In addition, an electrical power amplifier $PA_3$ further exists after a second optical-electrical module (for example, the optical-electrical module 211). For processing processes of a TX signal and an RX signal, refer to the foregoing descriptions of the processing processes of the TX signal and the RX signal in the apparatus 100 and the apparatus 200. For brevity, details are not described herein again. In addition, in the architecture shown in FIG. 33A and FIG. 33B, a part or all of second electro-optical modules (electro-optical modules 221 to 22M) each receive a dedicated optical carrier from the transmit link and implement modulation. There are a plurality of RX multi-wavelength light source modules in a BBU.

Figure 34A:
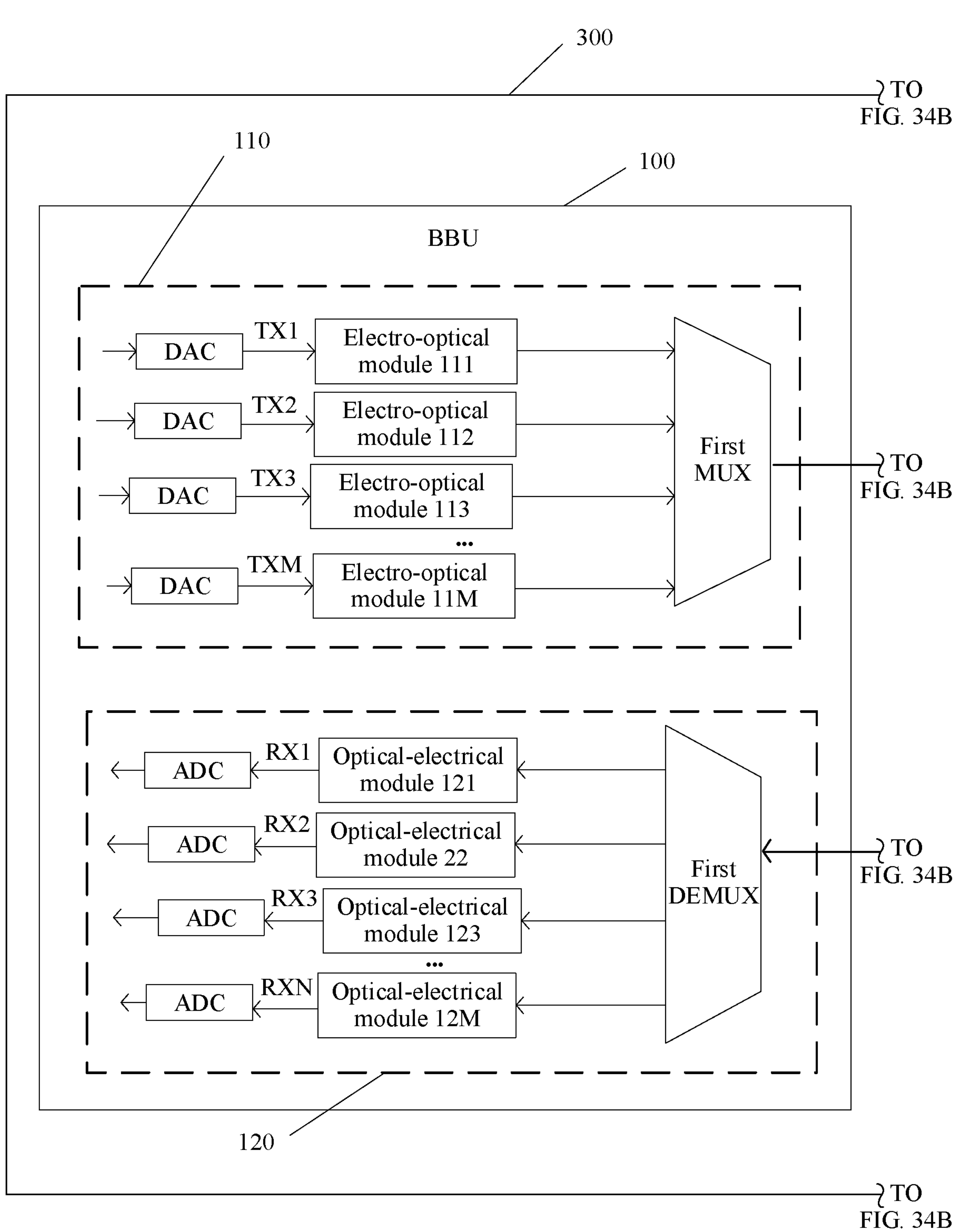
Figure 34B:
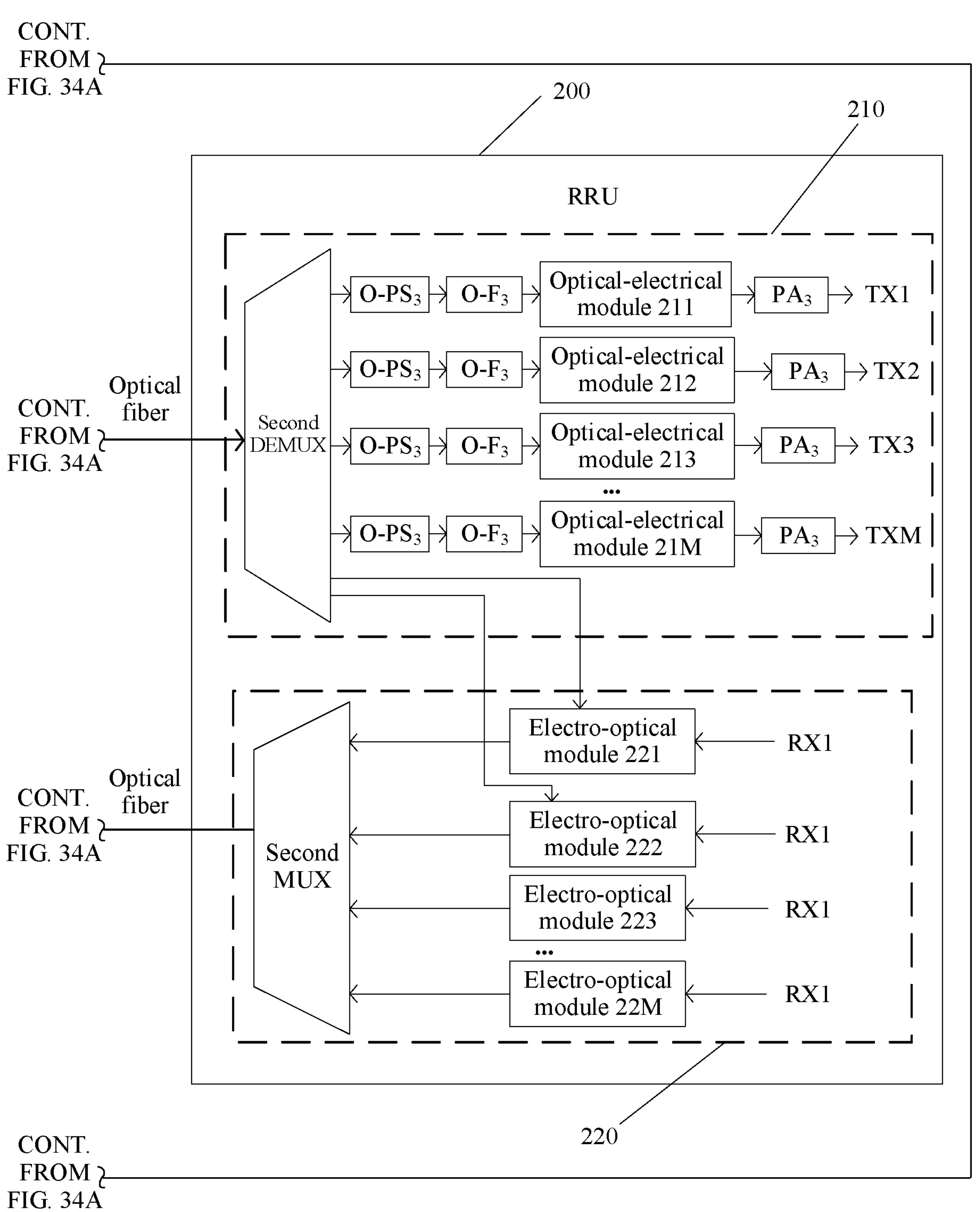

FIG. 34A and FIG. 34B are a schematic block diagram of a possible structure of the communications apparatus 300. As shown in FIG. 34A and FIG. 34B, the communications apparatus 300 includes a communications apparatus 100 and a communications apparatus 200. As shown in FIG. 34A and FIG. 34B, neither a receive link 120 nor a receive link 220 includes an optical processing module. A transmit link 110 does not include a first optical processing module, either. A third optical processing module in a transmit link 210 includes only an O-$PS_3$ and an O-$F_3$. The O-$PS_3$ is connected to the O-$F_3$. An output terminal of the O-$PS_3$ and an output terminal of the O-$F_3$ are connected to an input terminal of a second optical-electrical module (for example, an optical-electrical module 211). An input terminal of the O-$PS_3$ and an input terminal of the O-$F_3$ are connected to an output terminal of a second DEMUX. In addition, an electrical power amplifier $PA_3$ further exists after a second optical-electrical module (for example, the optical-electrical module 211). For processing processes of a TX signal and an RX signal, refer to the foregoing descriptions of the processing processes of the TX signal and the RX signal in the apparatus 100 and the apparatus 200. For brevity, details are not described herein again. In addition, in the architecture shown in FIG. 34A and FIG. 34B, a part or all of second electro-optical modules (electro-optical modules 221 to 22M) each recover an optical carrier from an analog optical signal transmitted in the downlink (the transmit link) and implement electrical signal modulation.

Figure 35A:
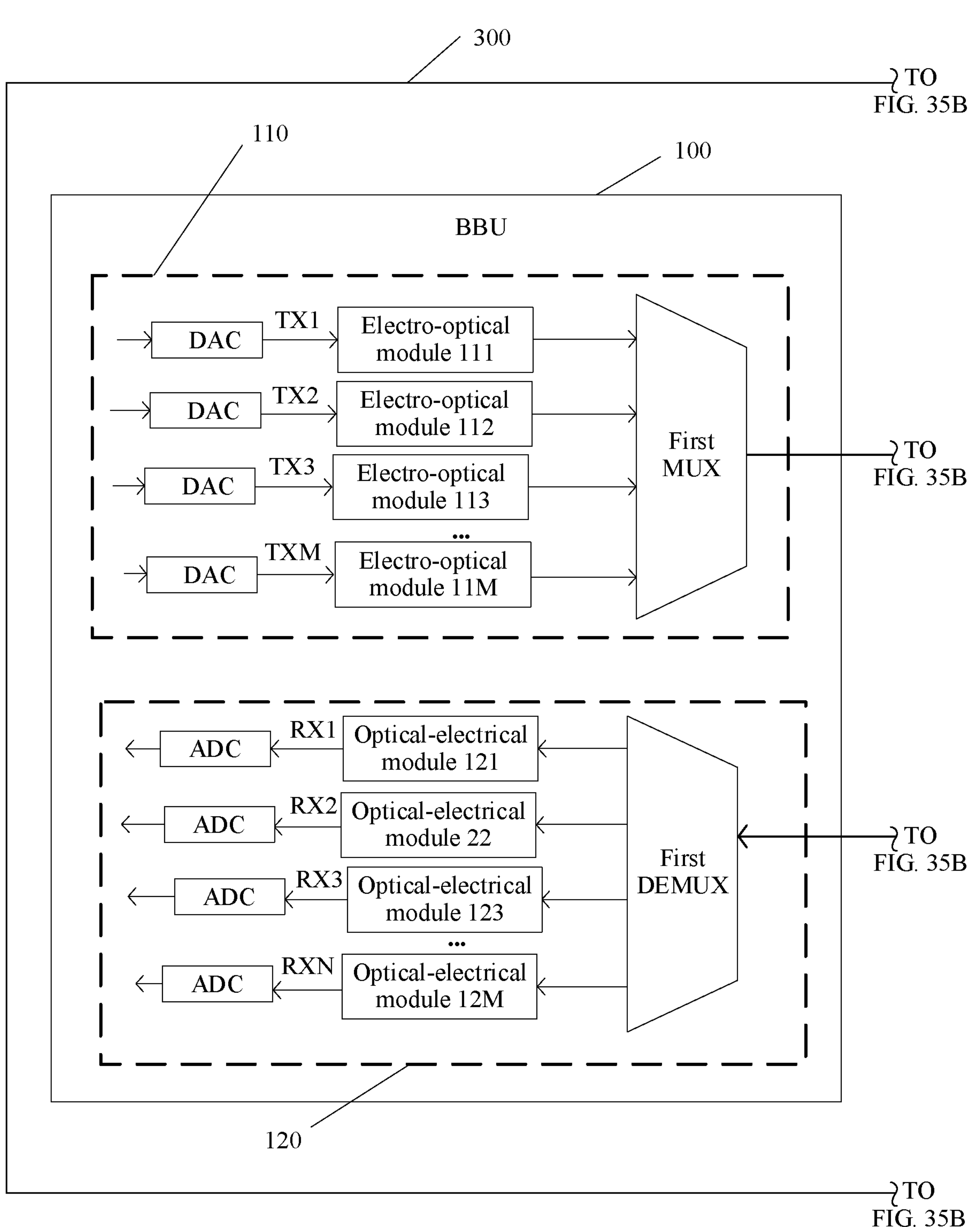
Figure 35B:
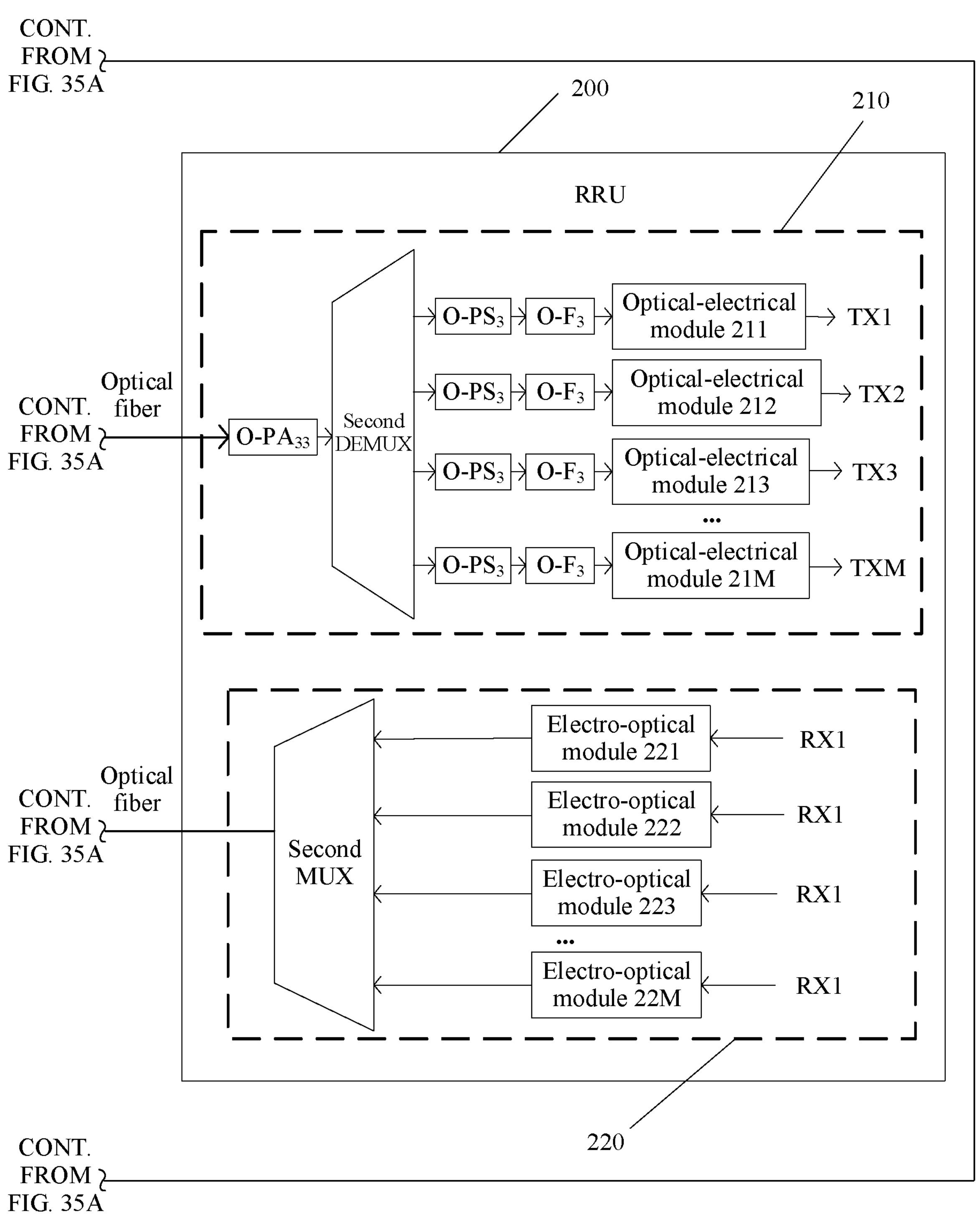

FIG. 35A and FIG. 35B are a schematic block diagram of a possible structure of the communications apparatus 300. As shown in FIG. 35A and FIG. 35B, the communications apparatus 300 includes a communications apparatus 100 and a communications apparatus 200. As shown in FIG. 35A and FIG. 35B, neither a receive link 120 nor a receive link 220 includes an optical processing module. A transmit link 110 does not include a first optical processing module, either. A third optical processing module in a transmit link 210 includes only an O-$PS_3$ and an O-$F_3$. The transmit link 210 further includes a pre-optical power amplifier O-$PA_{33}$. The O-$PS_3$ is connected to the O-$F_3$. An output terminal of the O-$PS_3$ and an output terminal of the O-$F_3$ are connected to an input terminal of a second optical-electrical module (for example, an optical-electrical module 211). An input terminal of the O-$PS_3$ and an input terminal of the O-$F_3$ are connected to an output terminal of a second DEMUX. An output terminal of the O-$PA_{33}$ is connected to an input terminal of the second DEMUX, and an input terminal of the O-$PA_{33}$ is connected to an output terminal of an optical fiber. For processing processes of a TX signal and an RX signal, refer to the foregoing descriptions of the processing processes of the TX signal and the RX signal in the apparatus 100 and the apparatus 200. For brevity, details are not described herein again. In addition, in the architecture shown in FIG. 35A and FIG. 35B, a part or all of second electro-optical modules (electro-optical modules 221 to 22M) each generate an optical carrier and modulate a radio frequency signal.

Figure 36A:
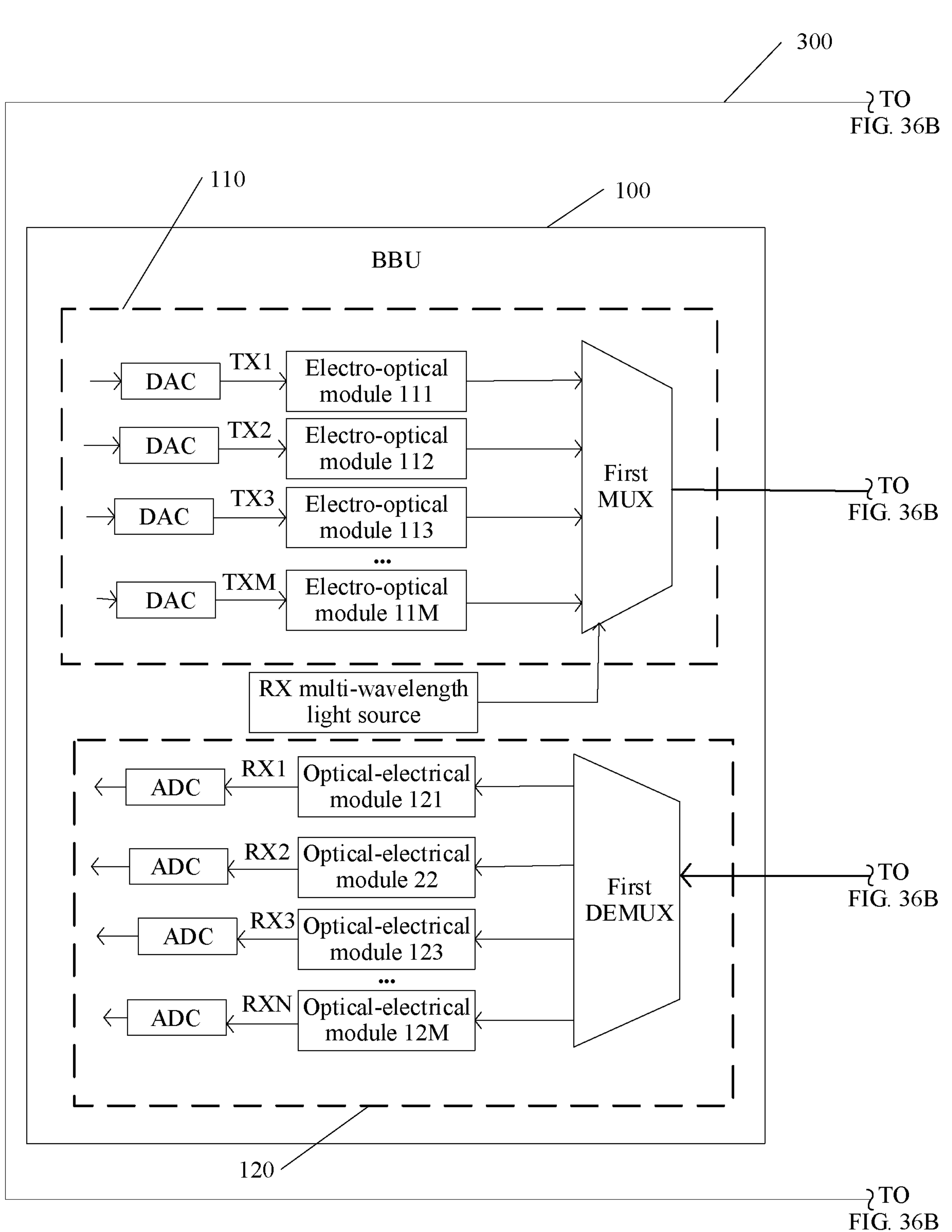
Figure 36B:
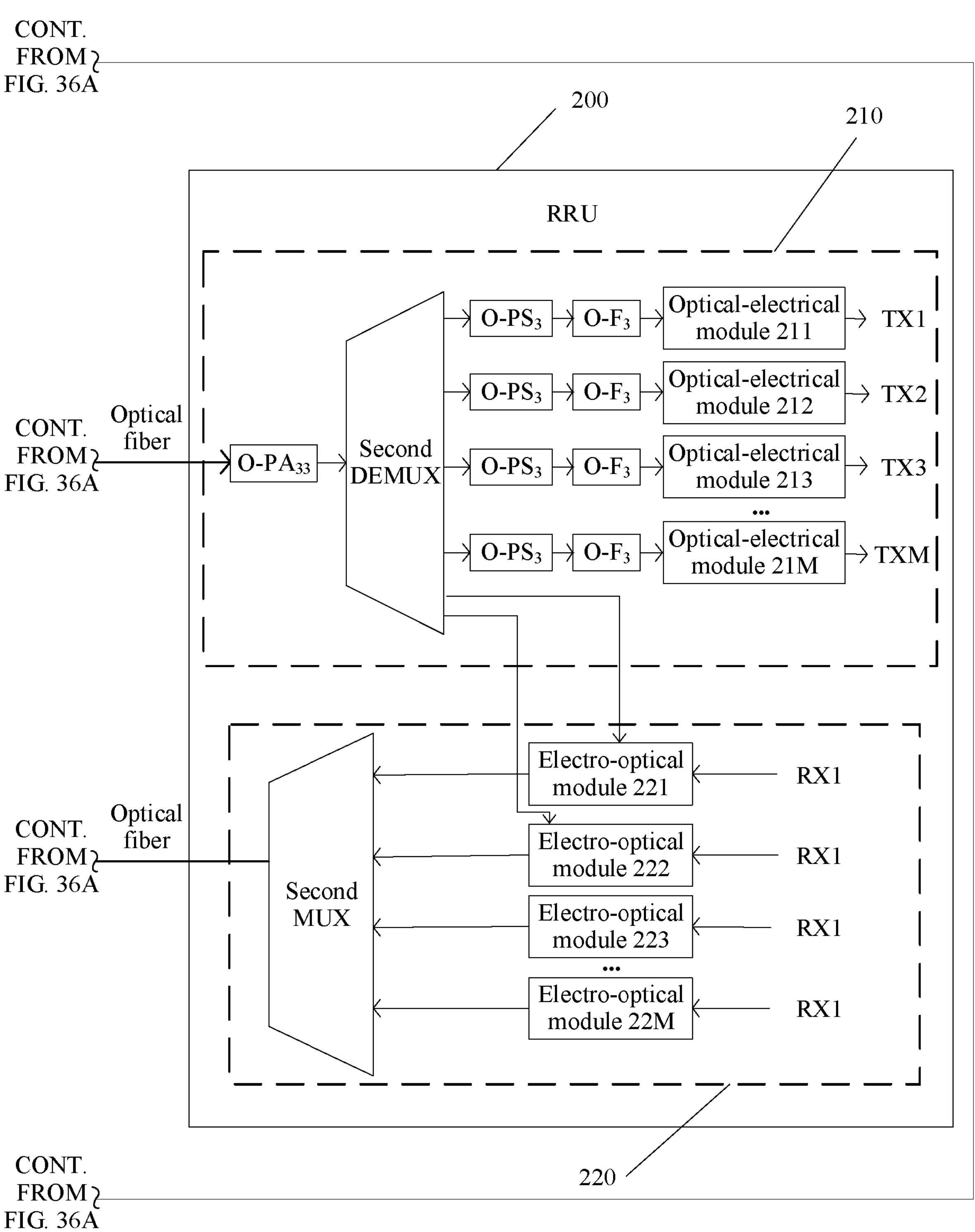

FIG. 36A and FIG. 36B are a schematic block diagram of a possible structure of the communications apparatus 300. As shown in FIG. 36A and FIG. 36B, the communications apparatus 300 includes a communications apparatus 100 and a communications apparatus 200. As shown in FIG. 36A and FIG. 36B, neither a receive link 120 nor a receive link 220 includes an optical processing module. A transmit link 110 does not include a first optical processing module, either. A third optical processing module in a transmit link 210 includes only an O-$PS_3$ and an O-$F_3$. The transmit link 210 further includes a pre-optical power amplifier O-$PA_{33}$. The O-$PS_3$ is connected to the O-$F_3$. An output terminal of the O-$PS_3$ and an output terminal of the O-$F_3$ are connected to an input terminal of a second optical-electrical module (for example, an optical-electrical module 211). An input terminal of the O-$PS_3$ and an input terminal of the O-$F_3$ are connected to an output terminal of a second DEMUX. An output terminal of the O-$PA_{33}$ is connected to an input terminal of the second DEMUX, and an input terminal of the O-$PA_{33}$ is connected to an output terminal of an optical fiber. For processing processes of a TX signal and an RX signal, refer to the foregoing descriptions of the processing processes of the TX signal and the RX signal in the apparatus 100 and the apparatus 200. For brevity, details are not described herein again. In addition, in the architecture shown in FIG. 36A and FIG. 36B, a part or all of second electro-optical modules (electro-optical modules 221 to 22M) each receive a dedicated optical carrier from the transmit link and implement modulation. There are a plurality of RX multi-wavelength light source modules in a BBU.

Figure 37A:
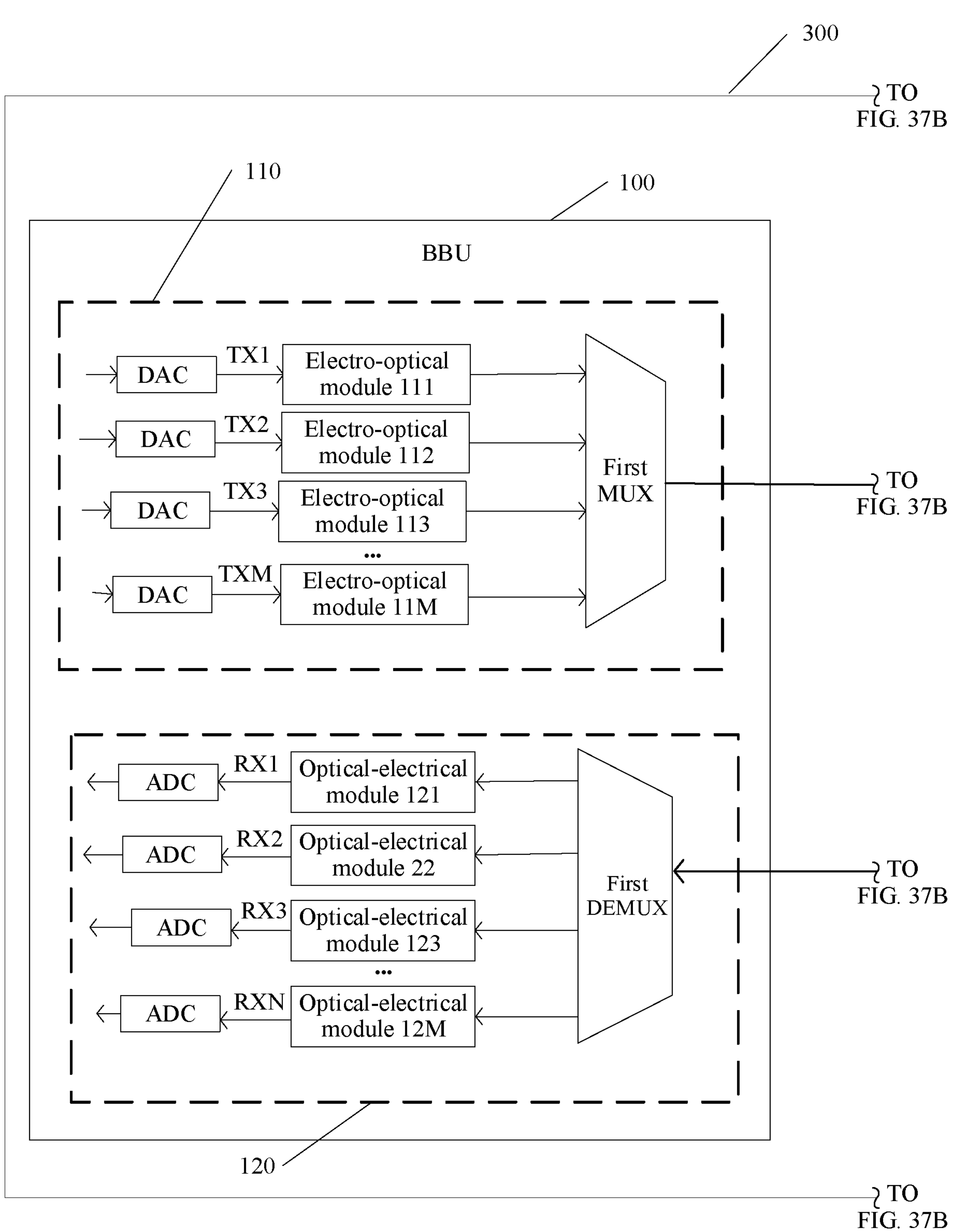
Figure 37B:
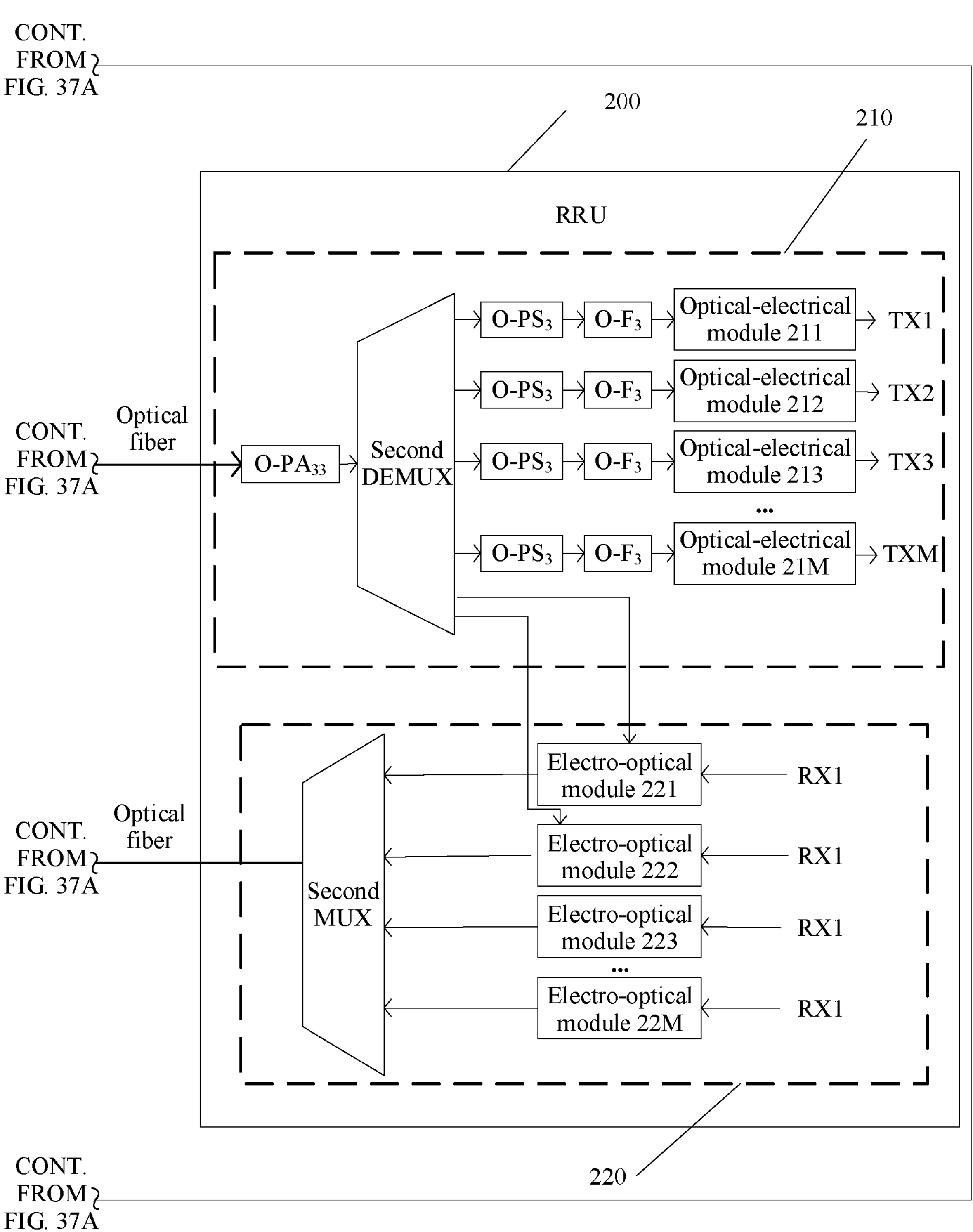

FIG. 37A and FIG. 37B are a schematic block diagram of a possible structure of the communications apparatus 300. As shown in FIG. 37A and FIG. 37B, the communications apparatus 300 includes a communications apparatus 100 and a communications apparatus 200. As shown in FIG. 37A and FIG. 37B, neither a receive link 120 nor a receive link 220 includes an optical processing module. A transmit link 110 does not include a first optical processing module, either. A third optical processing module in a transmit link 210 includes only an O-$PS_3$ and an O-$F_3$. The transmit link 210 further includes a pre-optical power amplifier O-$PA_{33}$. The O-$PS_3$ is connected to the O-$F_3$. An output terminal of the O-$PS_3$ and an output terminal of the O-$F_3$ are connected to an input terminal of a second optical-electrical module (for example, an optical-electrical module 211). An input terminal of the O-$PS_3$ and an input terminal of the O-$F_3$ are connected to an output terminal of a second DEMUX. An output terminal of the O-$PA_{33}$ is connected to an input terminal of the second DEMUX, and an input terminal of the O-$PA_{33}$ is connected to an output terminal of an optical fiber. For processing processes of a TX signal and an RX signal, refer to the foregoing descriptions of the processing processes of the TX signal and the RX signal in the apparatus 100 and the apparatus 200. For brevity, details are not described herein again. In addition, in the architecture shown in FIG. 37A and FIG. 37B, a part or all of second electro-optical modules (electro-optical modules 221 to 22M) each recover an optical carrier from an analog optical signal transmitted in the downlink (the transmit link) and implement electrical signal modulation.

Figure 38A:
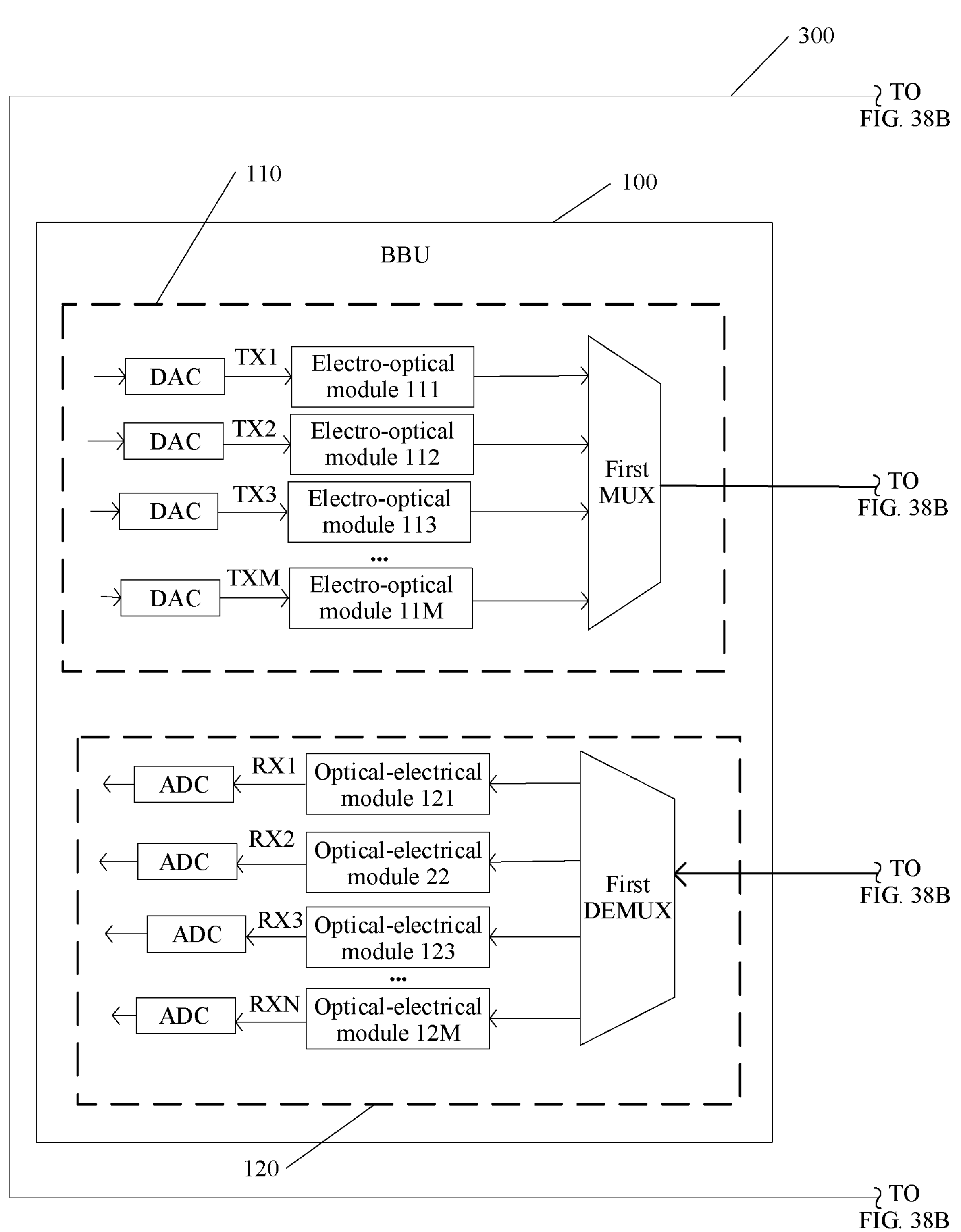
Figure 38B:
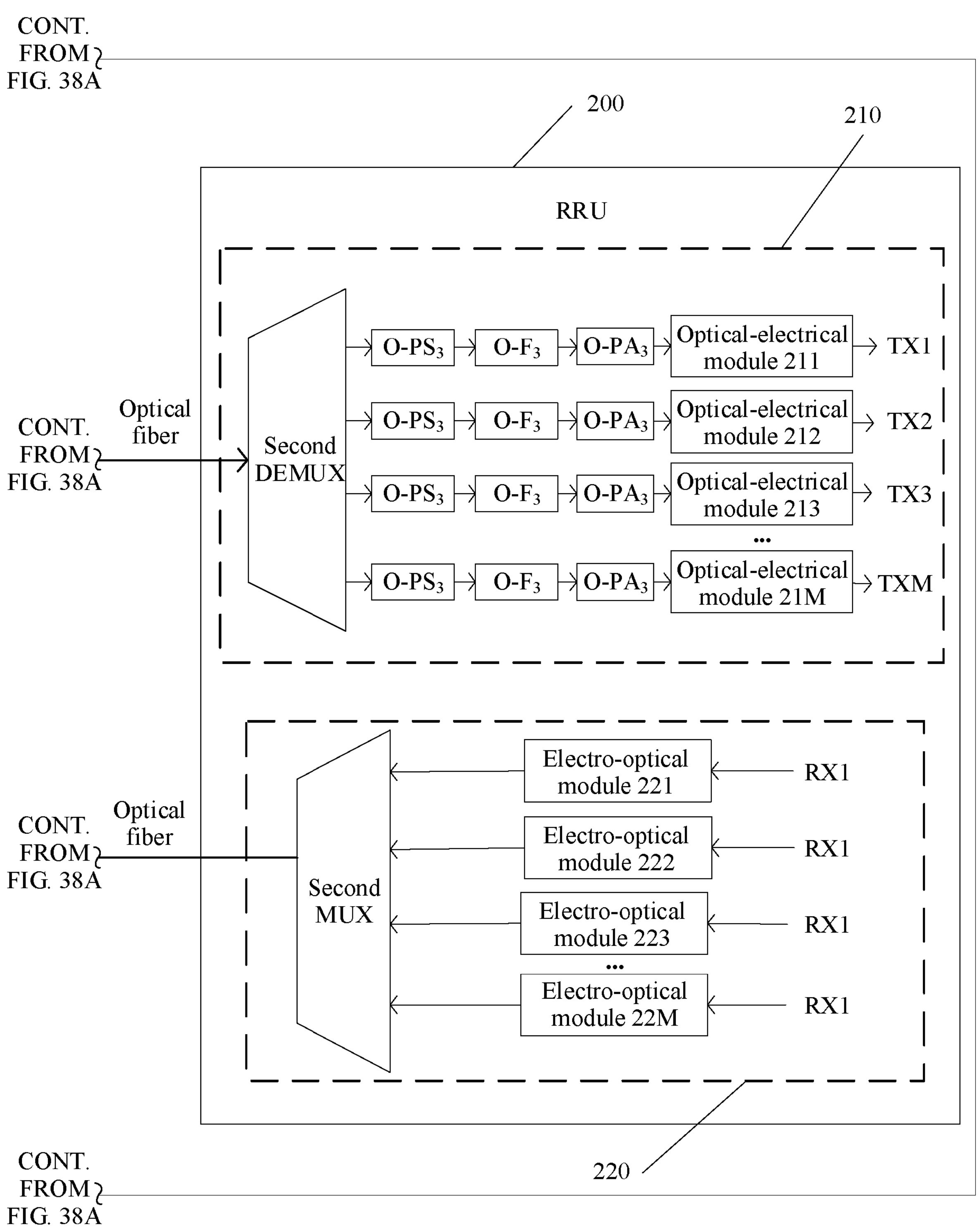

FIG. 38A and FIG. 38B are a schematic block diagram of a possible structure of the communications apparatus 300. As shown in FIG. 38A and FIG. 38B, the communications apparatus 300 includes a communications apparatus 100 and a communications apparatus 200. As shown in FIG. 38A and FIG. 38B, neither a receive link 120 nor a receive link 220 includes an optical processing module. A transmit link 110 does not include a first optical processing module, either. A third optical processing module in a transmit link 210 includes an O-$PS_3$, an O-$F_3$, and an O-$PA_3$. The O-$PS_3$ is connected to the O-$F_3$. An output terminal of the O-$PS_3$ and an output terminal of the O-$F_3$ are connected to an input terminal of a second optical-electrical module (for example, an optical-electrical module 211). An input terminal of the O-$PS_3$ and an input terminal of the O-$F_3$ are connected to an output terminal of a second DEMUX. An input terminal of the O-$PA_3$ is connected to the output terminal of the O-$F_3$, and an output terminal of the O-$PA_3$ is connected to the input terminal of the second optical-electrical module. For processing processes of a TX signal and an RX signal, refer to the foregoing descriptions of the processing processes of the TX signal and the RX signal in the apparatus 100 and the apparatus 200. For brevity, details are not described herein again. In addition, in the architecture shown in FIG. 38A and FIG. 38B, a part or all of second electro-optical modules (electro-optical modules 221 to 22M) each generate an optical carrier and modulate a radio frequency signal.

Figure 39A:
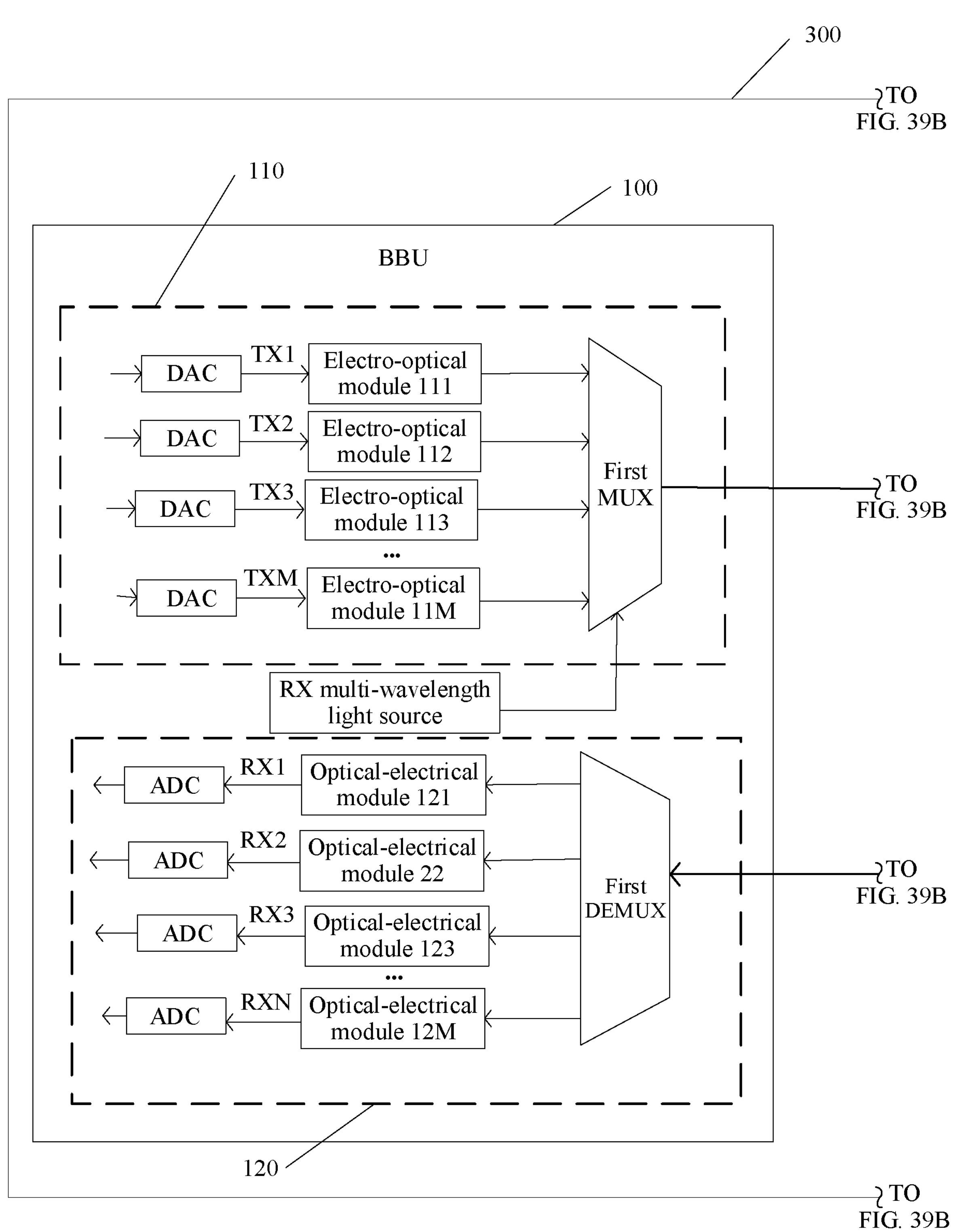
Figure 39B:
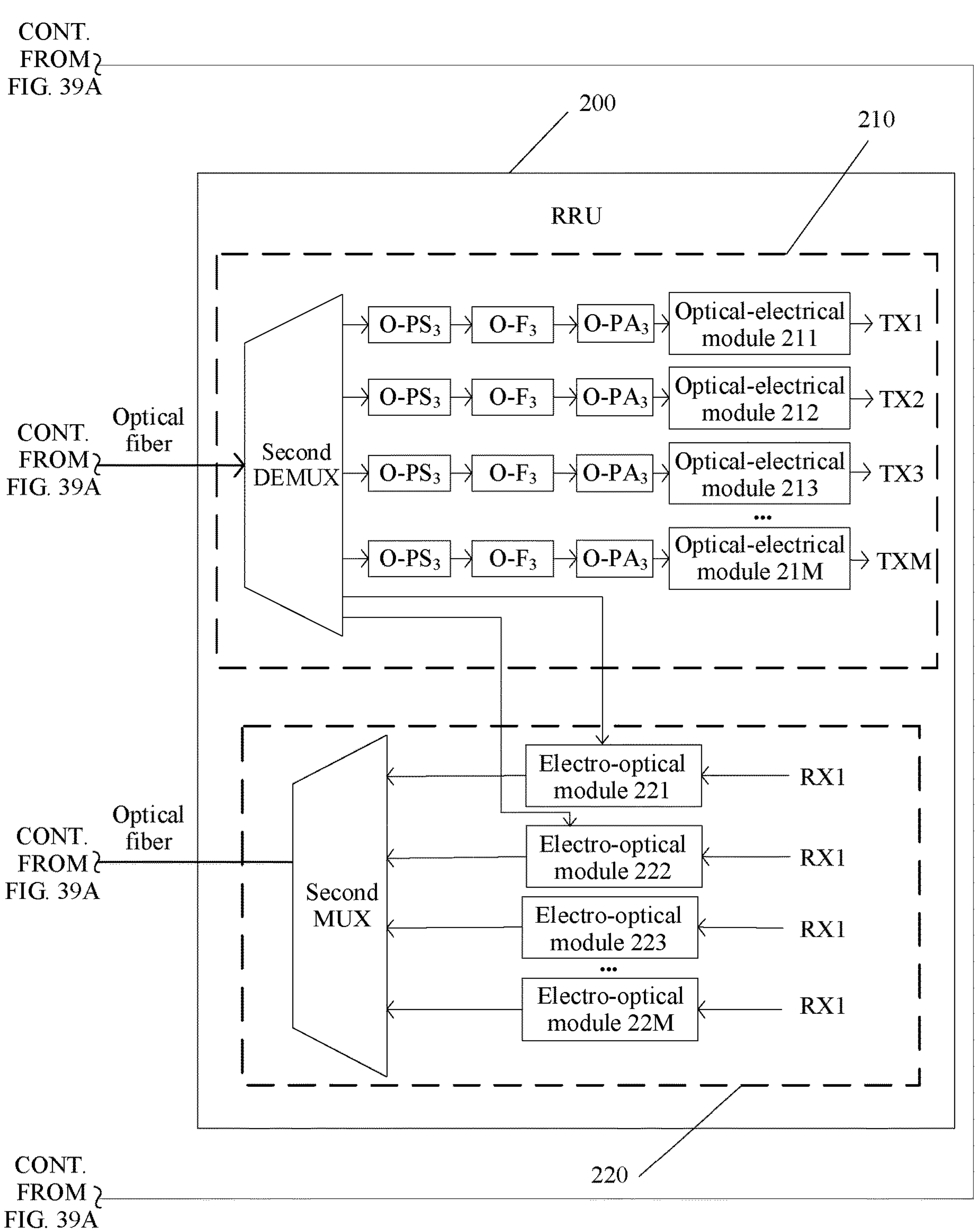

FIG. 39A and FIG. 39B are a schematic block diagram of a possible structure of the communications apparatus 300. As shown in FIG. 39A and FIG. 39B, the communications apparatus 300 includes a central unit 100 and a remote unit 200. As shown in FIG. 39A and FIG. 39B, neither a receive link 120 nor a receive link 220 includes an optical processing module. A transmit link 110 does not include a first optical processing module, either. A third optical processing module in a transmit link 210 includes an O-$PS_3$, an O-$F_3$, and an O-$PA_3$. The O-$PS_3$ is connected to the O-$F_3$. An output terminal of the O-$PS_3$ and an output terminal of the O-$F_3$ are connected to an input terminal of a second optical-electrical module (for example, an optical-electrical module 211). An input terminal of the O-$PS_3$ and an input terminal of the O-$F_3$ are connected to an output terminal of a second DEMUX. An input terminal of the O-$PA_3$ is connected to the output terminal of the O-$F_3$, and an output terminal of the O-$PA_3$ is connected to the input terminal of the second optical-electrical module. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 39A and FIG. 39B, a part or all of second electro-optical modules (electro-optical modules 221 to 22M) each receive a dedicated optical carrier from the transmit link and implement modulation. There are a plurality of RX multi-wavelength light source modules in a BBU.

Figure 40A:
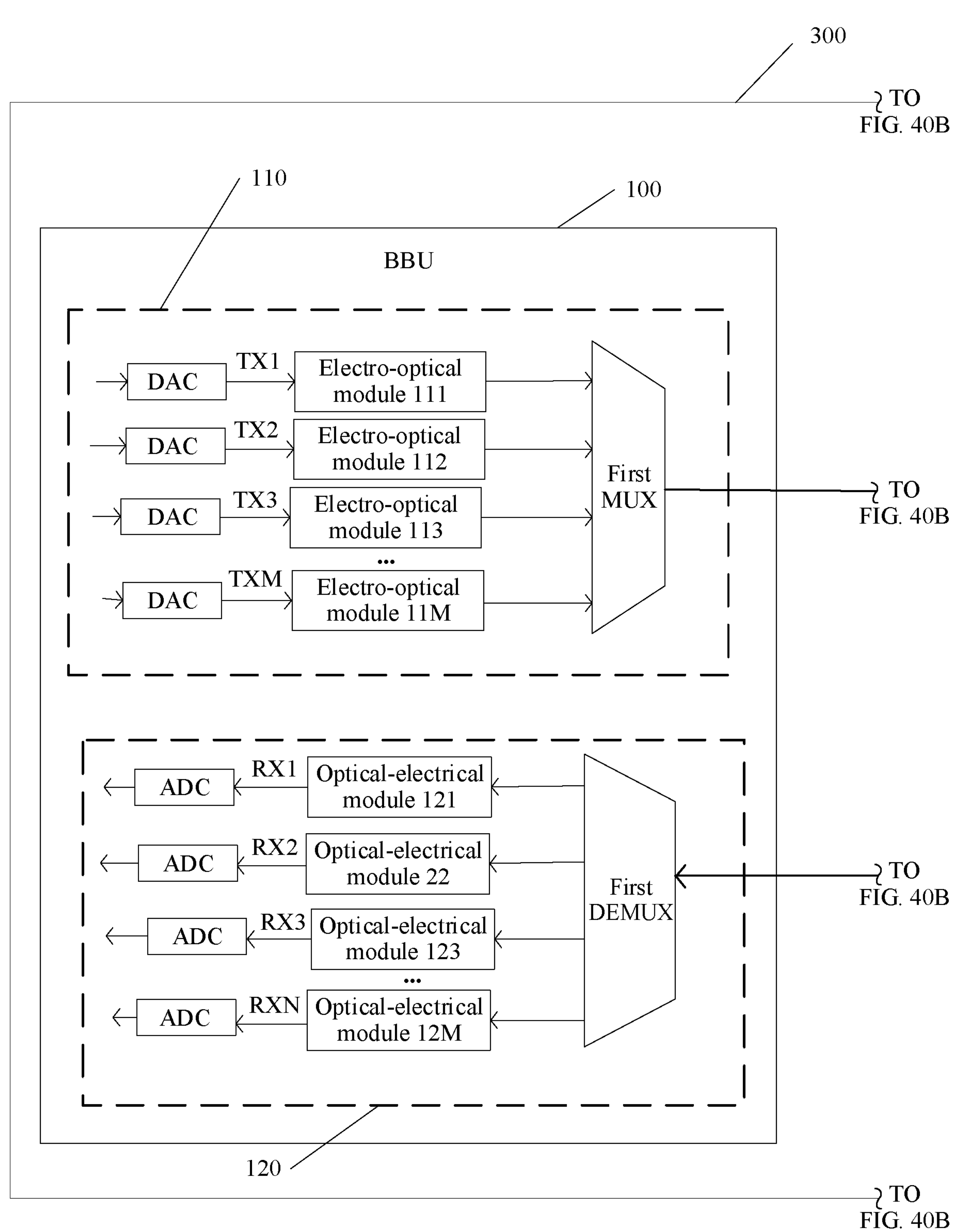
Figure 40B:
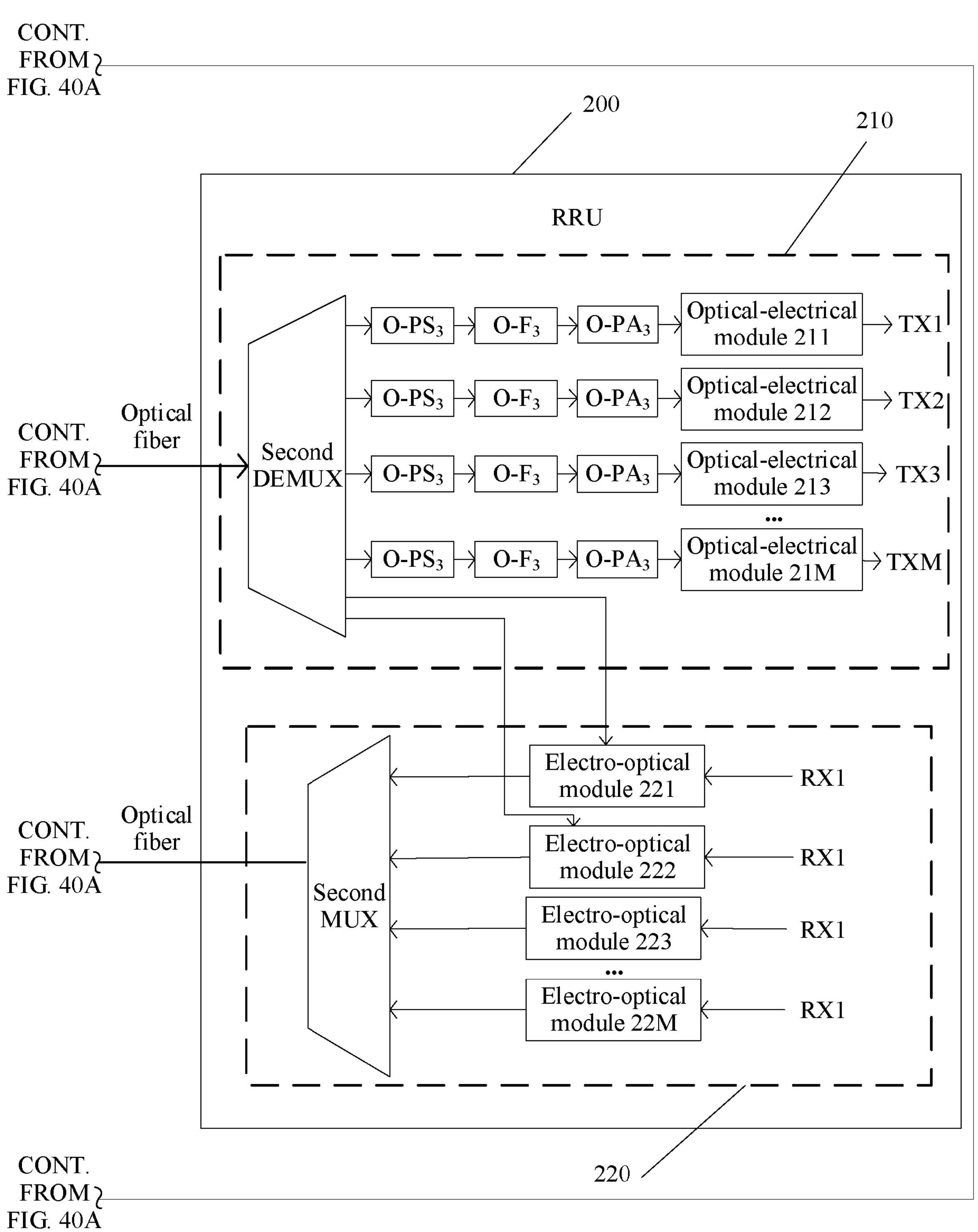

FIG. 40A and FIG. 40B are a schematic block diagram of a possible structure of the communications apparatus 300. As shown in FIG. 40A and FIG. 40B, the communications apparatus 300 includes a central unit 100 and a remote unit 200. As shown in FIG. 40A and FIG. 40B, neither a receive link 120 nor a receive link 220 includes an optical processing module. A transmit link 110 does not include a first optical processing module, either. A third optical processing module in a transmit link 210 includes an O-PS, an O-$F_3$, and an O-$PA_3$. The O-$PS_3$ is connected to the O-$F_3$. An output terminal of the O-$PS_3$ and an output terminal of the O-$F_3$ are connected to an input terminal of a second optical-electrical module (for example, an optical-electrical module 211). An input terminal of the O-$PS_3$ and an input terminal of the O-$F_3$ are connected to an output terminal of a second DEMUX. An input terminal of the O-$PA_3$ is connected to the output terminal of the O-$F_3$, and an output terminal of the O-$PA_3$ is connected to the input terminal of the second optical-electrical module. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 40A and FIG. 40B, a part or all of second electro-optical modules (electro-optical modules 221 to 22M) each generate an optical carrier and modulate a radio frequency signal.

Figure 41A:
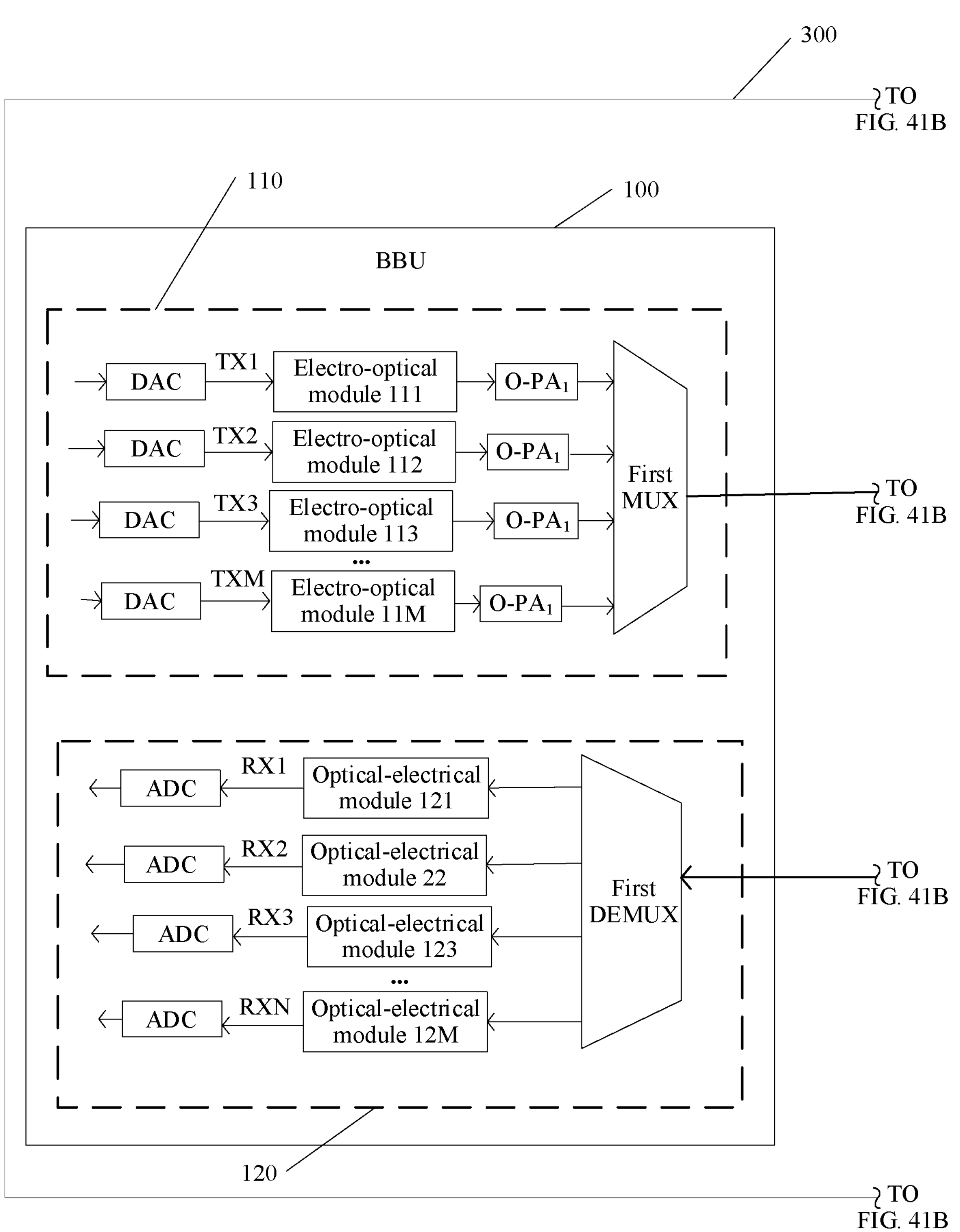
Figure 41B:
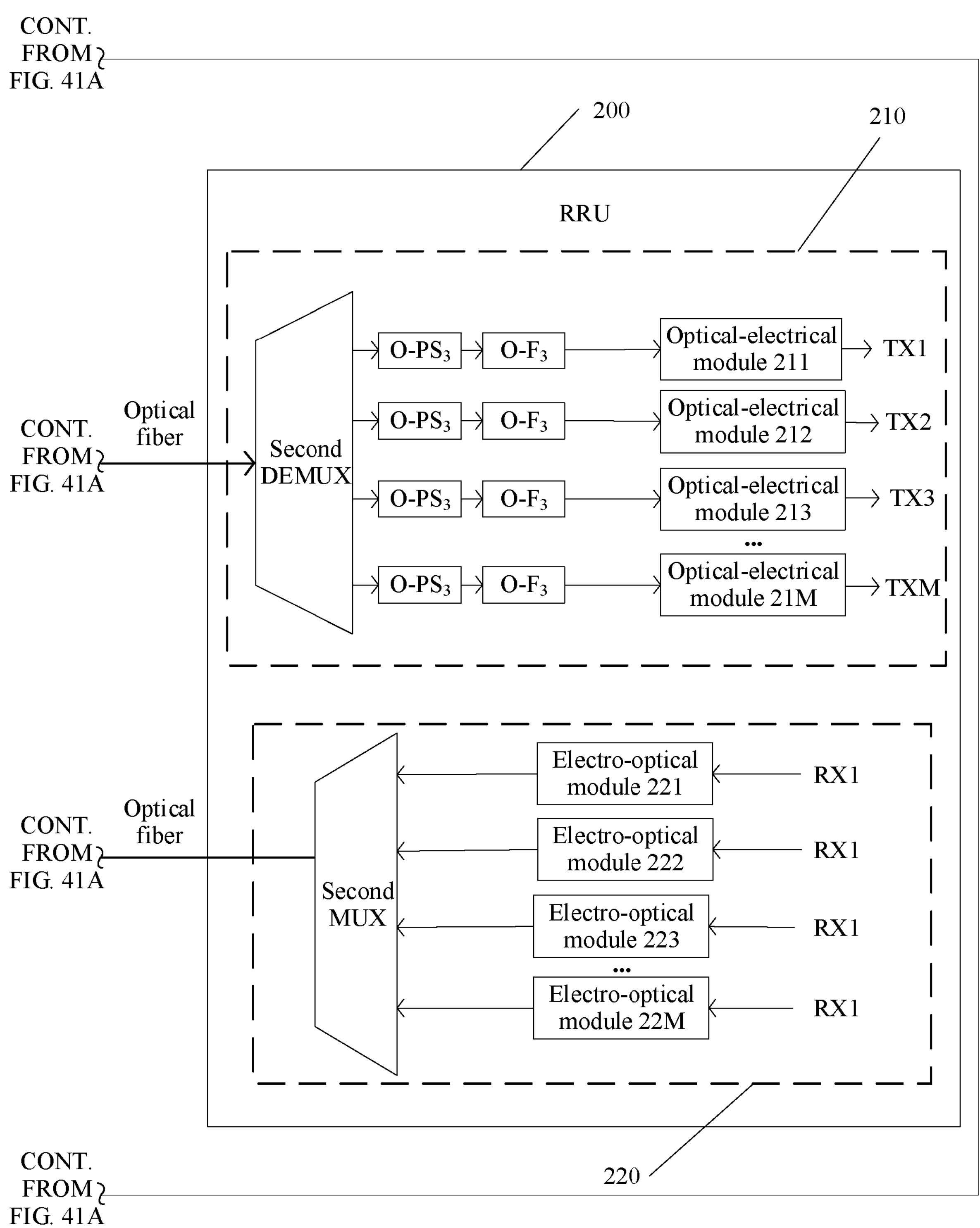

FIG. 41A and FIG. 41B are a schematic block diagram of a possible structure of the communications apparatus 300. As shown in FIG. 41A and FIG. 41B, the communications apparatus 300 includes a central unit 100 and a remote unit 200. As shown in FIG. 41A and FIG. 41B, neither a receive link 120 nor a receive link 220 includes an optical processing module. A transmit link 110 includes a first optical processing module. The first optical processing module includes an O-$PA_1$, and the O-$PA_1$ is located between an electro-optical module and a first MUX. A third optical processing module in a transmit link 210 includes an O-$PS_3$ and an O-$F_3$. The O-$PS_3$ is connected to the O-$F_3$. An output terminal of the O-$PS_3$ and an output terminal of the O-$F_3$ are connected to an input terminal of a second optical-electrical module (for example, an optical-electrical module 211). An input terminal of the O-$PS_3$ and an input terminal of the O-$F_3$ are connected to an output terminal of a second DEMUX. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 41A and FIG. 41B, a part or all of second electro-optical modules (electro-optical modules 221 to 22M) each generate an optical carrier and modulate a radio frequency signal.

Figure 42A:
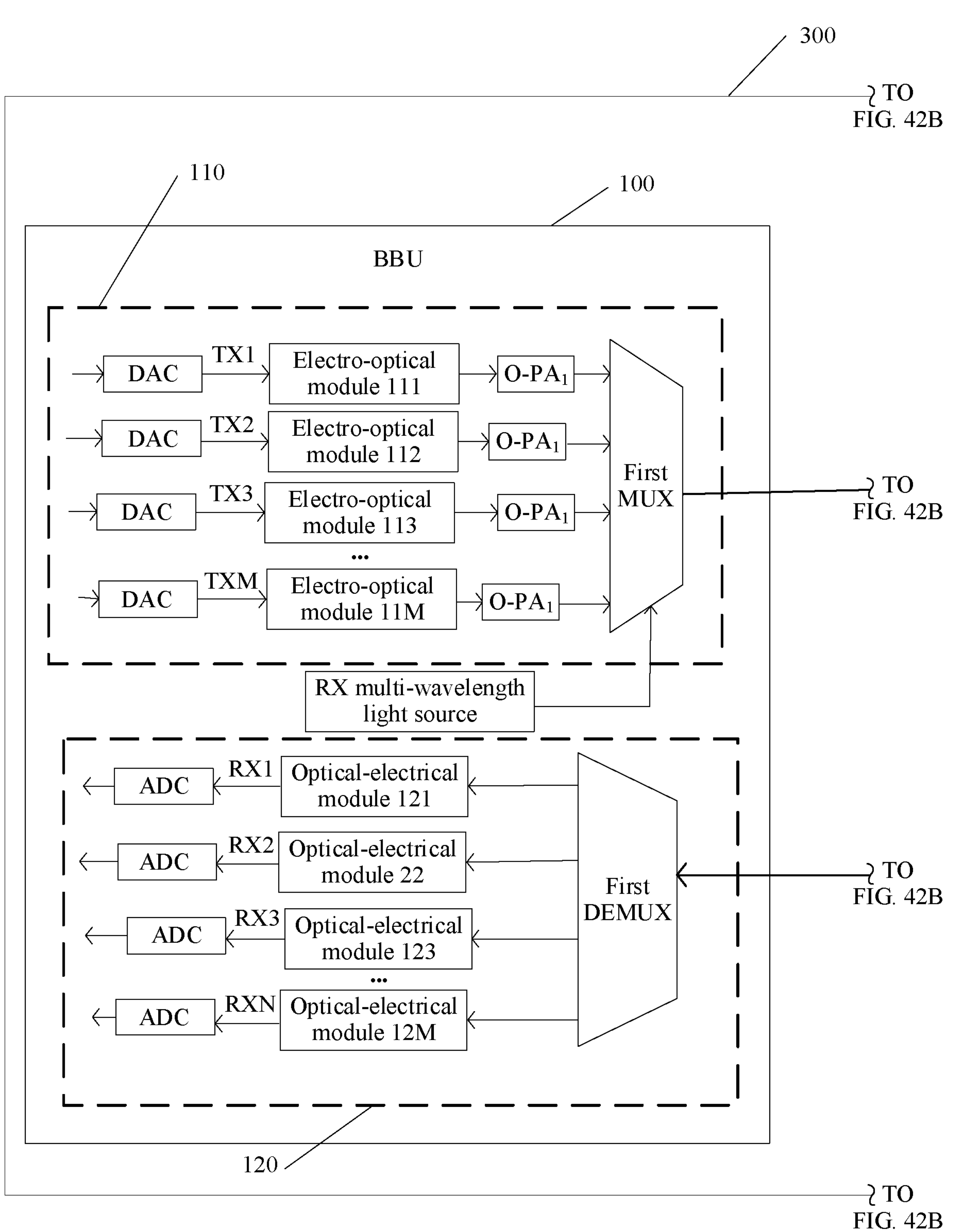
Figure 42B:
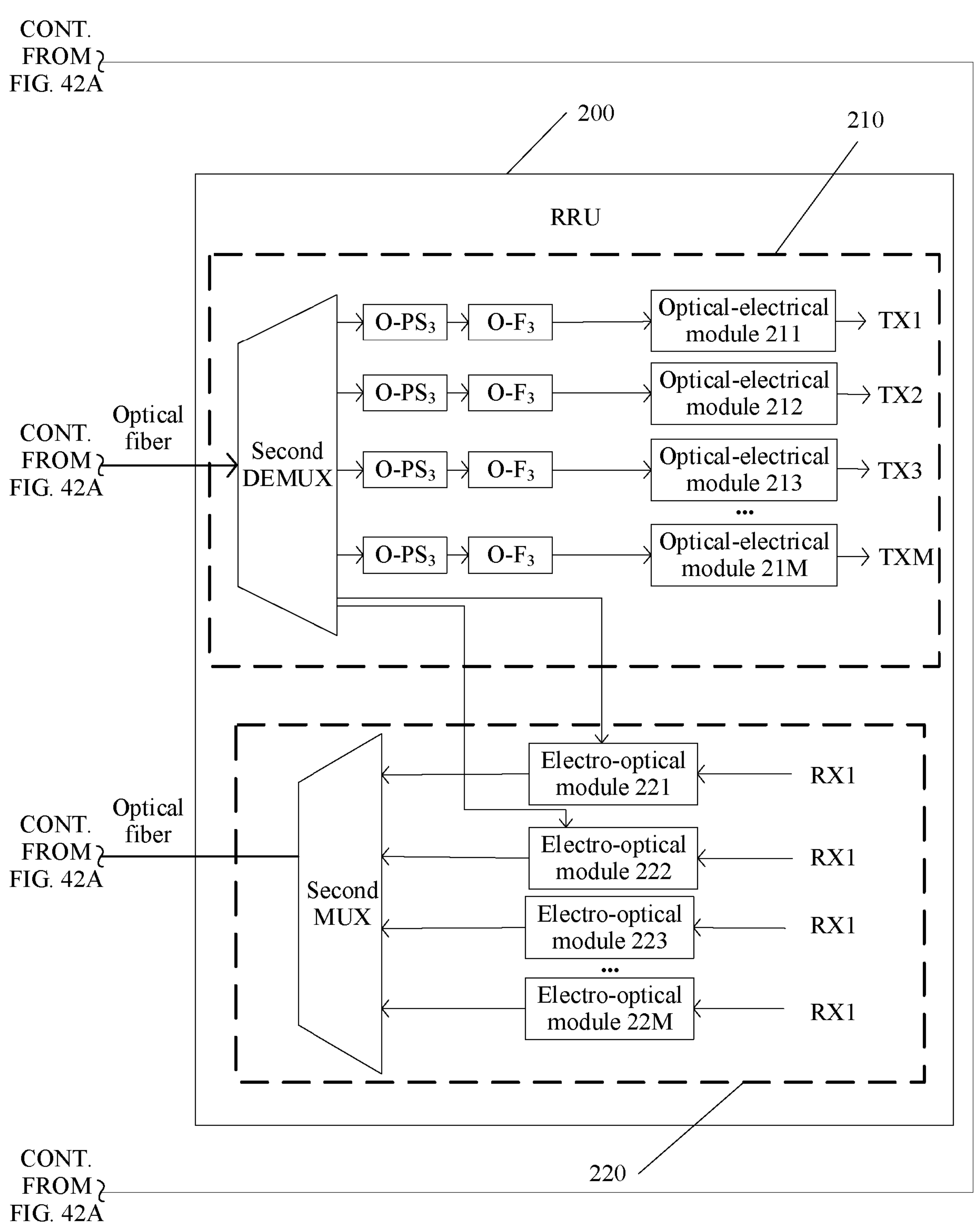

FIG. 42A and FIG. 42B are a schematic block diagram of a possible structure of the communications apparatus 300. As shown in FIG. 41A and FIG. 41B, the communications apparatus 300 includes a central unit 100 and a remote unit 200. As shown in FIG. 42A and FIG. 42B, neither a receive link 120 nor a receive link 220 includes an optical processing module. A transmit link 110 includes a first optical processing module. The first optical processing module includes an O-$PA_1$, and the O-$PA_1$ is located between an electro-optical module and a first MUX. A third optical processing module in a transmit link 210 includes an O-$PS_3$ and an O-$F_3$. The O-$PS_3$ is connected to the O-$F_3$. An output terminal of the O-$PS_3$ and an output terminal of the O-$F_3$ are connected to an input terminal of a second optical-electrical module (for example, an optical-electrical module 211). An input terminal of the O-$PS_3$ and an input terminal of the O-$F_3$ are connected to an output terminal of a second DEMUX. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 42A and FIG. 42B, a part or all of second electro-optical modules (electro-optical modules 221 to 22M) each receive a dedicated optical carrier from the transmit link and implement modulation. There are a plurality of RX multi-wavelength light source modules in a BBU.

Figure 43A:
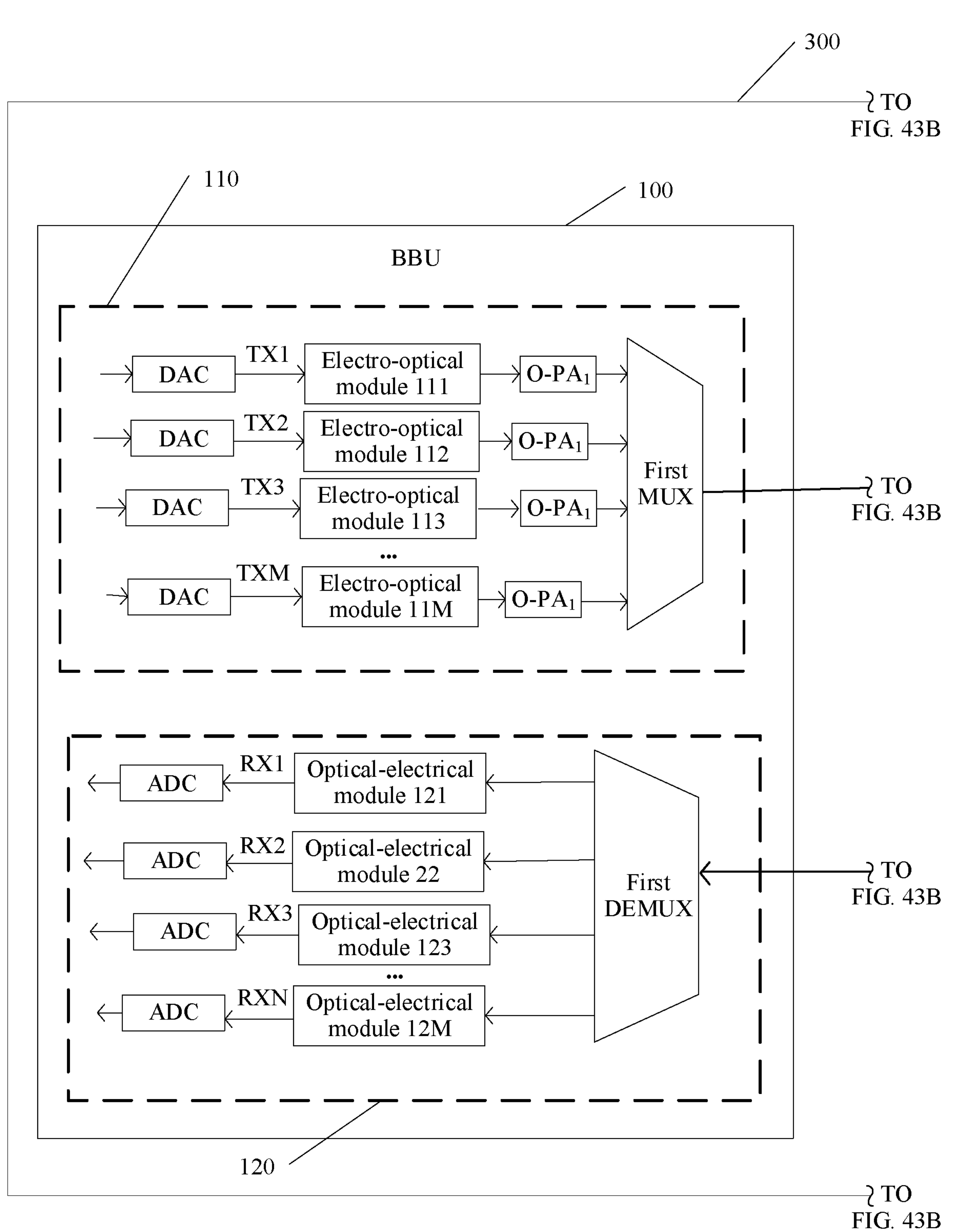
Figure 43B:
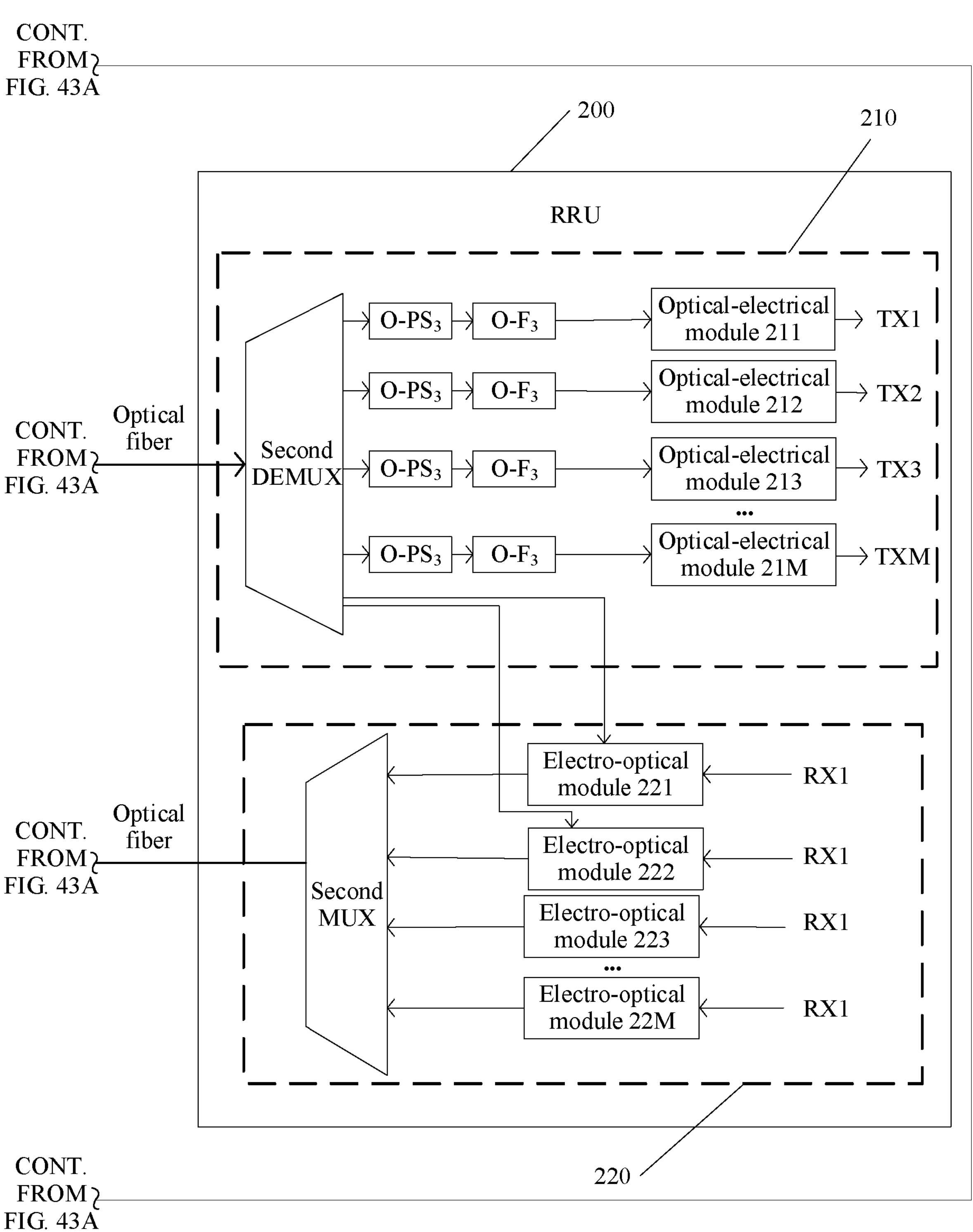

FIG. 43A and FIG. 43B are a schematic block diagram of a possible structure of the communications apparatus 300. As shown in FIG. 43A and FIG. 43B, the communications apparatus 300 includes a central unit 100 and a remote unit 200. As shown in FIG. 43A and FIG. 43B, neither a receive link 120 nor a receive link 220 includes an optical processing module. A transmit link 110 includes a first optical processing module. The first optical processing module includes an O-$PA_1$, and the O-$PA_1$ is located between an electro-optical module and a first MUX. A third optical processing module in a transmit link 210 includes an O-$PS_3$ and an O-$F_3$. The O-$PS_3$ is connected to the O-$F_3$. An output terminal of the O-$PS_3$ and an output terminal of the O-$F_3$ are connected to an input terminal of a second optical-electrical module (for example, an optical-electrical module 211). An input terminal of the O-$PS_3$ and an input terminal of the O-$F_3$ are connected to an output terminal of a second DEMUX. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 43A and FIG. 43B, a part or all of second electro-optical modules (electro-optical modules 221 to 22M) each recover an optical carrier from an analog optical signal transmitted in the downlink (the transmit link) and implement electrical signal modulation.

Figure 44A:
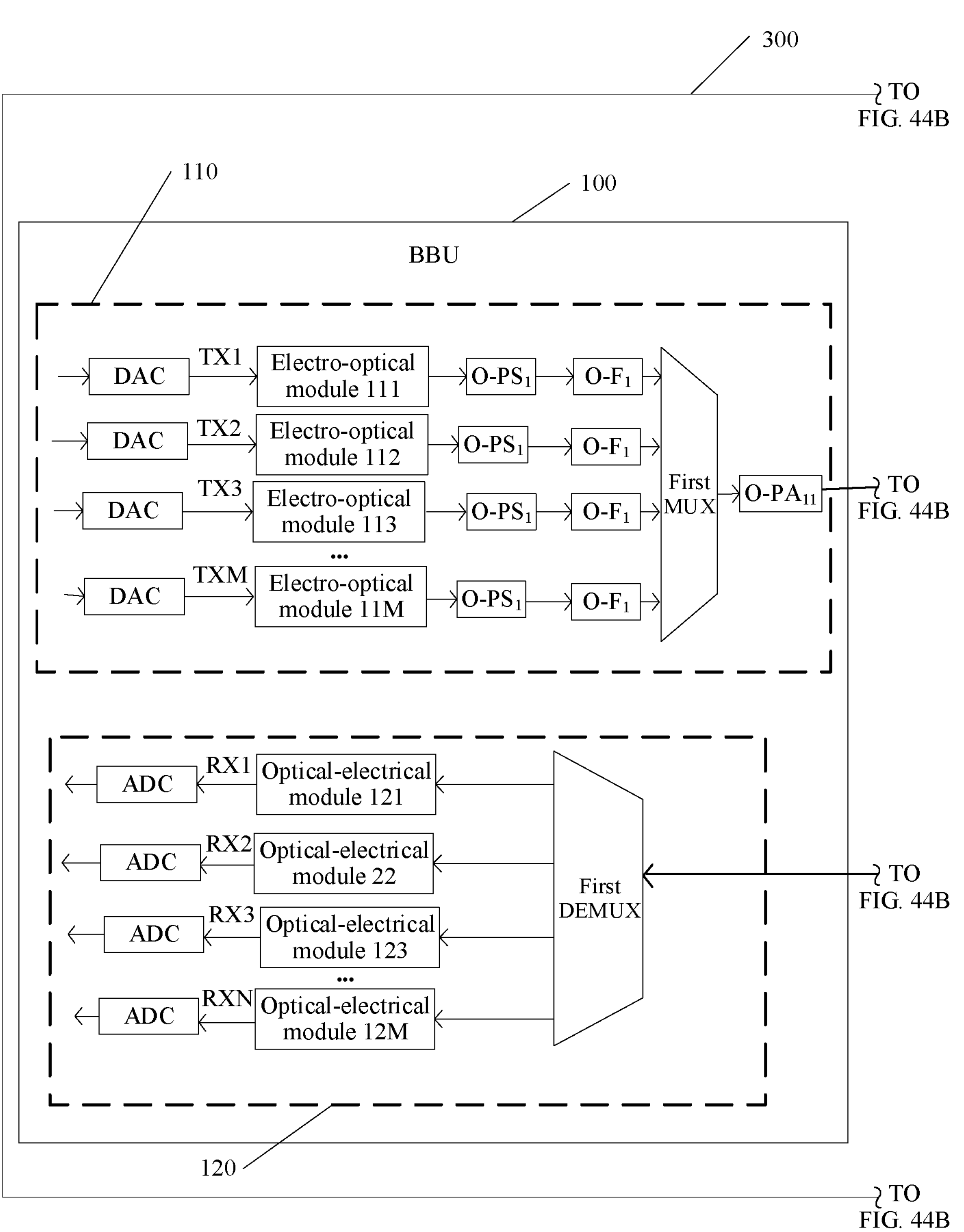
Figure 44B:
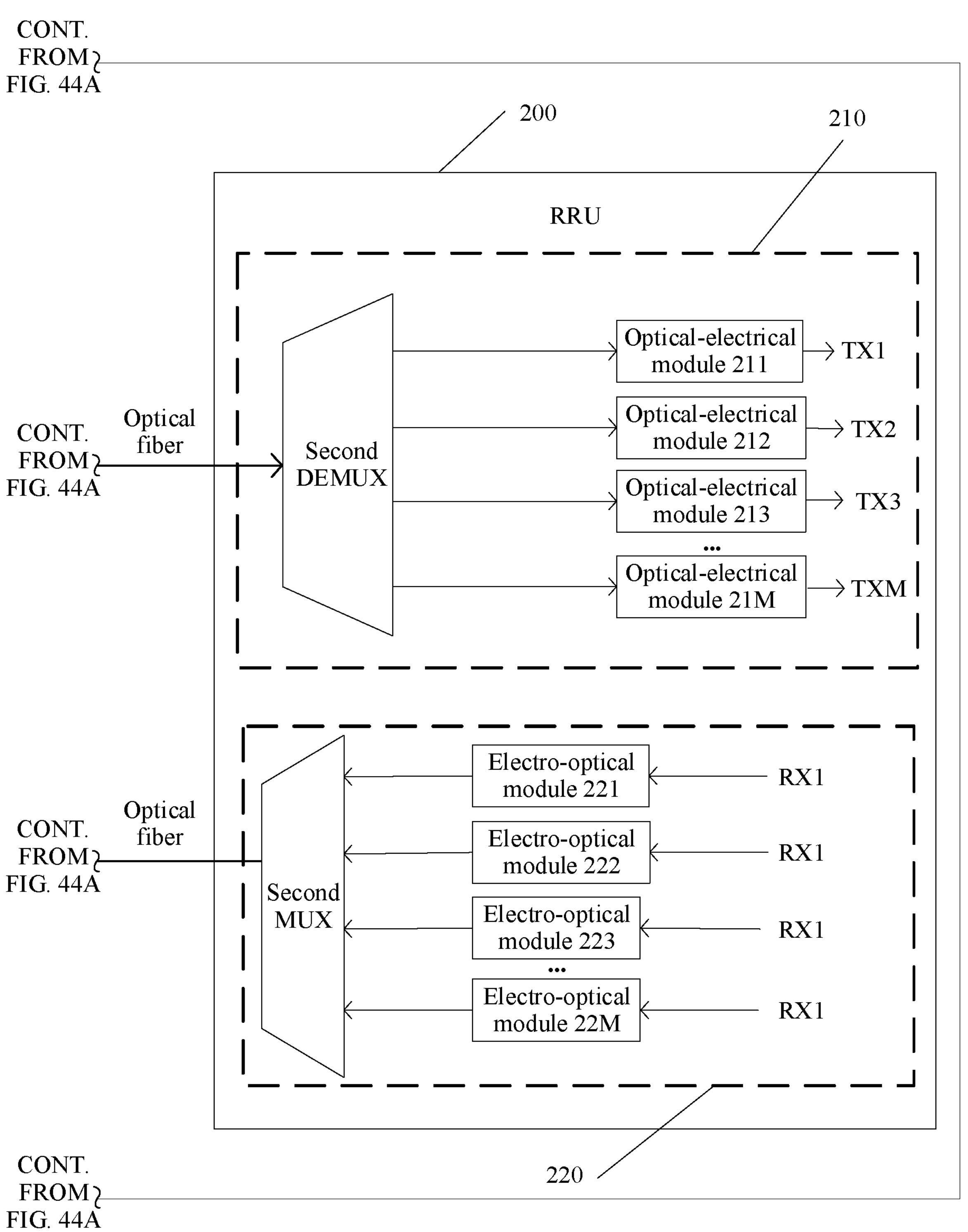

FIG. 44A and FIG. 44B are a schematic block diagram of a possible structure of the communications apparatus 300. As shown in FIG. 44A and FIG. 44B, the communications apparatus 300 includes a central unit 100 and a remote unit 200. As shown in FIG. 44A and FIG. 44B, neither a receive link 120 nor a receive link 220 includes an optical processing module. A transmit link 110 includes a first optical processing module. The first optical processing module includes an O-$PS_1$ and an O-$F_1$. An output terminal of the O-$PS_1$ is connected to an input terminal of the O-$F_1$. The central unit 100 further includes a post optical power amplifier O-$PA_{11}$. An input terminal of the O-$PA_{11}$ is connected to an output terminal of a first MUX, and an output terminal of the O-$PA_{11}$ is connected to an input terminal of an optical fiber. A transmit link 210 does not include a third optical processing module. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 44A and FIG. 44B, a part or all of second electro-optical modules (electro-optical modules 221 to 22M) each generate an optical carrier and modulate a radio frequency signal.

Figure 45A:
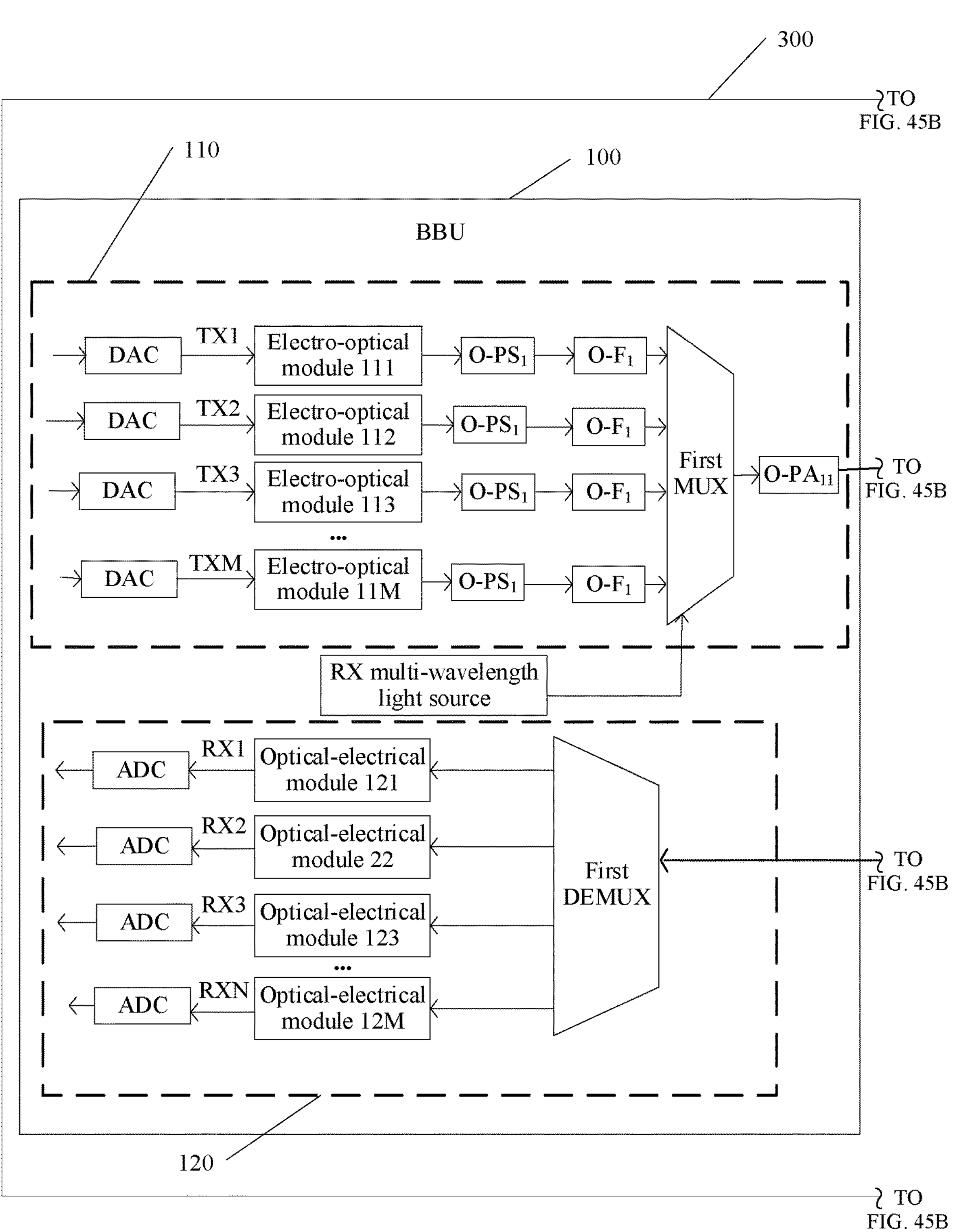
Figure 45B:
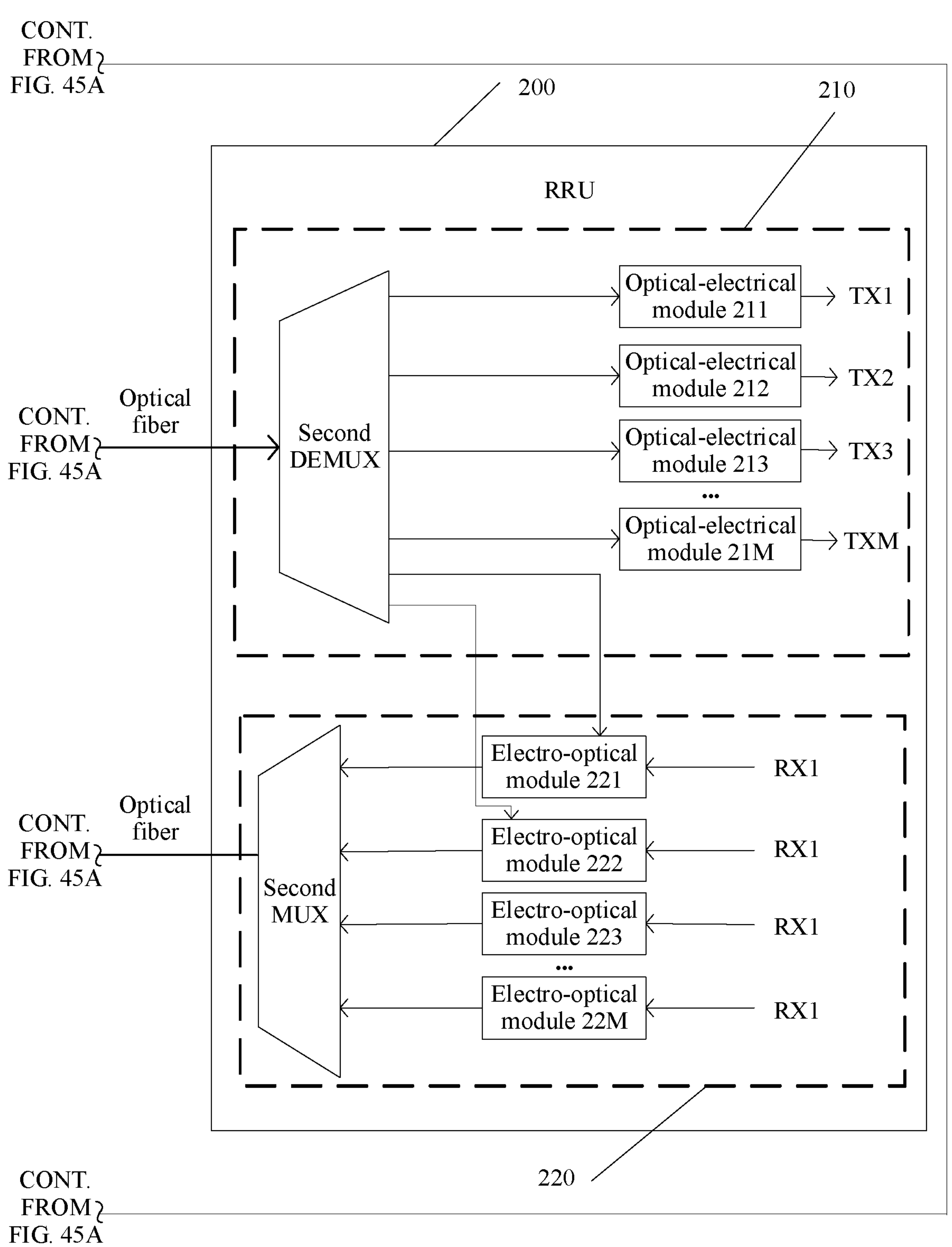

FIG. 45A and FIG. 45B are a schematic block diagram of a possible structure of the communications apparatus 300. As shown in FIG. 45A and FIG. 45B, the communications apparatus 300 includes a central unit 100 and a remote unit 200. As shown in FIG. 45A and FIG. 45B, neither a receive link 120 nor a receive link 220 includes an optical processing module. A transmit link 110 includes a first optical processing module. The first optical processing module includes an O-$PS_1$ and an O-$F_1$. An output terminal of the O-$PS_1$ is connected to an input terminal of the O-$F_1$. The central unit 100 further includes a post optical power amplifier O-$PA_{11}$. An input terminal of the O-$PA_{11}$ is connected to an output terminal of a first MUX, and an output terminal of the O-$PA_{11}$ is connected to an input terminal of an optical fiber. A transmit link 210 does not include a third optical processing module. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 45A and FIG. 45B, a part or all of second electro-optical modules (electro-optical modules 221 to 22M) each receive a dedicated optical carrier from the transmit link and implement modulation. There are a plurality of RX multi-wavelength light source modules in a BBU.

Figure 46A:
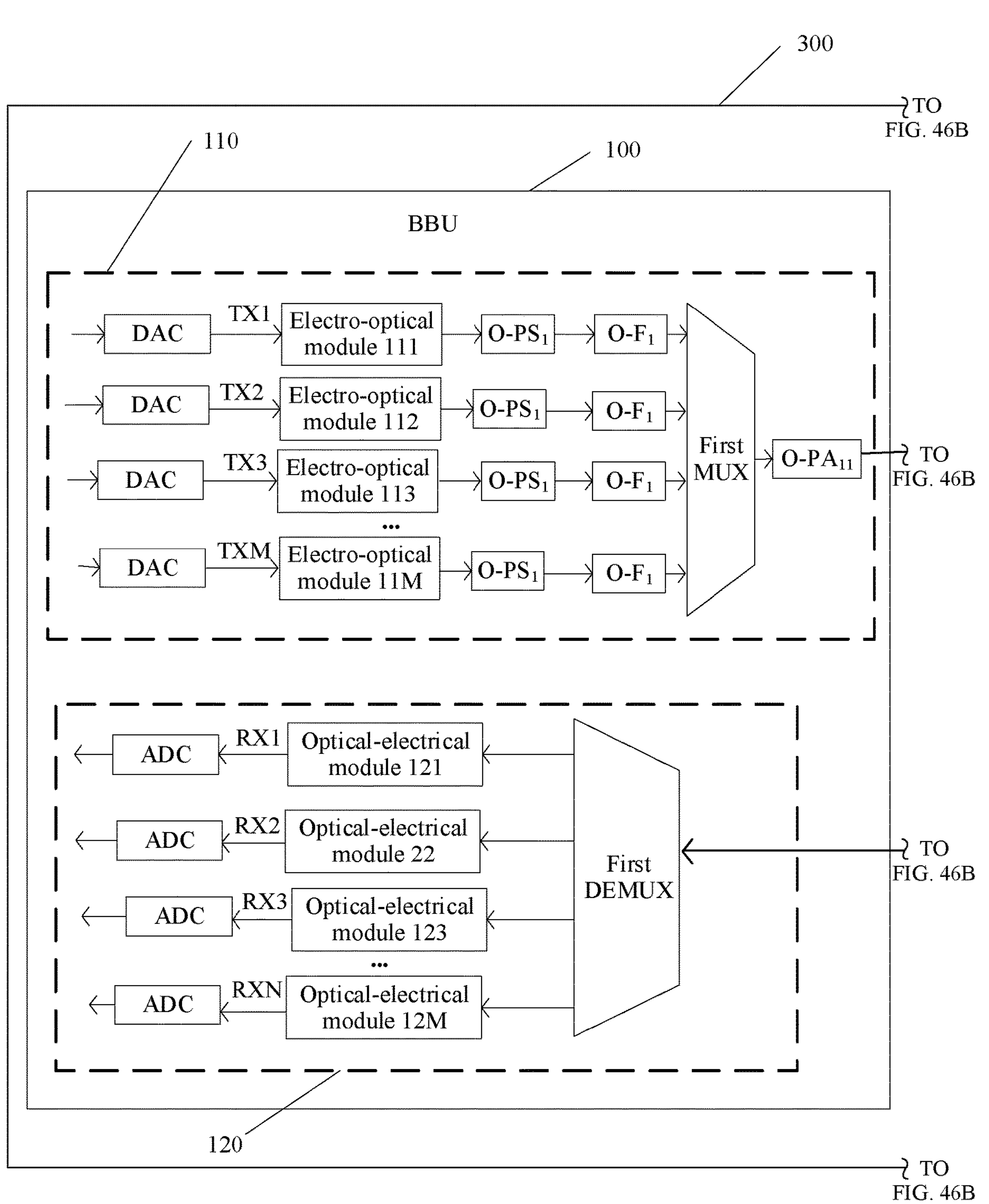
Figure 46B:
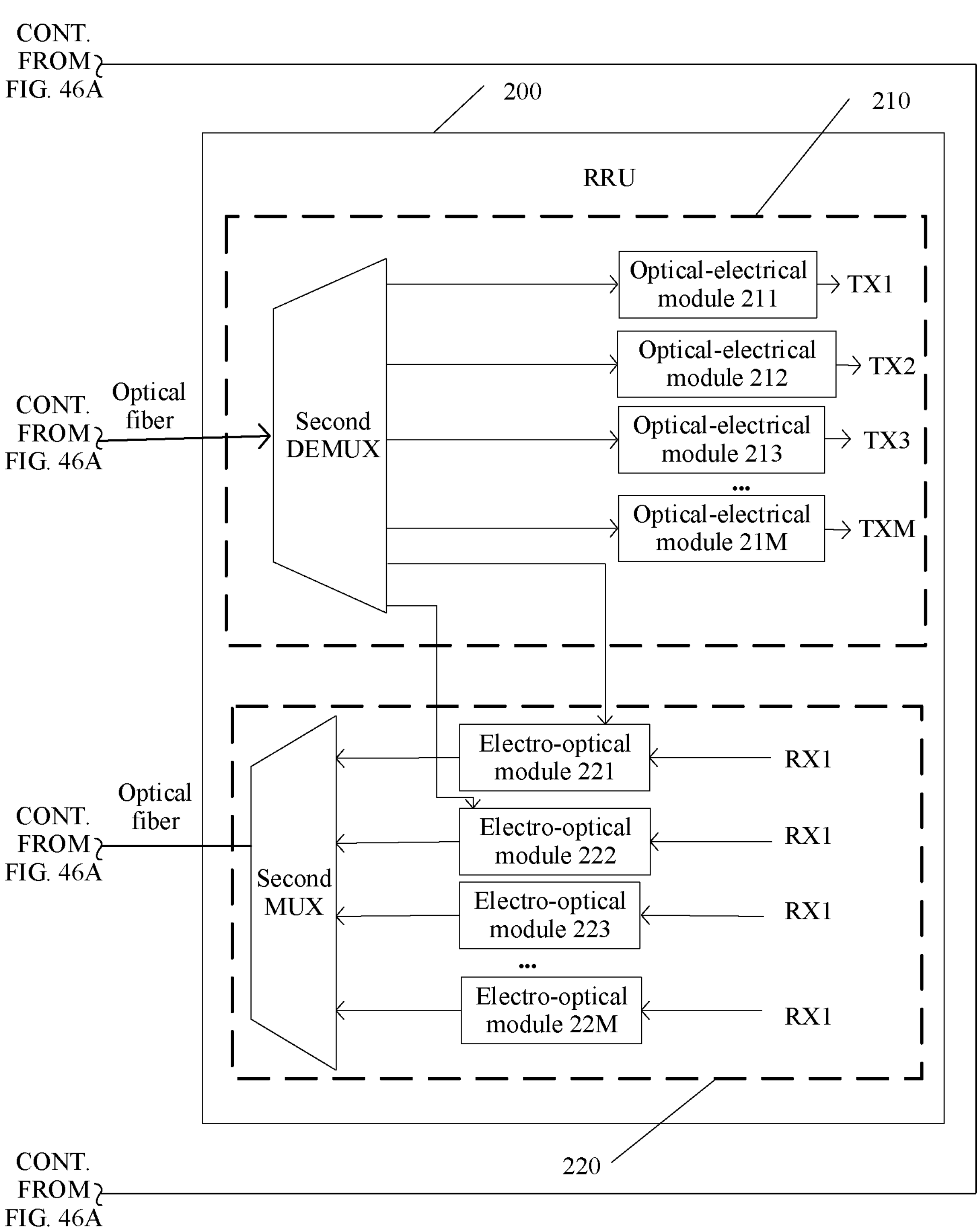

FIG. 46A and FIG. 46B are a schematic block diagram of a possible structure of the communications apparatus 300. As shown in FIG. 46A and FIG. 46B, the communications apparatus 300 includes a central unit 100 and a remote unit 200. As shown in FIG. 46A and FIG. 46B, neither a receive link 120 nor a receive link 220 includes an optical processing module. A transmit link 110 includes a first optical processing module. The first optical processing module includes an O-$PS_1$ and an O-$F_1$. An output terminal of the O-$PS_1$ is connected to an input terminal of the O-$F_1$. The central unit 100 further includes a post optical power amplifier O-$PA_{11}$. An input terminal of the O-$PA_{11}$ is connected to an output terminal of a first MUX, and an output terminal of the O-$PA_{11}$ is connected to an input terminal of an optical fiber. A transmit link 210 does not include a third optical processing module. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 46A and FIG. 46B, a part or all of second electro-optical modules (electro-optical modules 221 to 22M) each recover an optical carrier from an analog optical signal transmitted in the downlink (the transmit link) and implement electrical signal modulation.

Figure 47A:
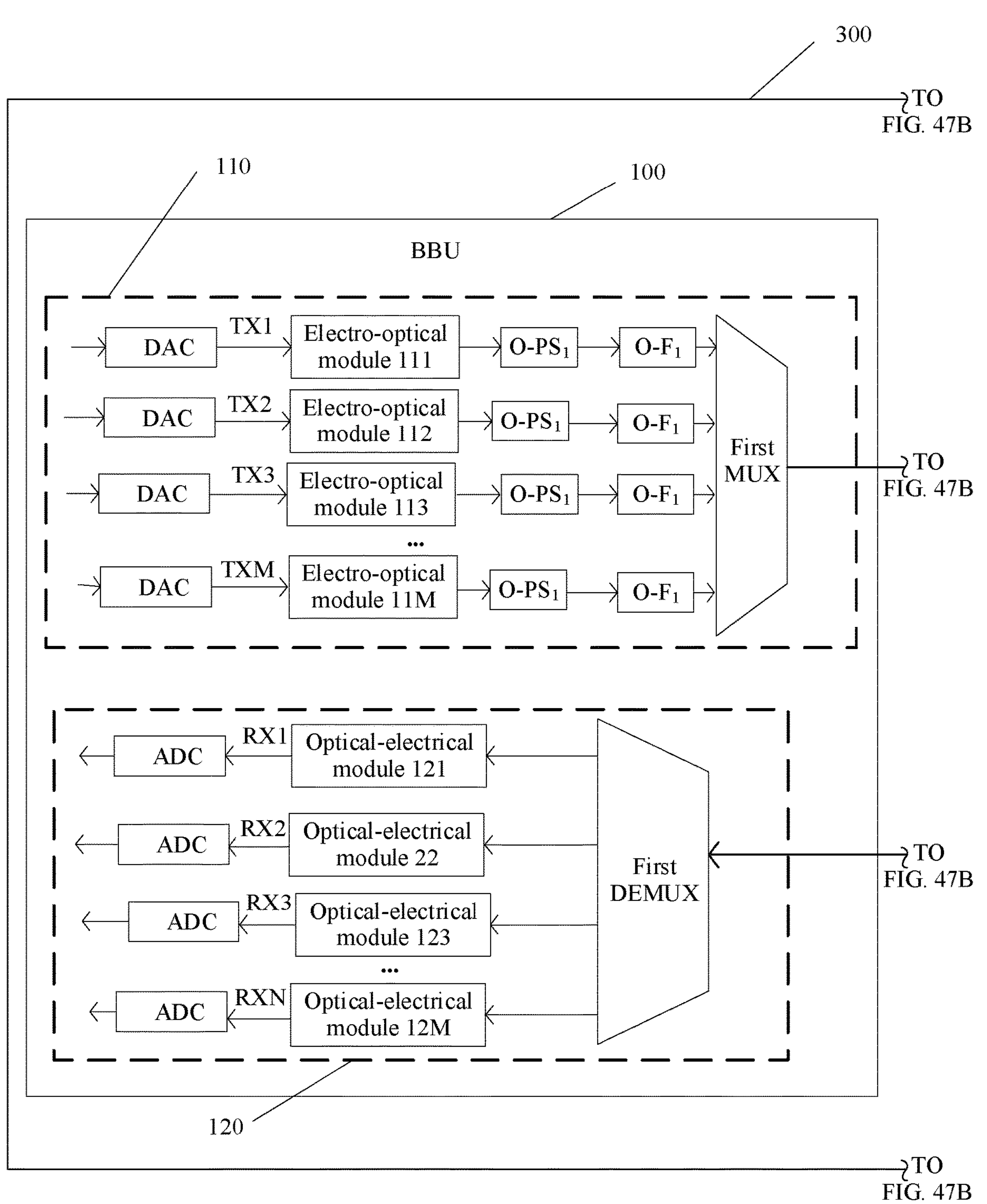
Figure 47B:
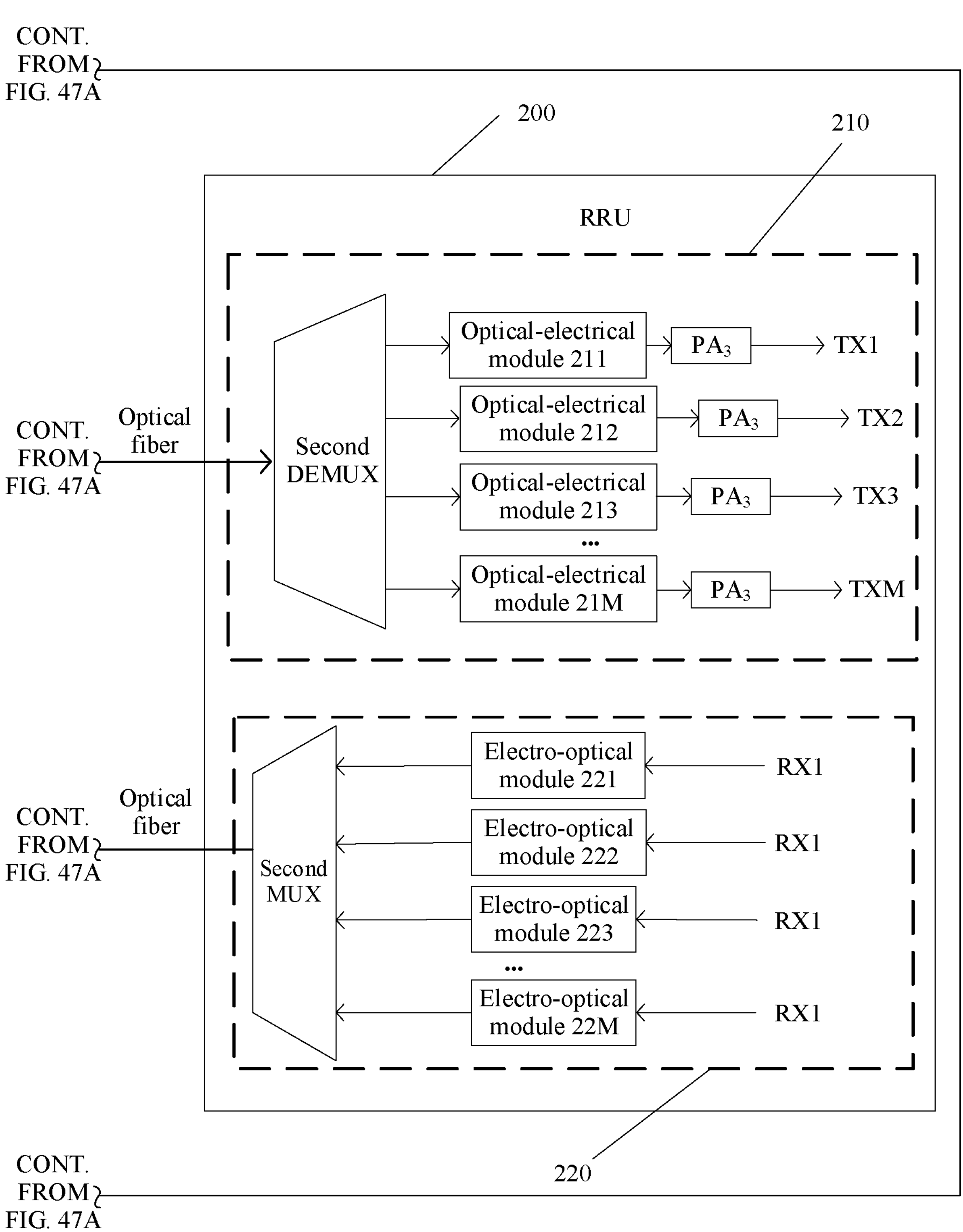

FIG. 47A and FIG. 47B are a schematic block diagram of a possible structure of the communications apparatus 300. As shown in FIG. 47A and FIG. 47B, the communications apparatus 300 includes a central unit 100 and a remote unit 200. As shown in FIG. 47A and FIG. 47B, neither a receive link 120 nor a receive link 220 includes an optical processing module. A transmit link 110 includes a first optical processing module. The first optical processing module includes an O-$PS_1$ and an O-$F_1$. An output terminal of the O-$PS_1$ is connected to an input terminal of the O-$F_1$. In a transmit link 210, a $PA_3$ exists after a second optical-electrical module (optical-electrical modules 211 to 21M). An input terminal of the $PA_3$ is connected to an output terminal of the optical-electrical modules 211 to 21M. The transmit link 210 does not include a third optical processing module. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 47A and FIG. 47B, a part or all of second electro-optical modules (electro-optical modules 221 to 22M) each generate an optical carrier and modulate a radio frequency signal.

Figure 48A:
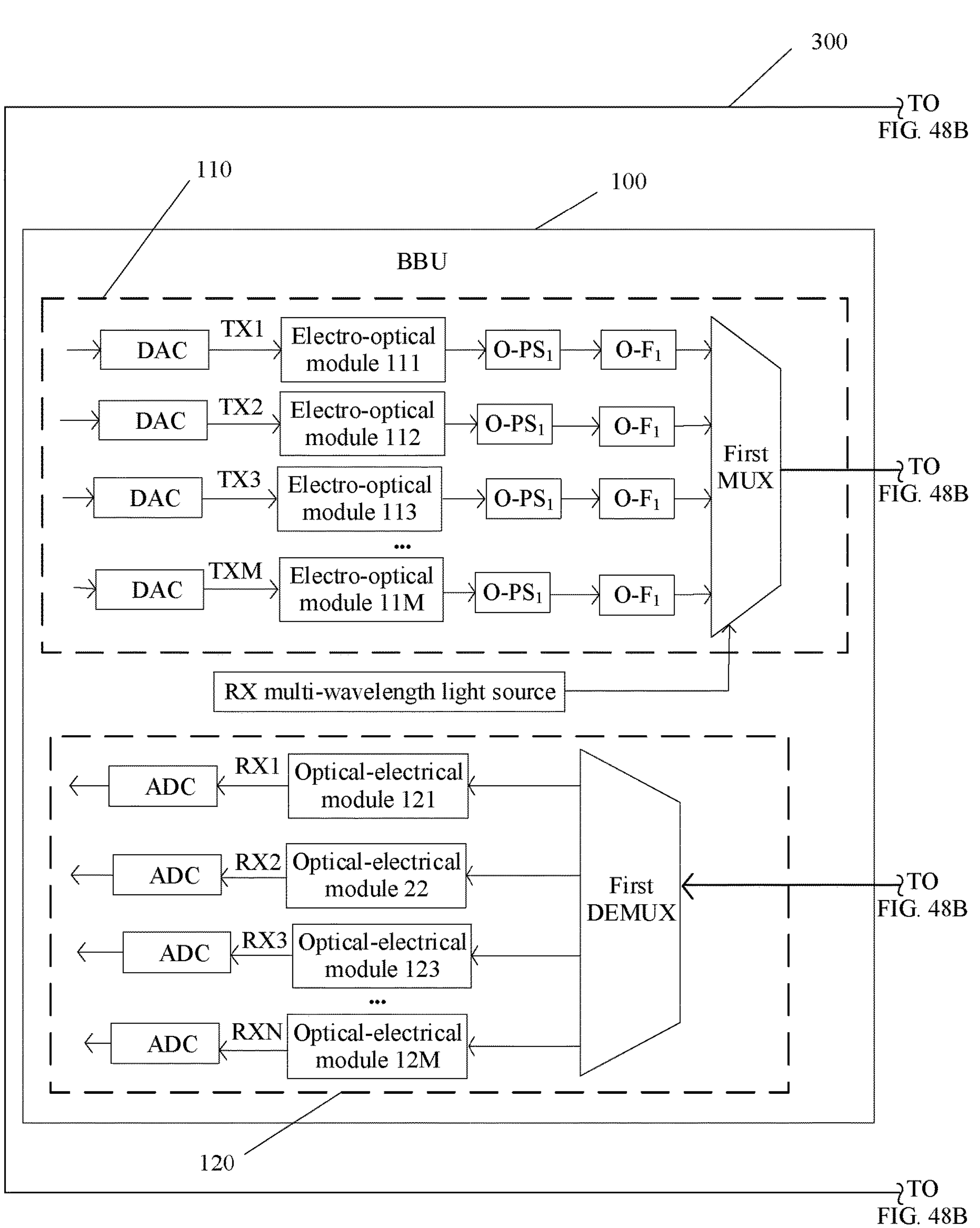
Figure 48B:
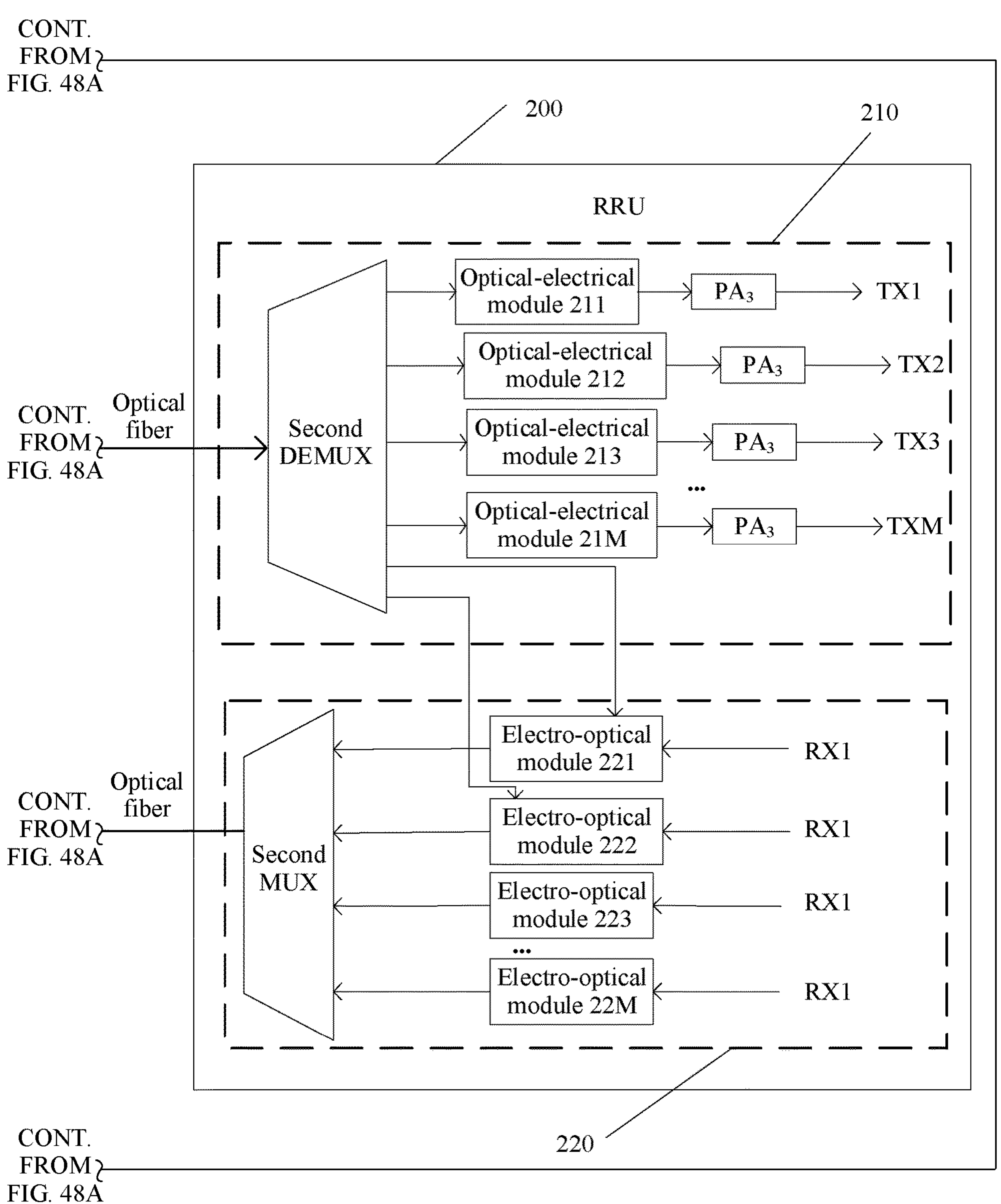

FIG. 48A and FIG. 48B are a schematic block diagram of a possible structure of the communications apparatus 300. As shown in FIG. 48A and FIG. 48B, the communications apparatus 300 includes a central unit 100 and a remote unit 200. As shown in FIG. 48A and FIG. 48B, neither a receive link 120 nor a receive link 220 includes an optical processing module. A transmit link 110 includes a first optical processing module. The first optical processing module includes an O-$PS_1$ and an O-$F_1$. An output terminal of the O-$PS_1$ is connected to an input terminal of the O-$F_1$. In a transmit link 210, a $PA_3$ exists after a second optical-electrical module (optical-electrical modules 211 to 21M). An input terminal of the $PA_3$ is connected to an output terminal of the optical-electrical modules 211 to 21M. The transmit link 210 does not include a third optical processing module. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 48A and FIG. 48B, a part or all of second electro-optical modules (electro-optical modules 221 to 22M) each receive a dedicated optical carrier from the transmit link and implement modulation. There are a plurality of RX multi-wavelength light source modules in a BBU.

Figure 49A:
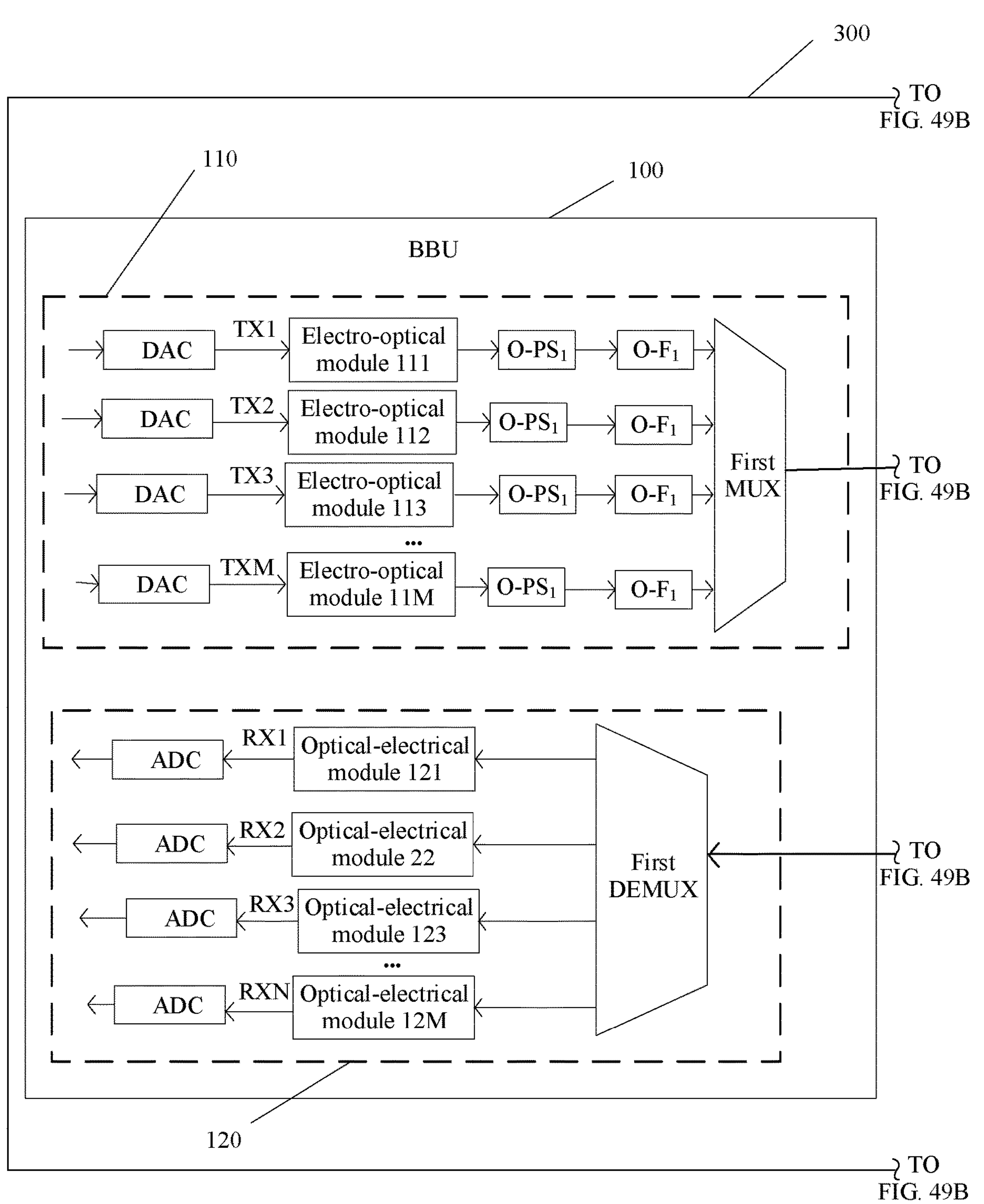
Figure 49B:
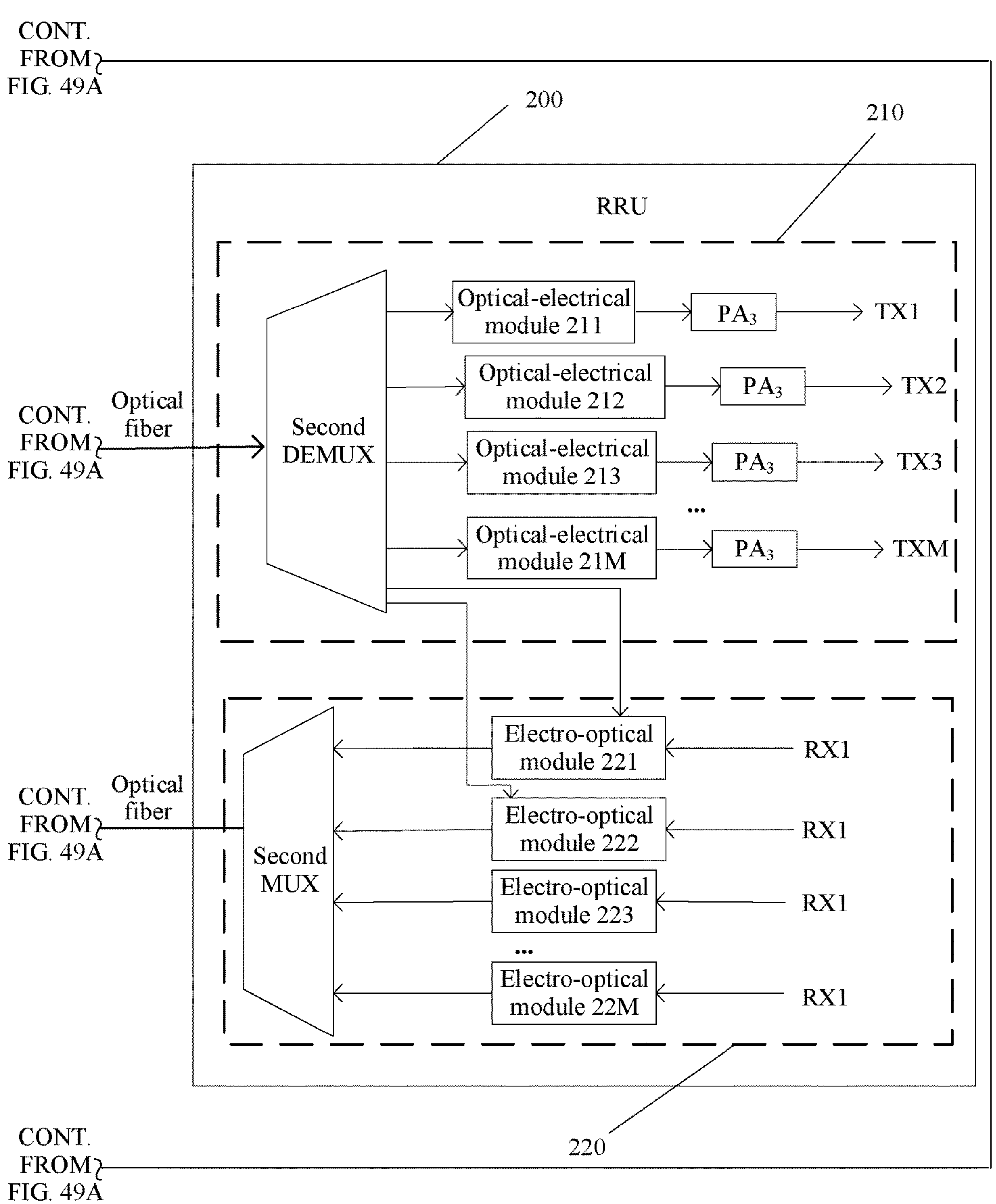

FIG. 49A and FIG. 49B are a schematic block diagram of a possible structure of the communications apparatus 300. As shown in FIG. 49A and FIG. 49B, the communications apparatus 300 includes a central unit 100 and a remote unit 200. As shown in FIG. 49A and FIG. 49B, neither a receive link 120 nor a receive link 220 includes an optical processing module. A transmit link 110 includes a first optical processing module. The first optical processing module includes an O-$PS_1$ and an O-$F_1$. An output terminal of the O-$PS_1$ is connected to an input terminal of the O-$F_1$. In a transmit link 210, a $PA_3$ exists after a second optical-electrical module (optical-electrical modules 211 to 21M). An input terminal of the $PA_3$ is connected to an output terminal of the optical-electrical modules 211 to 21M. The transmit link 210 does not include a third optical processing module. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 49A and FIG. 49B, a part or all of second electro-optical modules (electro-optical modules 221 to 22M) each recover an optical carrier from an analog optical signal transmitted in the downlink (the transmit link) and implement electrical signal modulation.

Figure 50A:
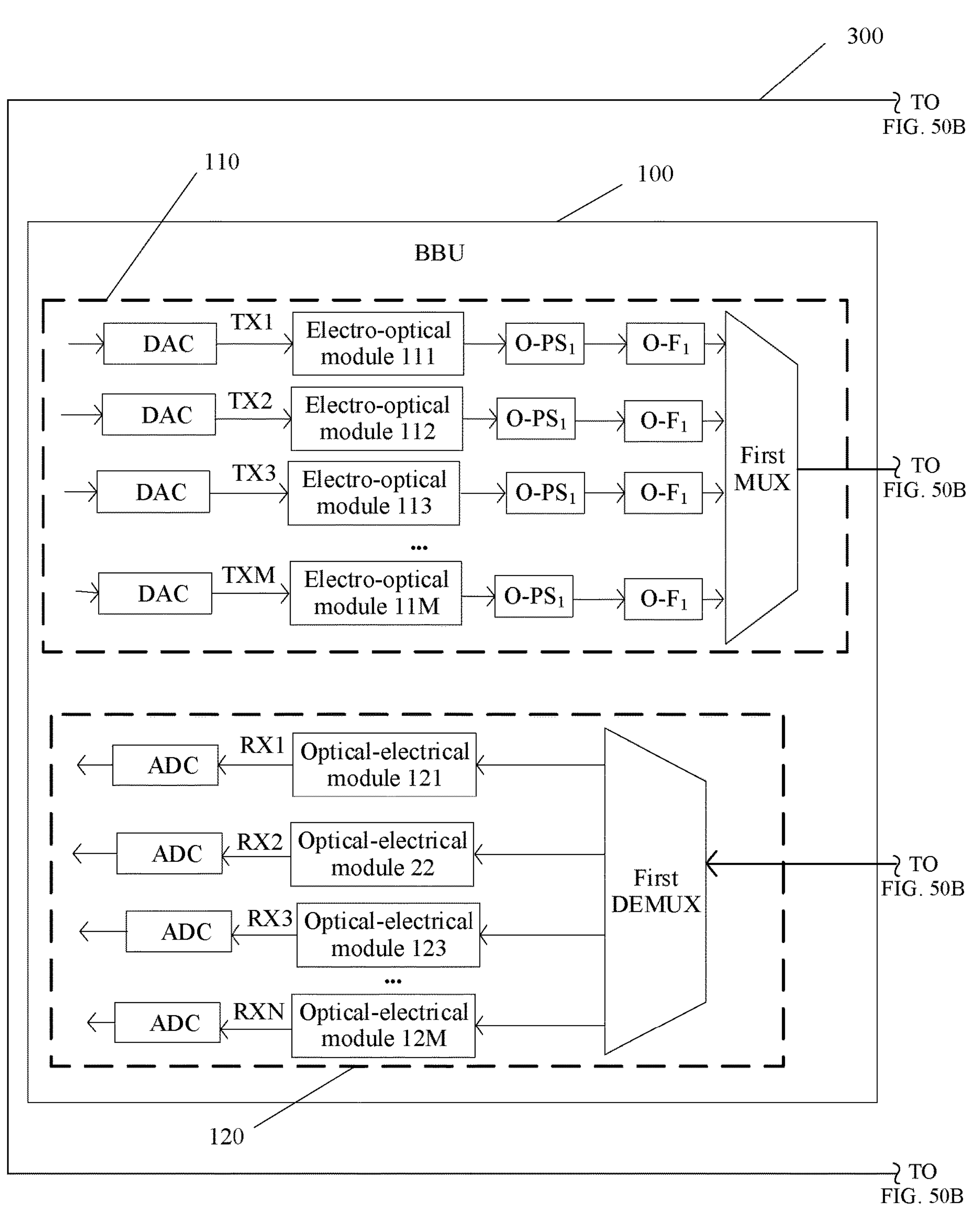
Figure 50B:
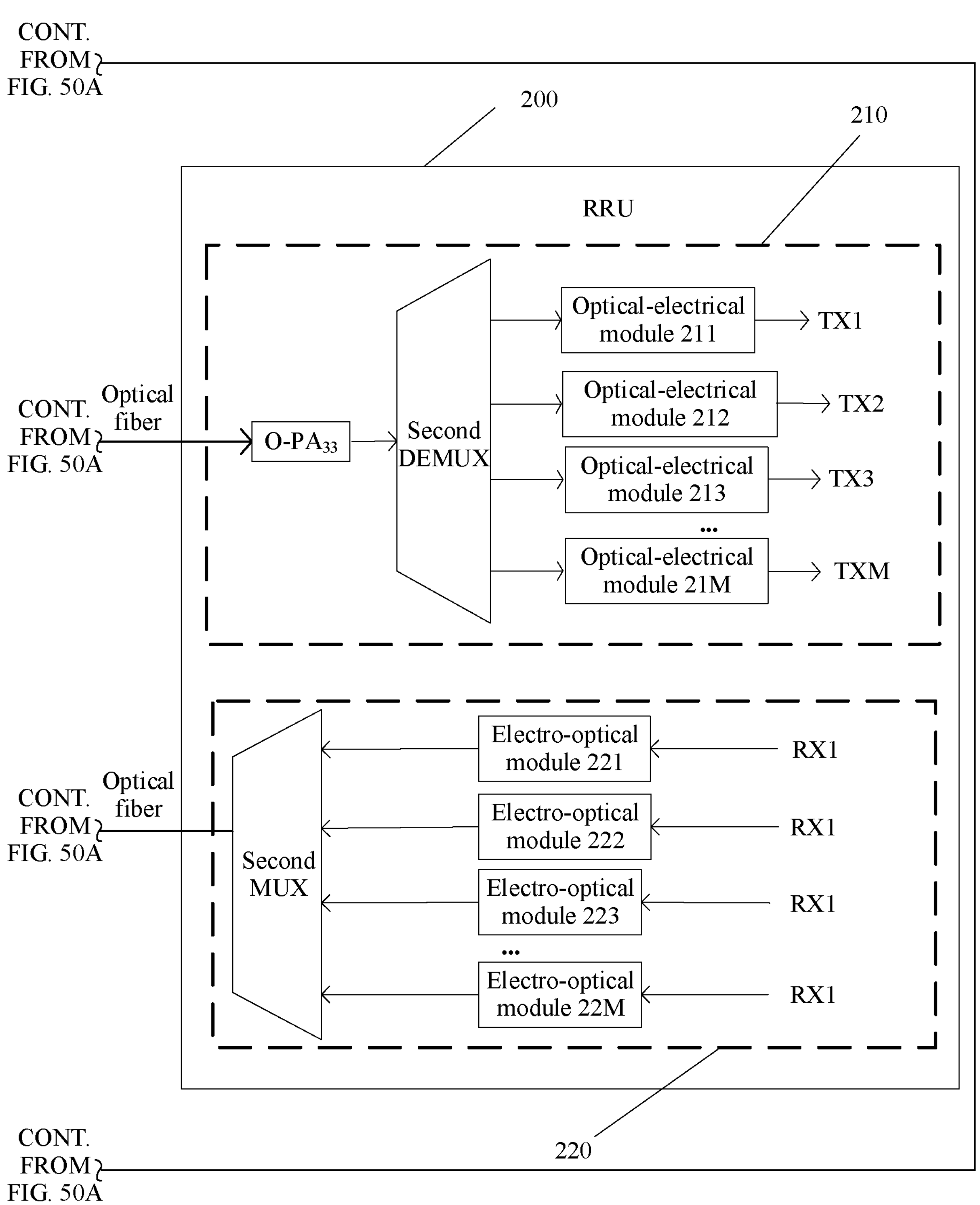

FIG. 50A and FIG. 50B are a schematic block diagram of a possible structure of the communications apparatus 300. As shown in FIG. 50A and FIG. 50B, the communications apparatus 300 includes a central unit 100 and a remote unit 200. As shown in FIG. 50A and FIG. 50B, neither a receive link 120 nor a receive link 220 includes an optical processing module. A transmit link 110 includes a first optical processing module. The first optical processing module includes an O-$PS_1$ and an O-$F_1$. An output terminal of the O-$PS_1$ is connected to an input terminal of the O-$F_1$. In a transmit link 210, an optical processing component includes only a pre-optical power amplifier O-$PA_{33}$. An input terminal of the O-$PA_{33}$ is connected to an optical fiber, and an output terminal of the O-$PA_{33}$ is connected to a second DEMUX. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 50A and FIG. 50B, a part or all of second electro-optical modules (electro-optical modules 221 to 22M) each generate an optical carrier and modulate a radio frequency signal.

Figure 51A:
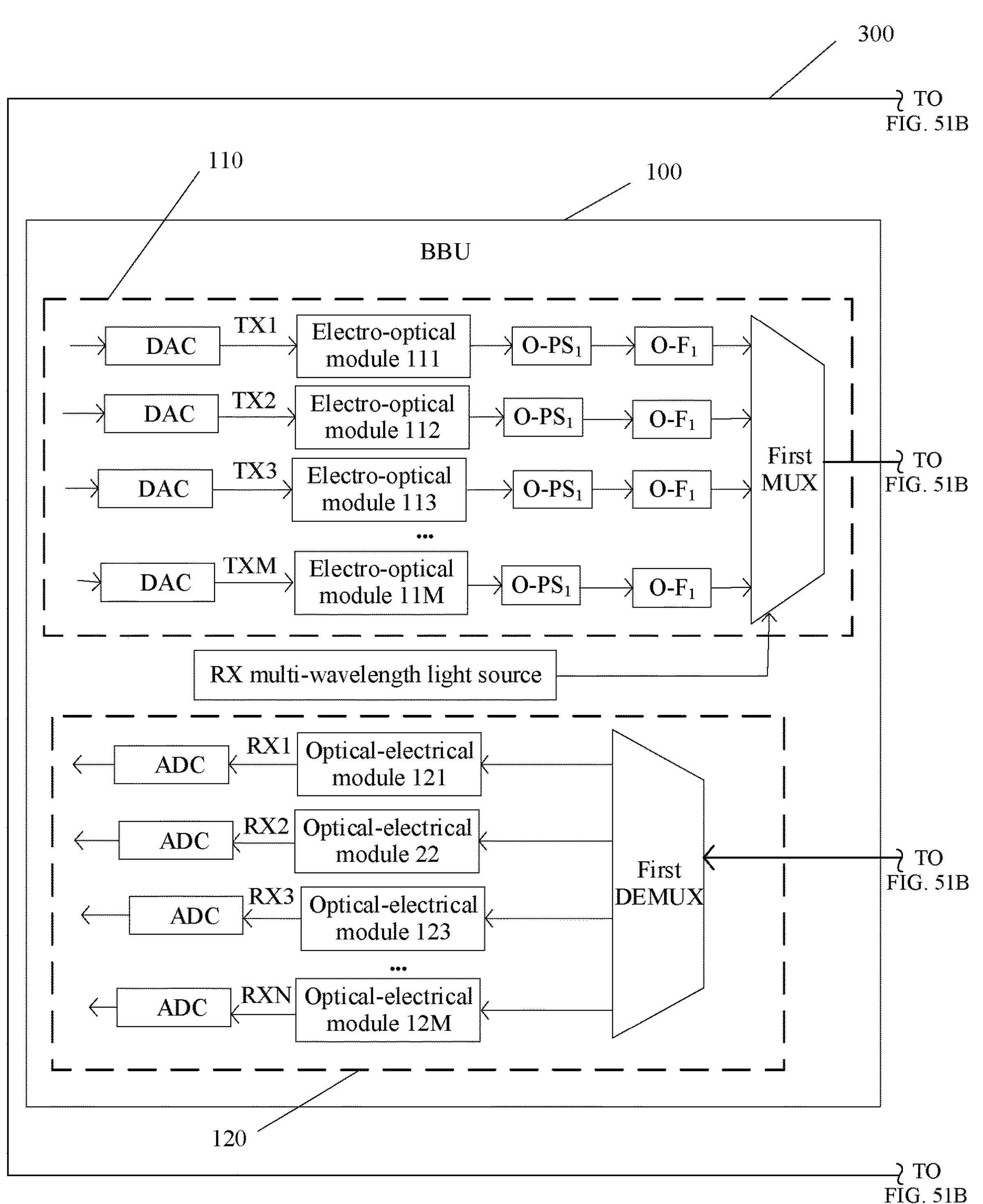
Figure 51B:
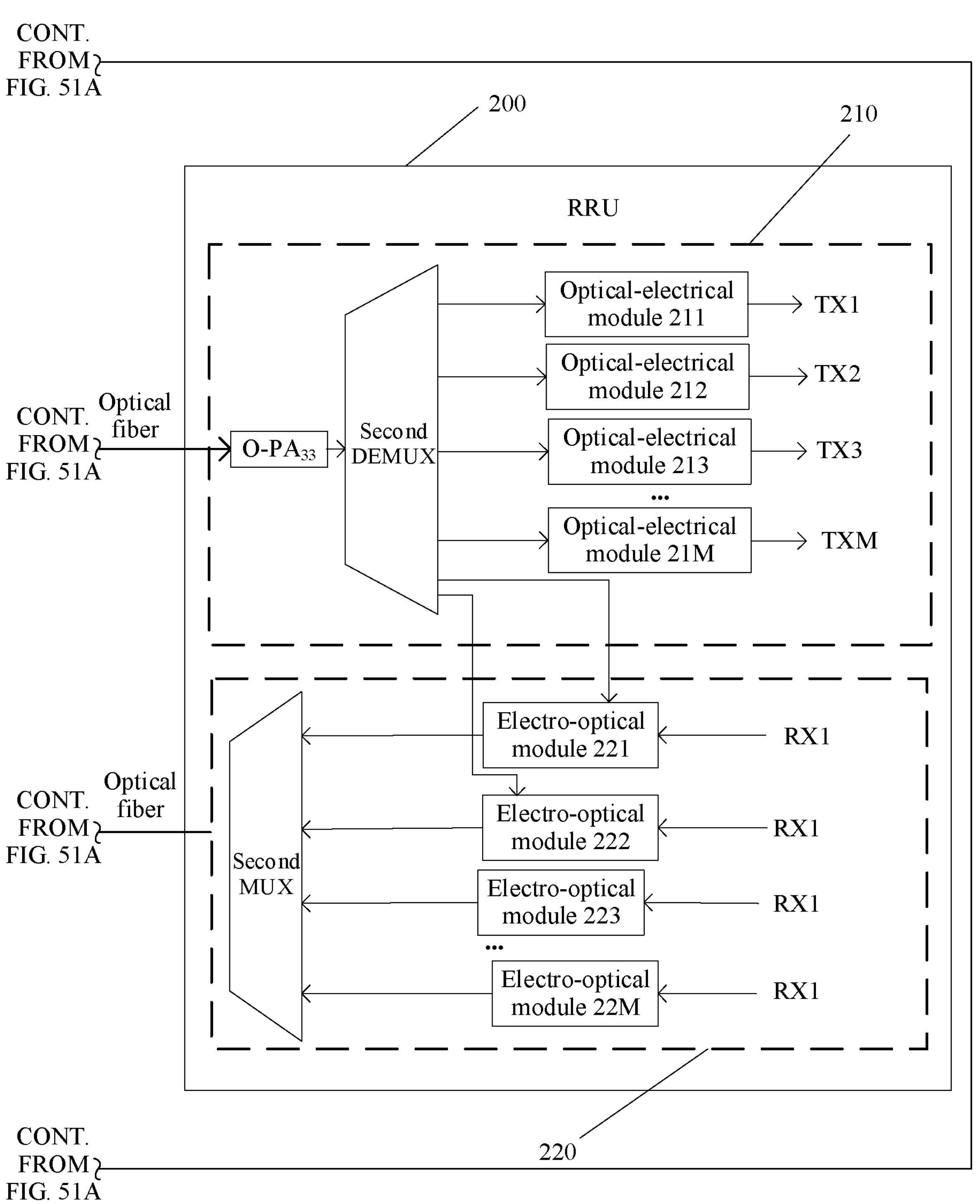

FIG. 51A and FIG. 51B are a schematic block diagram of a possible structure of the communications apparatus 300. As shown in FIG. 51A and FIG. 51B, the communications apparatus 300 includes a central unit 100 and a remote unit 200. As shown in FIG. 51A and FIG. 51B, neither a receive link 120 nor a receive link 220 includes an optical processing module. A transmit link 110 includes a first optical processing module. The first optical processing module includes an O-$PS_1$ and an O-$F_1$. An output terminal of the O-$PS_1$ is connected to an input terminal of the O-$F_1$. In a transmit link 210, an optical processing component includes only a pre-optical power amplifier O-$PA_{33}$. An input terminal of the O-$PA_{33}$ is connected to an optical fiber, and an output terminal of the O-$PA_3$ is connected to a second DEMUX. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 51A and FIG. 51B, a part or all of second electro-optical modules (electro-optical modules 221 to 22M) each receive a dedicated optical carrier from the transmit link and implement modulation. There are a plurality of RX multi-wavelength light source modules in a BBU.

Figure 52A:
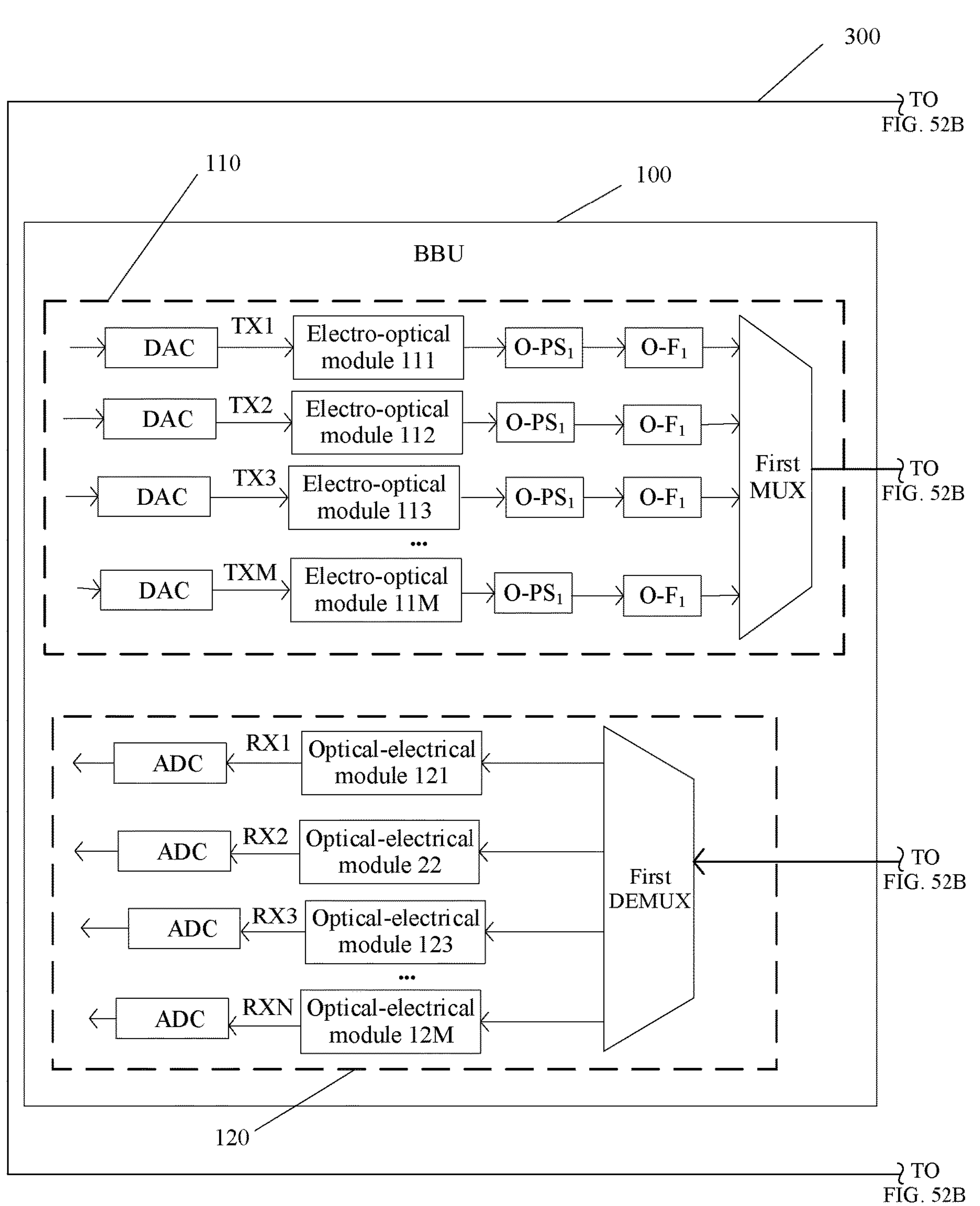
Figure 52B:
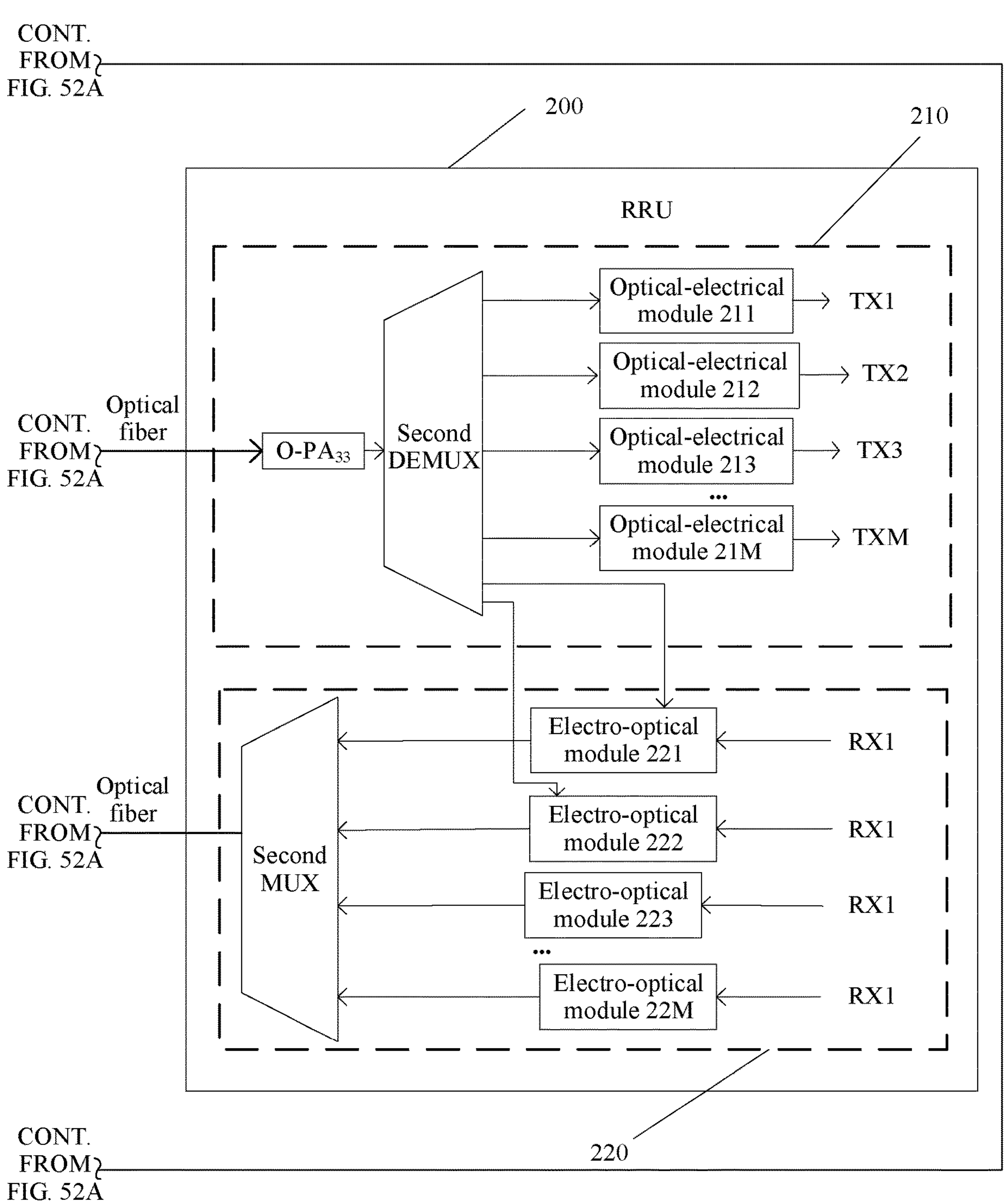

FIG. 52A and FIG. 52B are a schematic block diagram of a possible structure of the communications apparatus 300. As shown in FIG. 52A and FIG. 52B, the communications apparatus 300 includes a central unit 100 and a remote unit 200. As shown in FIG. 52A and FIG. 52B, neither a receive link 120 nor a receive link 220 includes an optical processing module. A transmit link 110 includes a first optical processing module. The first optical processing module includes an O-$PS_1$ and an O-$F_1$. An output terminal of the O-$PS_1$ is connected to an input terminal of the O-$F_1$. In a transmit link 210, an optical processing component includes only a pre-optical power amplifier O-$PA_{33}$. An input terminal of the O-$PA_{33}$ is connected to an optical fiber, and an output terminal of the O-$PA_3$ is connected to a second DEMUX. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 52A and FIG. 52B, a part or all of second electro-optical modules (electro-optical modules 221 to 22M) each recover an optical carrier from an analog optical signal transmitted in the downlink (the transmit link) and implement electrical signal modulation.

Figure 53A:
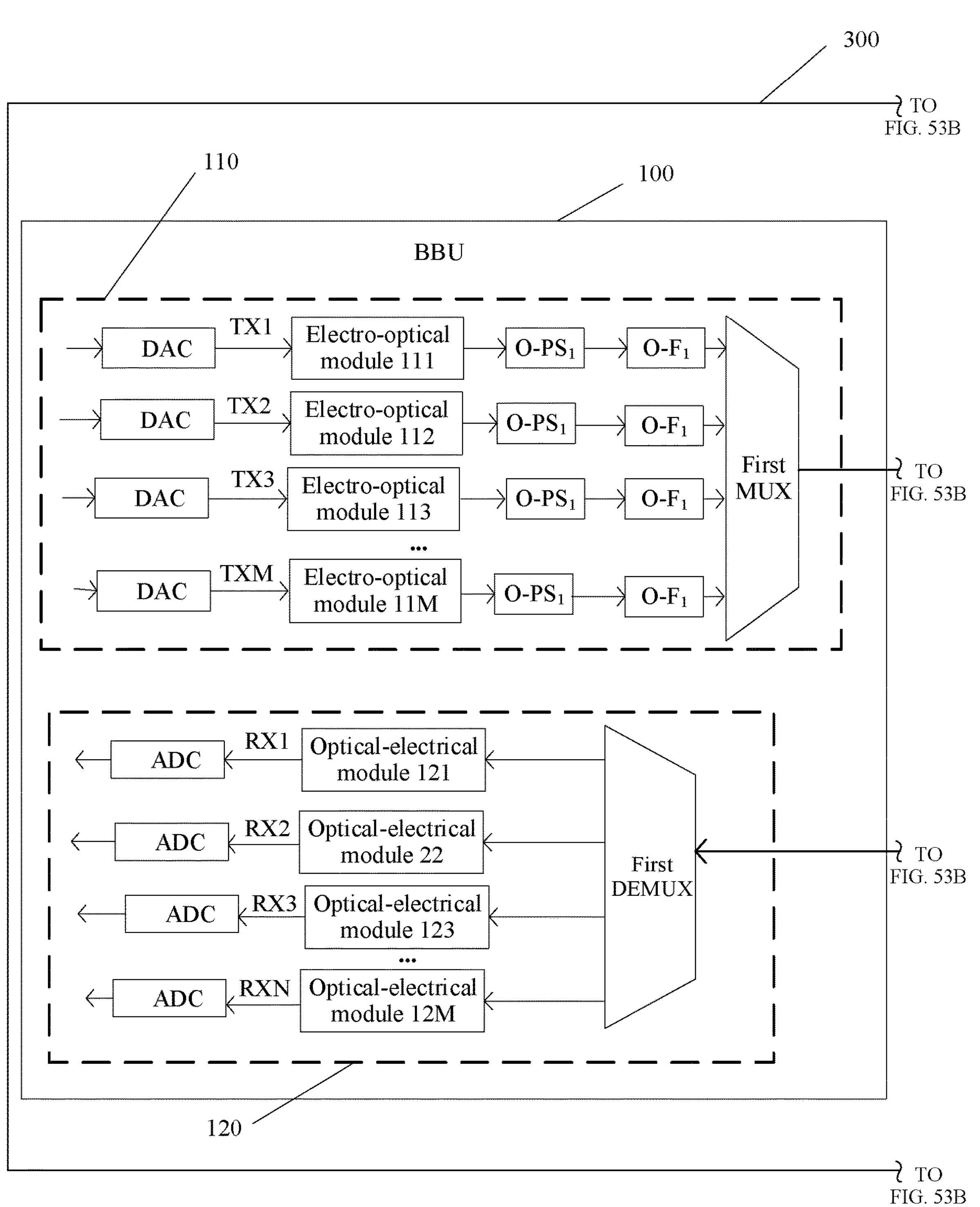
Figure 53B:
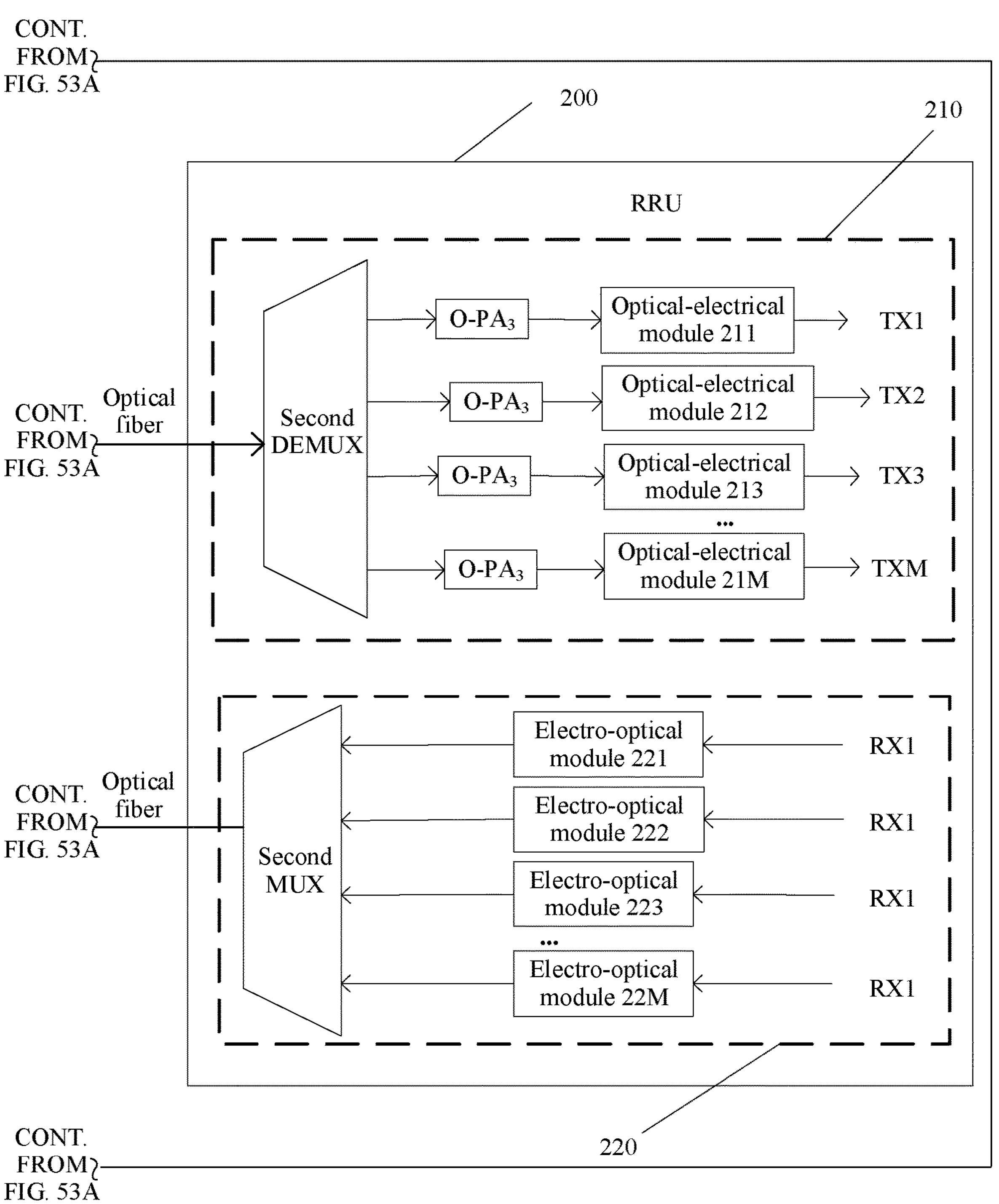

FIG. 53A and FIG. 53B are a schematic block diagram of a possible structure of the communications apparatus 300. As shown in FIG. 53A and FIG. 53B, the communications apparatus 300 includes a central unit 100 and a remote unit 200. As shown in FIG. 53A and FIG. 53B, neither a receive link 120 nor a receive link 220 includes an optical processing module. A transmit link 110 includes a first optical processing module. The first optical processing module includes an O-$PS_1$ and an O-$F_1$. An output terminal of the O-$PS_1$ is connected to an input terminal of the O-$F_1$. A transmit link 210 includes a third optical processing module. The third optical processing module includes only an O-$PA_3$. An output terminal of the O-$PA_3$ is connected to an optical-electrical module, and an input terminal of the O-$PA_3$ is connected to a second DEMUX. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 53A and FIG. 53B, a part or all of second electro-optical modules (electro-optical modules 221 to 22M) each generate an optical carrier and modulate a radio frequency signal.

Figure 54A:
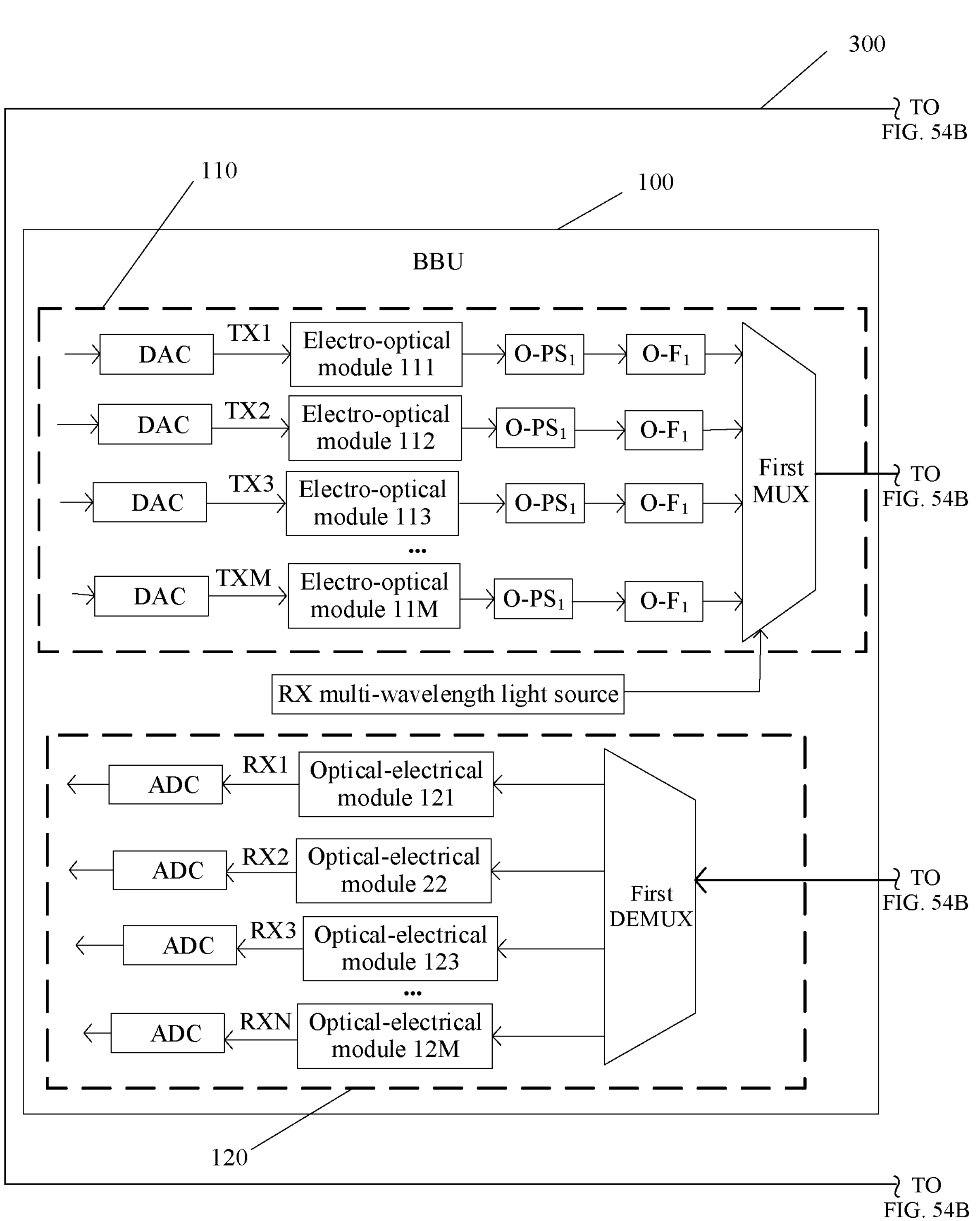
Figure 54B:
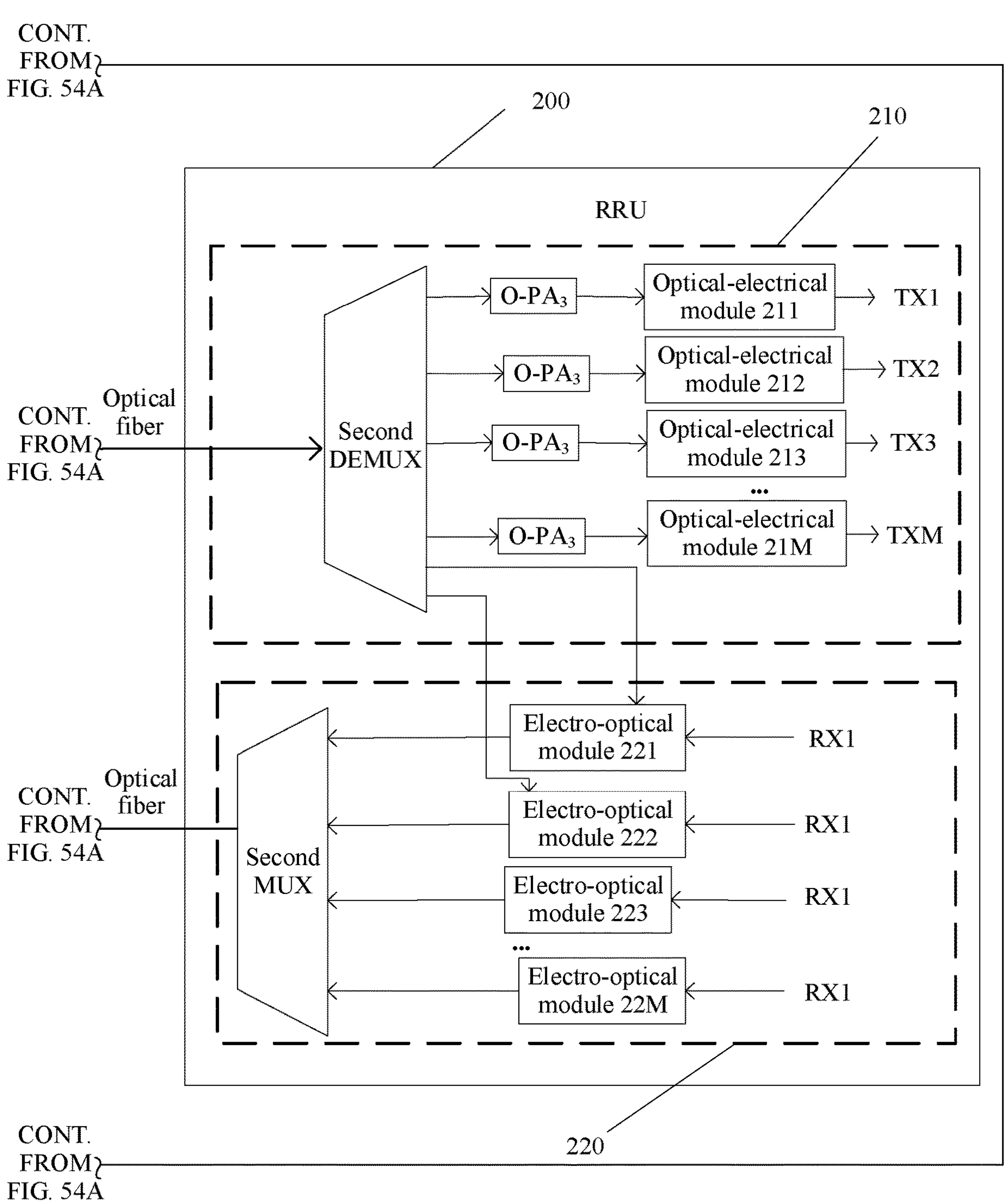

FIG. 54A and FIG. 54B are a schematic block diagram of a possible structure of the communications apparatus 300. As shown in FIG. 54A and FIG. 54B, the communications apparatus 300 includes a central unit 100 and a remote unit 200. As shown in FIG. 54A and FIG. 54B, neither a receive link 120 nor a receive link 220 includes an optical processing module. A transmit link 110 includes a first optical processing module. The first optical processing module includes an O-$PS_1$ and an O-$F_1$. An output terminal of the O-$PS_1$ is connected to an input terminal of the O-$F_1$. A transmit link 210 includes a third optical processing module. The third optical processing module includes only an O-$PA_3$. An output terminal of the O-$PA_3$ is connected to an optical-electrical module, and an input terminal of the O-$PA_3$ is connected to a second DEMUX. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 54A and FIG. 54B, a part or all of second optical-electrical modules (221 to 22M) each receive a dedicated optical carrier from the transmit link and implement modulation. There are a plurality of RX multi-wavelength light source modules in a BBU.

Figure 55A:
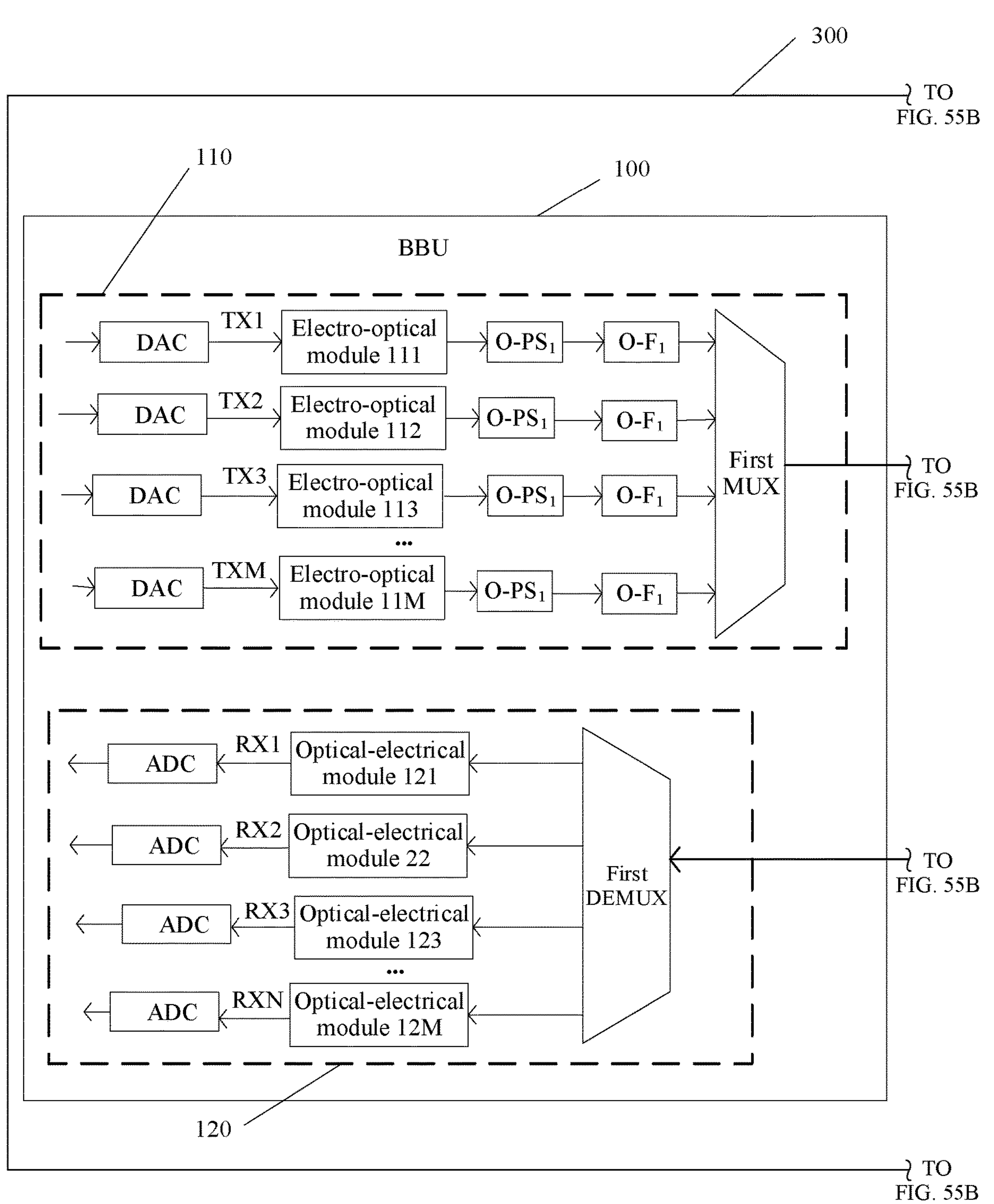
Figure 55B:
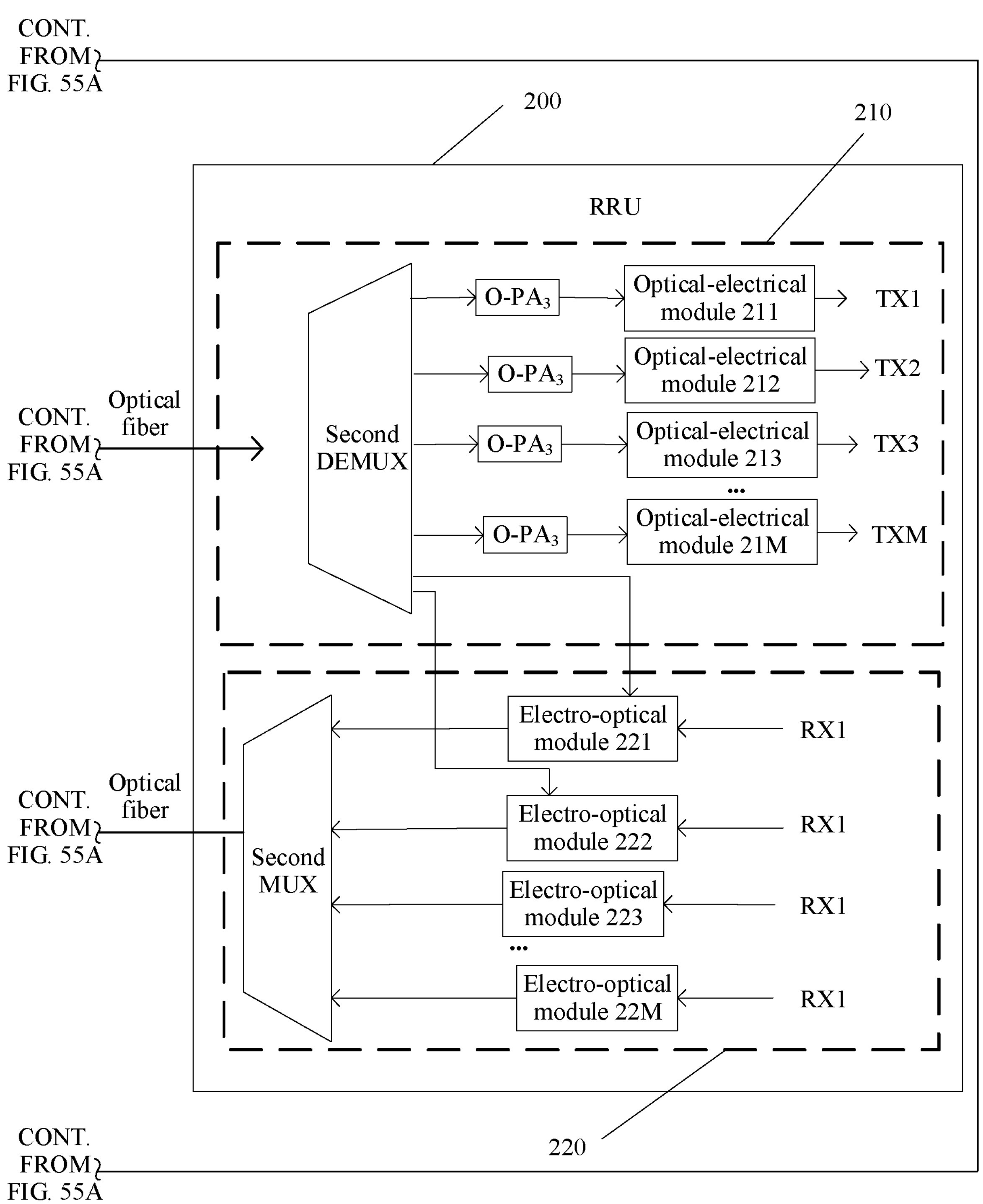

FIG. 55A and FIG. 55B are a schematic block diagram of a possible structure of the communications apparatus 300. As shown in FIG. 55A and FIG. 55B, the communications apparatus 300 includes a central unit 100 and a remote unit 200. As shown in FIG. 55A and FIG. 55B, neither a receive link 120 nor a receive link 220 includes an optical processing module. A transmit link 110 includes a first optical processing module. The first optical processing module includes an O-$PS_1$ and an O-$F_1$. An output terminal of the O-$PS_1$ is connected to an input terminal of the O-$F_1$. A transmit link 210 includes a third optical processing module. The third optical processing module includes only an O-$PA_3$. An output terminal of the O-$PA_3$ is connected to an optical-electrical module, and an input terminal of the O-$PA_3$ is connected to a second DEMUX. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 55A and FIG. 55B, a part or all of second electro-optical modules (electro-optical modules 221 to 22M) each recover an optical carrier from an analog optical signal transmitted in the downlink (the transmit link) and implement electrical signal modulation.

Figure 56A:
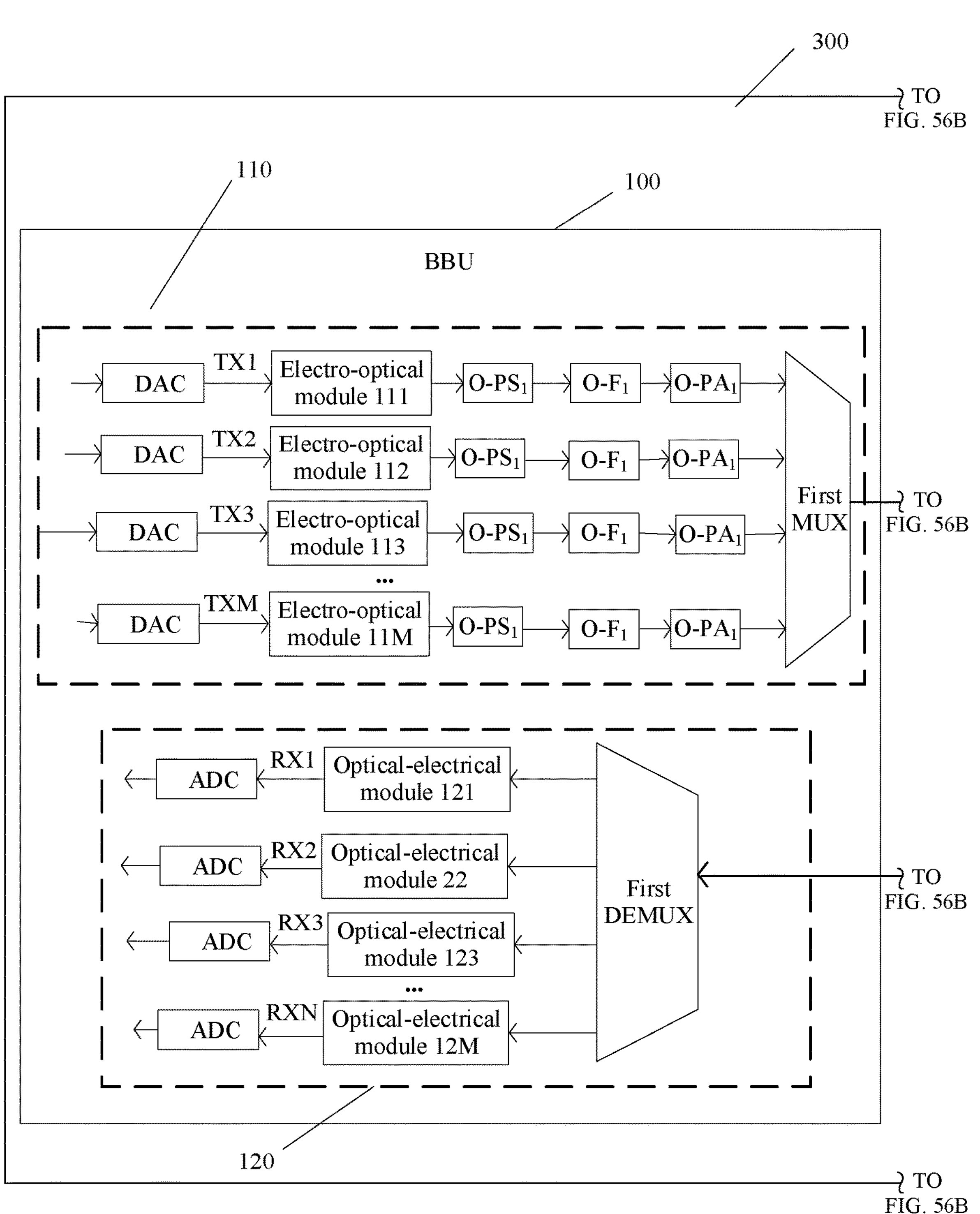
Figure 56B:
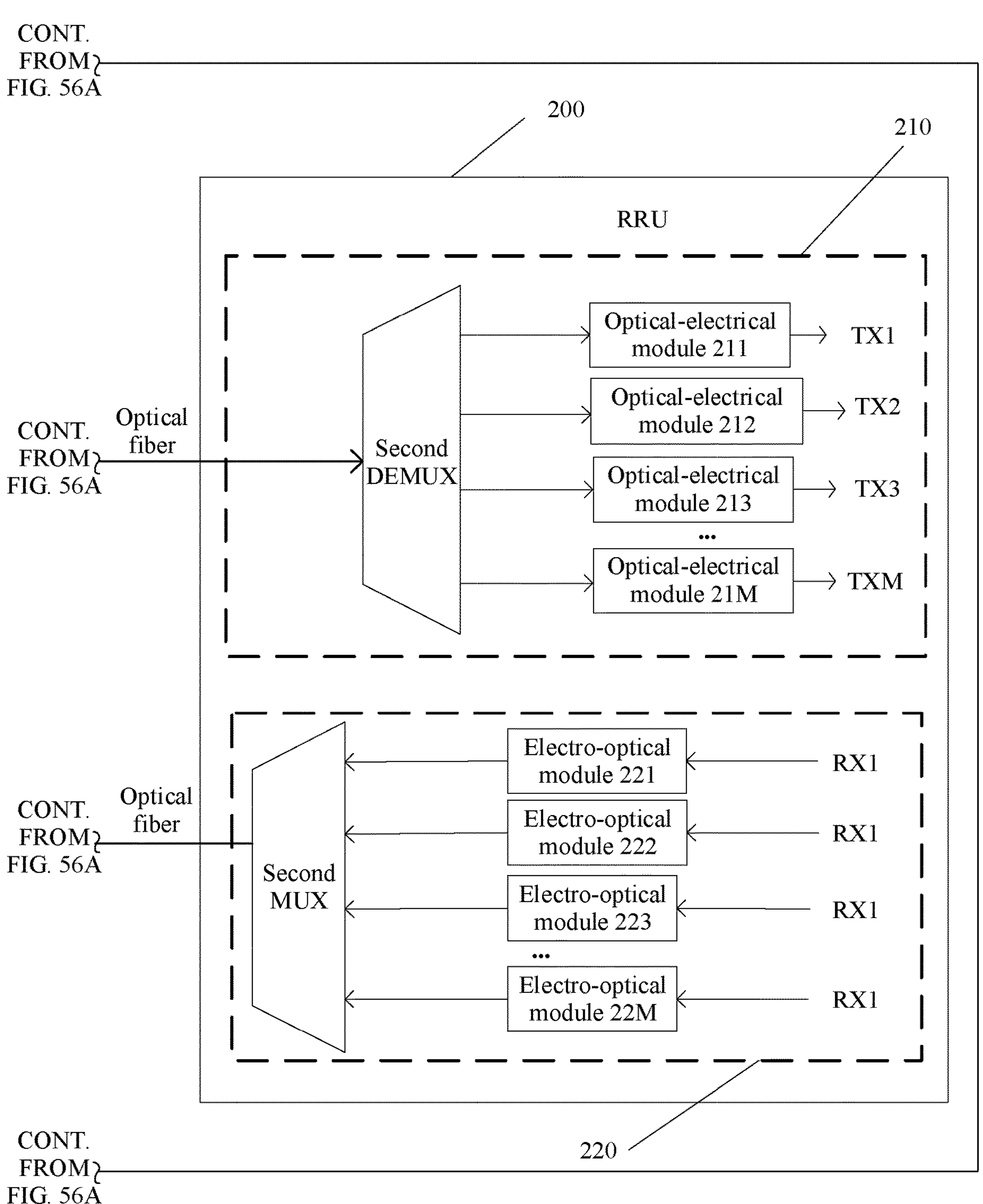

FIG. 56A and FIG. 56B are a schematic block diagram of a possible structure of the communications apparatus 300. As shown in FIG. 53A and FIG. 53B, the communications apparatus 300 includes a central unit 100 and a remote unit 200. As shown in FIG. 56A and FIG. 56B, neither a receive link 120 nor a receive link 220 includes an optical processing module. A transmit link 110 includes a first optical processing module. The first optical processing module includes an O-$PS_1$, an O-$F_1$, and an O-$PA_1$. A transmit link 210 does not include a third optical processing module. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 56A and FIG. 56B, a part or all of second electro-optical modules (electro-optical modules 221 to 22M) each generate an optical carrier and modulate a radio frequency signal.

Figure 57A:
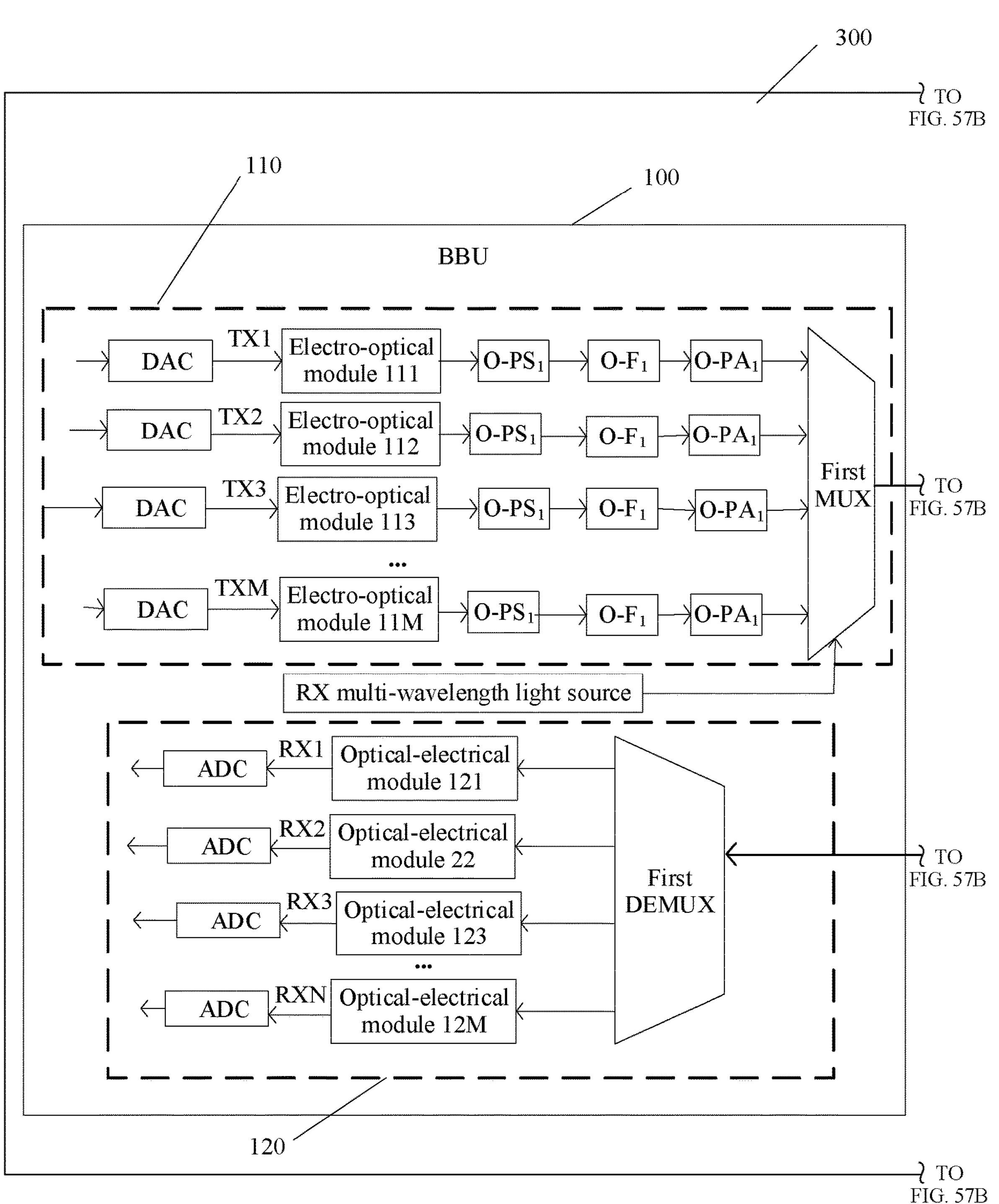
Figure 57B:
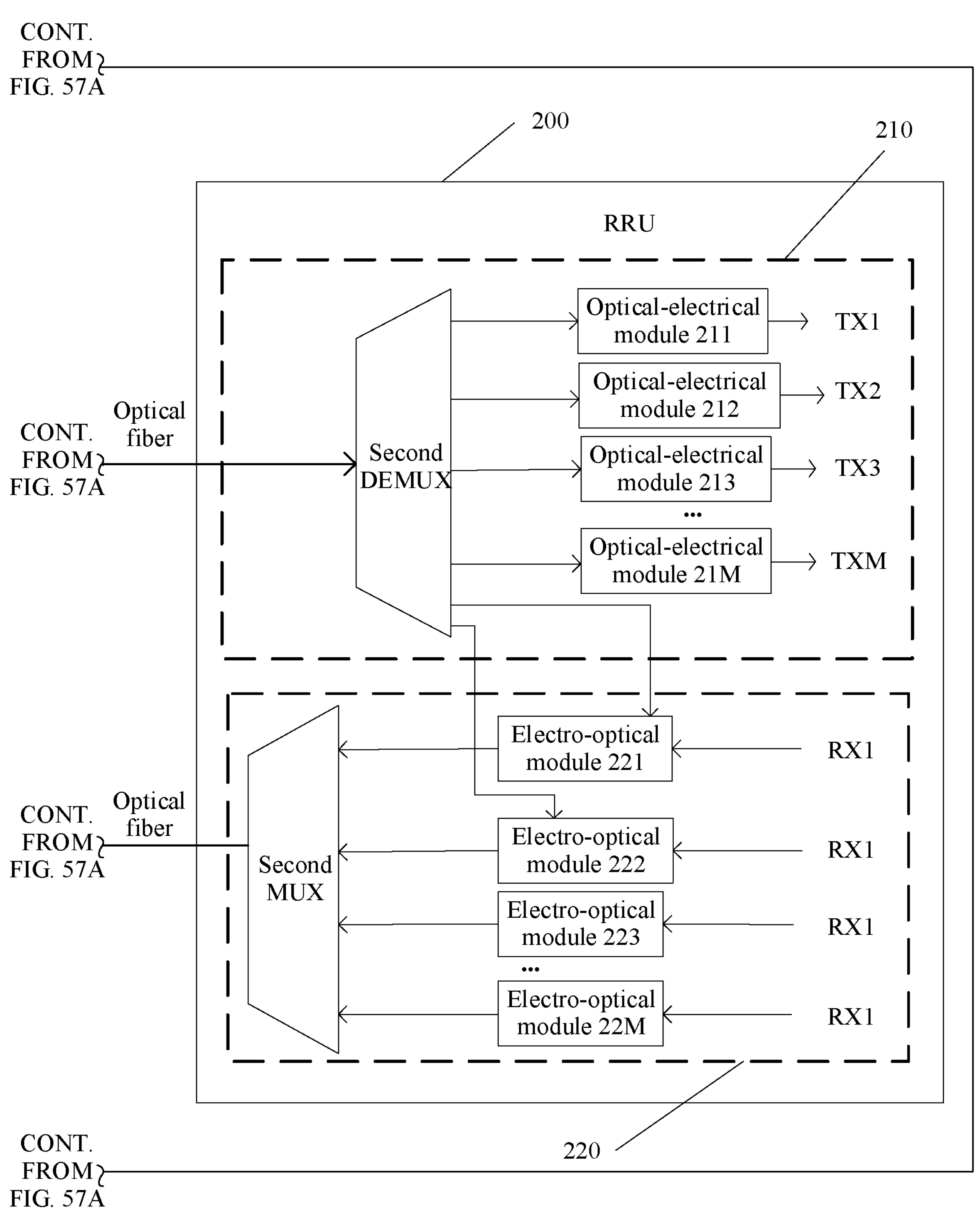

FIG. 57A and FIG. 57B are a schematic block diagram of a possible structure of the communications apparatus 300. As shown in FIG. 57A and FIG. 57B, the communications apparatus 300 includes a central unit 100 and a remote unit 200. As shown in FIG. 57A and FIG. 57B, neither a receive link 120 nor a receive link 220 includes an optical processing module. A transmit link 110 includes a first optical processing module. The first optical processing module includes an O-$PS_1$, an O-$F_1$, and an O-$PA_1$. A transmit link 210 does not include a third optical processing module. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 57A and FIG. 57B, a part or all of second electro-optical modules (electro-optical modules 221 to 22M) each receive a dedicated optical carrier from the transmit link and implement modulation. There are a plurality of RX multi-wavelength light source modules in a BBU.

Figure 58A:
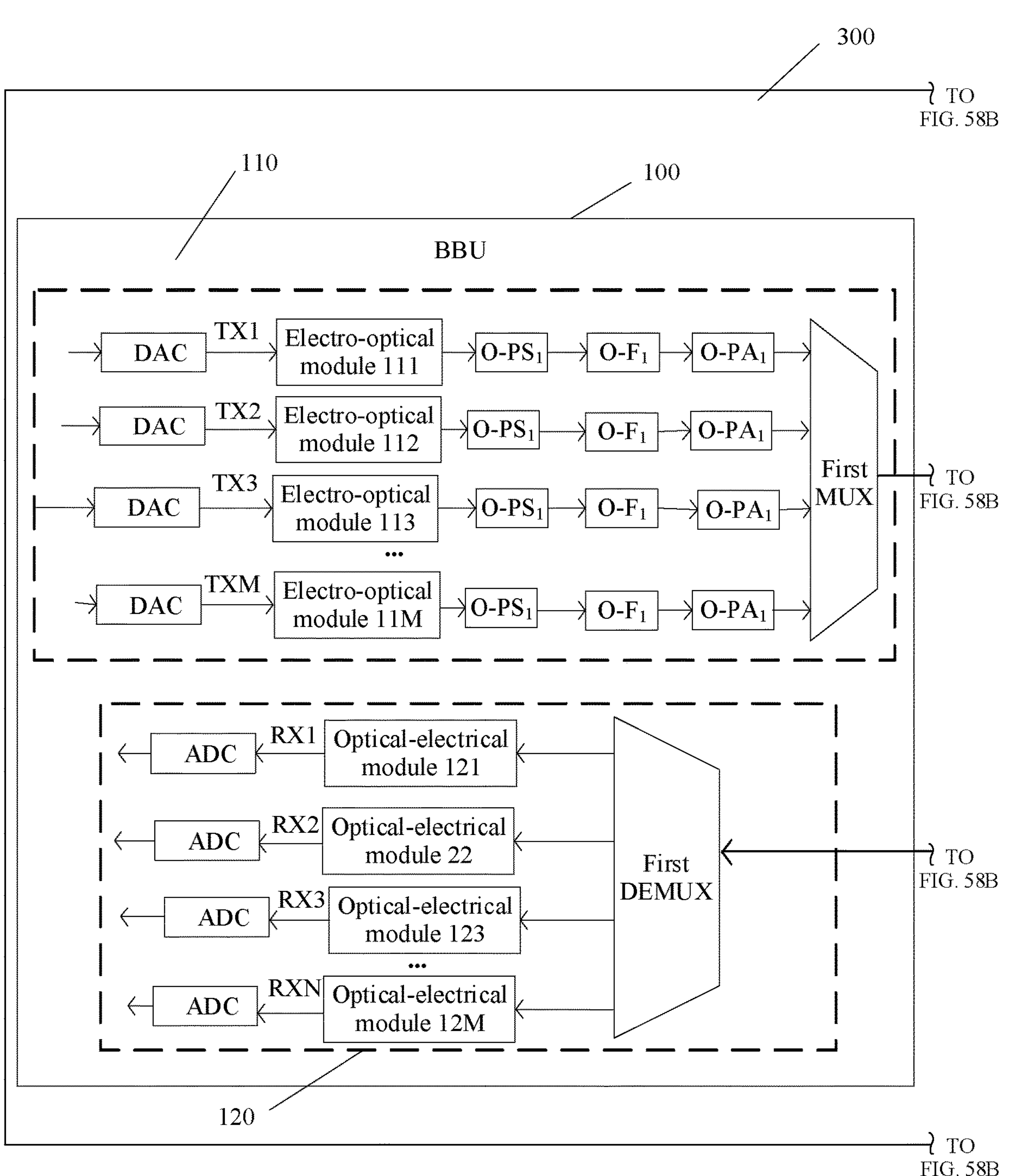
Figure 58B:
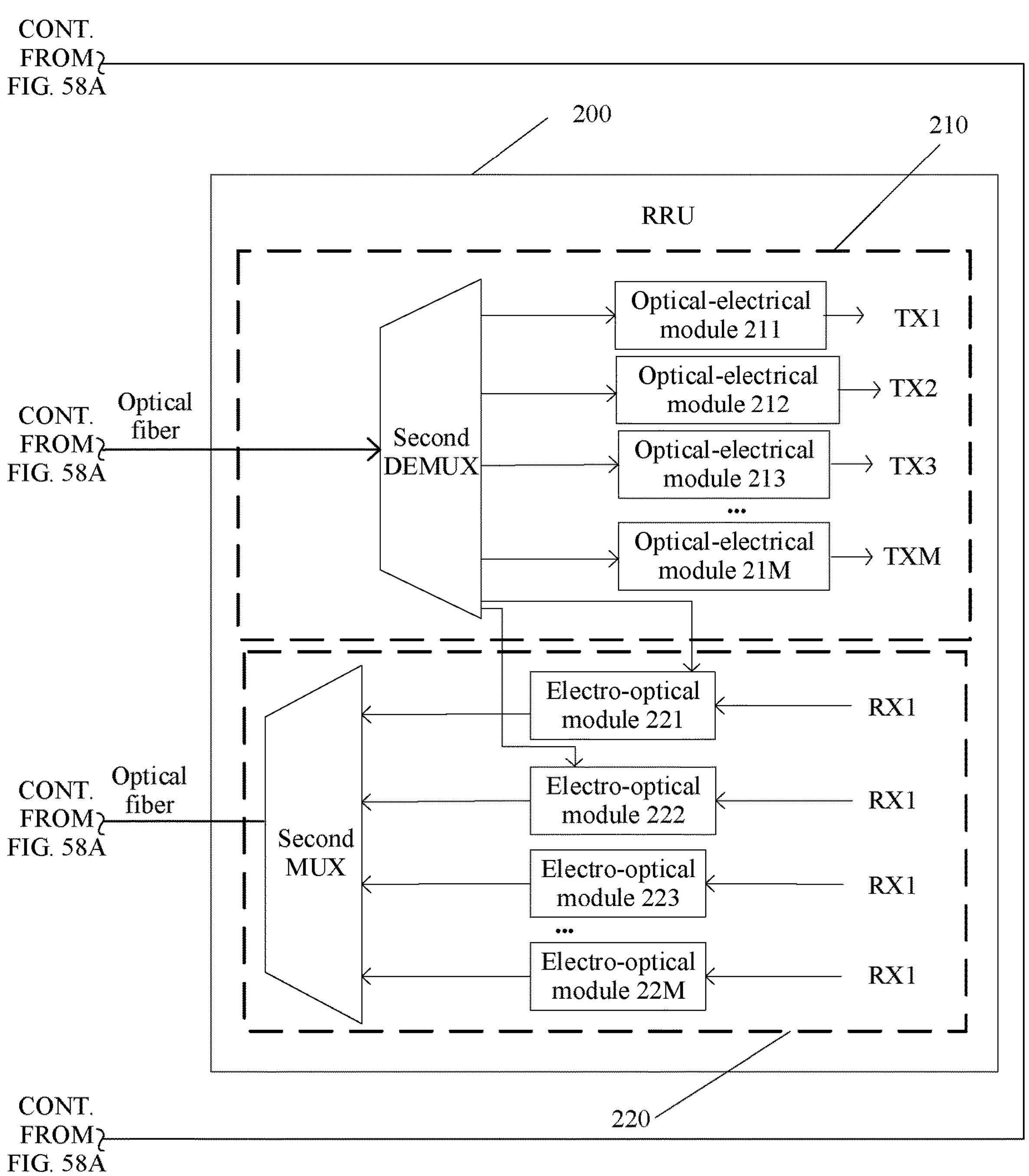

FIG. 58A and FIG. 58B are a schematic block diagram of a possible structure of the communications apparatus 300. As shown in FIG. 58A and FIG. 58B, the communications apparatus 300 includes a central unit 100 and a remote unit 200. As shown in FIG. 58A and FIG. 58B, neither a receive link 120 nor a receive link 220 includes an optical processing module. A transmit link 110 includes a first optical processing module. The first optical processing module includes an $O\text{-}PS_1$, an $O\text{-}F_1$, and an $O\text{-}PA_1$. A transmit link 210 does not include a third optical processing module. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 58A and FIG. 58B, a part or all of second electro-optical modules (electro-optical modules 221 to 22M) each recover an optical carrier from an analog optical signal transmitted in the downlink (the transmit link) and implement electrical signal modulation.

Figure 59A:
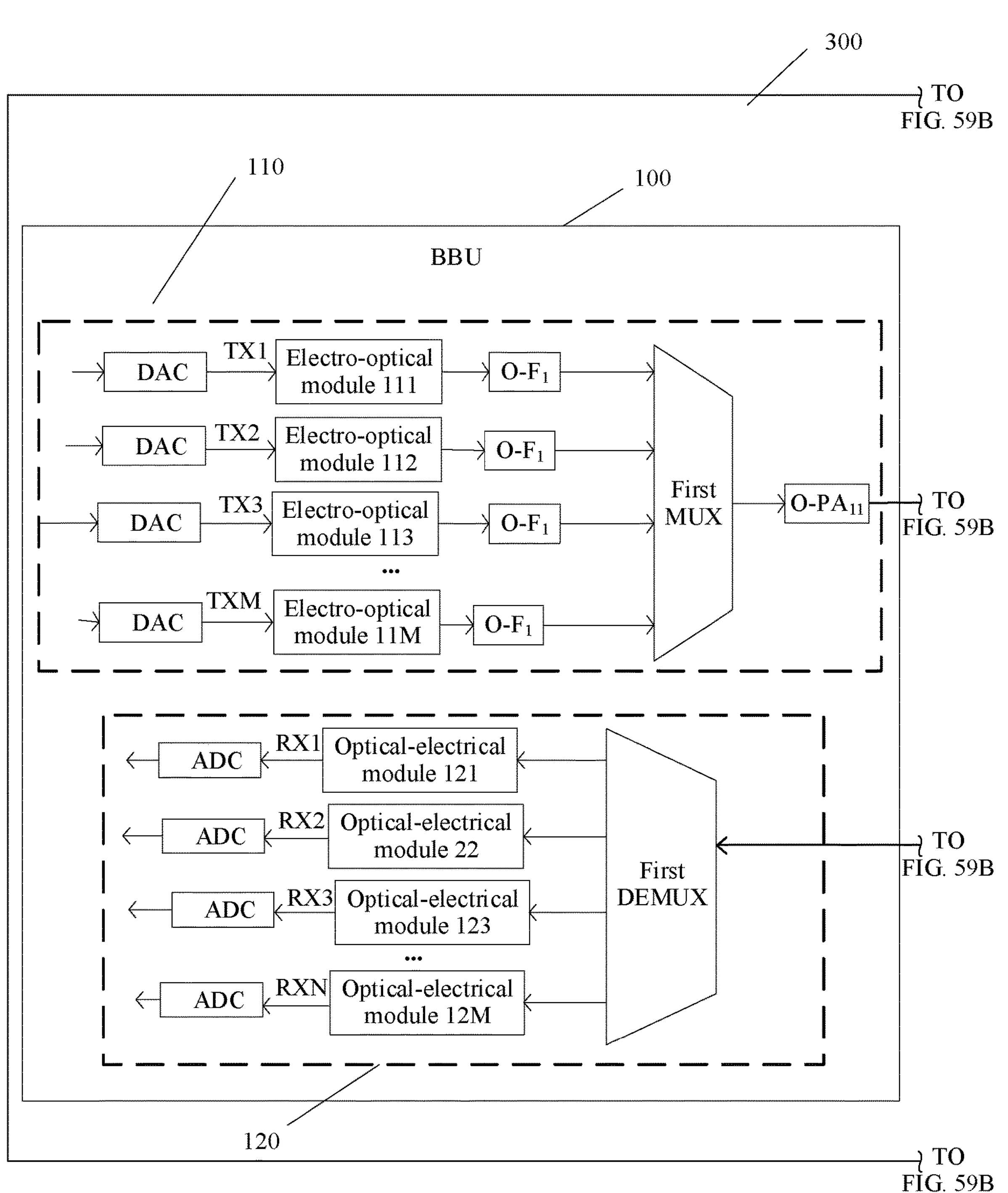
Figure 59B:
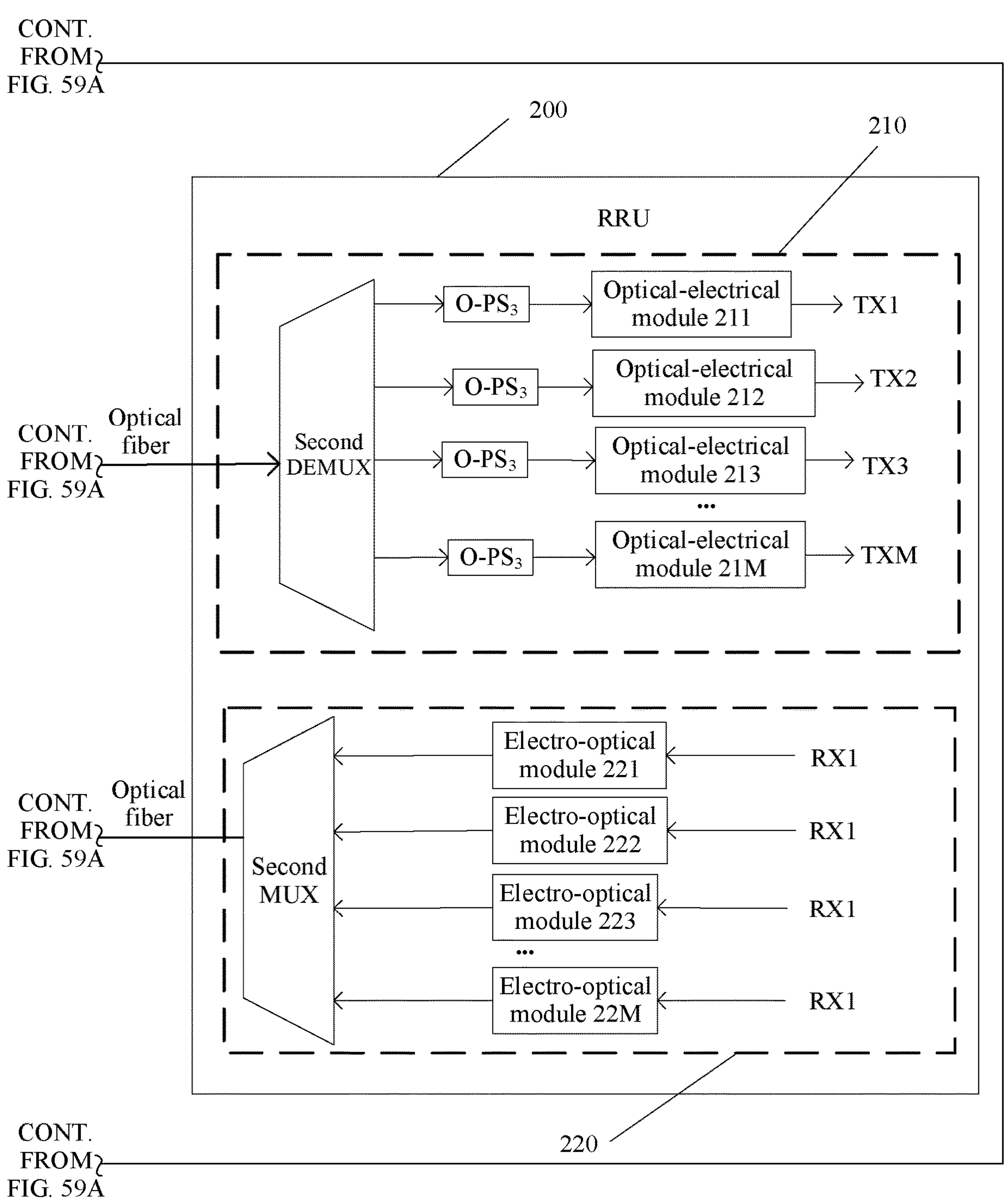

FIG. 59A and FIG. 59B are a schematic block diagram of a possible structure of the communications apparatus 300. As shown in FIG. 59A and FIG. 59B, the communications apparatus 300 includes a central unit 100 and a remote unit 200. Neither a receive link 120 nor a receive link 220 includes an optical processing module. A transmit link 110 includes a first optical processing module. The first optical processing module includes only an $O\text{-}F_1$, and the central unit 100 further includes a post optical power amplifier $O\text{-}PA_{11}$. An input terminal of the $O\text{-}PA_{11}$ is connected to an output terminal of a first MUX, and an output terminal of the $O\text{-}PA_{11}$ is connected to an output terminal of an optical fiber. A transmit link 210 includes a third optical processing module. The third optical processing module includes only an $O\text{-}PS_3$. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 59A and FIG. 59B, a part or all of second electro-optical modules (electro-optical modules 221 to 22M) each generate an optical carrier and modulate a radio frequency signal.

Figure 60A:
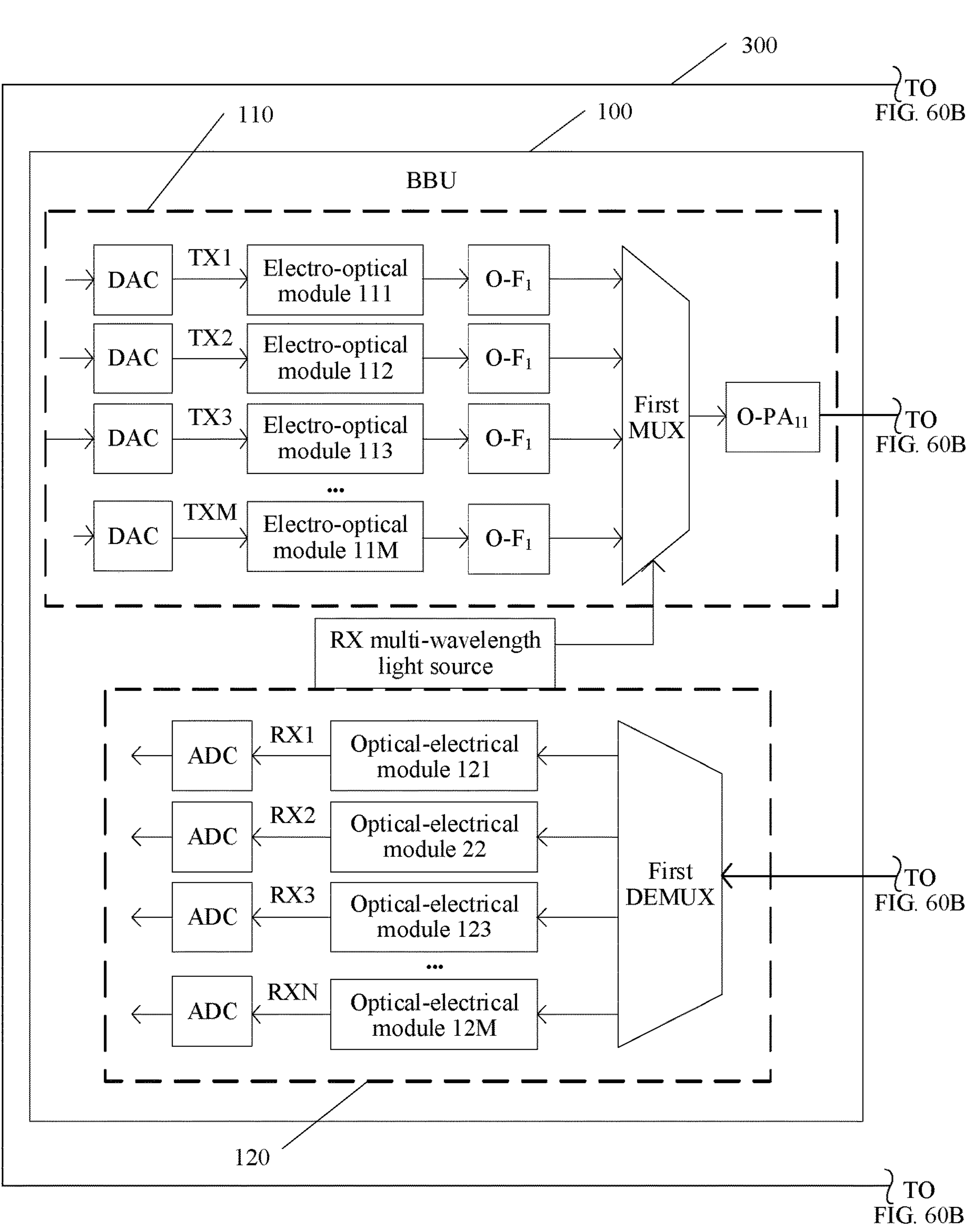
Figure 60B:
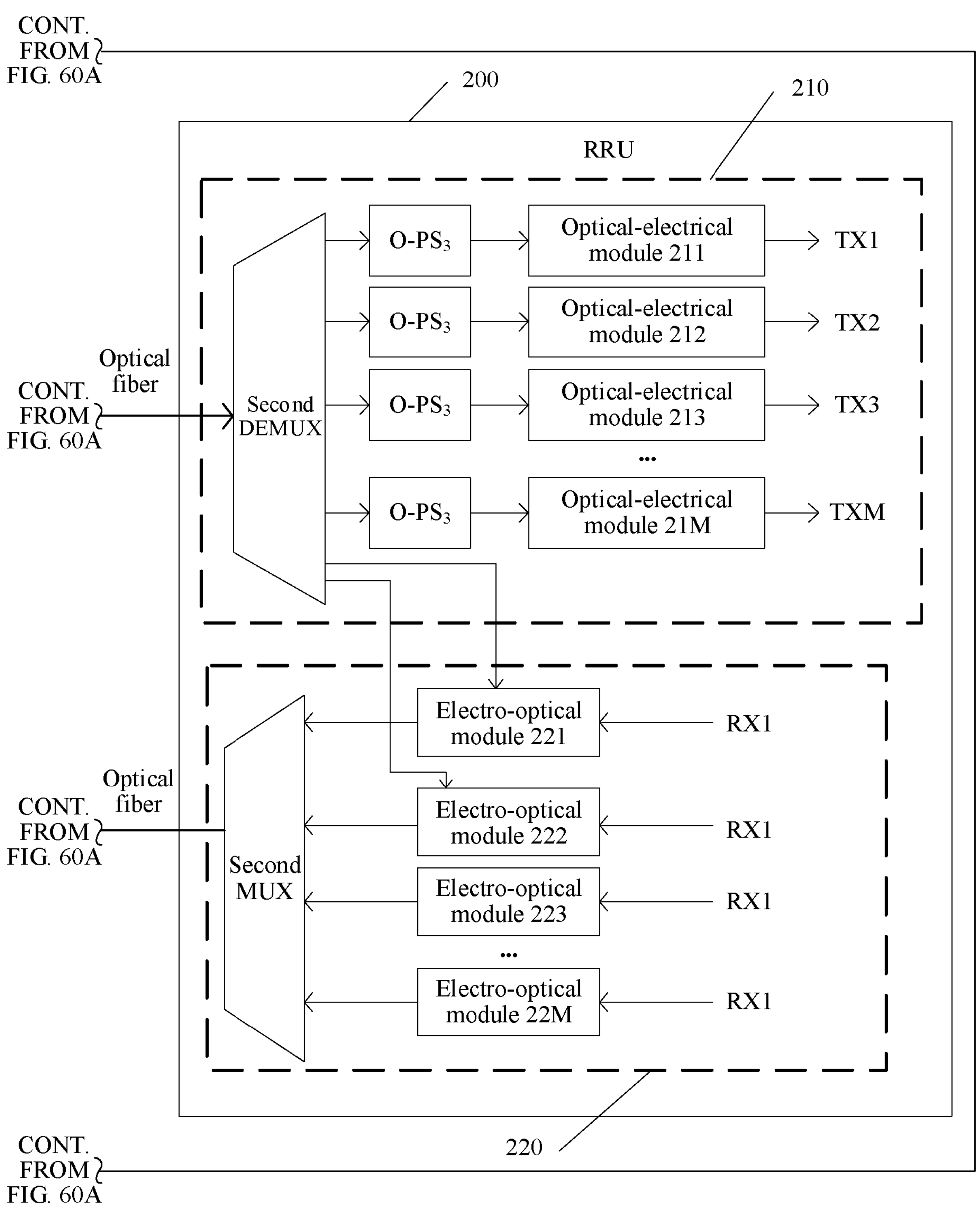

FIG. 60A and FIG. 60B are a schematic block diagram of a possible structure of the communications apparatus 300. As shown in FIG. 60A and FIG. 60B, the communications apparatus 300 includes a central unit 100 and a remote unit 200. Neither a receive link 120 nor a receive link 220 includes an optical processing module. A transmit link 110 includes a first optical processing module. The first optical processing module includes only an $O\text{-}F_1$, and the central unit 100 further includes a post optical power amplifier $O\text{-}PA_{11}$. An input terminal of the $O\text{-}PA_{11}$ is connected to an output terminal of a first MUX, and an output terminal of the $O\text{-}PA_{11}$ is connected to an output terminal of an optical fiber. A transmit link 210 includes a third optical processing module. The third optical processing module includes only an $O\text{-}PS_3$. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 60A and FIG. 60B, a part or all of second electro-optical modules (electro-optical modules 221 to 22M) each receive a dedicated optical carrier from the transmit link and implement modulation. There are a plurality of RX multi-wavelength light source modules in a BBU.

Figure 61A:
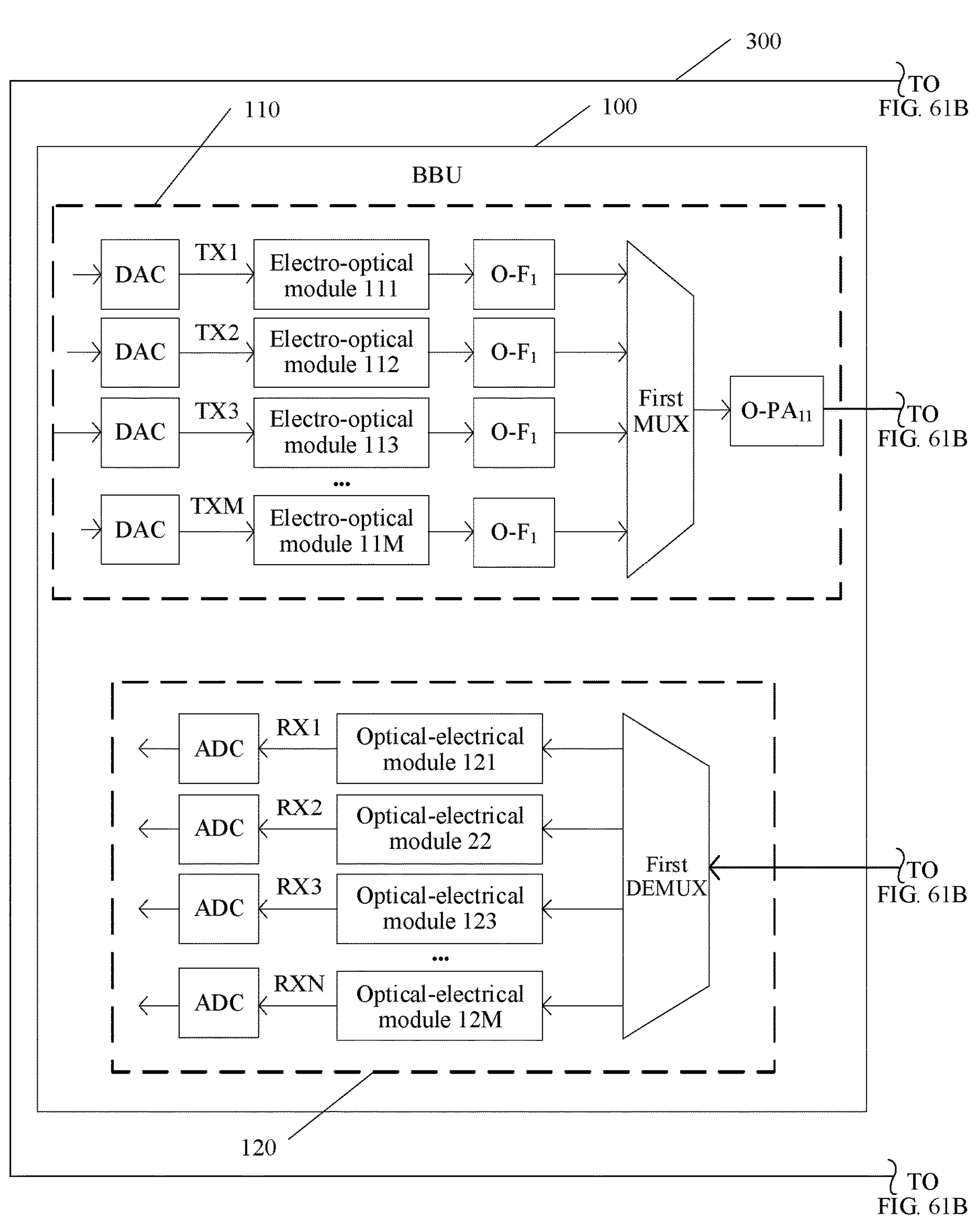
Figure 61B:
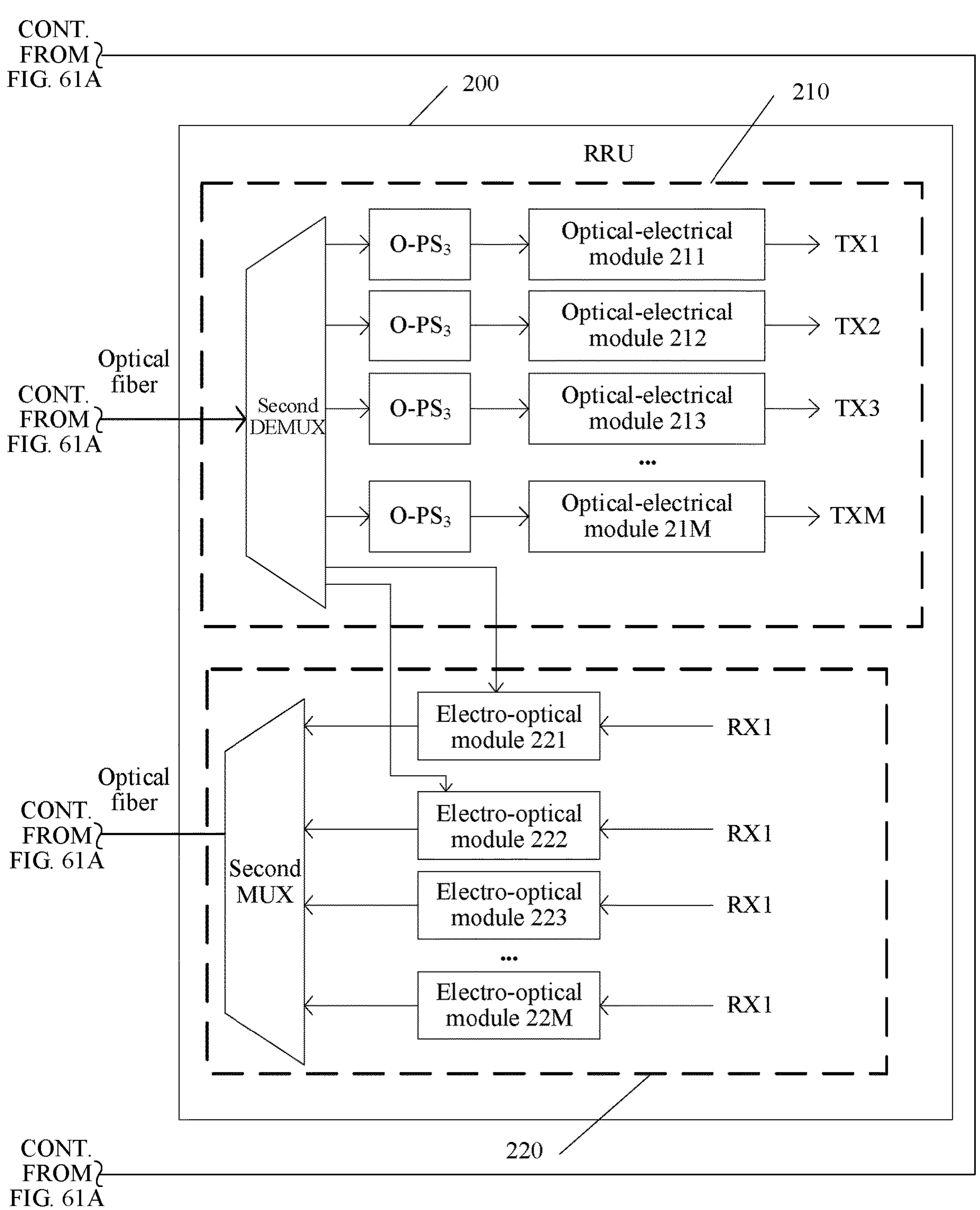

FIG. 61A and FIG. 61B are a schematic block diagram of a possible structure of the communications apparatus 300. As shown in FIG. 61A and FIG. 61B, the communications apparatus 300 includes a central unit 100 and a remote unit 200. Neither a receive link 120 nor a receive link 220 includes an optical processing module. A transmit link 110 includes a first optical processing module. The first optical processing module includes only an $O\text{-}F_1$, and the central unit 100 further includes a post optical power amplifier $O\text{-}PA_{11}$. An input terminal of the $O\text{-}PA_{11}$ is connected to an output terminal of a first MUX, and an output terminal of the $O\text{-}PA_{11}$ is connected to an output terminal of an optical fiber. A transmit link 210 includes a third optical processing module. The third optical processing module includes only an $O\text{-}PS_3$. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 61A and FIG. 61B, a part or all of second electro-optical modules (electro-optical modules 221 to 22M) each recover an optical carrier from an analog optical signal transmitted in the downlink (the transmit link) and implement electrical signal modulation.

Figure 62A:
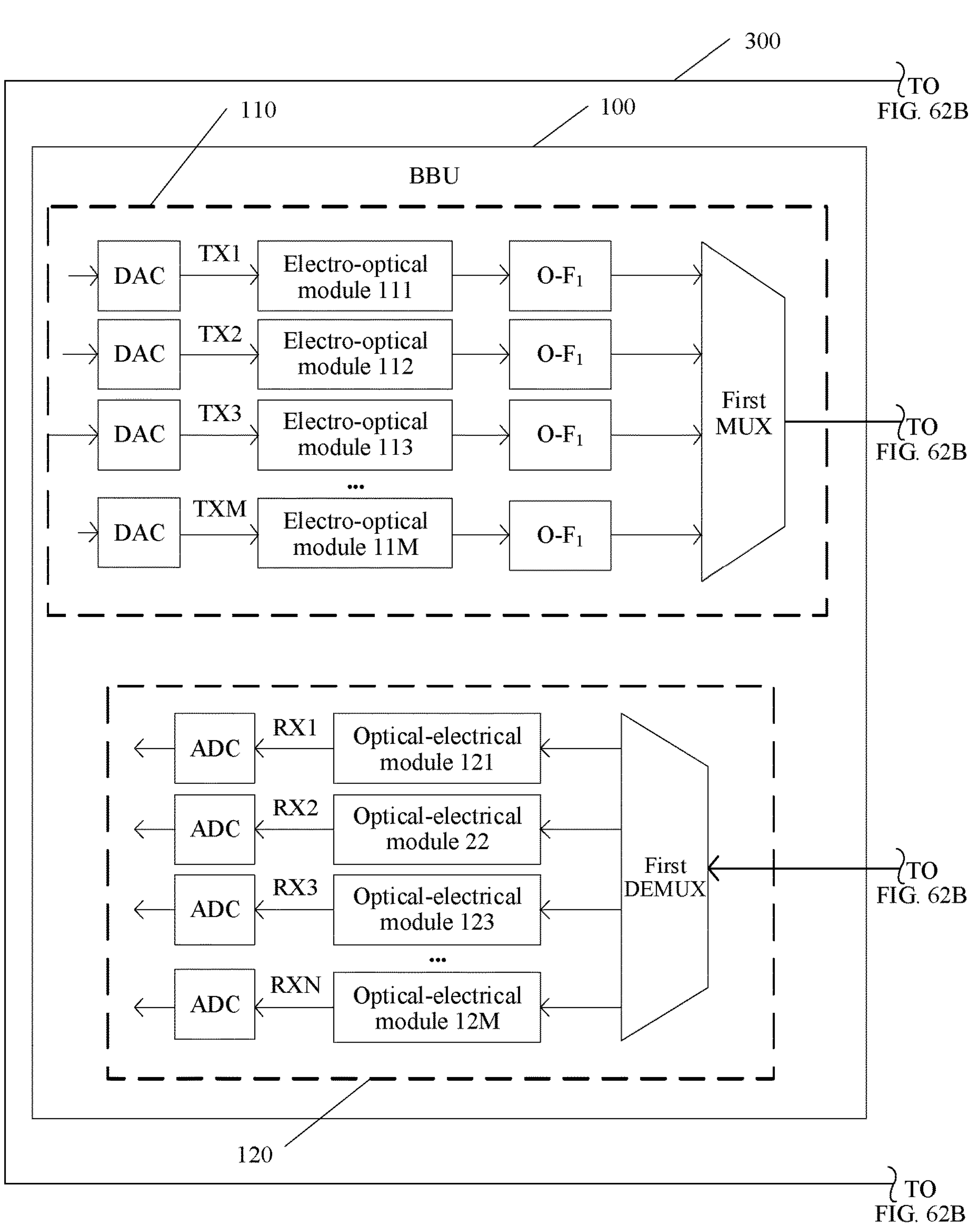
Figure 62B:
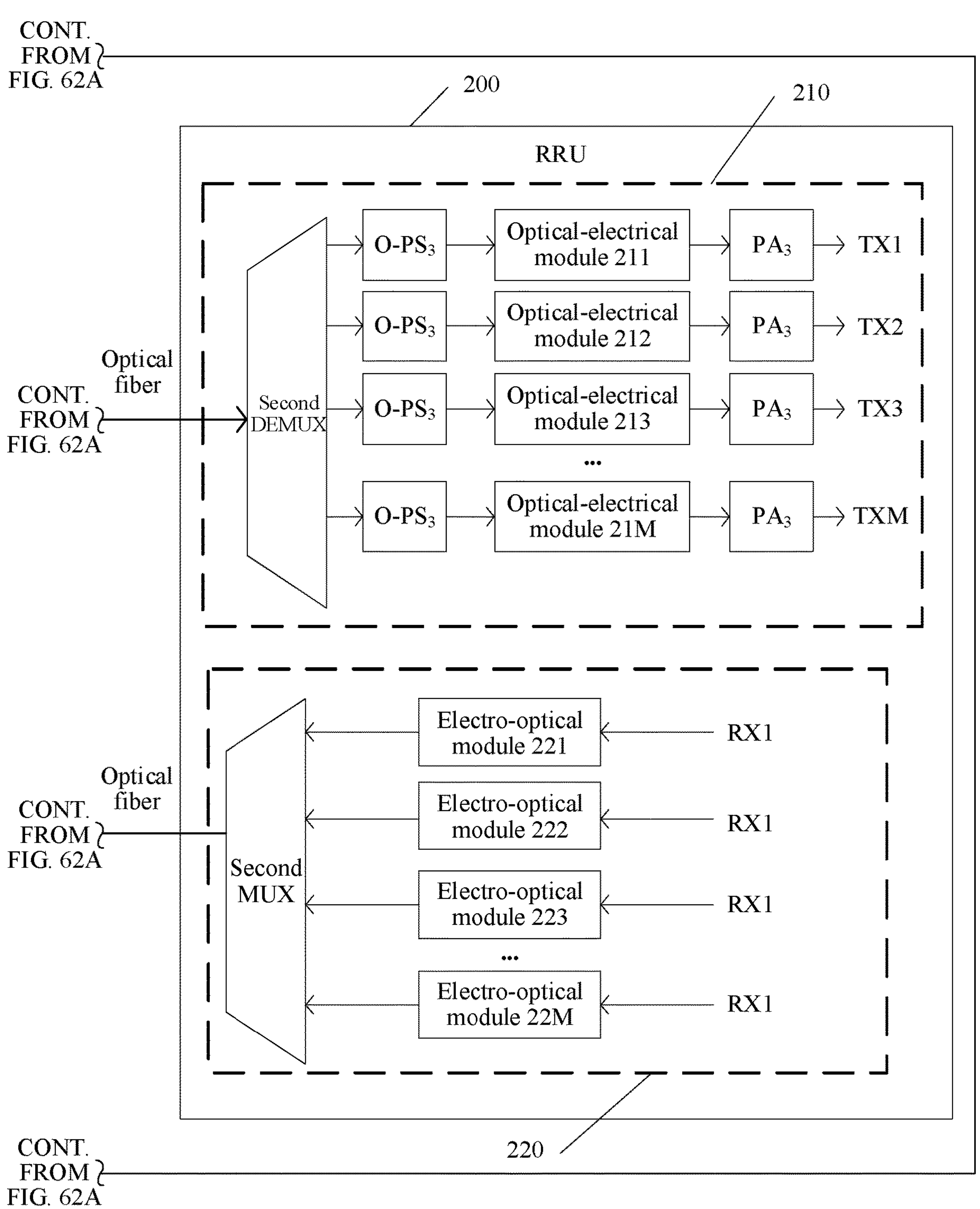

FIG. 62A and FIG. 62B are a schematic block diagram of a possible structure of the communications apparatus 300. As shown in FIG. 62A and FIG. 62B, the communications apparatus 300 includes a central unit 100 and a remote unit 200. Neither a receive link 120 nor a receive link 220 includes an optical processing module. A transmit link 110 includes a first optical processing module. The first optical processing module includes only an $O\text{-}F_1$, and the $O\text{-}F_1$ is located between an electro-optical module and a first MUX. A transmit link 210 includes a third optical processing module. The third optical processing module includes only $O\text{-}F_1$, and the remote unit 200 further includes a $PA_3$. The $PA_3$ is located after an optical-electrical module in the remote unit 200, and an input terminal of the $PA_3$ is connected to an output terminal of the optical-electrical module in the remote unit 200. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 62A and FIG. 62B, a part or all of second electro-optical modules (electro-optical modules 221 to 22M) each generate an optical carrier and modulate a radio frequency signal.

Figure 63A:
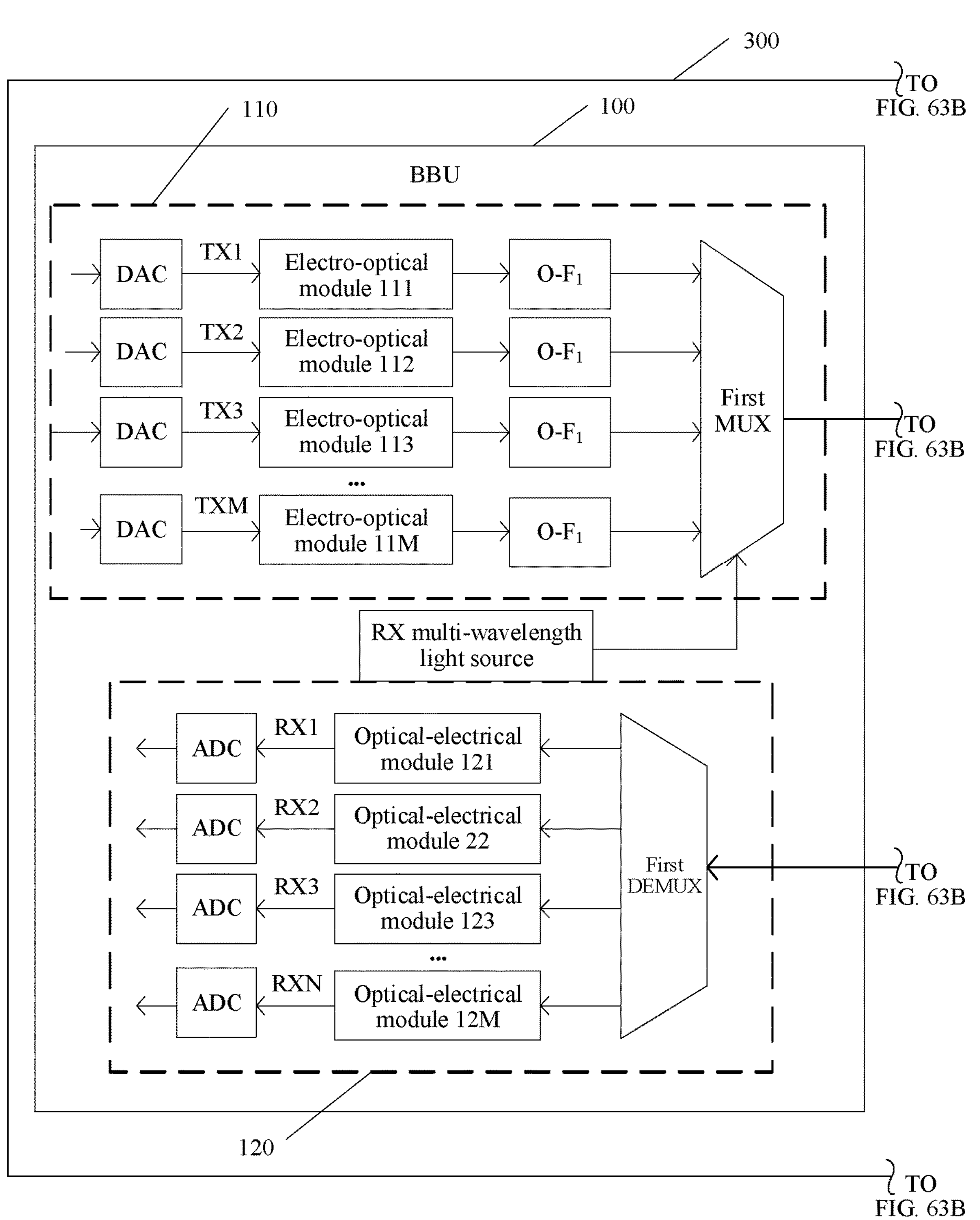
Figure 63B:
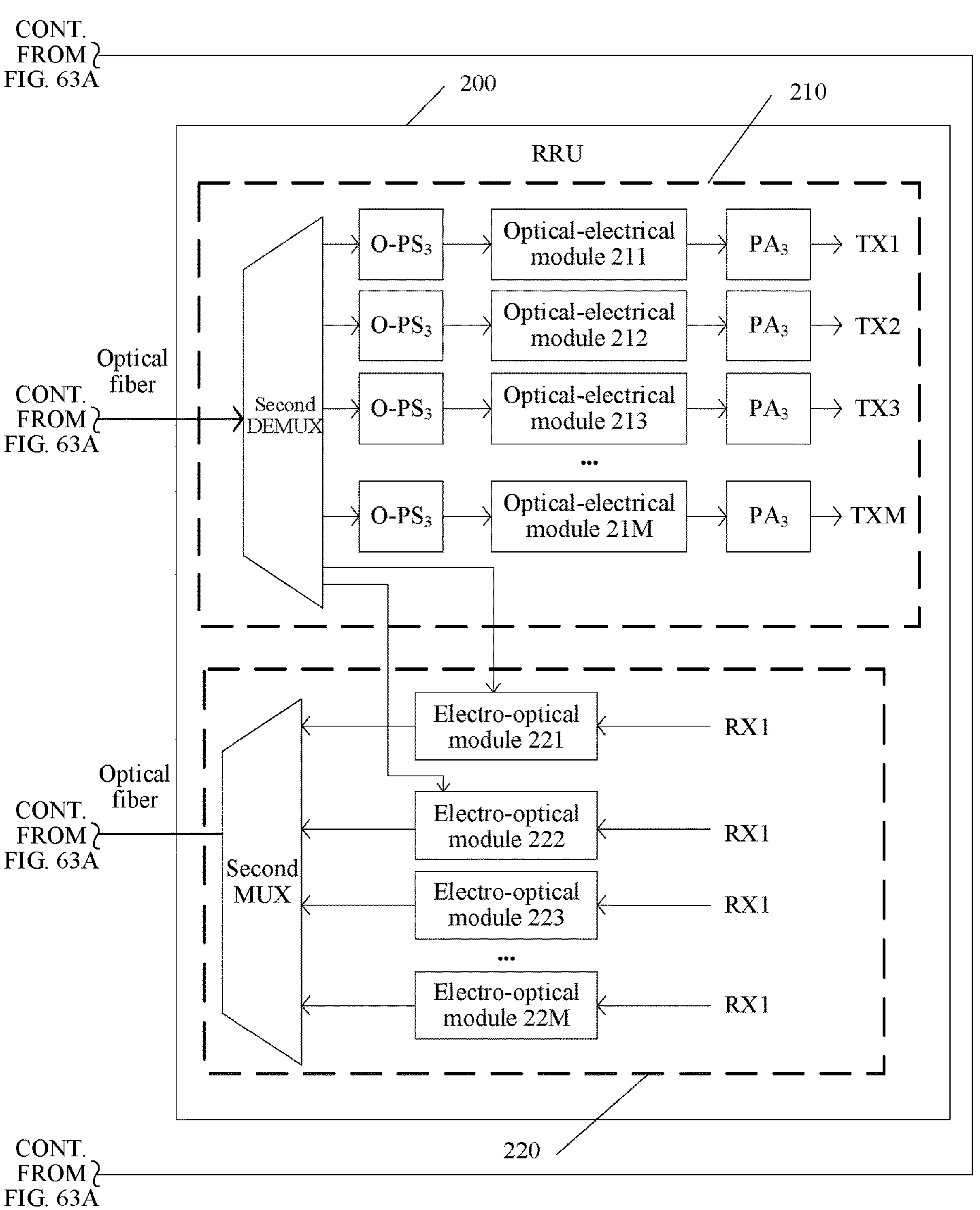

FIG. 63A and FIG. 63B are a schematic block diagram of a possible structure of the communications apparatus 300. As shown in FIG. 63A and FIG. 63B, the communications apparatus 300 includes a central unit 100 and a remote unit 200. Neither a receive link 120 nor a receive link 220 includes an optical processing module. A transmit link 110 includes a first optical processing module. The first optical processing module includes only an $O\text{-}F_1$, and the $O\text{-}F_1$ is located between an electro-optical module and a first MUX. A transmit link 210 includes a third optical processing module. The third optical processing module includes only O-$F_1$, and the remote unit 200 further includes a $PA_3$. The $PA_3$ is located after an optical-electrical module in the remote unit 200, and an input terminal of the $PA_3$ is connected to an output terminal of the optical-electrical module in the remote unit 200. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 63A and FIG. 63B, a part or all of second electro-optical modules (electro-optical modules 221 to 22M) each receive a dedicated optical carrier from the transmit link and implement modulation. There are a plurality of RX multi-wavelength light source modules in a BBU.

Figure 64A:
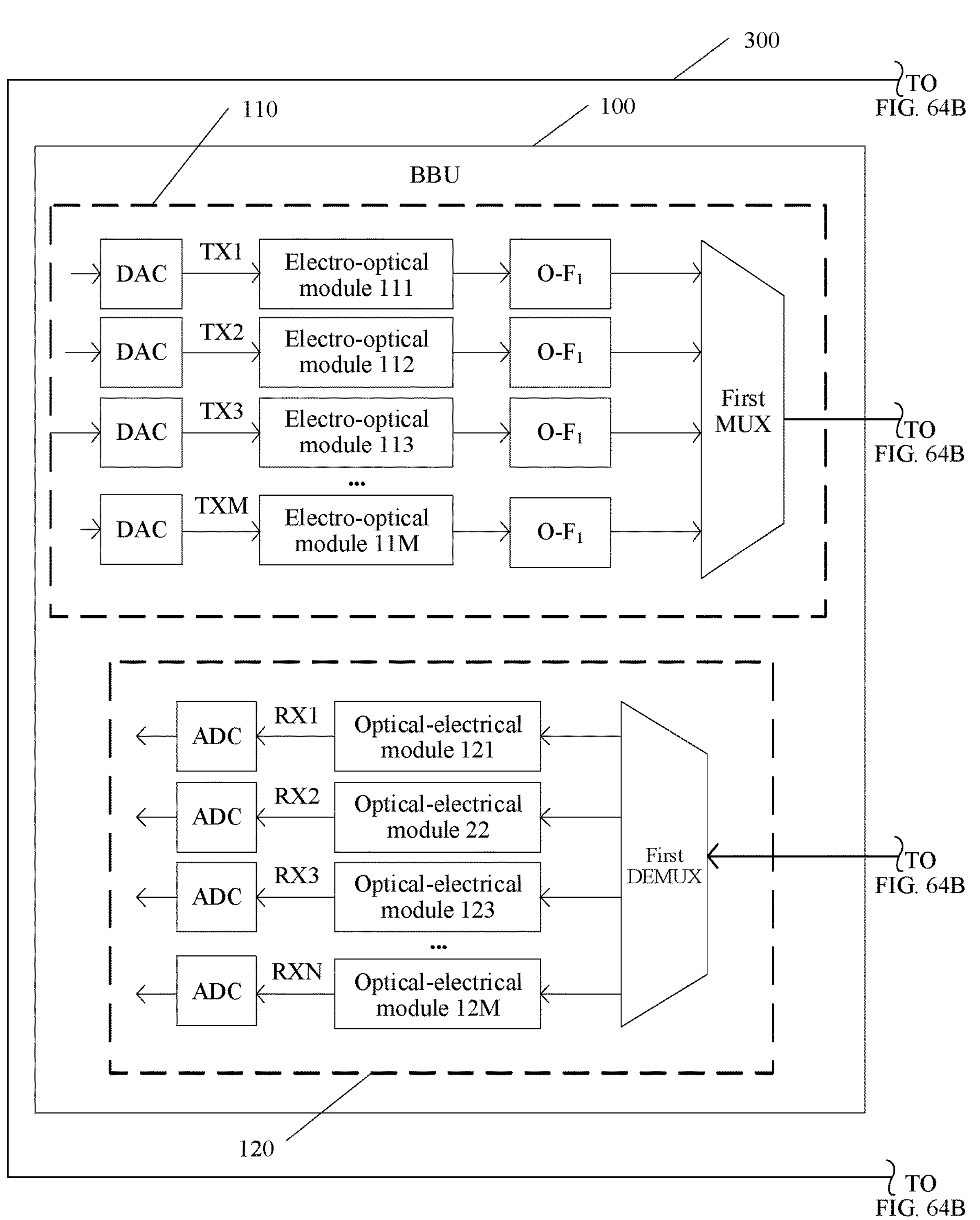
Figure 64B:
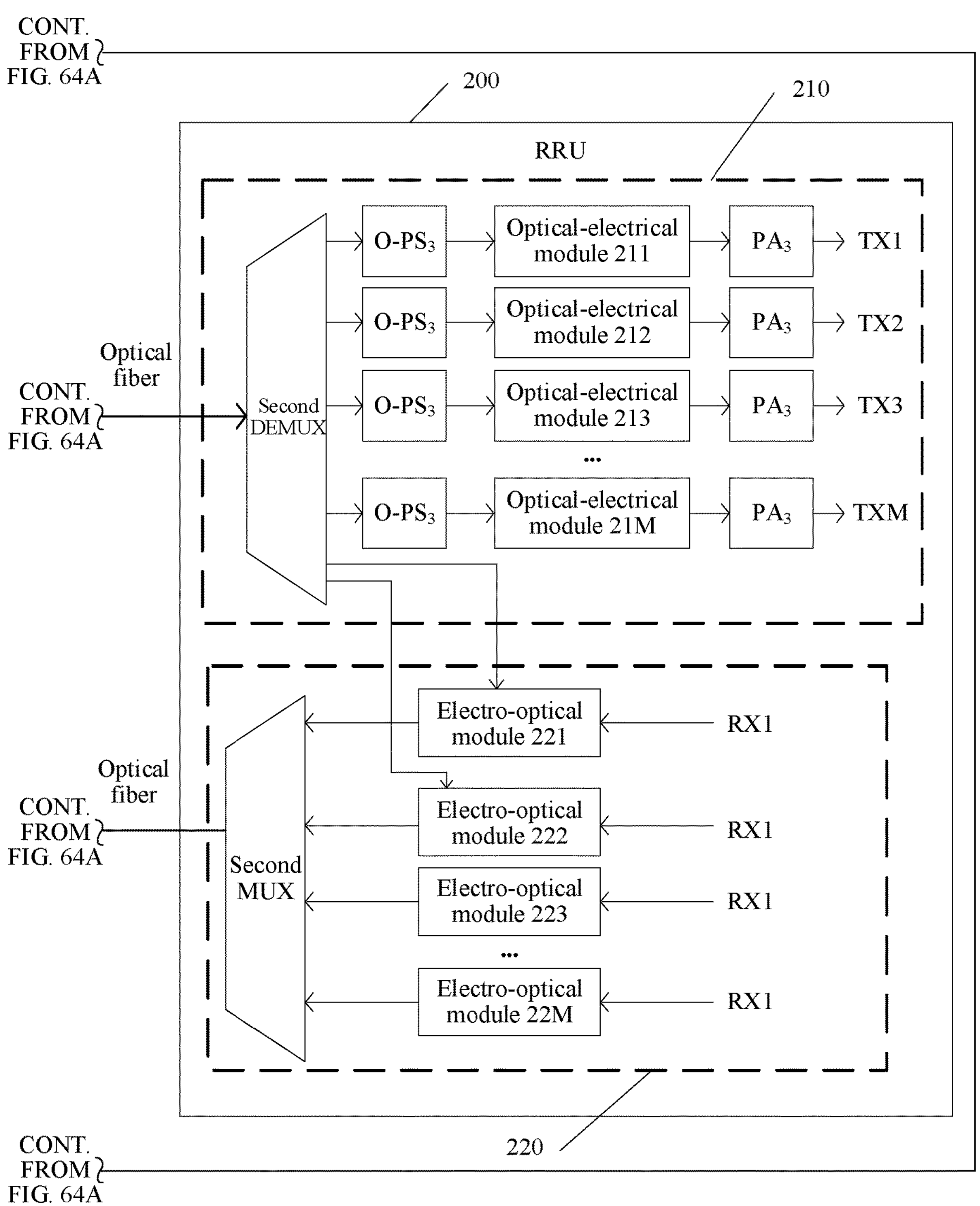

FIG. 64A and FIG. 64B are a schematic block diagram of a possible structure of the communications apparatus 300. As shown in FIG. 64A and FIG. 64B, the communications apparatus 300 includes a central unit 100 and a remote unit 200. Neither a receive link 120 nor a receive link 220 includes an optical processing module. A transmit link 110 includes a first optical processing module. The first optical processing module includes only an O-$F_1$, and the O-$F_1$ is located between an electro-optical module and a first MUX. A transmit link 210 includes a third optical processing module. The third optical processing module includes only O-$F_1$, and the remote unit 200 further includes a $PA_3$. The $PA_3$ is located after an optical-electrical module in the remote unit 200, and an input terminal of the $PA_3$ is connected to an output terminal of the optical-electrical module in the remote unit 200. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 64A and FIG. 64B, a part or all of second electro-optical modules (electro-optical modules 221 to 22M) each recover an optical carrier from an analog optical signal transmitted in the downlink (the transmit link) and implement electrical signal modulation.

Figure 65A:
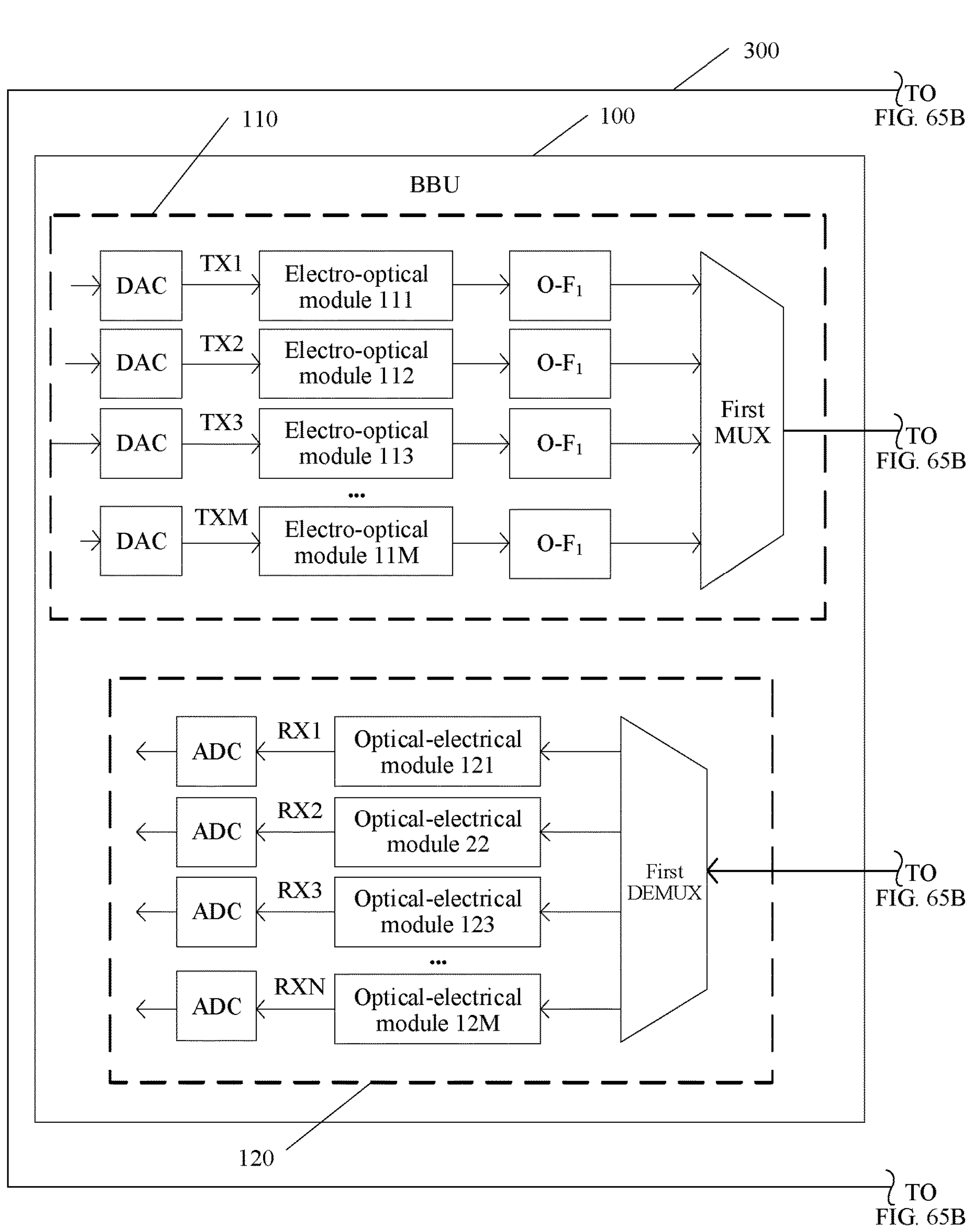
Figure 65B:
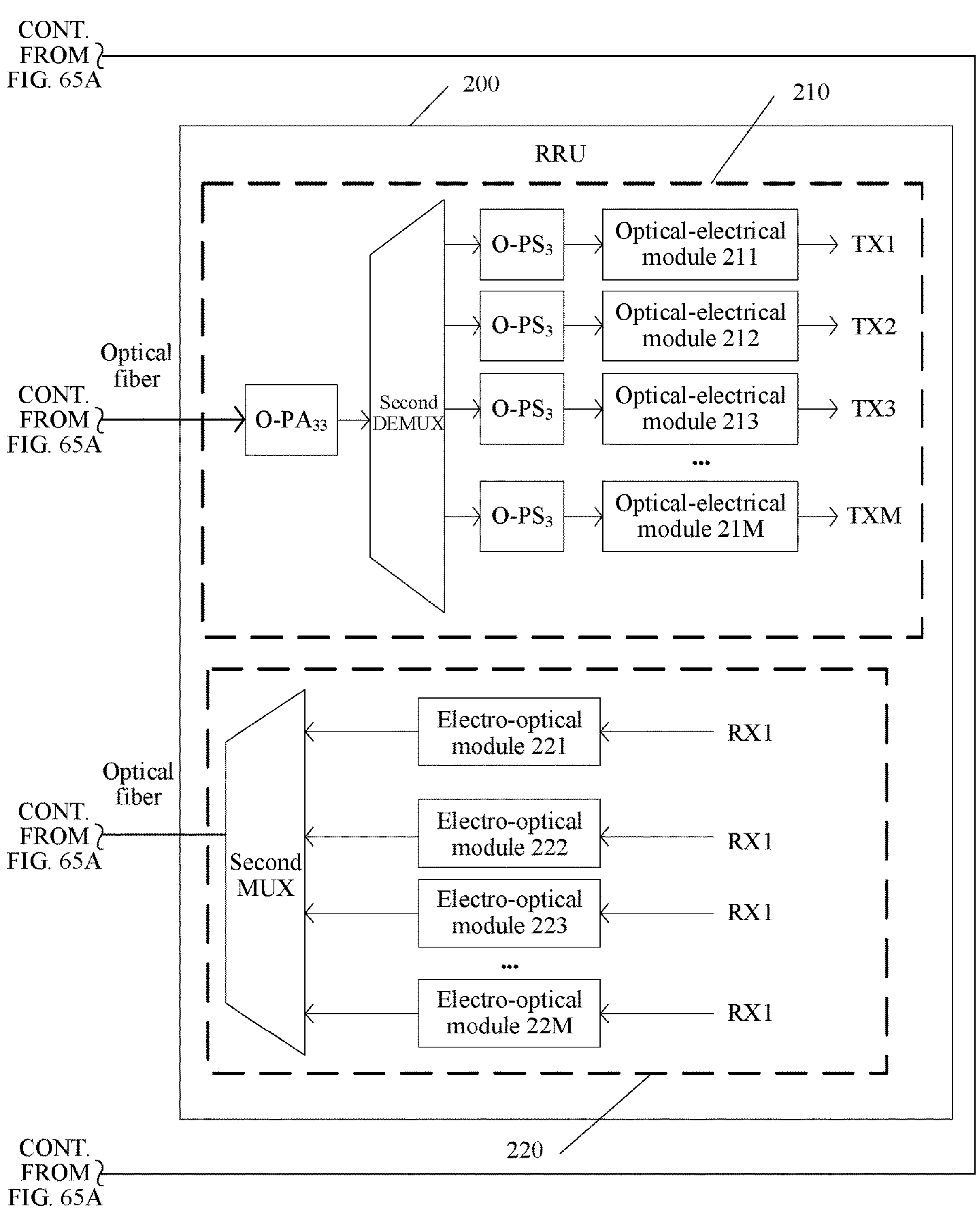

FIG. 65A and FIG. 65B are a schematic block diagram of a possible structure of the communications apparatus 300. As shown in FIG. 65A and FIG. 65B, the communications apparatus 300 includes a central unit 100 and a remote unit 200. Neither a receive link 120 nor a receive link 220 includes an optical processing module. A transmit link 110 includes a first optical processing module. The first optical processing module includes only an O-$F_1$, and the O-$F_1$ is located between an electro-optical module and a first MUX. A transmit link 210 includes a third optical processing module. The third optical processing module includes an O-$PS_3$. The O-$PS_3$ is located between a second DEMUX and optical-electrical modules 211 to 21M. In addition, the transmit link 210 further includes a pre-optical power amplifier O-$PA_{33}$. An output terminal of the O-$PA_{33}$ is connected to an output terminal of the transmit link 210, and an output terminal of the O-$PA_{33}$ is connected to an input terminal of a second DEMUX. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 65A and FIG. 65B, a part or all of second electro-optical modules (electro-optical modules 221 to 22M) each generate an optical carrier and modulate a radio frequency signal.

Figure 66A:
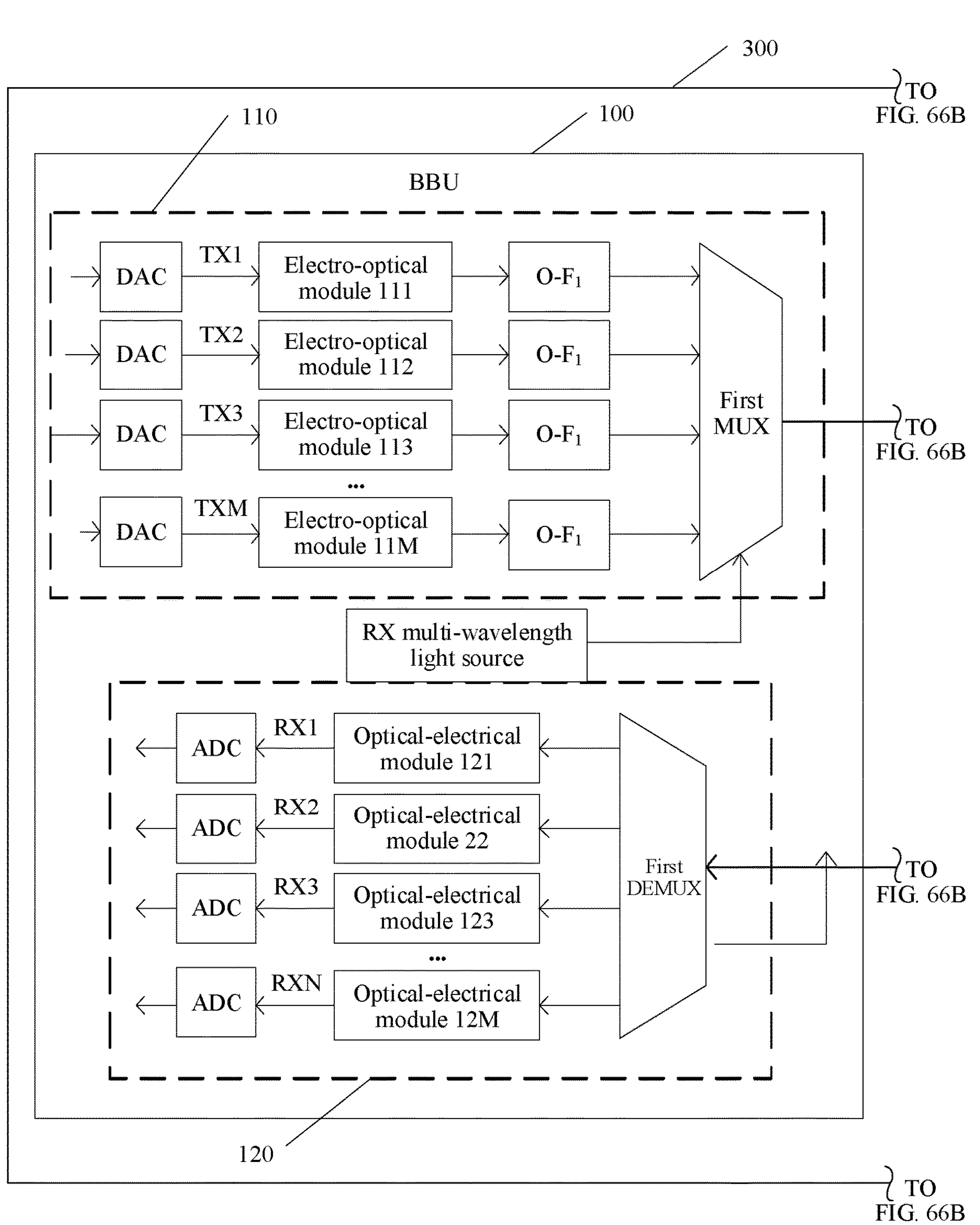
Figure 66B:
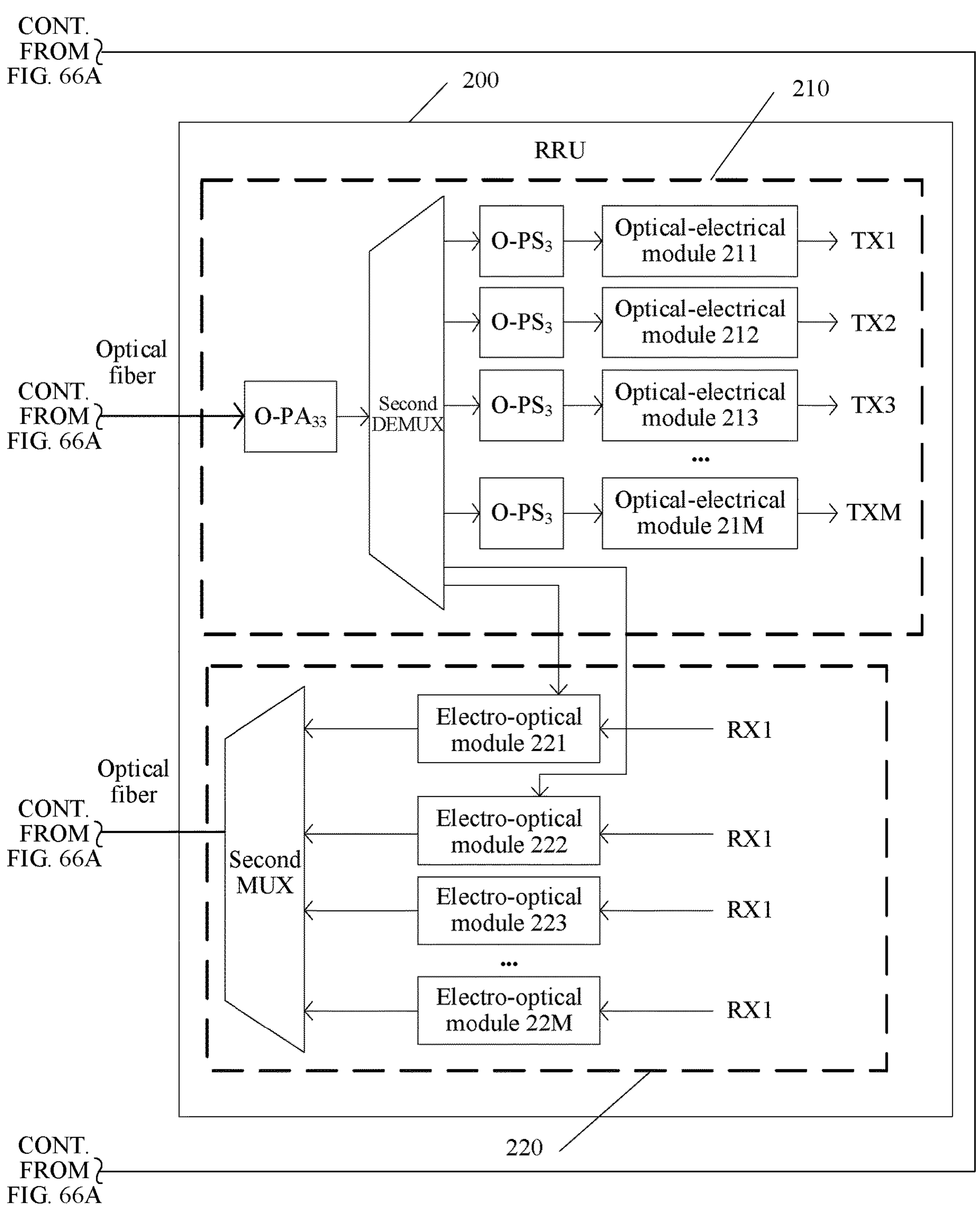

FIG. 66A and FIG. 66B are a schematic block diagram of a possible structure of the communications apparatus 300. As shown in FIG. 66A and FIG. 66B, the communications apparatus 300 includes a central unit 100 and a remote unit 200. Neither a receive link 120 nor a receive link 220 includes an optical processing module. A transmit link 110 includes a first optical processing module. The first optical processing module includes only an O-$F_1$, and the O-$F_1$ is located between an electro-optical module and a first MUX. A transmit link 210 includes a third optical processing module. The third optical processing module includes an O-$PS_3$. The O-$PS_3$ is located between a second DEMUX and optical-electrical modules 211 to 21M. In addition, the transmit link 210 further includes a pre-optical power amplifier O-$PA_{33}$. An output terminal of the O-$PA_{33}$ is connected to an output terminal of the transmit link 210, and an output terminal of the O-$PA_{33}$ is connected to an input terminal of a second DEMUX. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 66A and FIG. 66B, a part or all of second electro-optical modules (electro-optical modules 221 to 22M) each receive a dedicated optical carrier from the transmit link and implement modulation. There are a plurality of RX multi-wavelength light source modules in a BBU.

Figure 67A:
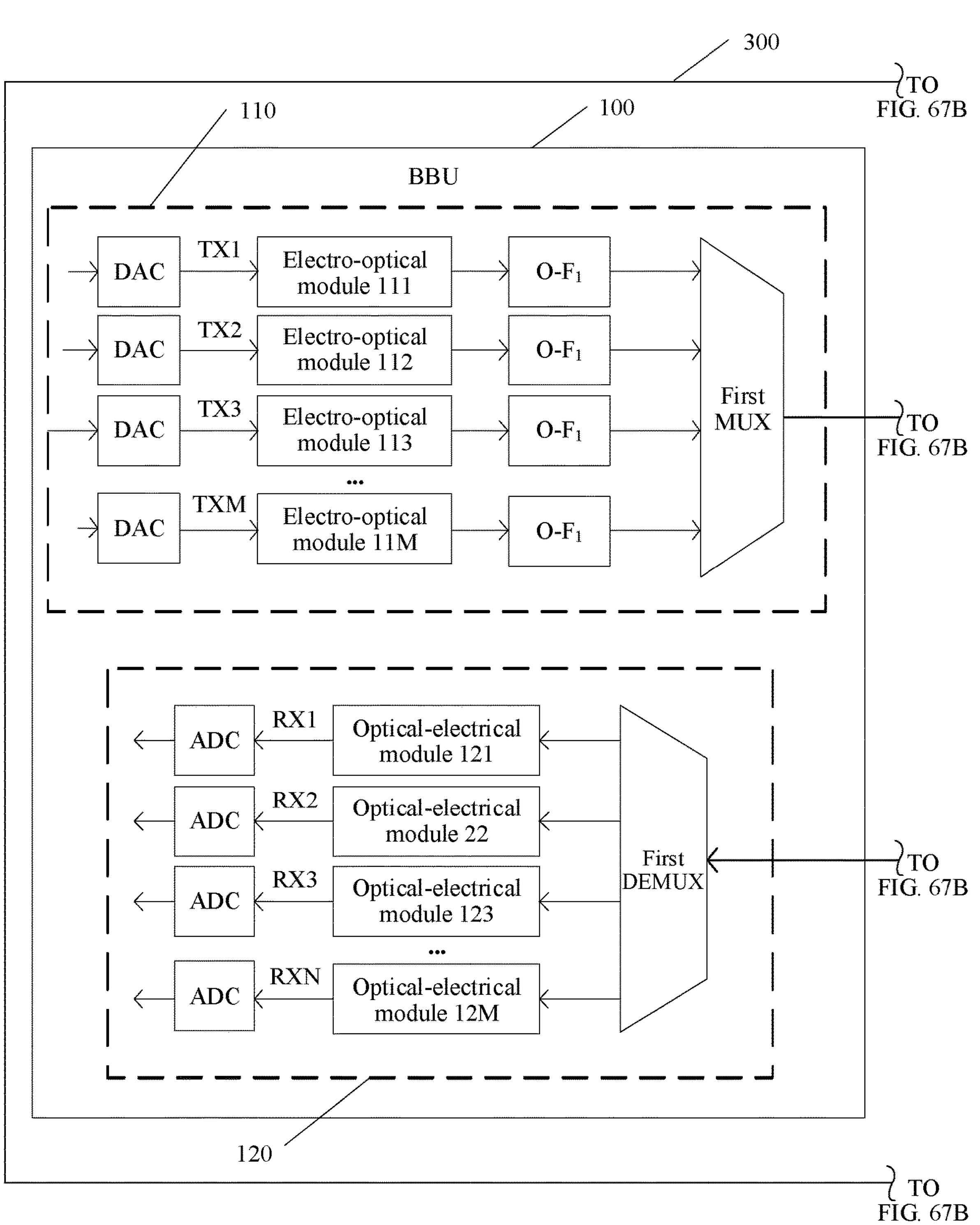
Figure 67B:
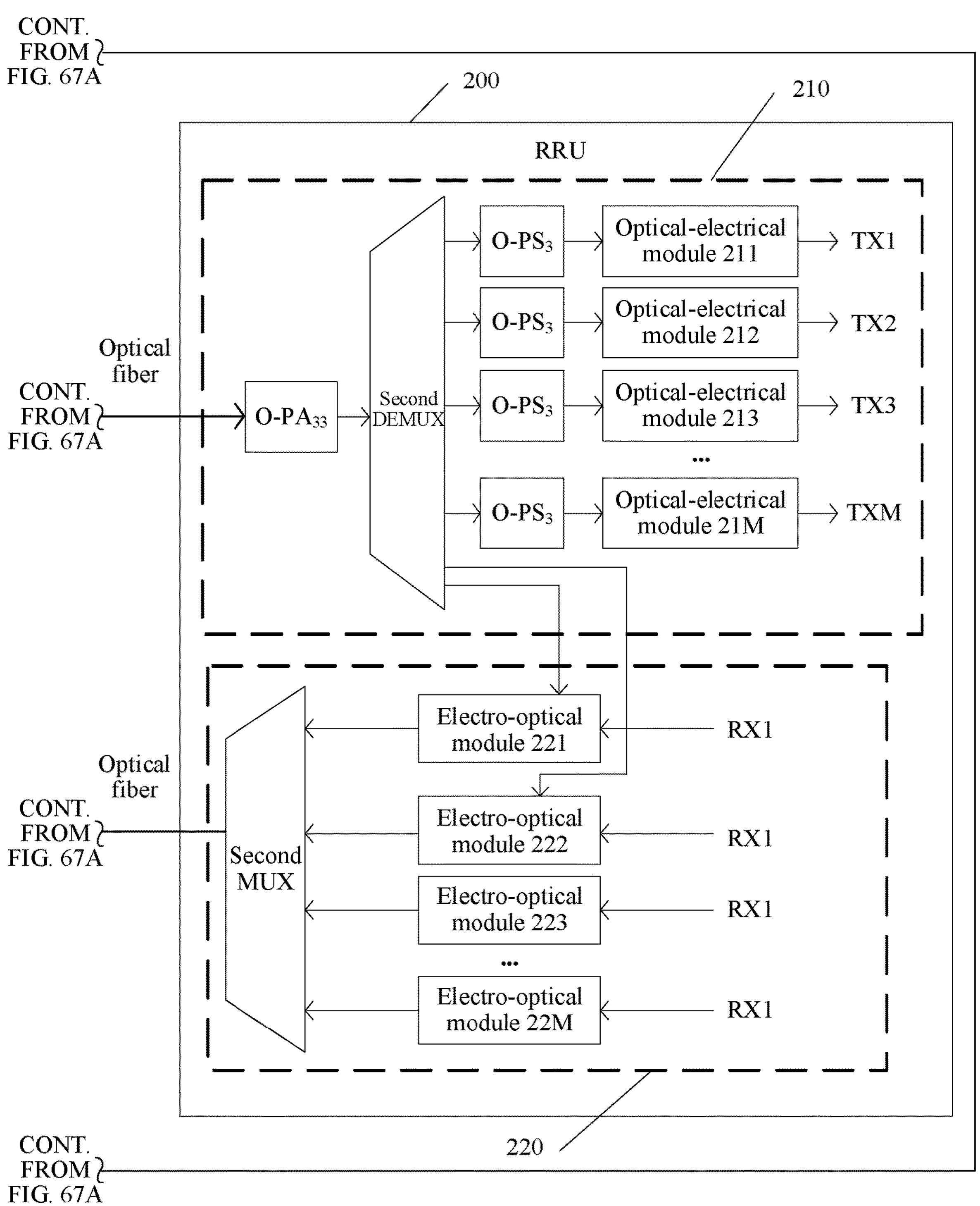

FIG. 67A and FIG. 67B are a schematic block diagram of a possible structure of the communications apparatus 300. As shown in FIG. 67A and FIG. 67B, the communications apparatus 300 includes a central unit 100 and a remote unit 200. Neither a receive link 120 nor a receive link 220 includes an optical processing module. A transmit link 110 includes a first optical processing module. The first optical processing module includes only an O-$F_1$, and the O-$F_1$ is located between an electro-optical module and a first MUX. A transmit link 210 includes a third optical processing module. The third optical processing module includes an O-$PS_3$. The O-$PS_3$ is located between a second DEMUX and optical-electrical modules 211 to 21M. In addition, the transmit link 210 further includes a pre-optical power amplifier O-$PA_{33}$. An output terminal of the O-$PA_{33}$ is connected to an output terminal of the transmit link 210, and an output terminal of the O-$PA_{33}$ is connected to an input terminal of a second DEMUX. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 67A and FIG. 67B, a part or all of second electro-optical modules (electro-optical modules 221 to 22M) each recover an optical carrier from an analog optical signal transmitted in the downlink (the transmit link) and implement electrical signal modulation.

Figure 68A:
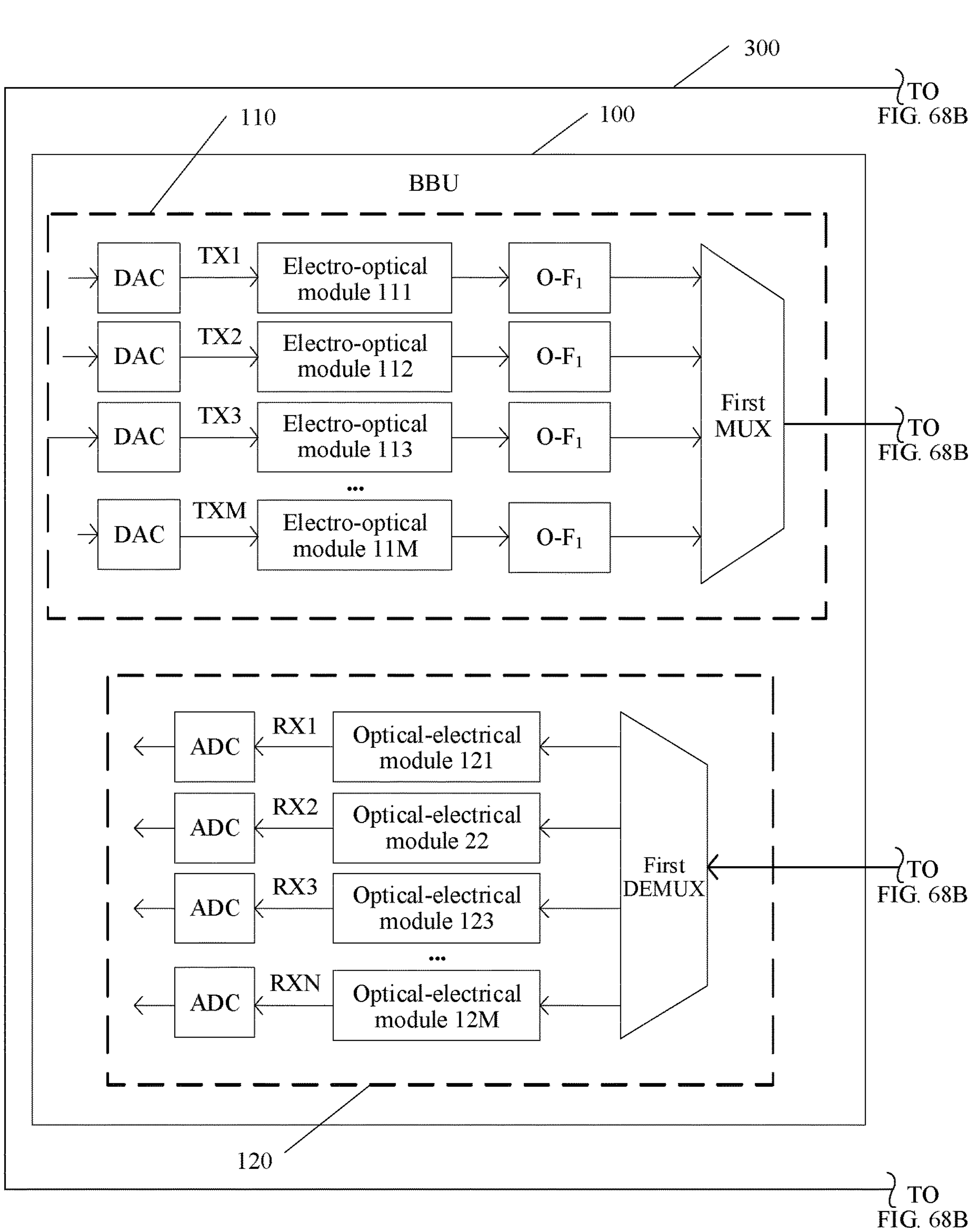
Figure 68B:
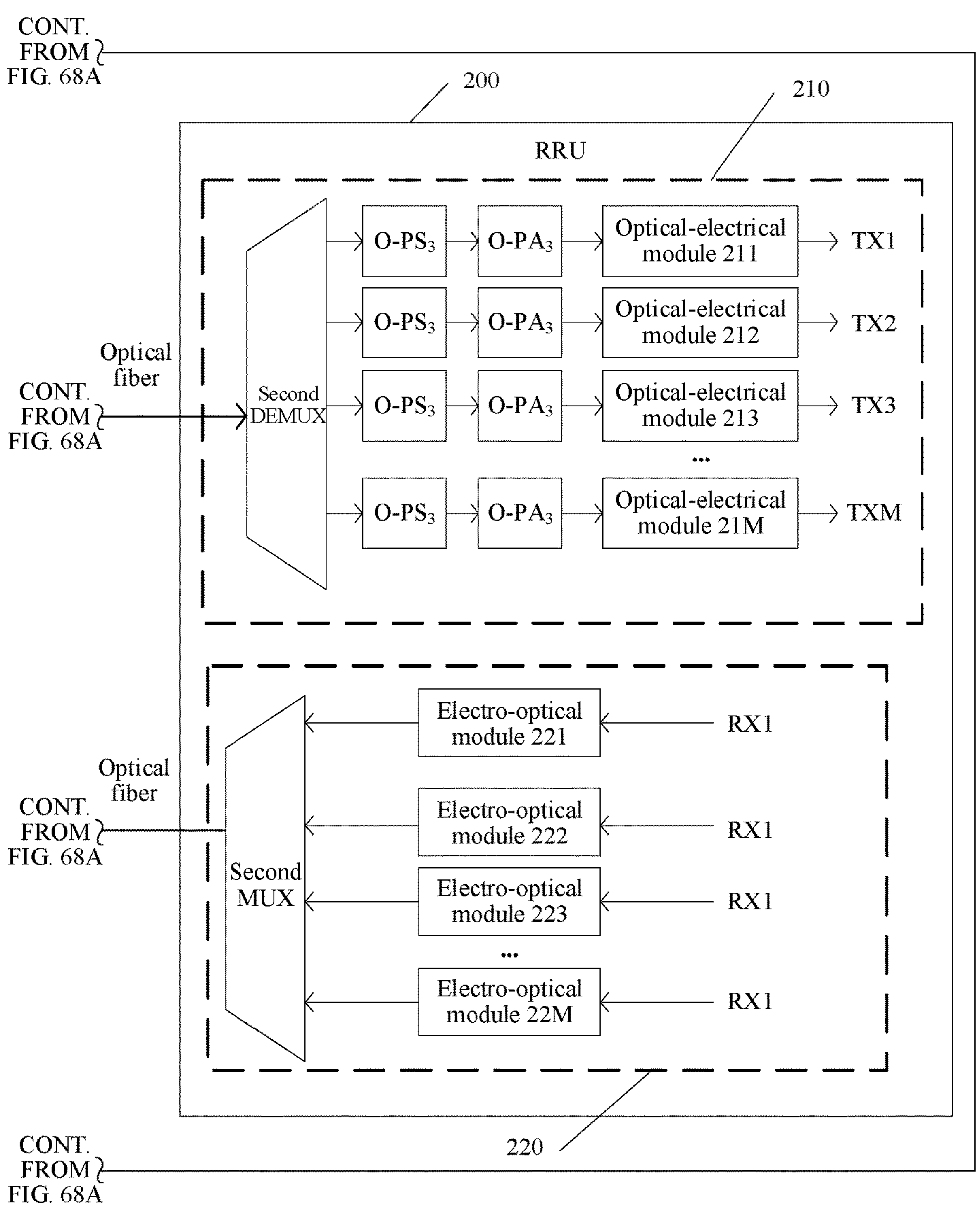
Figure 69A:
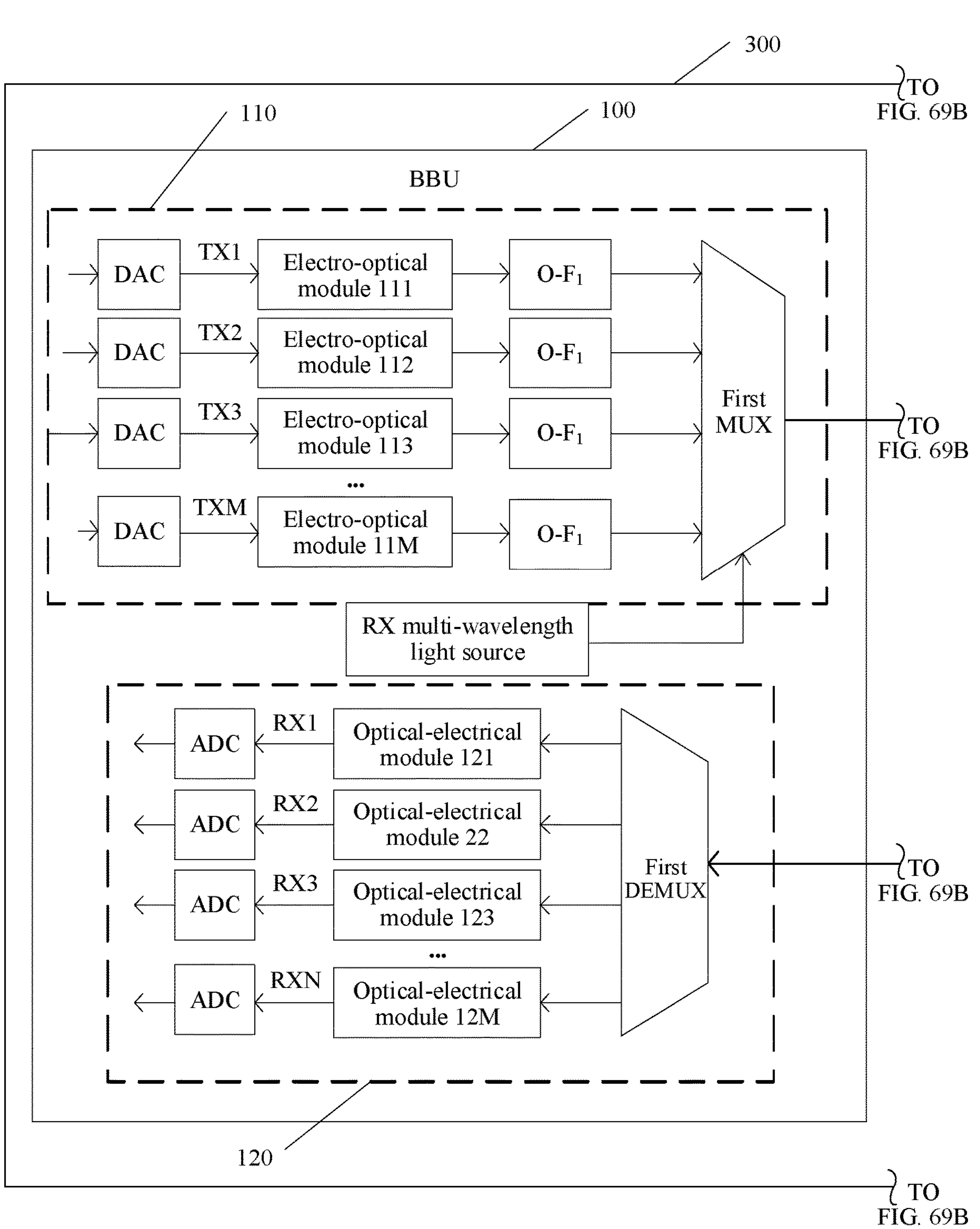
Figure 69B:
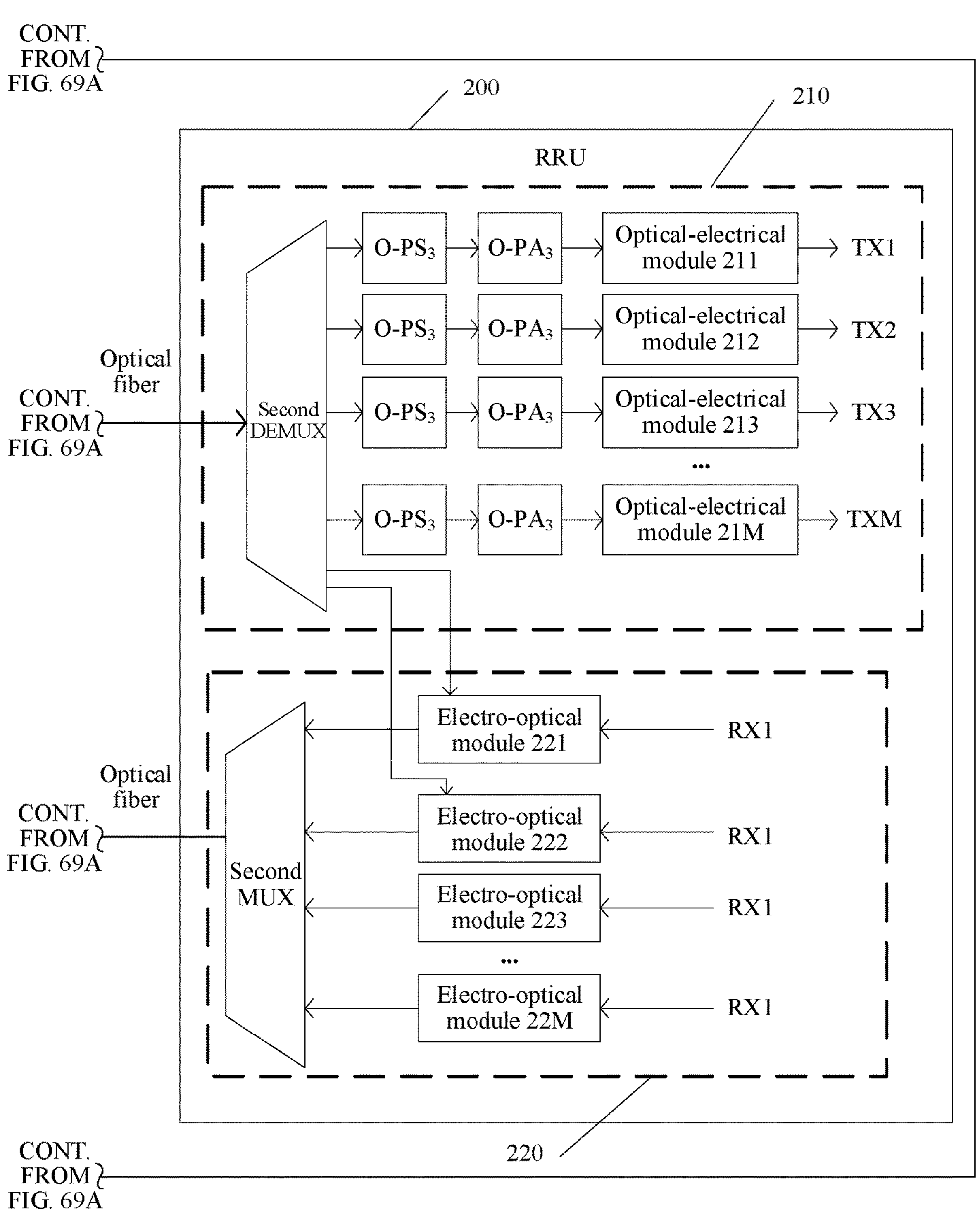

FIG. 68A and FIG. 68B are a schematic block diagram of a possible structure of the communications apparatus 300. As shown in FIG. 69A and FIG. 69B, the communications apparatus 300 includes a central unit 100 and a remote unit 200. Neither a receive link 120 nor a receive link 220 includes an optical processing module. A transmit link 110 includes a first optical processing module. The first optical processing module includes only an O-$F_1$, and the O-$F_1$ is located between an electro-optical module and a first MUX.

A transmit link 210 includes a third optical processing module. The third optical processing module includes an O-$PA_3$ and an O-$PS_3$. The O-$PA_3$ is connected to the O-$PS_3$. The O-$PA_3$ and the O-$PS_3$ are located between a second DEMUX and optical-electrical modules 211 to 21M. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 68A and FIG. 68B, a part or all of second electro-optical modules (electro-optical modules 221 to 22M) each generate an optical carrier and modulate a radio frequency signal.

FIG. 69A and FIG. 69B are a schematic block diagram of a possible structure of the communications apparatus 300. As shown in FIG. 69A and FIG. 69B, the communications apparatus 300 includes a central unit 100 and a remote unit 200. Neither a receive link 120 nor a receive link 220 includes an optical processing module. A transmit link 110 includes a first optical processing module. The first optical processing module includes only an O-$F_1$, and the O-$F_1$ is located between an electro-optical module and a first MUX. A transmit link 210 includes a third optical processing module. The third optical processing module includes an O-$PA_3$ and an O-$PS_3$. The O-$PA_3$ is connected to the O-$PS_3$. The O-$PA_3$ and the O-$PS_3$ are located between a second DEMUX and optical-electrical modules 211 to 21M. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 69A and FIG. 69B, a part or all of second electro-optical modules (electro-optical modules 221 to 22M) each receive a dedicated optical carrier from the transmit link and implement modulation. There are a plurality of RX multi-wavelength light source modules in a BBU.

Figure 70A:
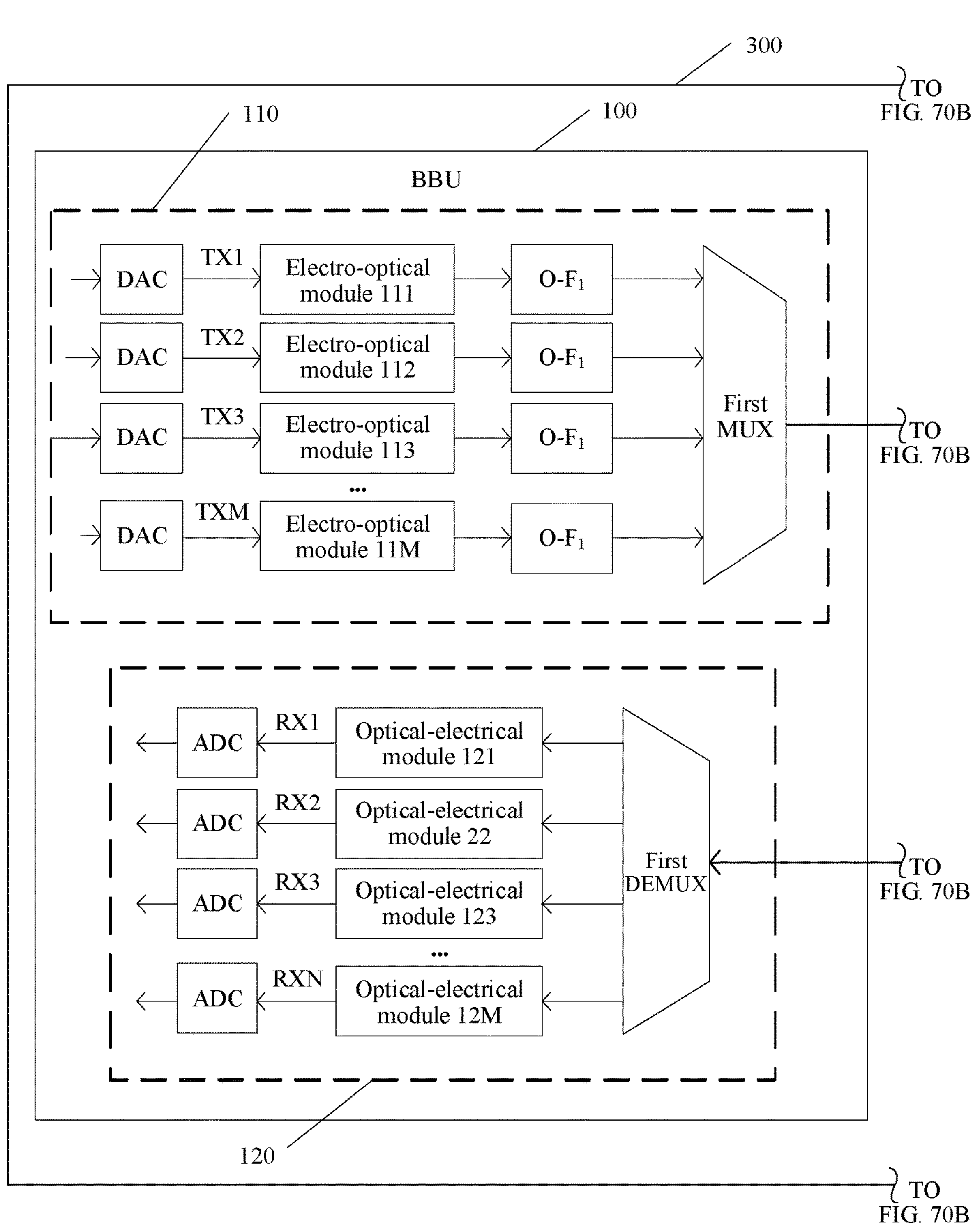
Figure 70B:
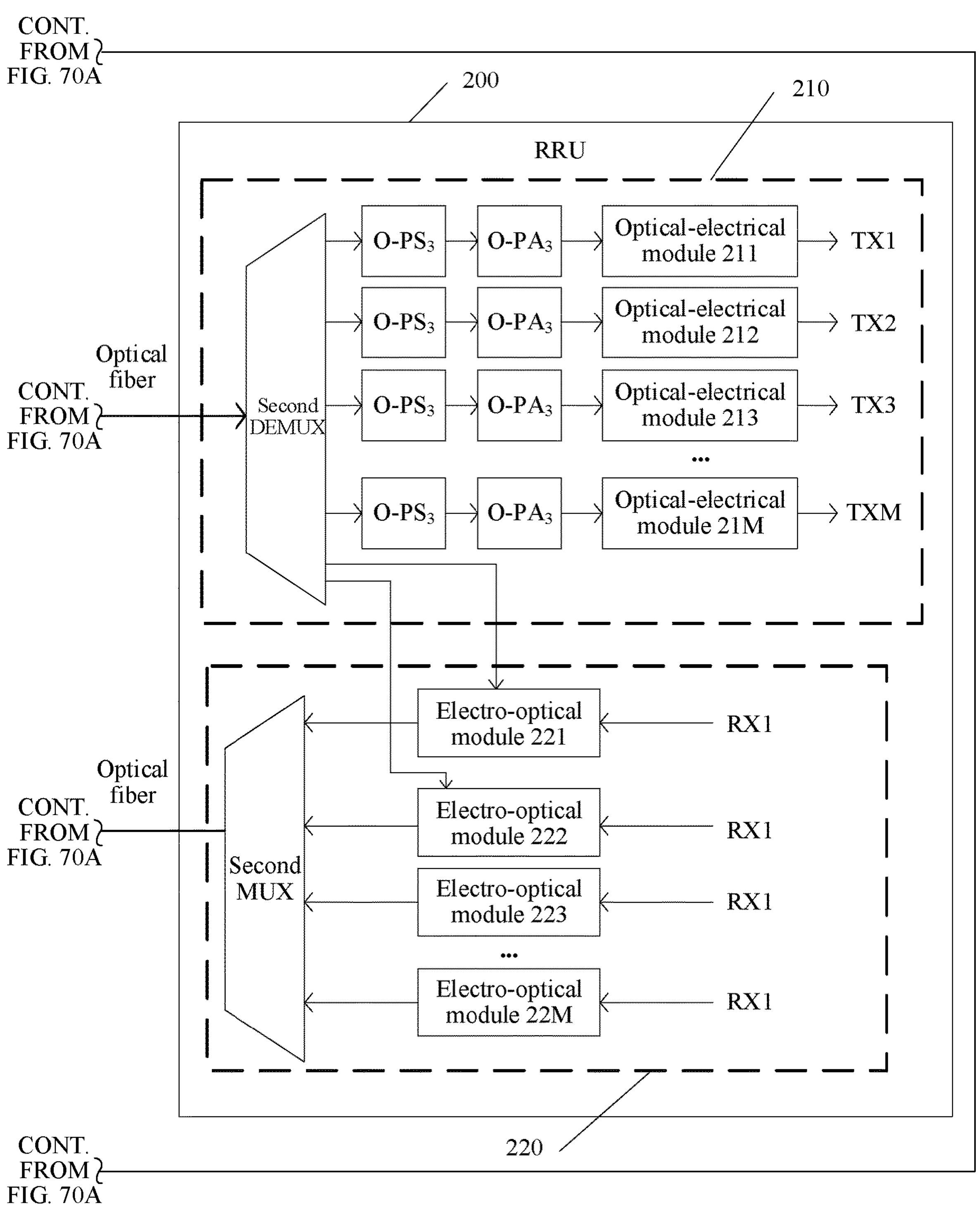

FIG. 70A and FIG. 70B are a schematic block diagram of a possible structure of the communications apparatus 300. As shown in FIG. 70A and FIG. 70B, the communications apparatus 300 includes a central unit 100 and a remote unit 200. Neither a receive link 120 nor a receive link 220 includes an optical processing module. A transmit link 110 includes a first optical processing module. The first optical processing module includes only an O-$F_1$, and the O-$F_1$ is located between an electro-optical module and a first MUX. A transmit link 210 includes a third optical processing module. The third optical processing module includes an O-$PA_3$ and an O-$PS_3$. The O-$PA_3$ is connected to the O-$PS_3$. The O-$PA_3$ and the O-$PS_3$ are located between a second DEMUX and optical-electrical modules 211 to 21M. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 70A and FIG. 70B, a part or all of second electro-optical modules (electro-optical modules 221 to 22M) each recover an optical carrier from an analog optical signal transmitted in the downlink (the transmit link) and implement electrical signal modulation.

FIG. 70A and FIG. 70B are a schematic block diagram of a possible structure of the communications apparatus 300. As shown in FIG. 70A and FIG. 70B, the communications apparatus 300 includes a central unit 100 and a remote unit 200. Neither a receive link 120 nor a receive link 220 includes an optical processing module. A transmit link 110 includes a first optical processing module. The first optical processing module includes an O-$F_1$ and an O-$PA_1$, the O-$F_1$ is connected to the O-$PA_1$, and the O-$F_1$ and the O-$PA_1$ are located between an electro-optical module and a first MUX. A transmit link 210 includes a third optical processing module. The third optical processing module includes an O-$PA_3$. The O-$PS_3$ is located between a second DEMUX and optical-electrical modules 211 to 21M. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 70A and FIG. 70B, a part or all of second electro-optical modules (electro-optical modules 221 to 22M) each generate an optical carrier and modulate a radio frequency signal.

Figure 71A:
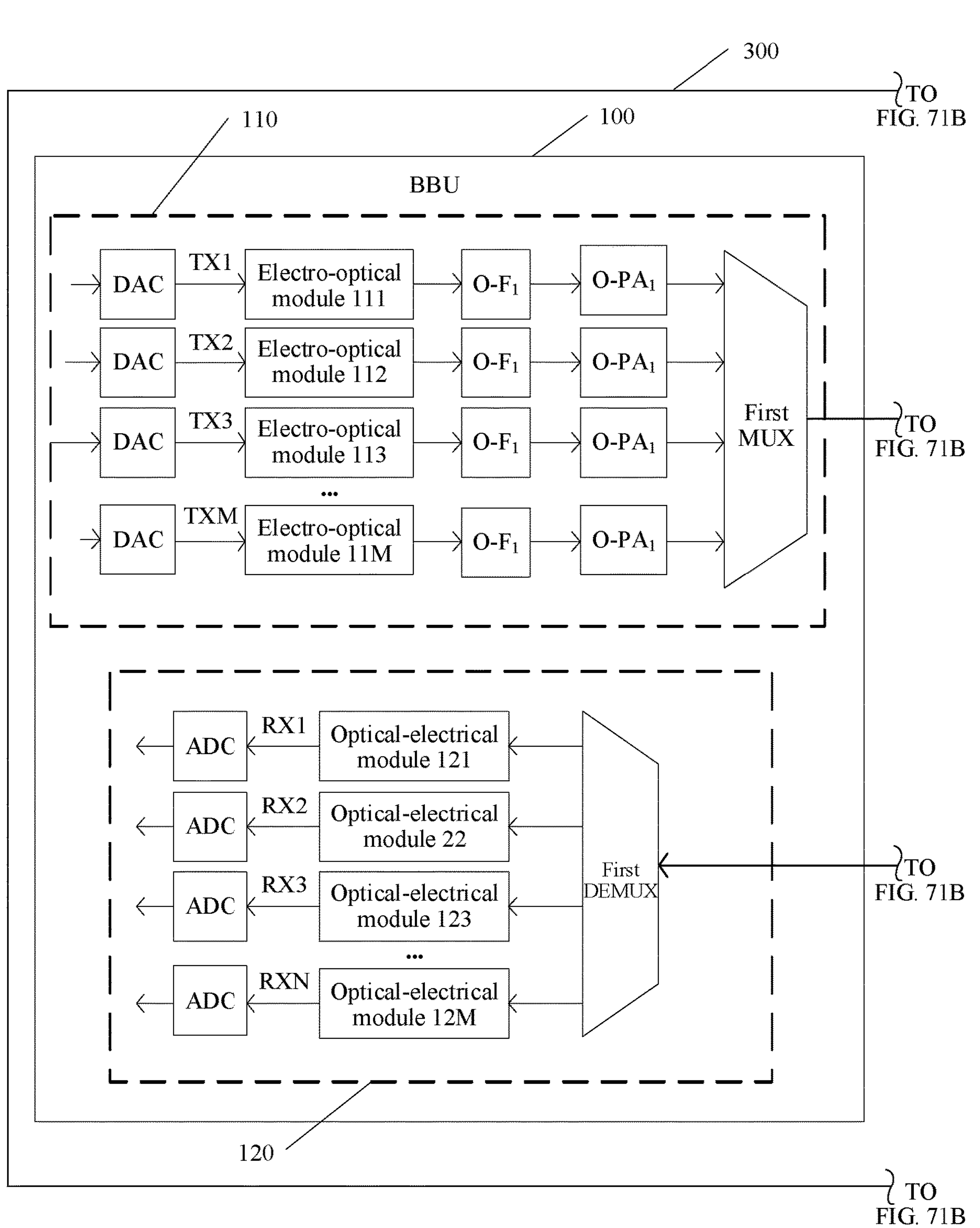
Figure 71B:
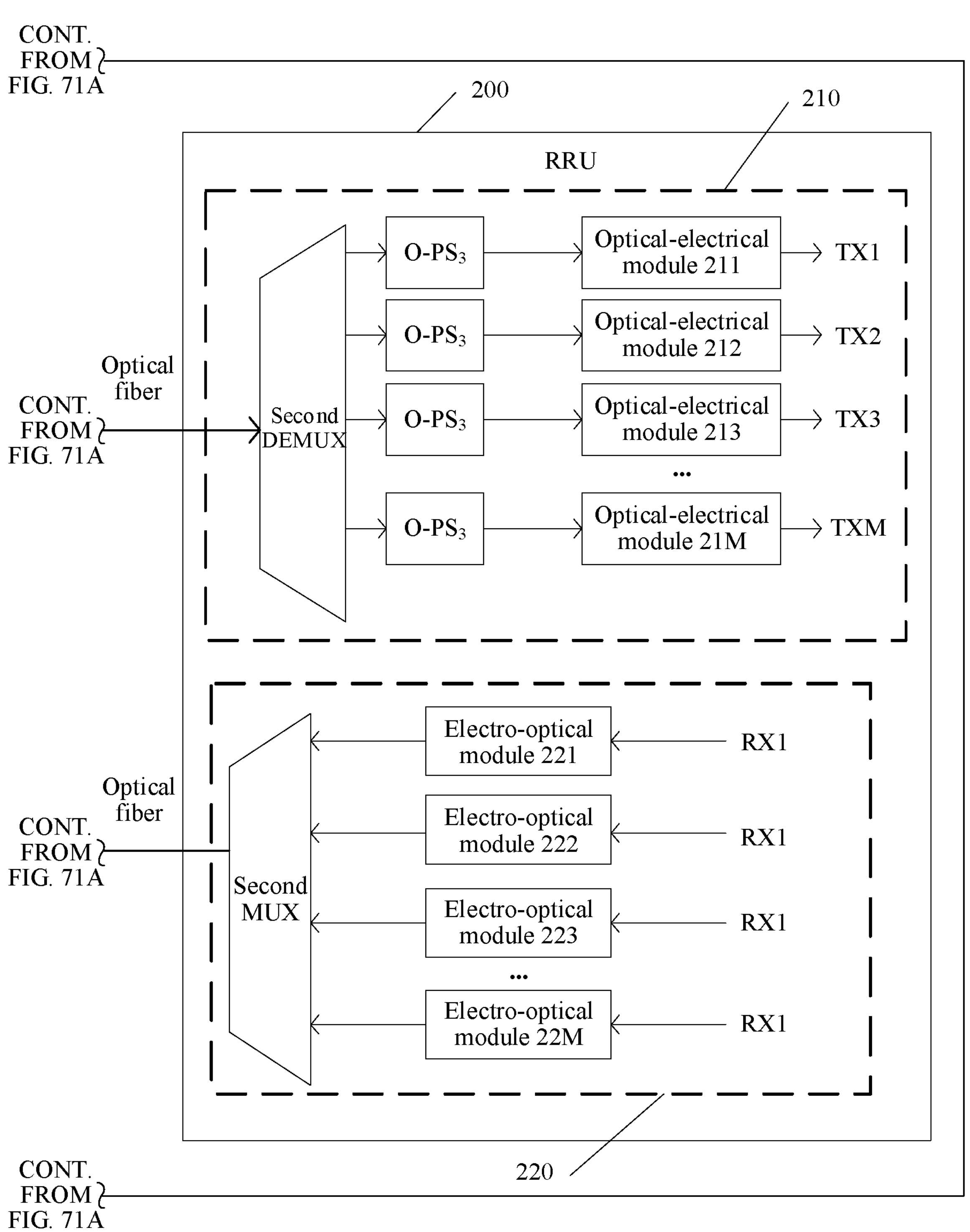

FIG. 71A and FIG. 71B are a schematic block diagram of a possible structure of the communications apparatus 300. As shown in FIG. 71A and FIG. 71B, the communications apparatus 300 includes a central unit 100 and a remote unit 200. Neither a receive link 120 nor a receive link 220 includes an optical processing module. A transmit link 110 includes a first optical processing module. The first optical processing module includes an O-$F_1$ and an O-$PA_1$, the O-$F_1$ is connected to the O-$PA_1$, and the O-$F_1$ and the O-$PA_1$ are located between an electro-optical module and a first MUX. A transmit link 210 includes a third optical processing module. The third optical processing module includes an O-$PA_3$. The O-$PS_3$ is located between a second DEMUX and optical-electrical modules 211 to 21M. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 71A and FIG. 71B, a part or all of second electro-optical modules (electro-optical modules 221 to 22M) each receive a dedicated optical carrier from the transmit link and implement modulation. There are a plurality of RX multi-wavelength light source modules in a BBU.

Figure 72A:
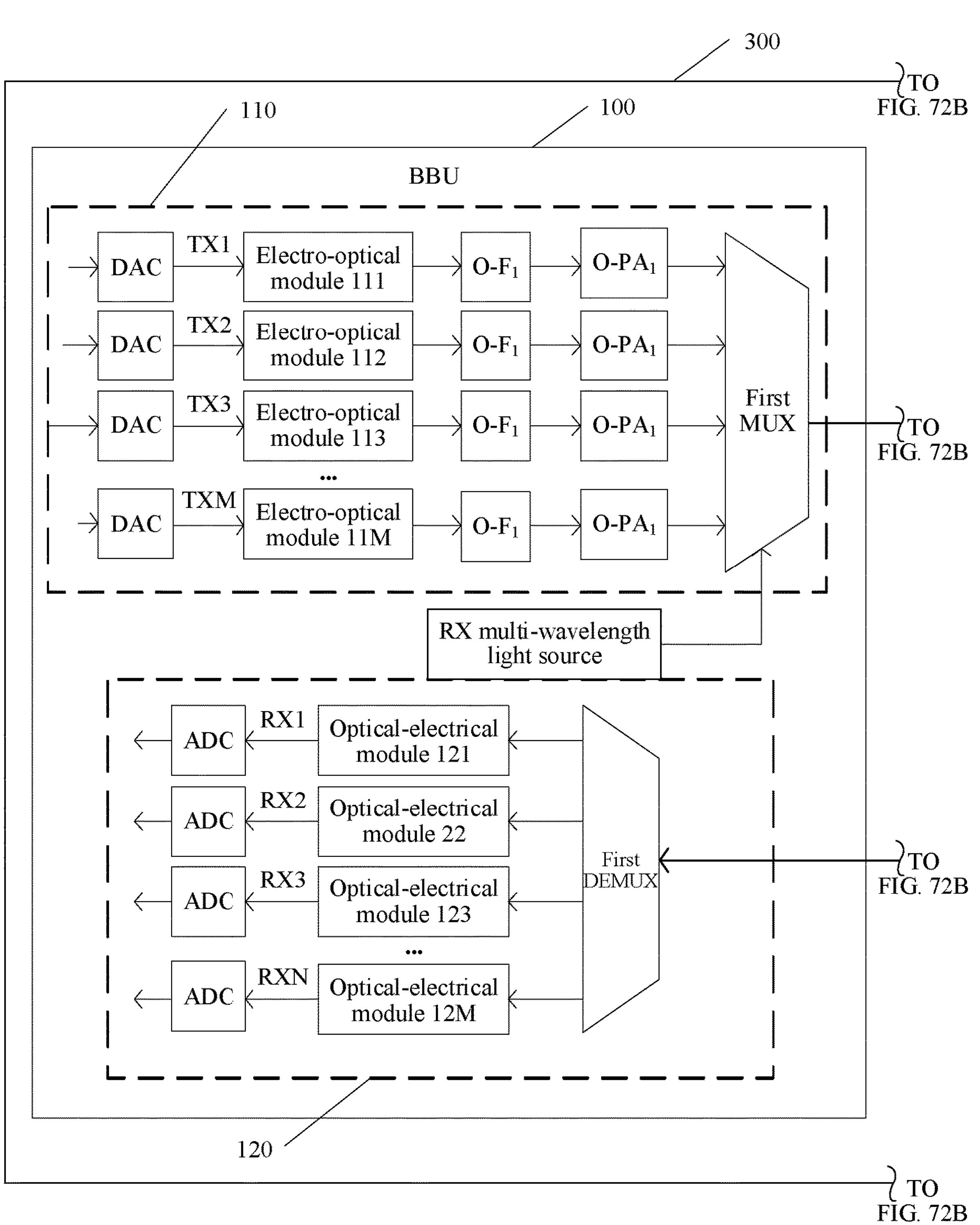
Figure 72B:
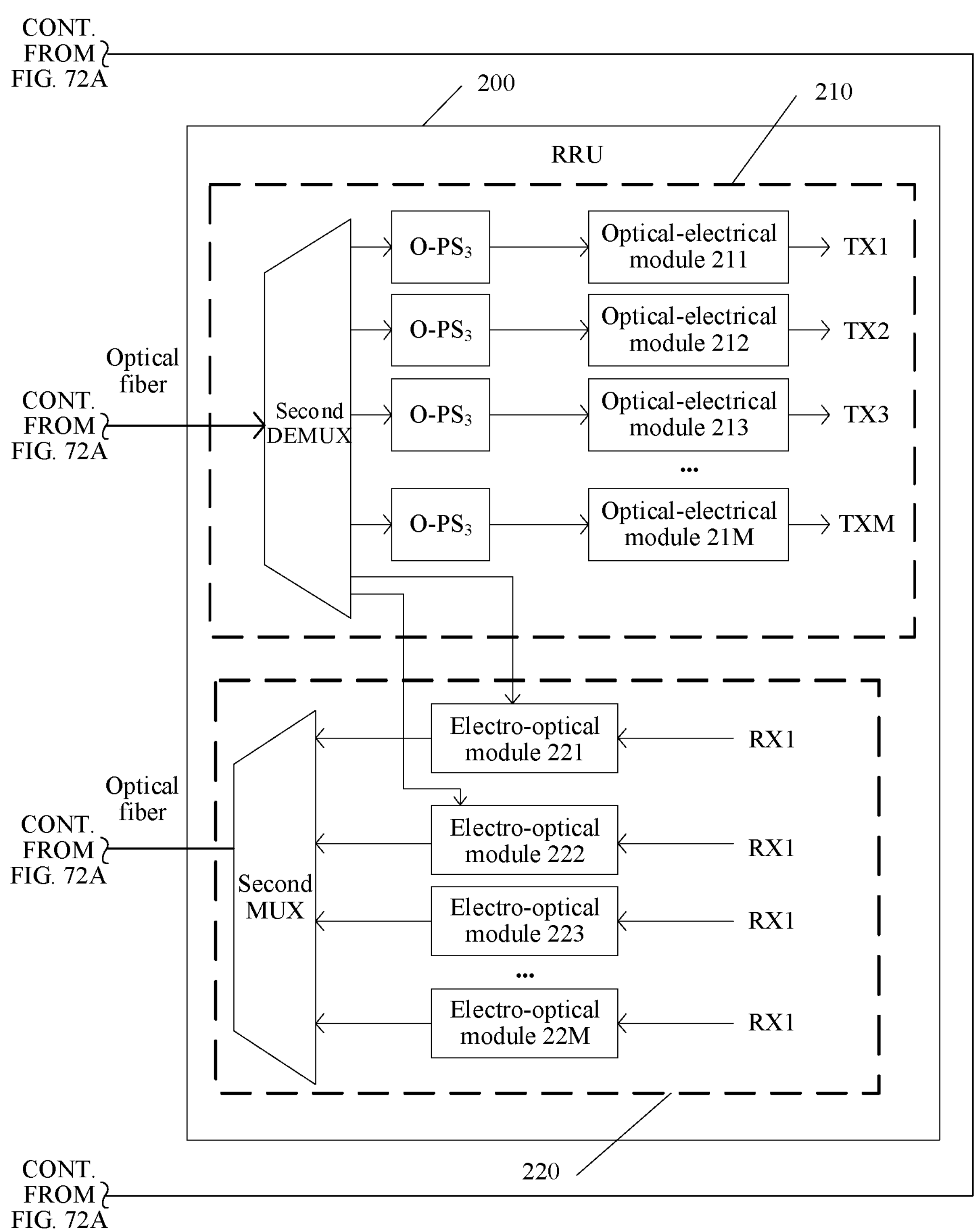

FIG. 72A and FIG. 72B are a schematic block diagram of a possible structure of the communications apparatus 300. As shown in FIG. 72A and FIG. 72B, the communications apparatus 300 includes a central unit 100 and a remote unit 200. Neither a receive link 120 nor a receive link 220 includes an optical processing module. A transmit link 110 includes a first optical processing module. The first optical processing module includes an O-$F_1$ and an O-$PA_1$, the O-$F_1$ is connected to the O-$PA_1$, and the O-$F_1$ and the O-$PA_1$ are located between an electro-optical module and a first MUX. A transmit link 210 includes a third optical processing module. The third optical processing module includes an O-$PA_3$. The O-$PS_3$ is located between a second DEMUX and optical-electrical modules 211 to 21M. For processing processes of a TX signal and an RX signal, refer to the foregoing descriptions of the processing processes of the TX signal and the RX signal in the central unit 100 and the remote unit 200. For brevity, details are not described herein again. In addition, in the architecture shown in FIG. 72A and FIG. 72B, a part or all of second electro-optical modules (electro-optical modules 221 to 22M) each recover an optical carrier from an analog optical signal transmitted in the downlink (the transmit link) and implement electrical signal modulation.

Figure 73A:
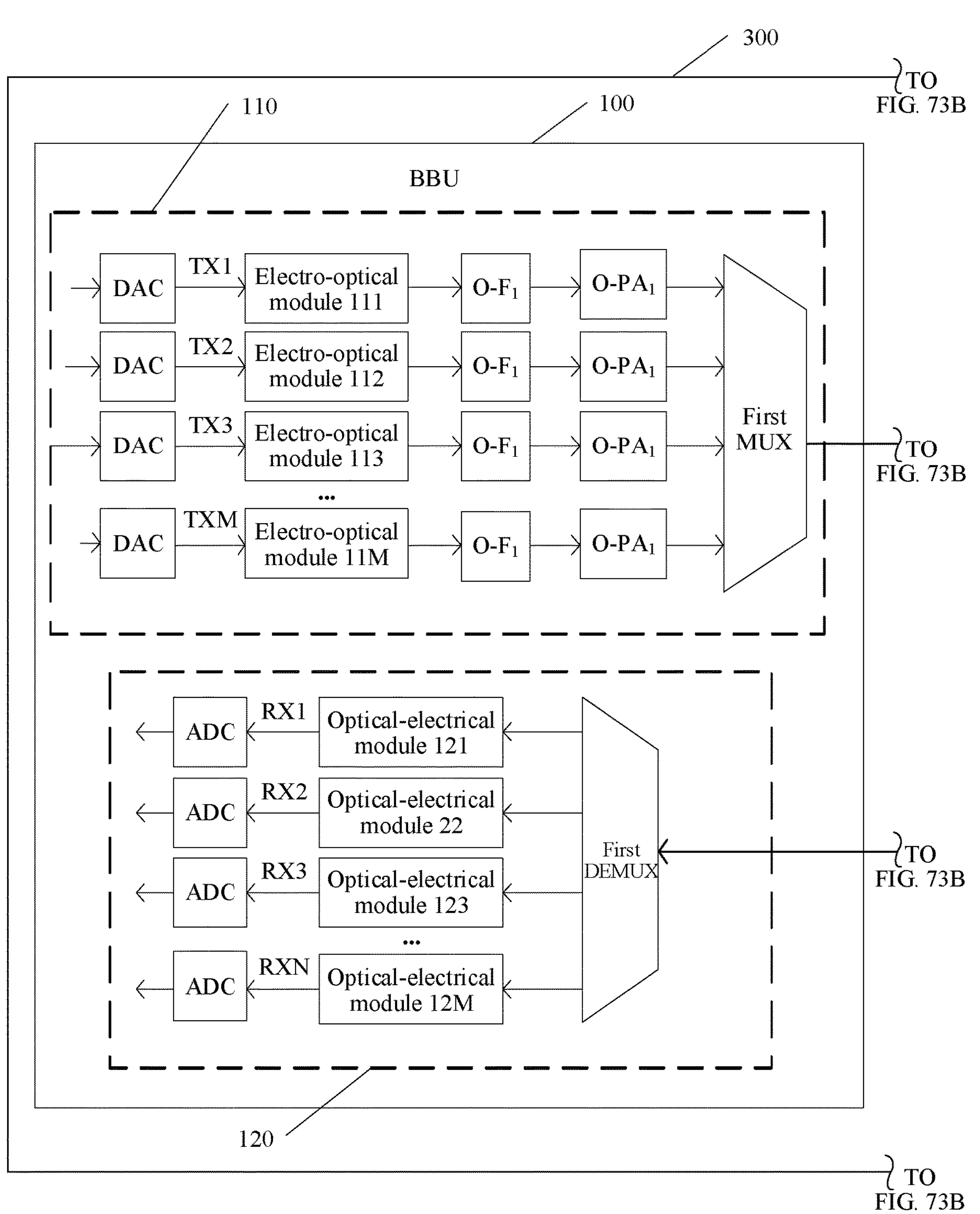
Figure 73B:
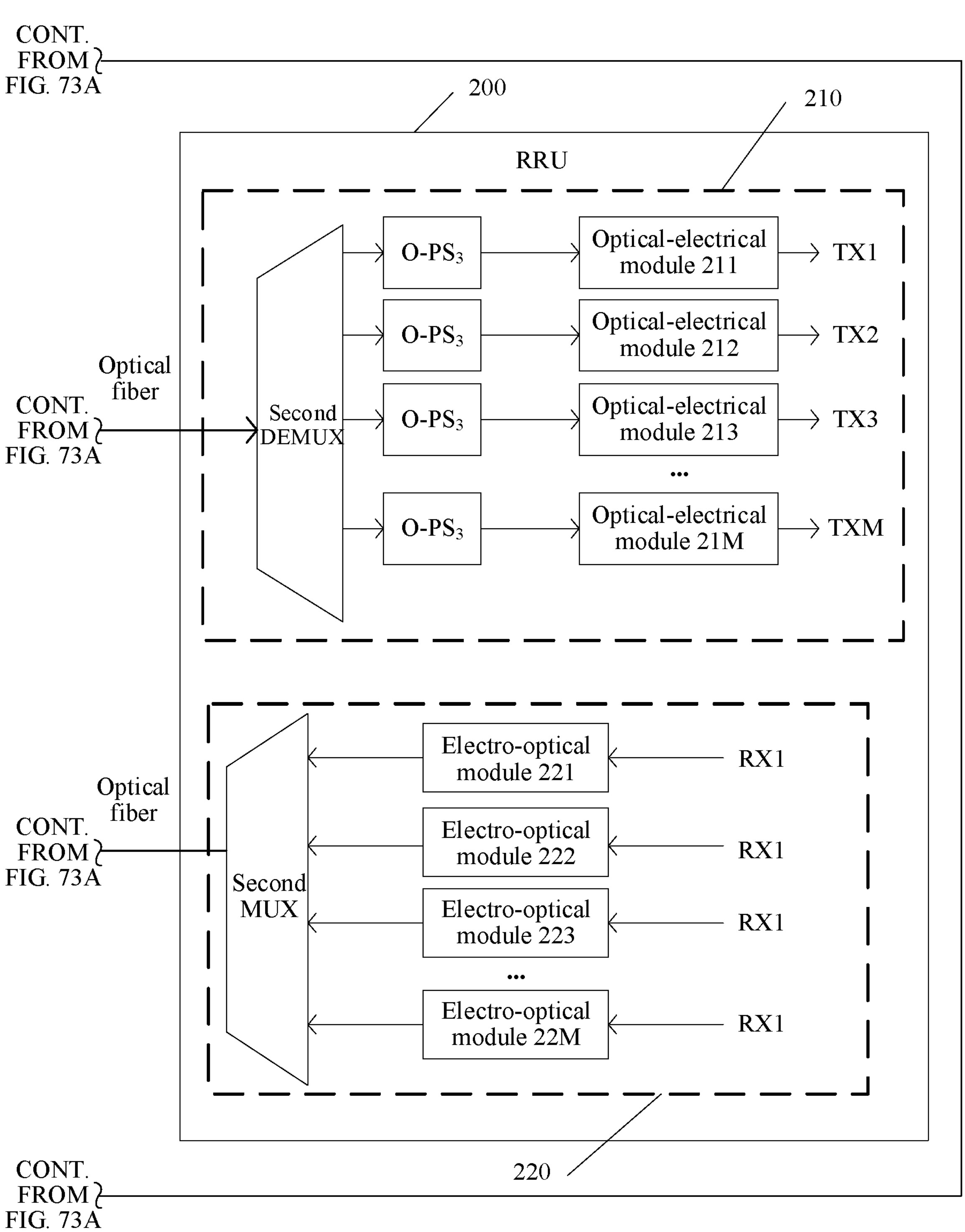

It should be understood that the apparatus 300 may further have a possible architecture form. For example, the central unit 100 includes no optical processing component, and in the remote unit 200, only the transmit link 210 includes a part or all of modules of the third optical processing module. As shown in FIG. 73A and FIG. 73B, the third optical processing module in the transmit link 210 includes only an O-$PS_3$.

For another example, for the apparatus 300, in the central unit 100, the transmit link 110 includes a part or all of modules of the first optical processing module, and the receive link 120 includes no optical processing module. The remote unit 200 includes no optical processing module or the like. In other words, in embodiments of this application, for the transmit link or the receive link, all or a part of optical processing components may be located in the remote unit, and there is no optical processing component in the central unit. Alternatively, all or a part of optical processing components may be located in the central unit, and there is no optical processing component in the remote unit. The optical processing components include an O-PA, an O-F, an O-PS, and the like.

It should be further understood that, in the foregoing possible implementations of the apparatus 300, the architecture of the apparatus 300 is described merely from various possible forms of the optical processing component included in the transmit link. For the optical processing components included in the receive links 120 and 220, there are also various possible forms similar to those of the first optical processing module and the third optical processing module that are included in the transmit links 110 and 210 respectively. Similarly, any possible form of the receive link may be combined with any possible form of the transmit link, to obtain another possible architecture form of the apparatus 300. This is not limited herein in embodiments of this application.

It should be understood that in the embodiments of this application, "first", "second", and the like are merely for ease of description. For example, the first optical-electrical module and the second optical-electrical module are merely intended to represent different optical-electrical modules. However, optical-electrical modules and a quantity of optical-electrical modules should not be affected. The foregoing first, second, and the like should not constitute any limitation on the embodiments of this application.

It should be further understood that, the foregoing descriptions are merely intended to help a person skilled in the art better understand the embodiments of this application, instead of limiting the scope of the embodiments of this application. It is clear that, a person skilled in the art may make various equivalent modifications or changes based on the foregoing examples. For example, in the embodiments of the central unit 100, the remote unit 200, and the apparatus 300, some electronic elements may be unnecessary, or some electronic elements or the like may be newly added. Alternatively, any two or more of the foregoing embodiments are combined. A modified, changed, or combined solution also falls within the scope of the embodiments of this application.

It should be further understood that the foregoing descriptions of the embodiments of this application emphasize differences between the embodiments. For same or similar parts that are not mentioned, refer to the embodiments. For brevity, details are not described herein again.

It should be further understood that a sequence of performing the foregoing processes for processing various signals should be determined based on functions and internal logic of the processes, and should not constitute any limitation on the implementation processes of the embodiments of this application.

It should be further understood that division of the manners, cases, categories, and embodiments in the embodiments of this application is merely intended for ease of description, and should not constitute a particular limitation. The features in the manners, categories, cases, and embodiments may be combined without contradiction.

It should be further understood that in the embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

An embodiment of this application further provides a communications system. The communications system includes the foregoing terminal device and the foregoing communications apparatus.

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The terms "uplink" and "downlink" in this application are used to describe data/information transmission directions in a specific scenario. For example, an "uplink" direction is usually a direction in which data/information is transmitted from a terminal to a network side, or a direction in which data/information is transmitted from a distributed unit to a centralized unit; and a "downlink" direction is usually a direction in which data/information is transmitted from a network side to a terminal, or a direction in which data/information is transmitted from a centralized unit to a distributed unit. It can be understood that "uplink" and "downlink" are merely used to describe data/information transmission directions, without limiting a specific starting or ending device of data/information transmission.

In this application, names may be assigned to various objects such as messages/information/devices/network elements/systems/apparatuses/actions/operations/procedures/concepts. It can be understood that the specific names do not constitute a limitation on the related objects. The assigned names may vary with factors such as scenarios, contexts, or usage habits. Understanding of technical meanings of technical terms in this application should be determined mainly based on functions and technical effects embodied/performed by the technical terms in the technical solutions.

A person of ordinary skill in the art may be aware that, the units, modules, and the like in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system and apparatus may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A central unit, comprising:

a plurality of digital-to-analog converters (DACs), wherein each DAC is configured to convert a digital electrical signal into an analog electrical signal;

a plurality of first electro-optical converters corresponding to the plurality of DACs, wherein each first electro-optical converter is configured to: obtain the analog electrical signal output by the corresponding DAC, and convert the analog electrical signal into an analog optical signal;

a plurality of first optical processors corresponding to the plurality of first electro-optical converters, wherein each first optical processor is configured to: obtain the analog optical signal output by the corresponding first electro-optical converter, and output an analog optical signal processed by the first optical processor, and wherein the first optical processor comprises at least one of: at least one first optical filter, at least one first optical phase shifter, and at least one first optical power amplifier;

a first multiplexer, wherein the first multiplexer is configured to combine a plurality of analog optical signals output by the plurality of first optical processor into one analog optical signal;

a first demultiplexer, wherein the first demultiplexer is configured to decompose the one analog optical signal into a plurality of analog optical signals at different wavelengths;

at least one first optical-electrical converter, wherein the first optical-electrical converter is configured to convert an analog optical signal at one wavelength into an analog electrical signal; and at least one analog-to-digital converter (ADC), wherein the ADC is configured to convert the analog electrical signal output by the first optical-electrical converter into a digital electrical signal.

2. The central unit according to claim 1, wherein the central unit further comprises:

at least one second optical processor, wherein the second optical processor is configured to: obtain an analog optical signal at one wavelength, and output an analog optical signal processed by the second optical processor, wherein the second optical processor comprises at least one of at least one second optical filter or at least one second optical phase shifter, and wherein the analog optical signal processed by the second optical processor is converted into an analog electrical signal by the first optical-electrical converter.

3. The central unit according to claim 2, wherein the central unit further comprises at least one post optical power amplifier, wherein an input terminal of the post optical power amplifier is connected to an output terminal of the first multiplexer, and wherein the post optical power amplifier is configured to amplify the analog optical signal output by the first multiplexer.

4. The central unit according to claim 3, wherein each first optical processor comprises at least one first optical filter and at least one first optical phase shifter, wherein the first optical filter is connected to the first optical phase shifter, and wherein the first optical filter and the first optical phase shifter are located between the corresponding first electro-optical converter and the first multiplexer.

5. The central unit according to claim 2, wherein the second optical processor comprises at least one second optical filter and at least one second optical phase shifter, wherein the second optical filter is connected to the second optical phase shifter, and wherein the second optical filter and the second optical phase shifter are located between the first optical-electrical converter and the first demultiplexer.

6. The central unit according to claim 2, wherein each first optical processor comprises at least one first optical filter or at least one first optical phase shifter, and wherein the first optical filter or the first optical phase shifter is located between the corresponding first electro-optical converter and the first multiplexer.

7. The central unit according to claim 2, wherein:

the second optical processor comprises at least one second optical filter or at least one second optical phase shifter; and the second optical filter or the second optical phase shifter is located between the first demultiplexer and the first optical-electrical converter.

8. The central unit according to claim 7, wherein the central unit further comprises:

a light source, wherein the light source is configured to generate an optical carrier, and wherein the optical carrier is used to generate an analog optical signal.

9. The central unit according to claim 8, wherein the analog electrical signal obtained by each first electro-optical converter comprises a plurality of analog electrical signals at different frequencies; and the central unit further comprises at least one of: at least one electrical power amplifier, at least one electrical phase shifter, and an electrical combiner, wherein:

the electrical power amplifier is configured to amplify an analog electrical signal at one frequency;

the electrical phase shifter is configured to shift a phase of an analog electrical signal at one frequency; and the electrical combiner is configured to: combine the plurality of analog electrical signals at different frequencies into one electrical signal, and then input the one electrical signal into the first electro-optical converter.

10. The central unit according to claim 9, wherein the central unit comprises at least one electrical power amplifier or at least one electrical phase shifter, and the electrical combiner; and an input terminal of the electrical power amplifier or an input terminal of the electrical phase shifter is configured to input an analog electrical signal at one frequency, an output terminal of the electrical power amplifier or an output terminal of the electrical phase shifter is connected to an input terminal of the electrical combiner, and an output terminal of the electrical combiner is connected to an input terminal of the first electro-optical converter.

11. The central unit according to claim 9, wherein the central unit comprises at least one electrical power amplifier and at least one electrical phase shifter; and the electrical power amplifier is connected to the electrical phase shifter, and the electrical power amplifier and the electrical phase shifter are located between the corresponding DAC and the first electro-optical converter.

12. A remote unit, comprising:

a demultiplexer, wherein the demultiplexer is configured to decompose one analog optical signal into a plurality of analog optical signals at different wavelengths;

a plurality of first optical processors, wherein each first optical processor is configured to: obtain an analog optical signal at one wavelength output by the demultiplexer, and output an analog optical signal processed by the first optical processor, and wherein the first optical processor comprises at least one of: at least one third optical filter, at least one third optical phase shifter, and at least one third optical power amplifier;

a plurality of optical-electrical converters corresponding to the plurality of first optical processors, wherein each optical-electrical converter is configured to convert the analog optical signal output by the corresponding first optical processor into an analog electrical signal;

a plurality of electro-optical converters corresponding to the plurality of optical-electrical converters, wherein each electro-optical converter is configured to: obtain the analog electrical signal output by the corresponding optical-electrical converter, and convert the analog electrical signal into an analog optical signal; and a multiplexer, wherein the multiplexer is configured to combine a plurality of analog optical signals output by the plurality of electro-optical converters into one analog optical signal.

13. The remote unit according to claim 12, wherein the remote unit further comprises:

at least one second optical processor, wherein the second optical processor is configured to: obtain the analog optical signal output by the plurality of electro-optical converters, and output an analog optical signal processed by the second optical processor, wherein the second optical processor comprises at least one of at least one second optical filter or at least one second optical phase shifter, wherein the analog optical signal processed by the second optical processor is received by the multiplexer.

14. The remote unit according to claim 13, wherein the remote unit further comprises at least one pre-optical power amplifier, wherein the pre-optical power amplifier is configured to obtain an analog optical signal and amplify the analog optical signal, and wherein an analog optical signal amplified by the pre-optical power amplifier is received by the demultiplexer.

15. The remote unit according to claim 14, wherein each first optical processor comprises at least one first optical filter and at least one first optical phase shifter, wherein the first optical filter is connected to the first optical phase shifter, and wherein the first optical filter and the first optical phase shifter are located between the demultiplexer and the corresponding optical-electrical converter.

16. The remote unit according to claim 13, wherein the second optical processor comprises at least one second optical filter and at least one second optical phase shifter, wherein the second optical filter is connected to the second optical phase shifter, and wherein the second optical filter and the second optical phase shifter are located between the multiplexer and the plurality of electro-optical converters.

17. The remote unit according to claim 13, wherein:

each first optical processor comprises at least one first optical filter or at least one first optical phase shifter; and the first optical filter or the first optical phase shifter is located between the demultiplexer and the corresponding optical-electrical converter.

18. The remote unit according to claim 13, wherein:

the second optical processor comprises at least one second optical filter or at least one second optical phase shifter; and the second optical filter or the second optical phase shifter is located between the plurality of electro-optical converters and the multiplexer.

19. The remote unit according to claim 18, wherein each electro-optical converter is further configured to: generate an optical carrier, receive a radio frequency signal, modulate the radio frequency signal to the optical carrier, and output an analog optical signal.

20. The remote unit according to claim 18, wherein:

the demultiplexer is further configured to decompose one optical carrier input into the demultiplexer into a plurality of optical carriers at different wavelengths; and each electro-optical converter is further configured to: obtain the optical carrier, receive a radio frequency signal, modulate the radio frequency signal to the optical carrier, and output an analog optical signal.

* * * * *